Figure 1:
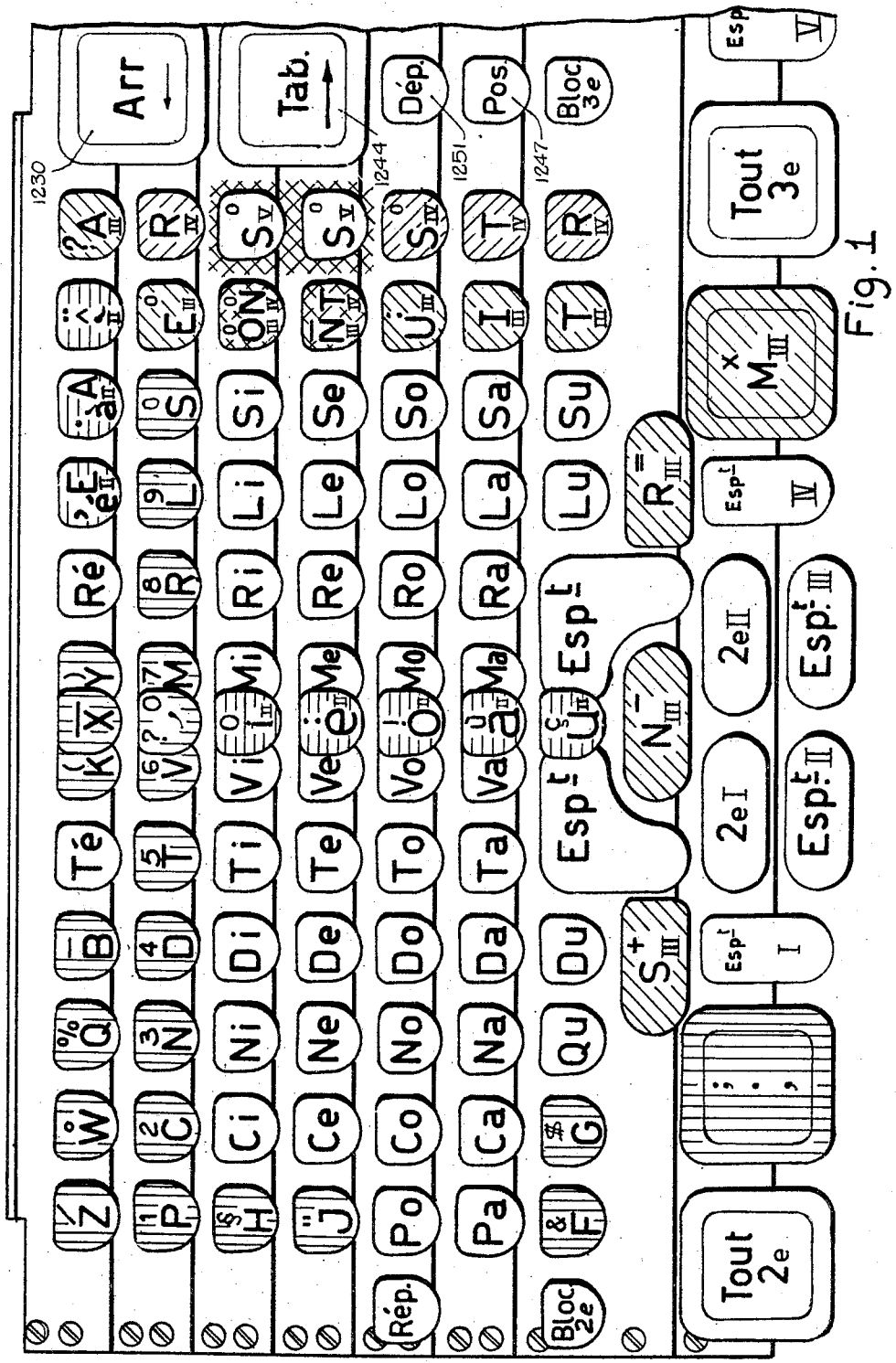

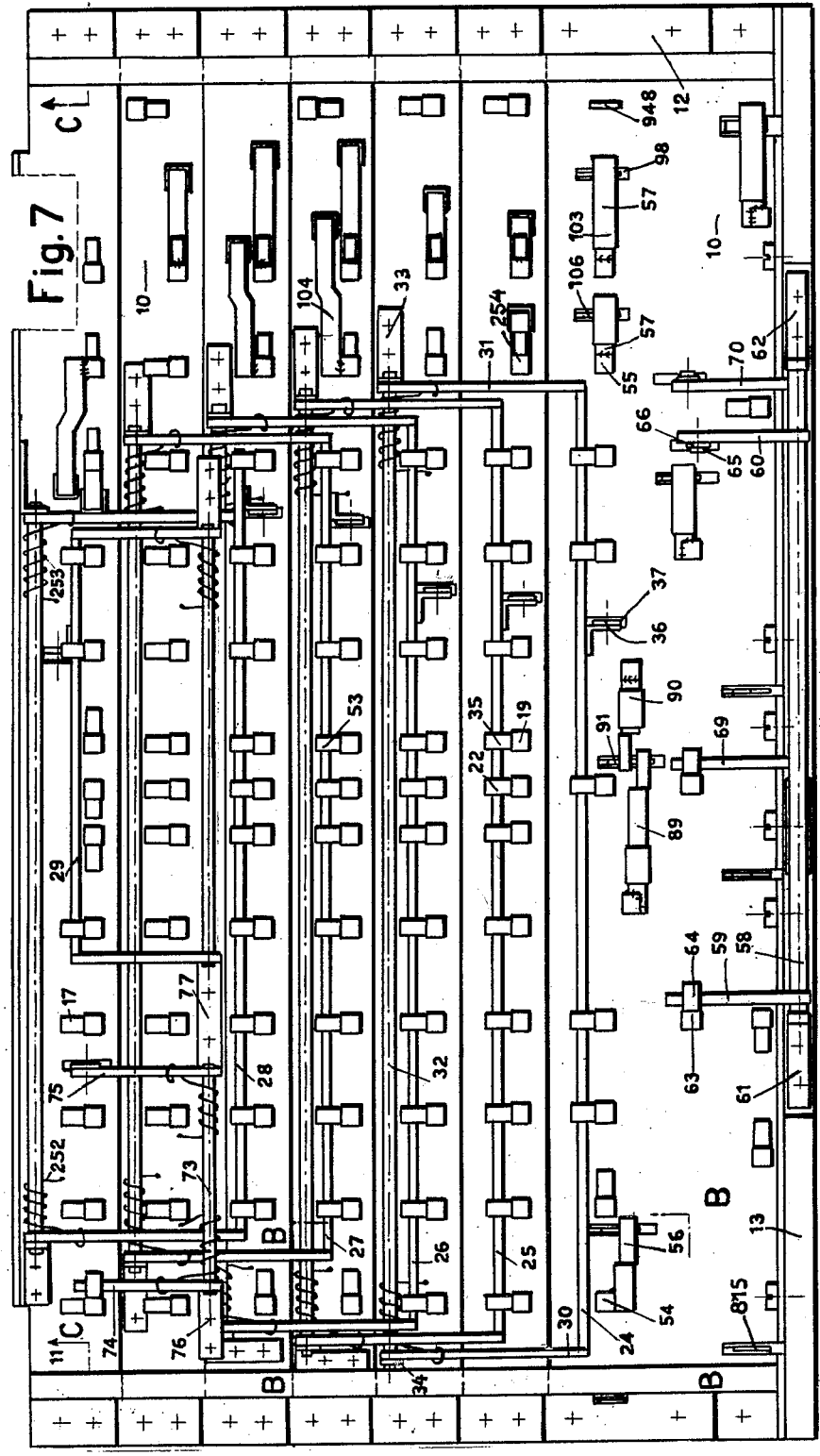

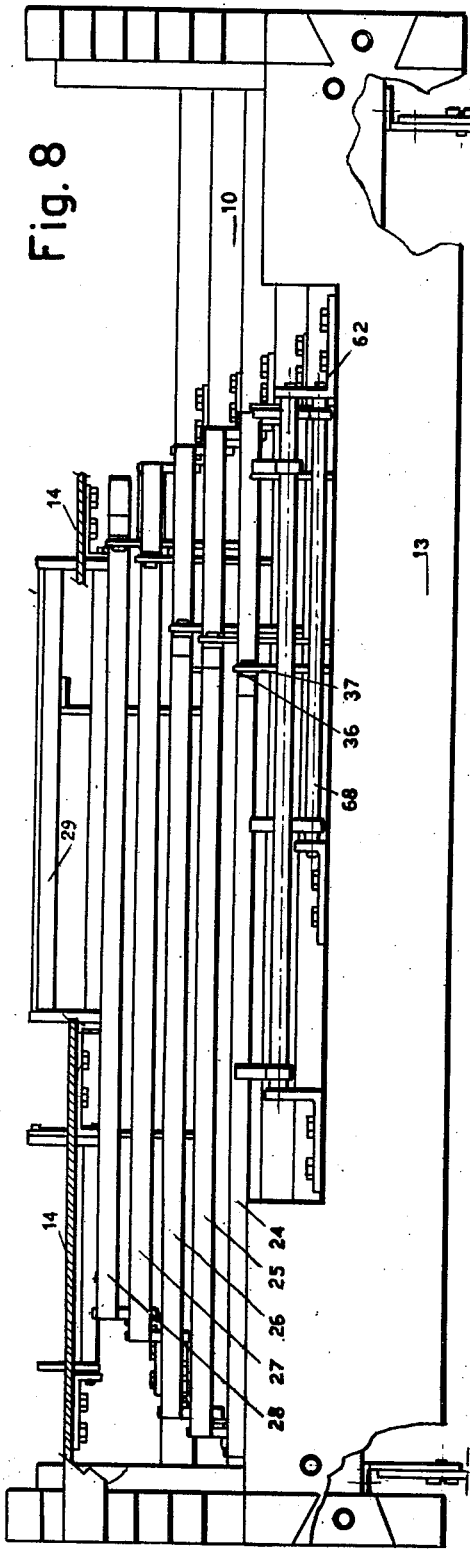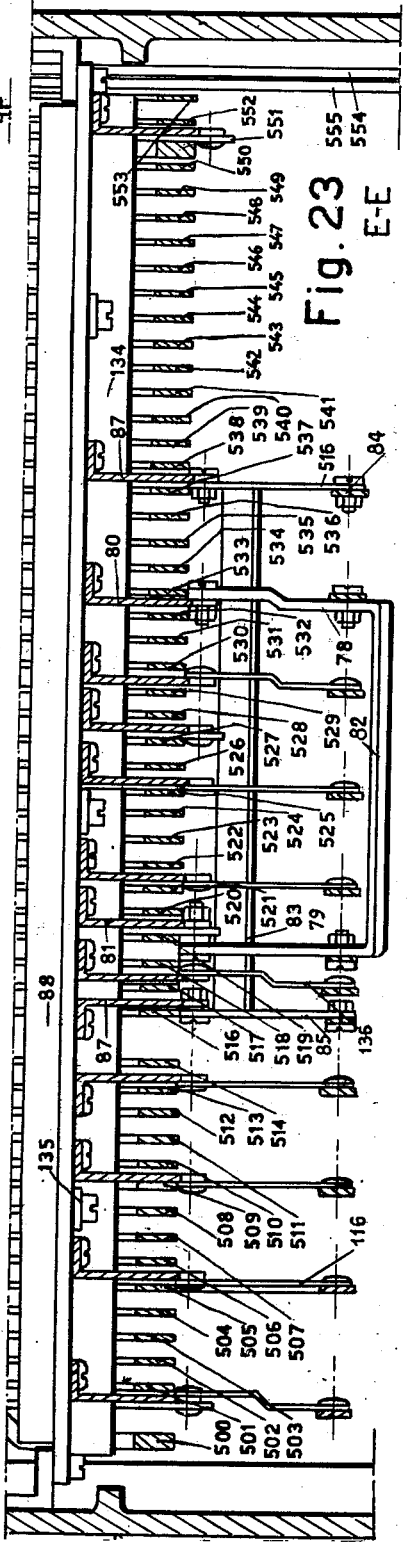

Jan. 15, 1963    J. GREMILLET    3,073,427
MACHINE FOR TYPEWRITING, STENOTYPING OR TELEPRINTING, ENABLING
THE SIMULTANEOUS OPERATION OF SEVERAL CHARACTER
AND SPACE KEYS, SINGLE OR MULTIPLE
Filed July 31, 1959    57 Sheets-Sheet 9
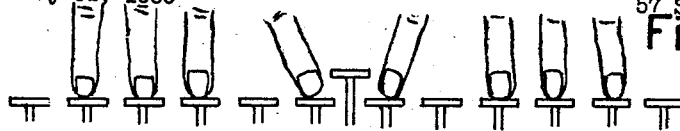
Fig. 11
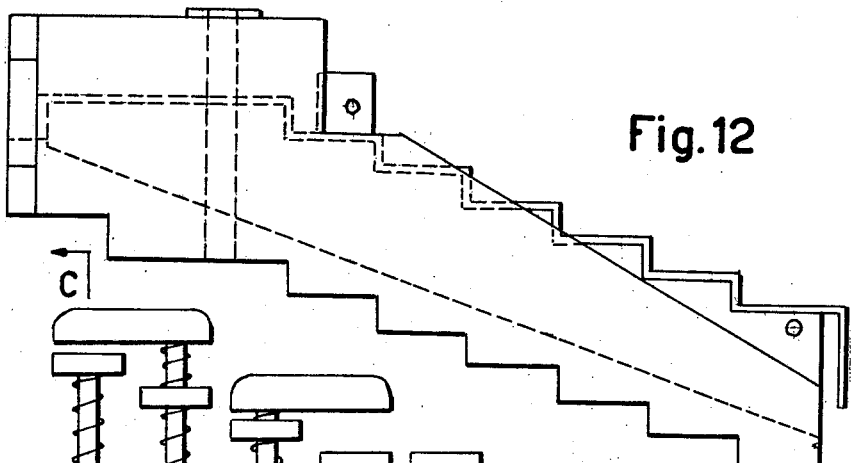
Fig. 12
Fig. 13
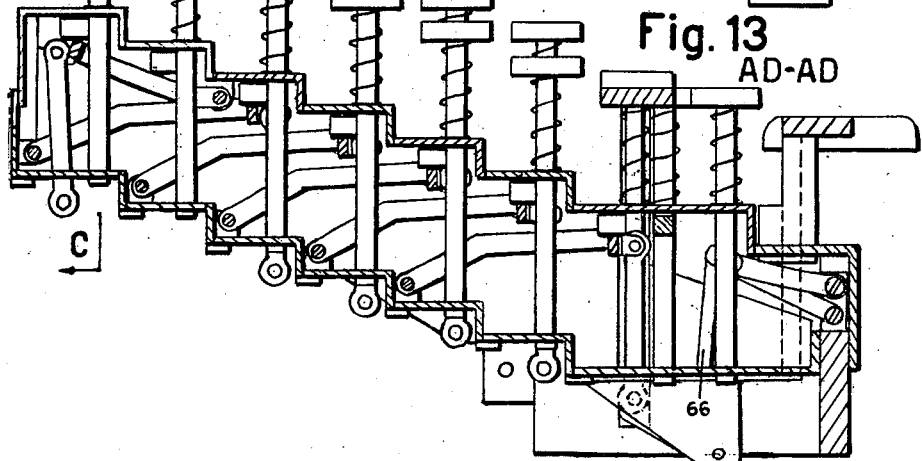
Fig. 14
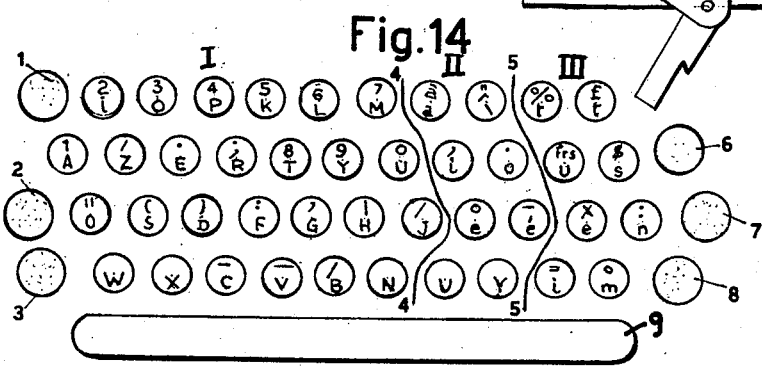

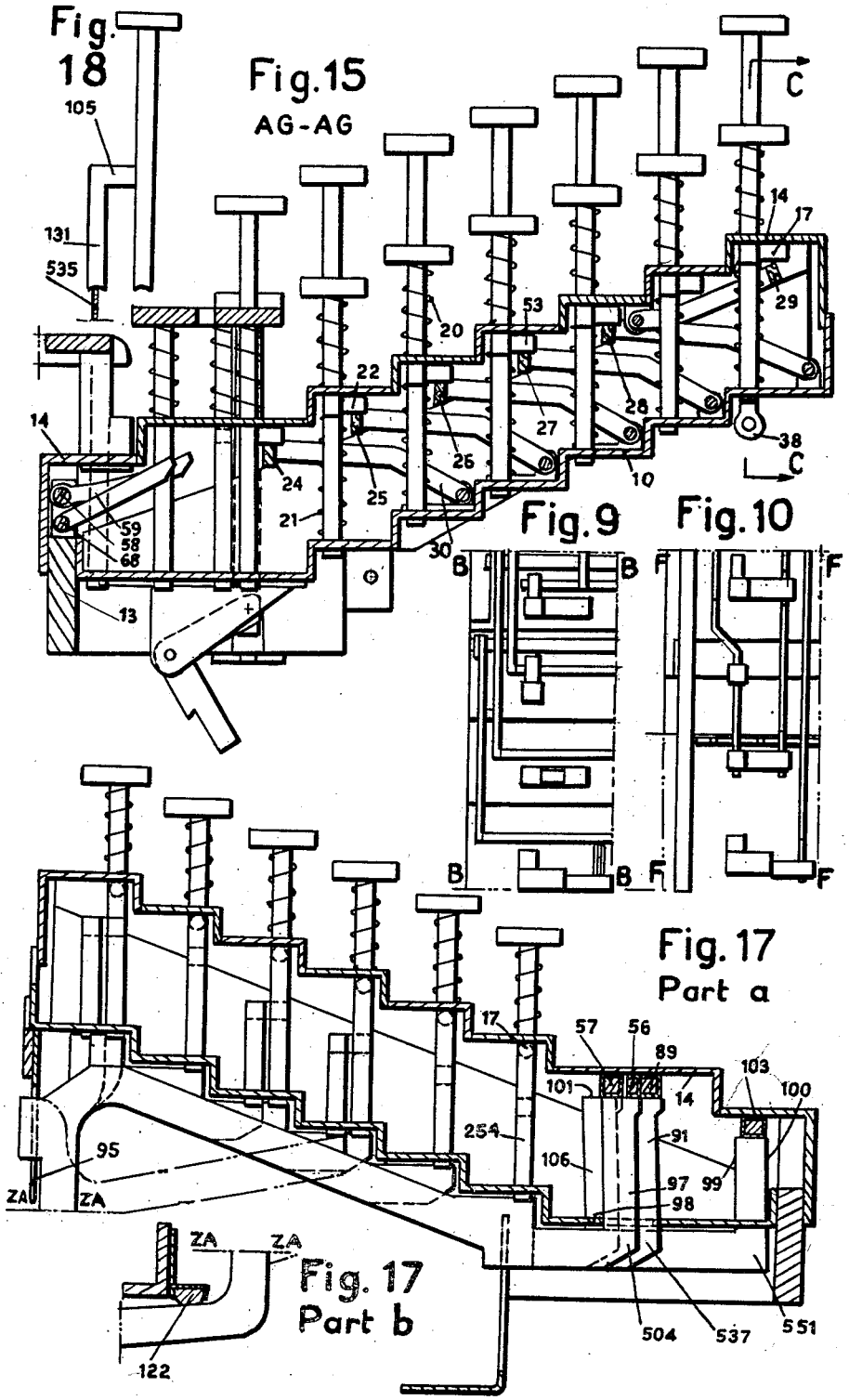

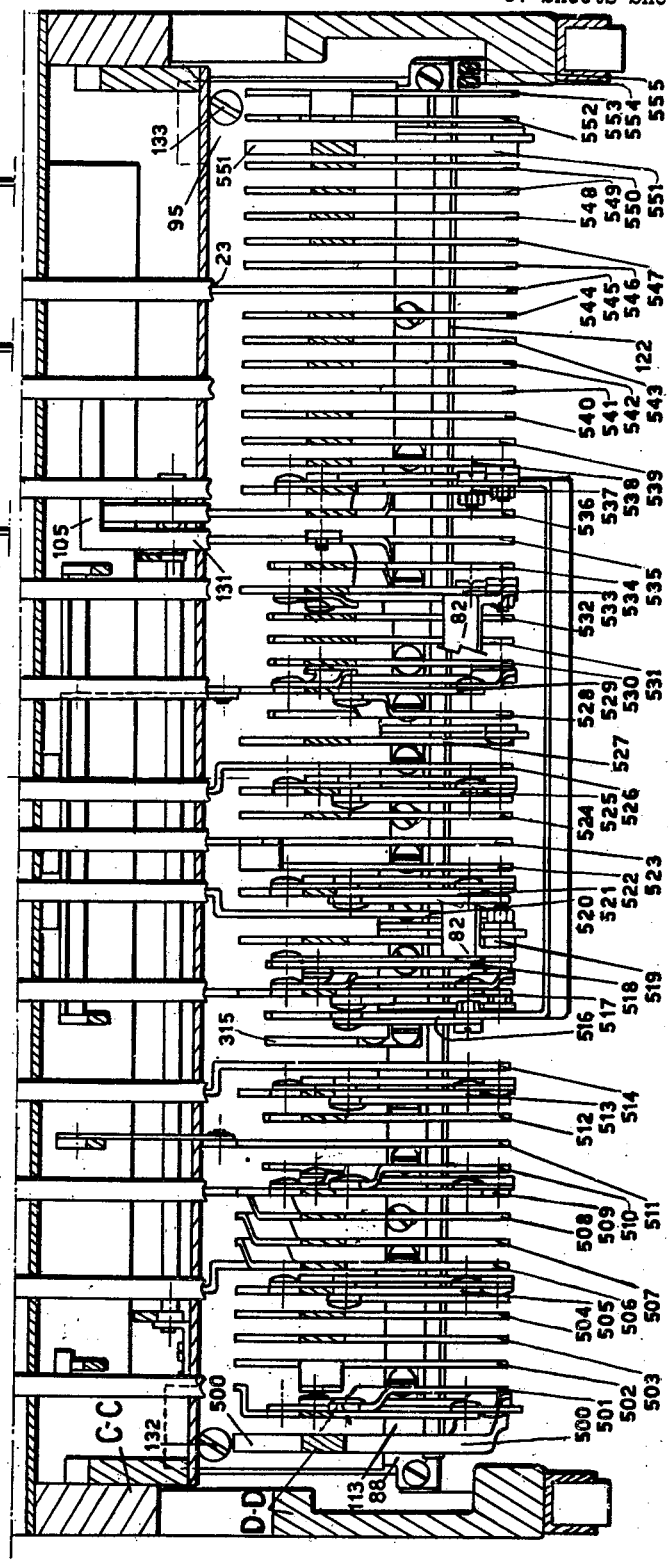

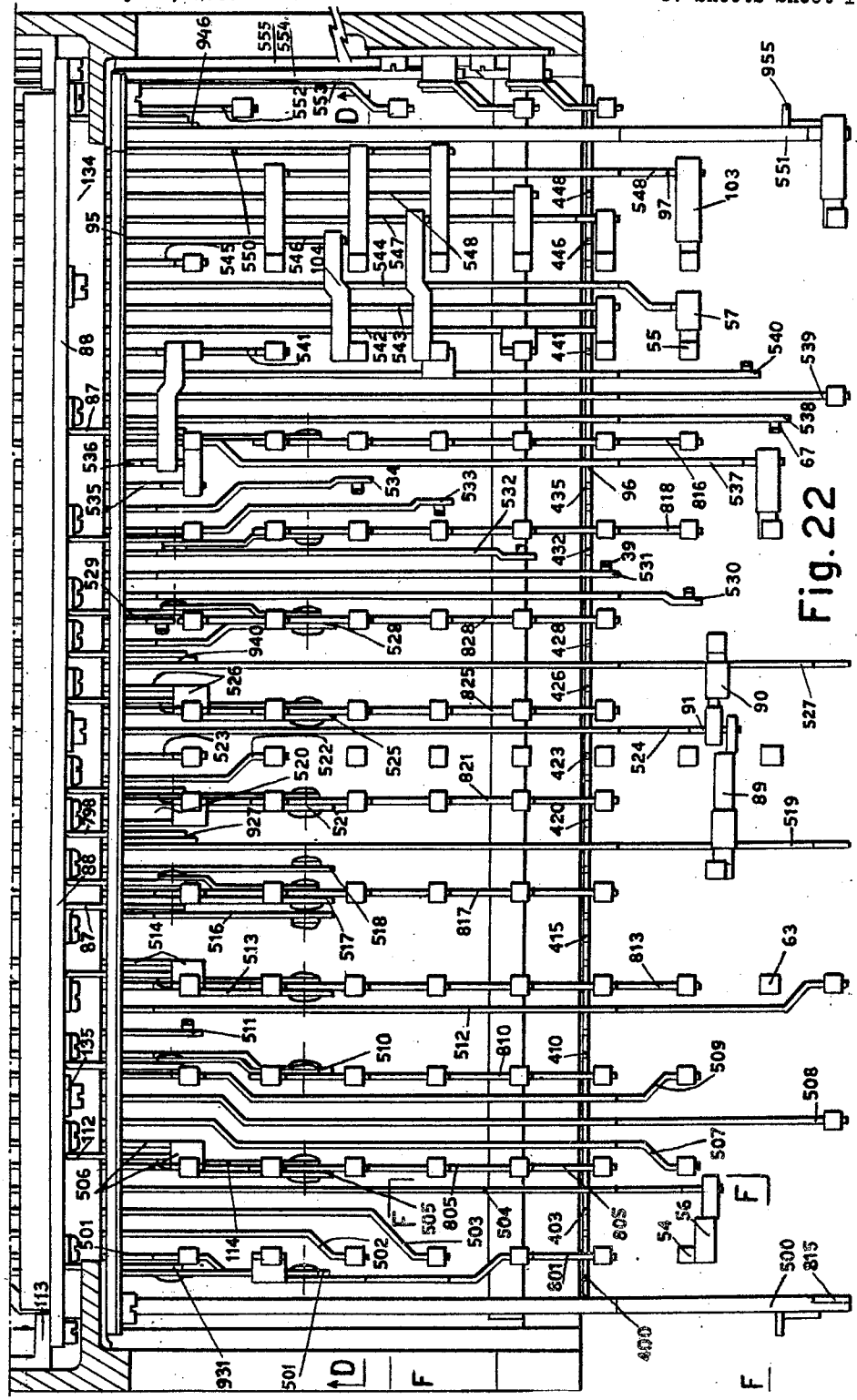

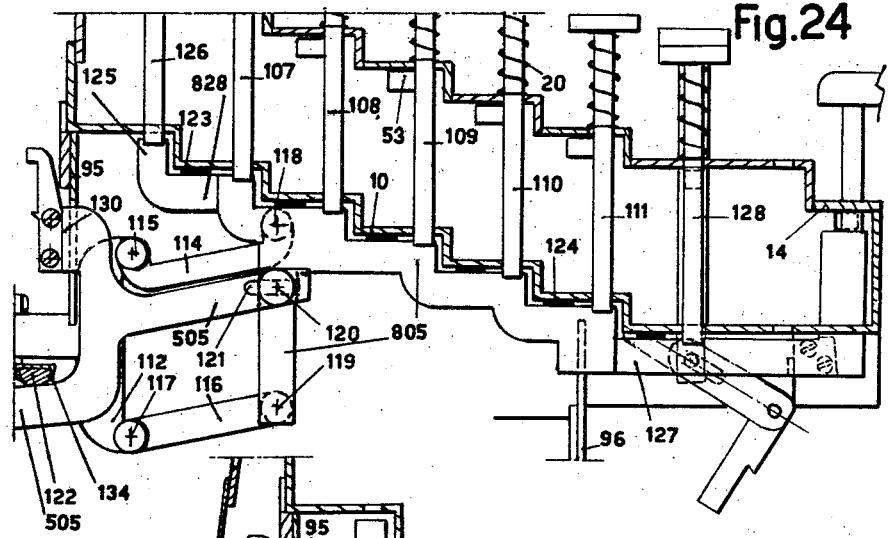
Fig. 24
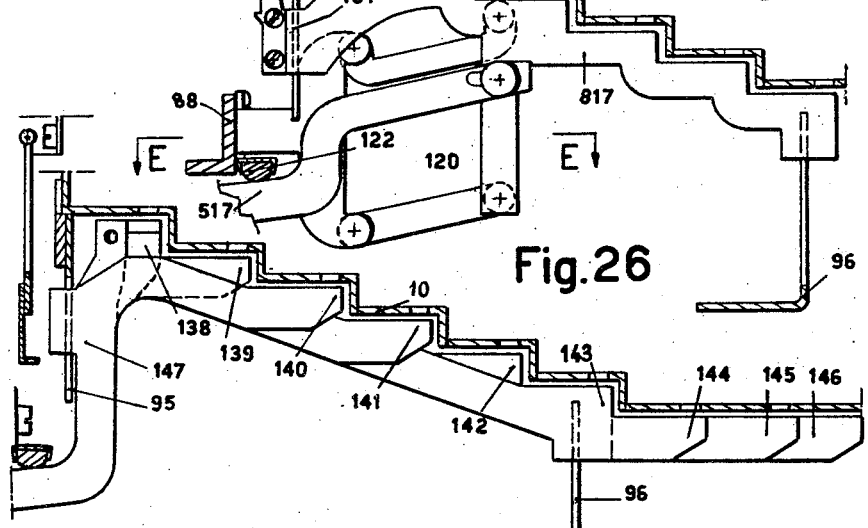
Fig. 25
Fig. 26
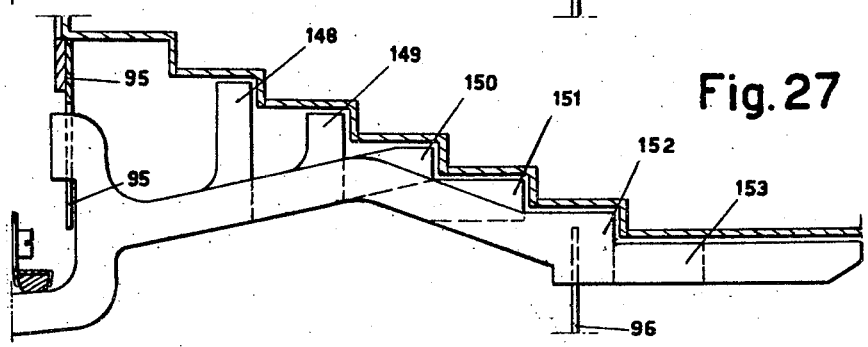
Fig. 27

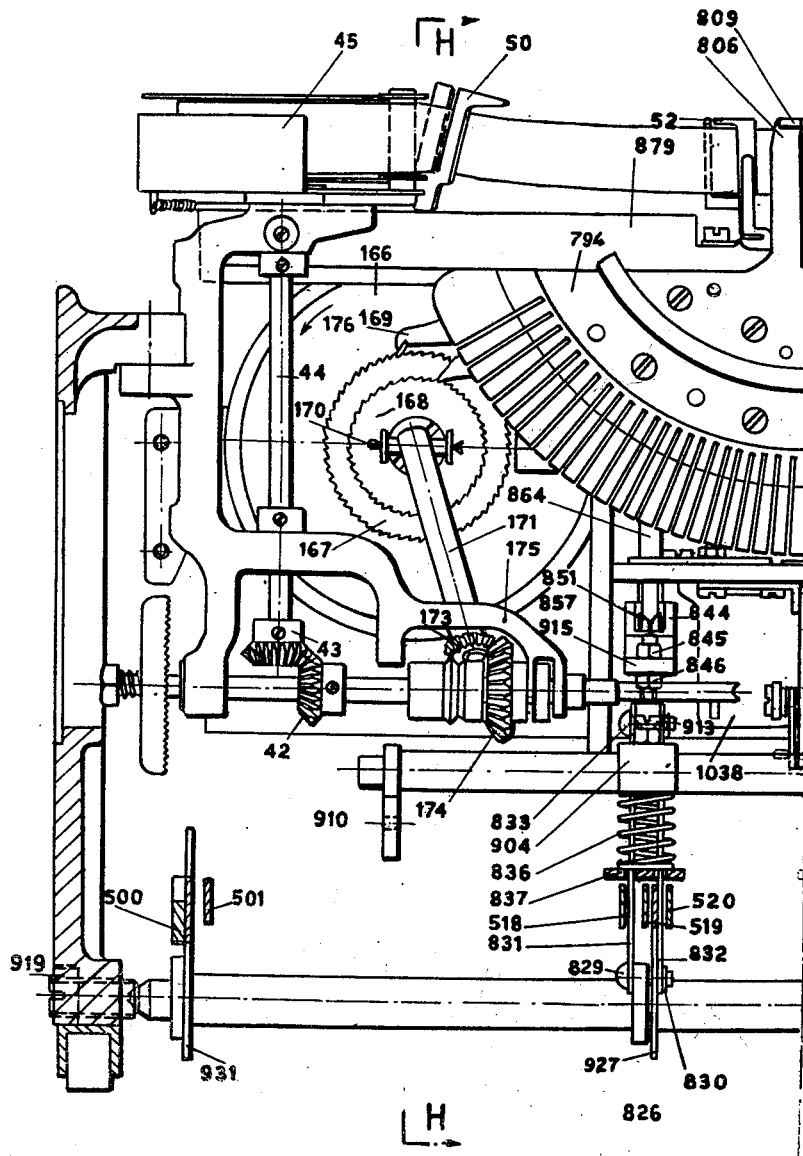
Fig. 28 Part a
G-G

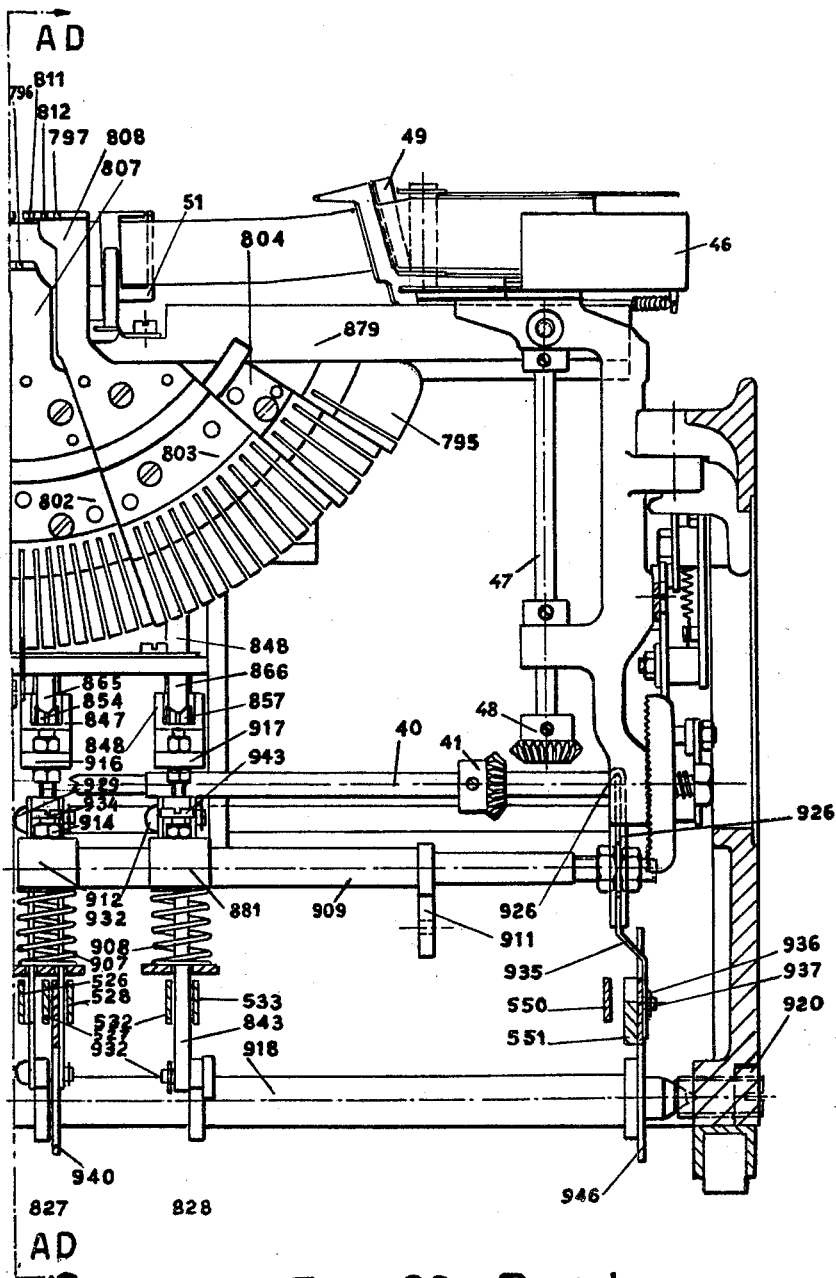

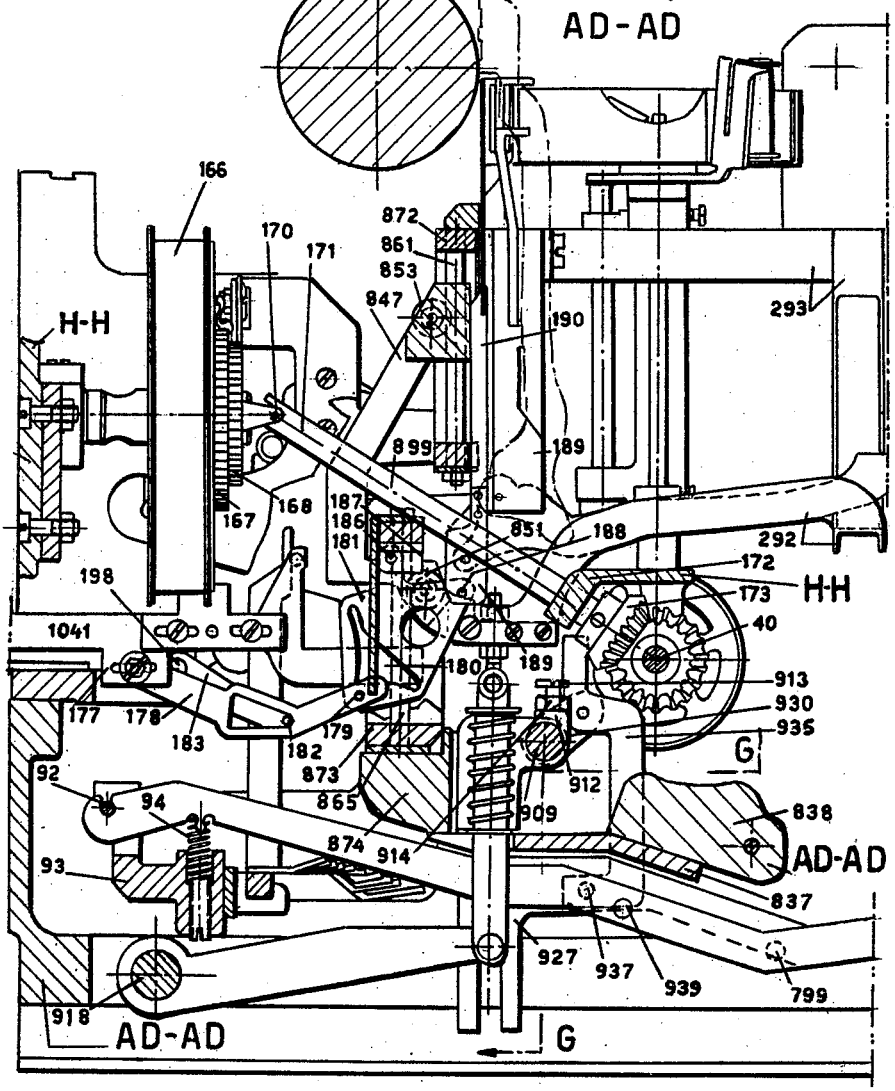

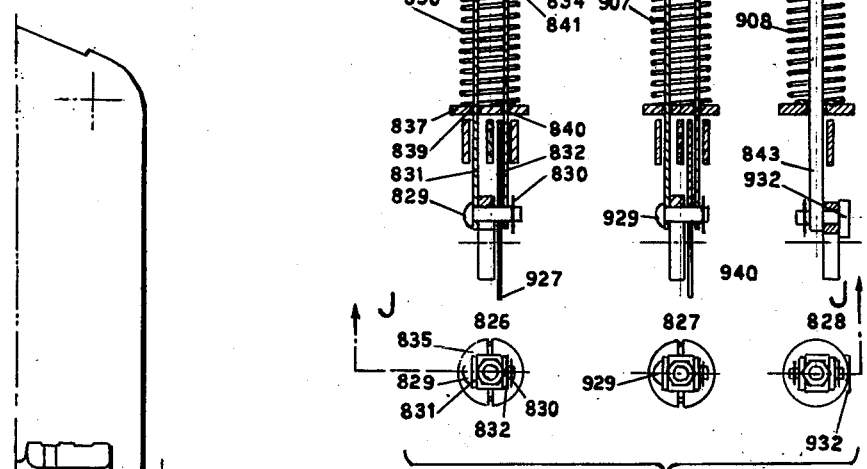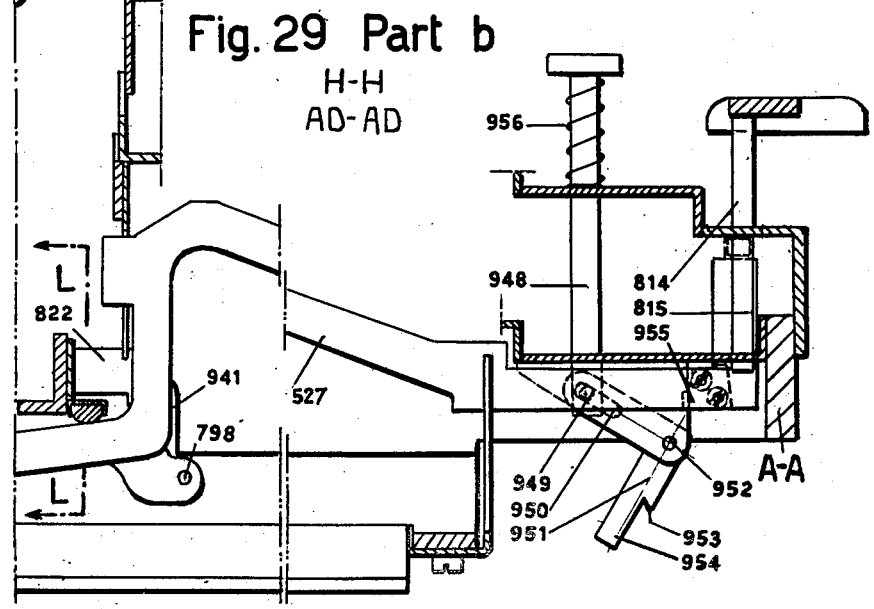

Fig. 33 Part a
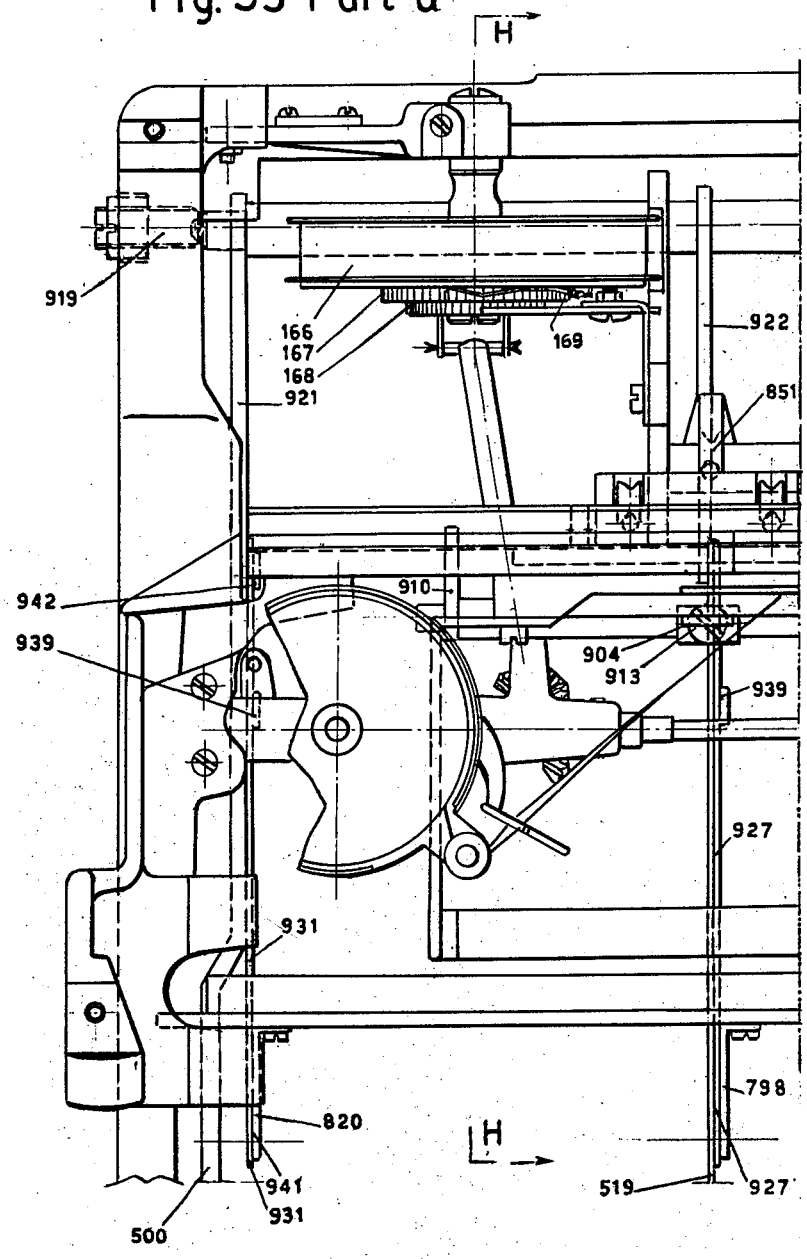

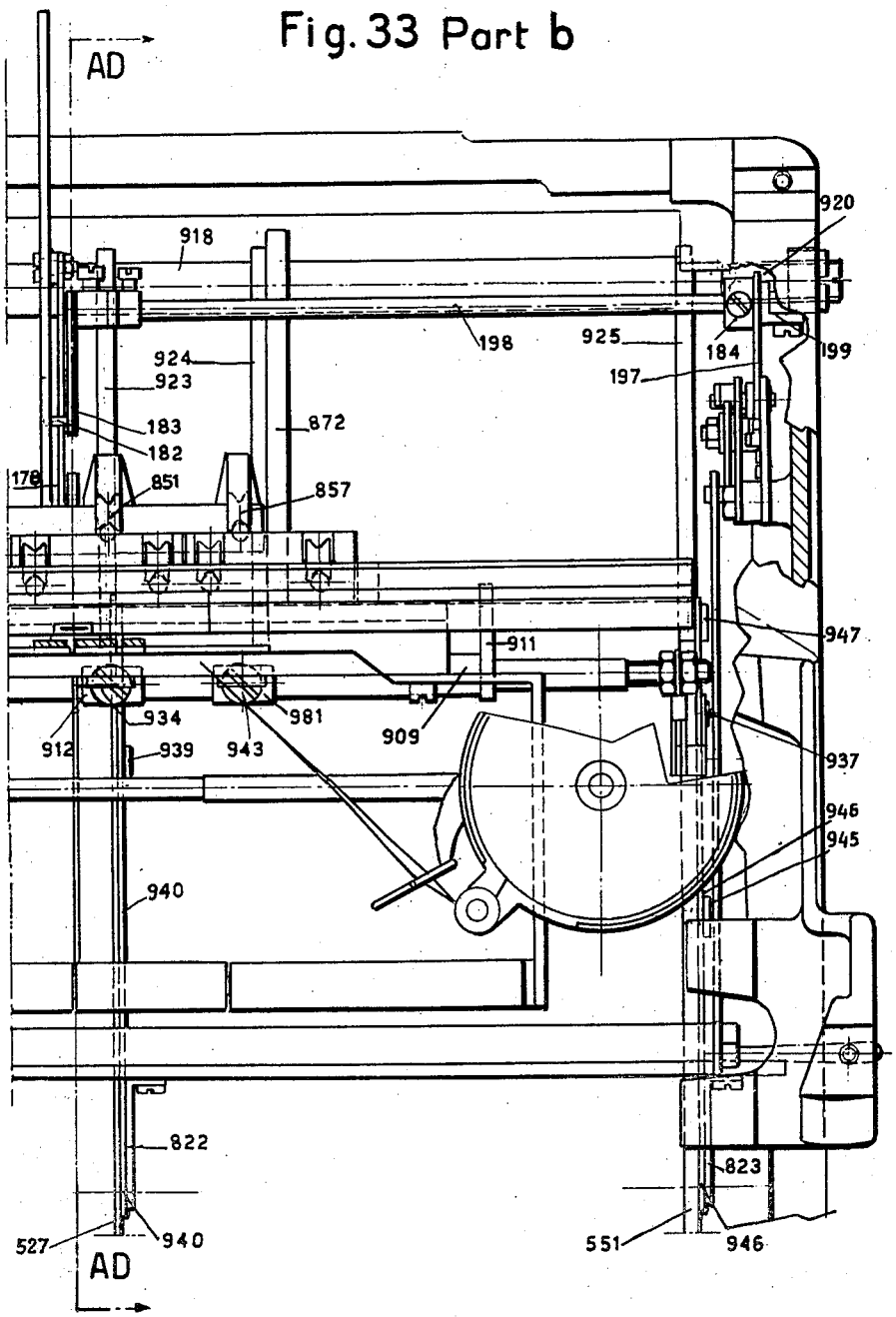
Fig. 33 Part b

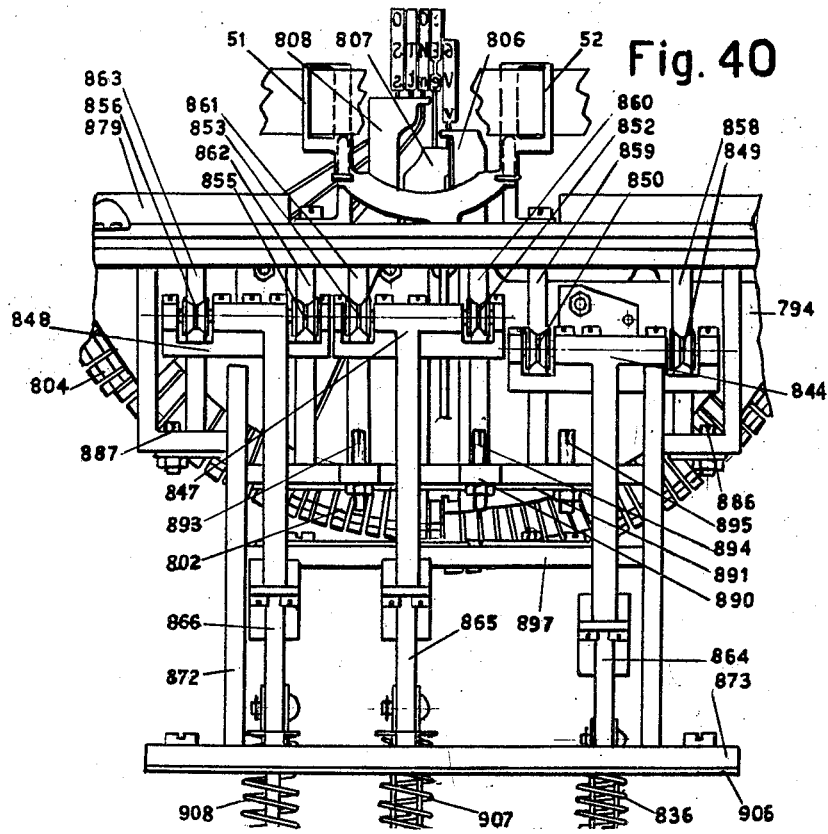
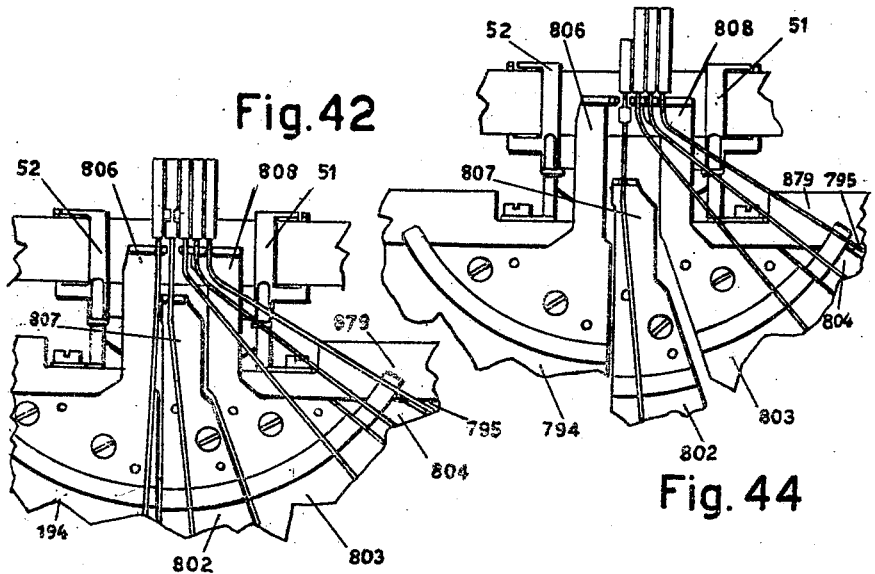

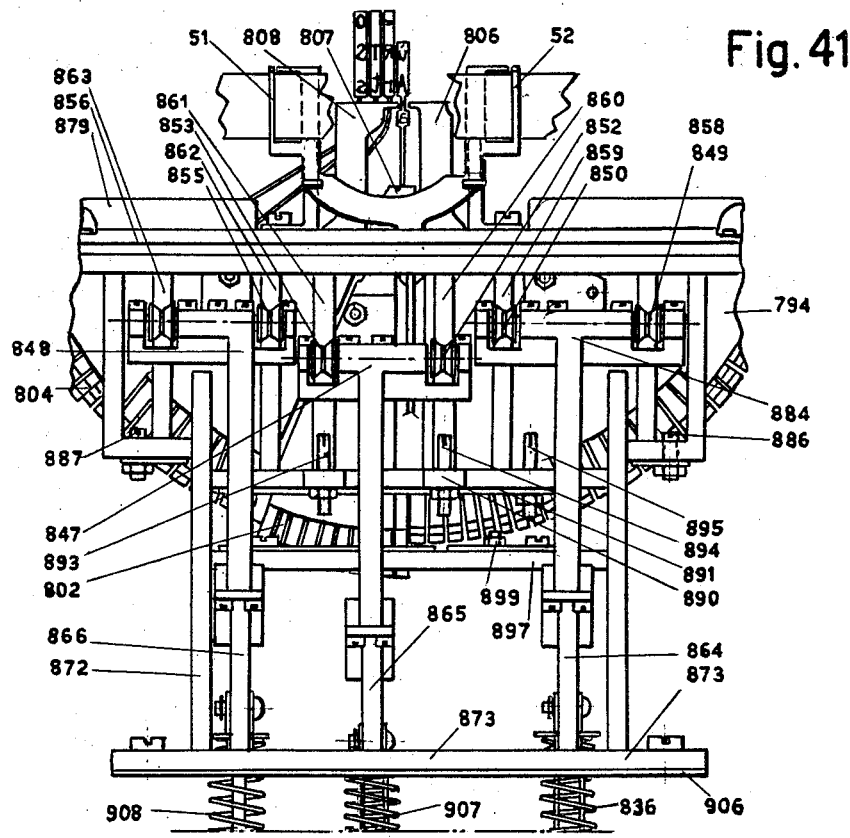
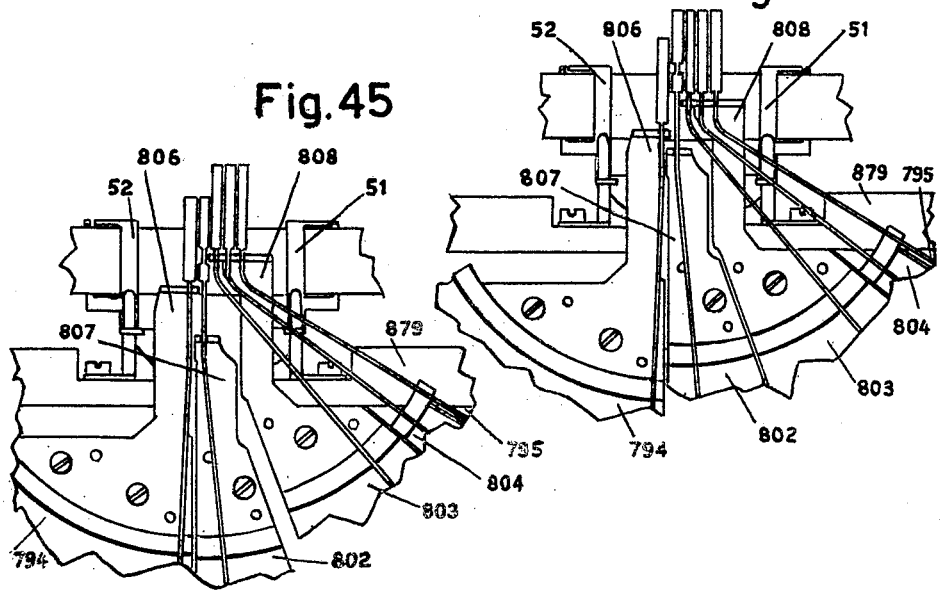

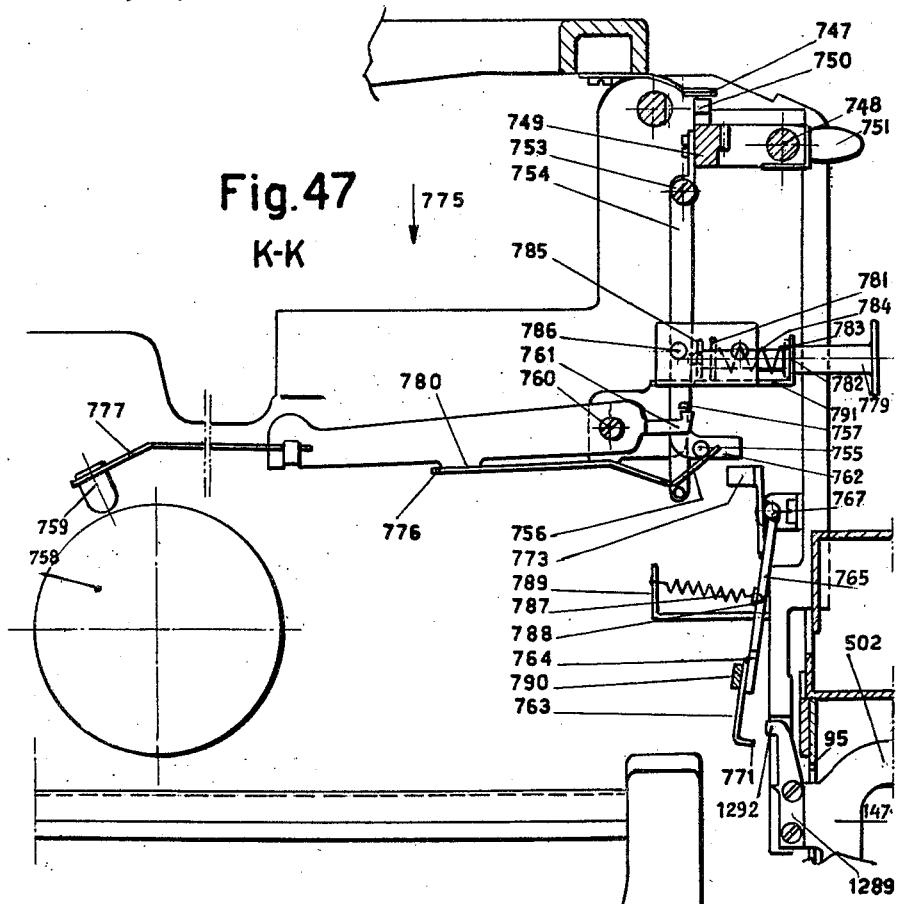
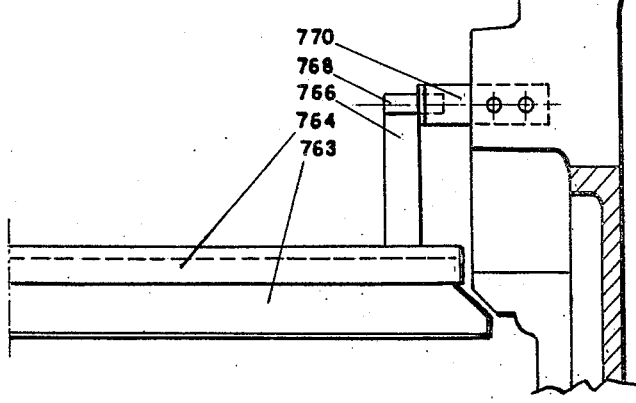

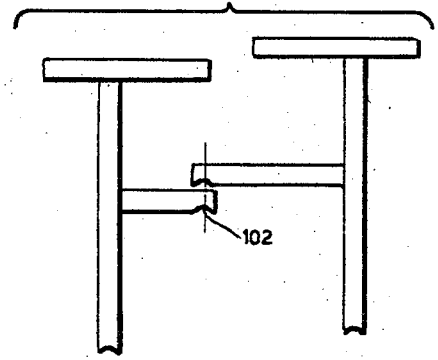
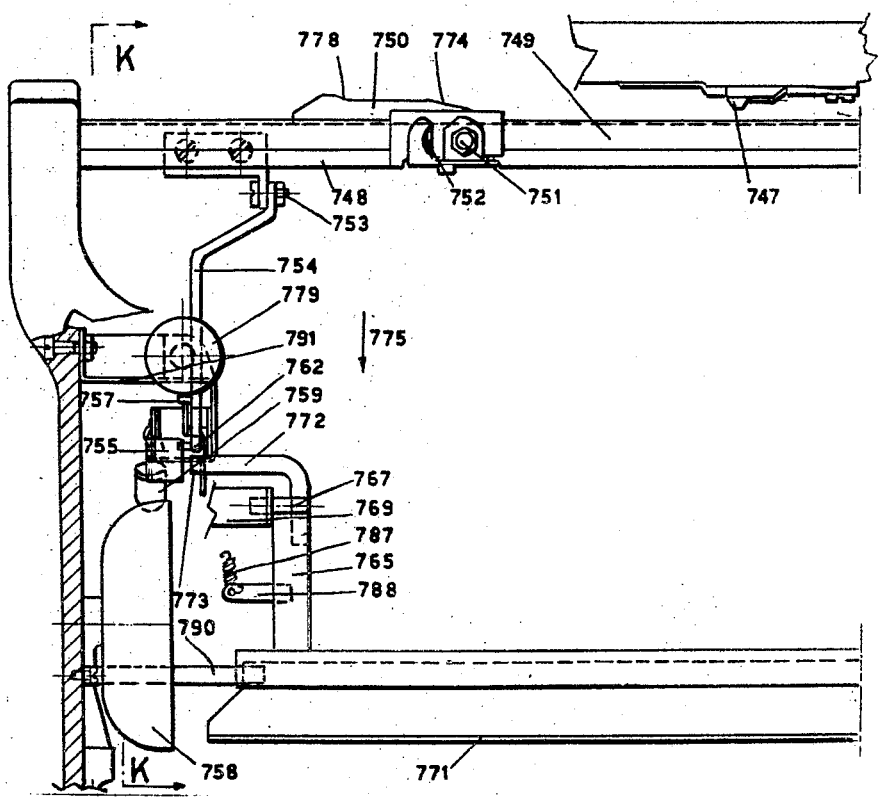

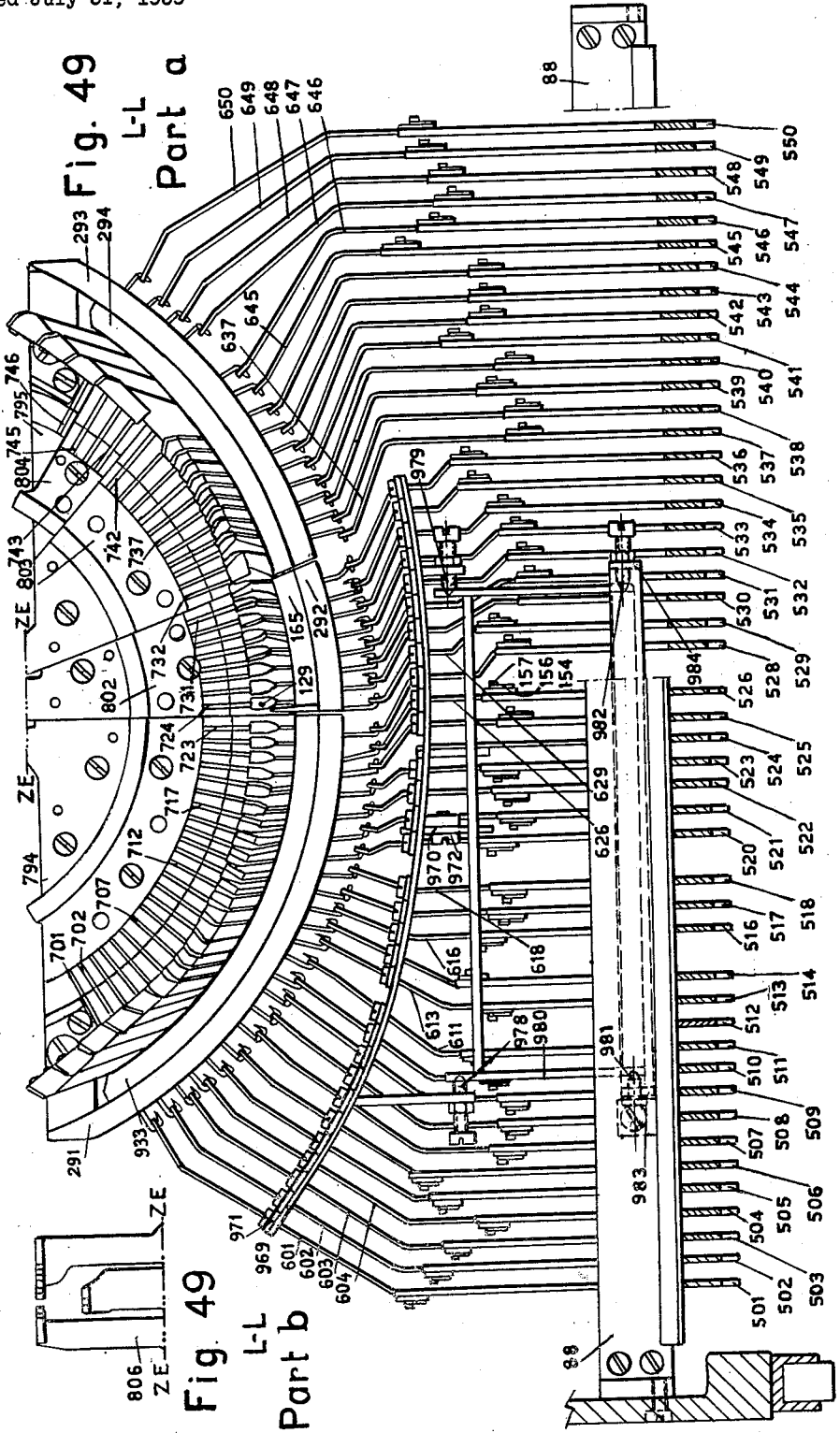

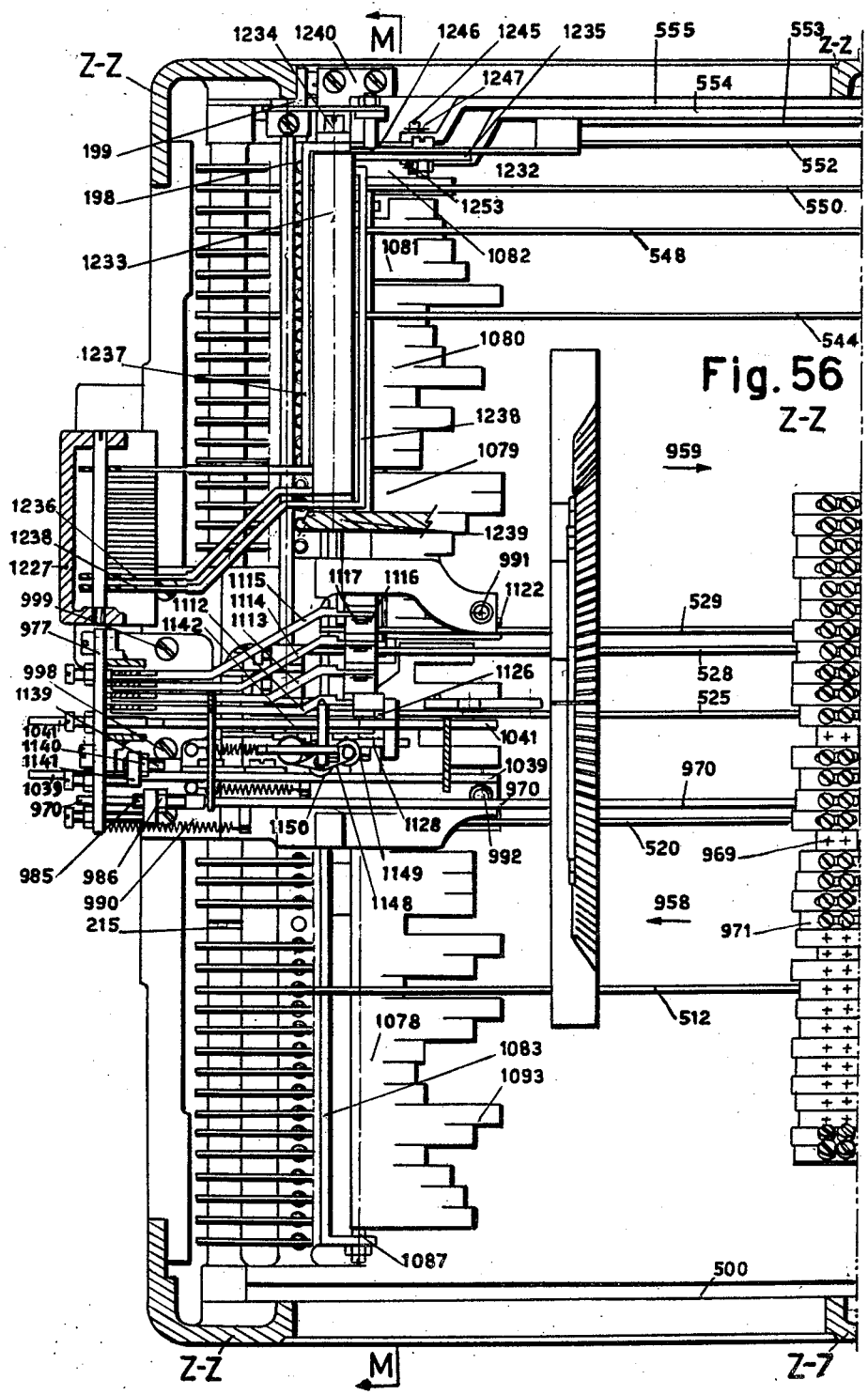

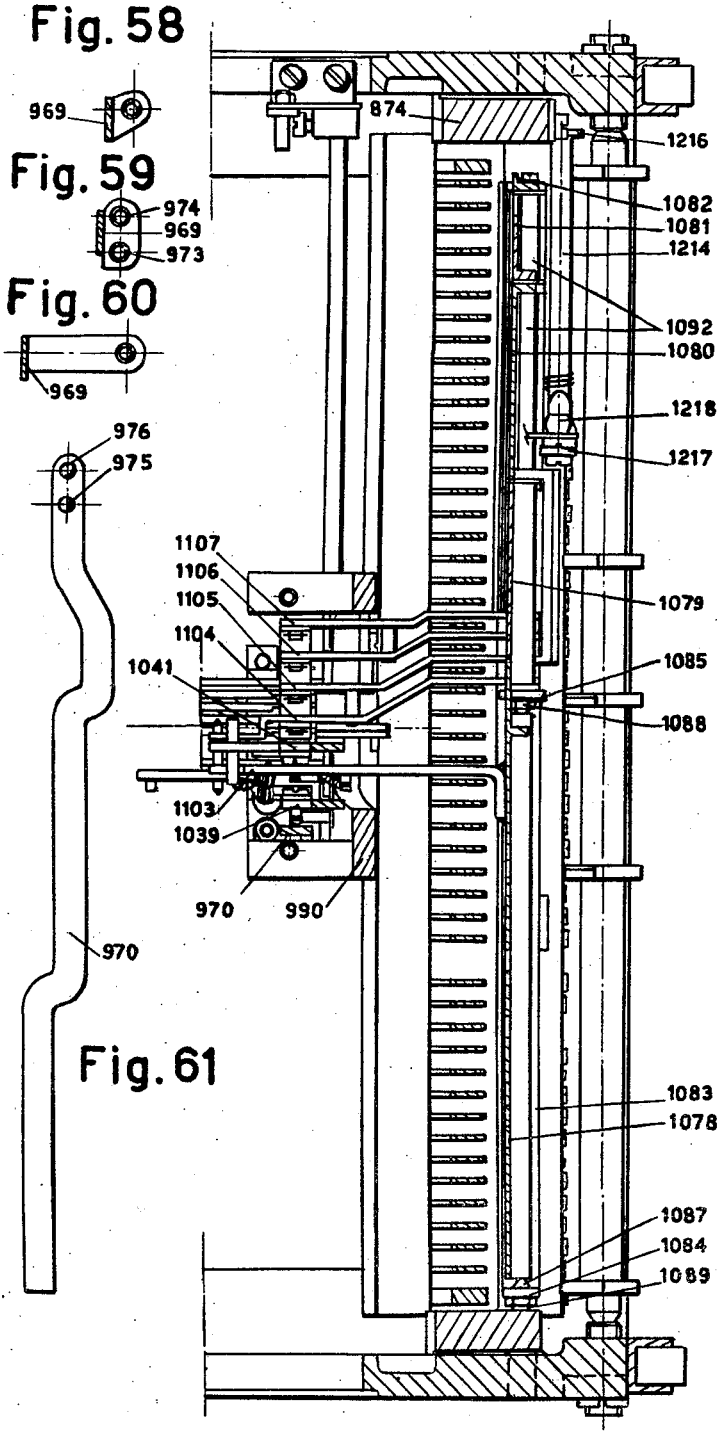

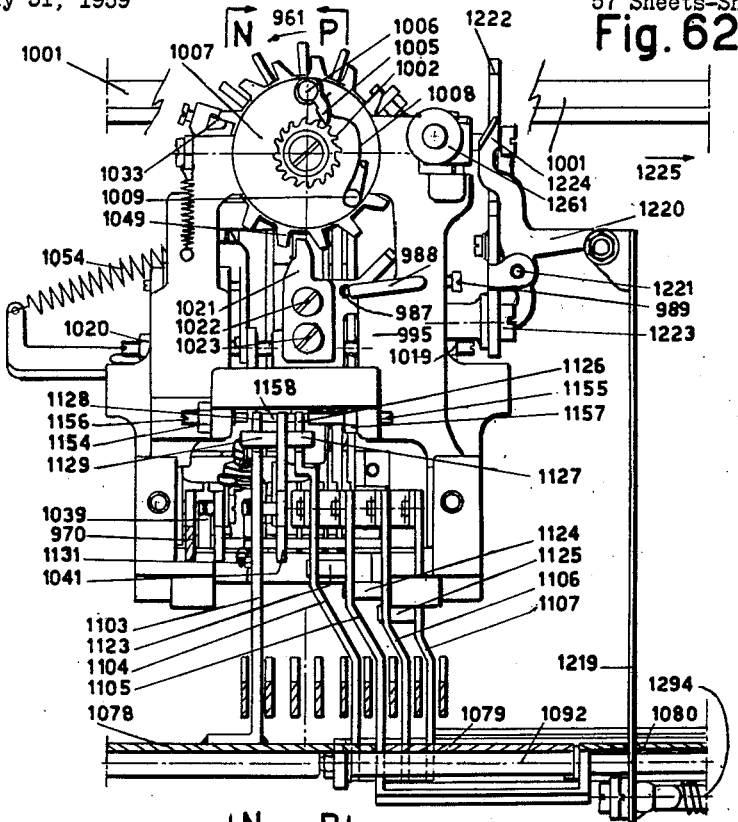
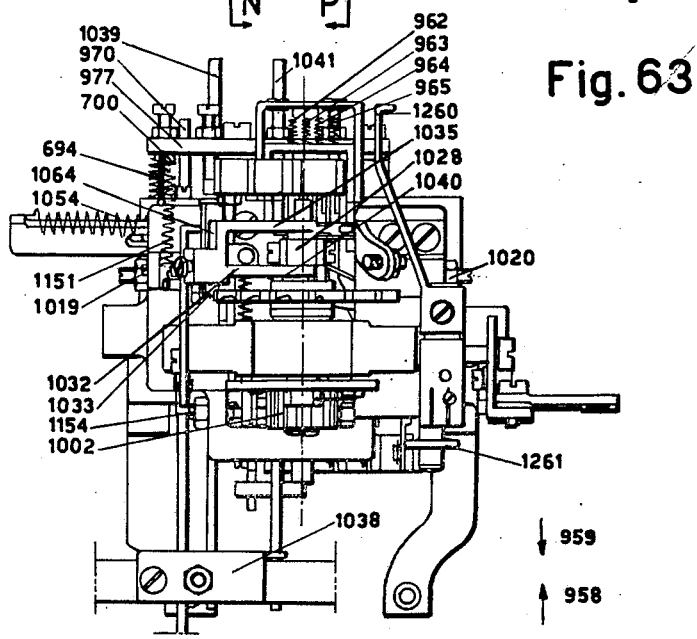
Fig. 62
Fig. 63

N-N

Jan. 15, 1963  J. GREMILLET  3,073,427
MACHINE FOR TYPEWRITING, STENOTYPING OR TELEPRINTING, ENABLING
THE SIMULTANEOUS OPERATION OF SEVERAL CHARACTER
AND SPACE KEYS, SINGLE OR MULTIPLE
Filed July 31, 1959  57 Sheets-Sheet 33

P-P

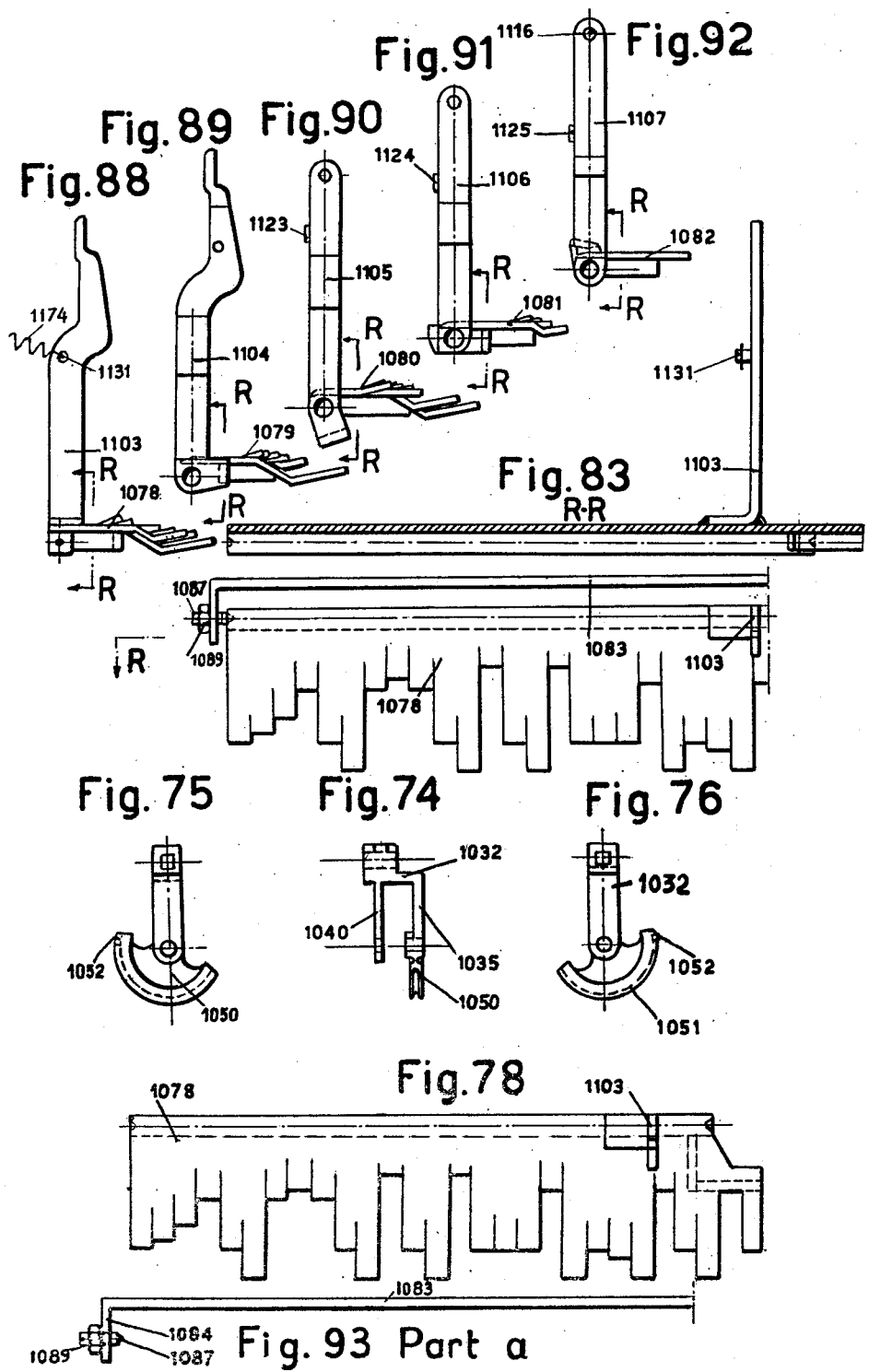

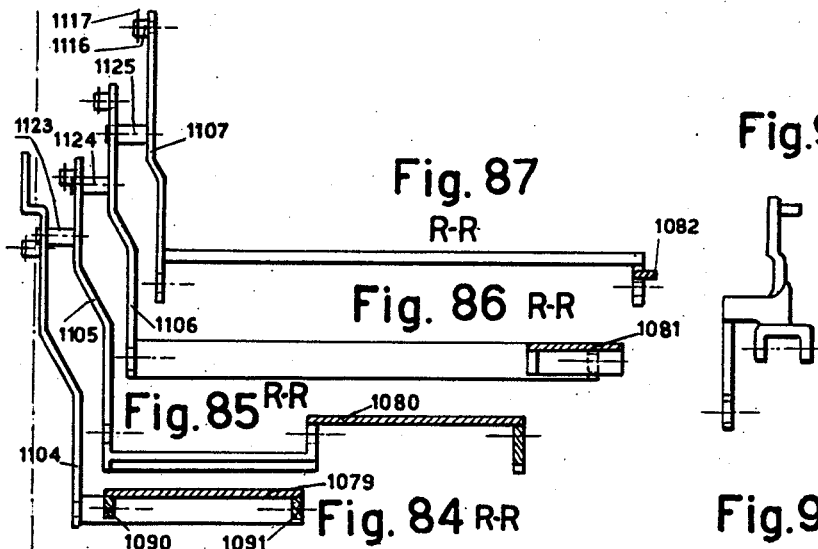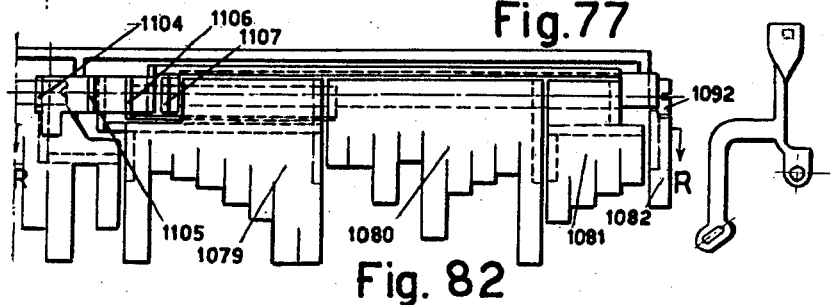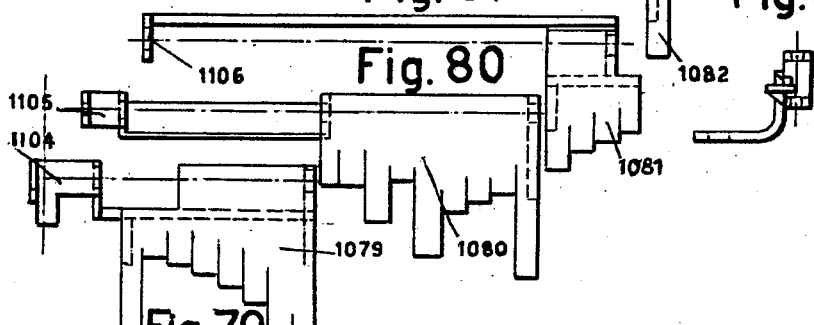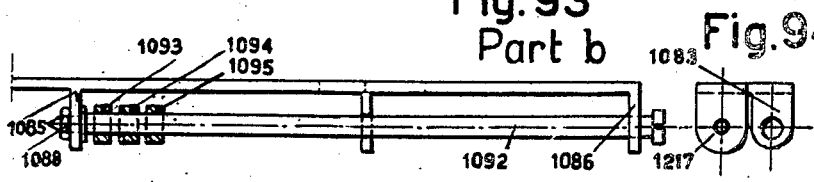

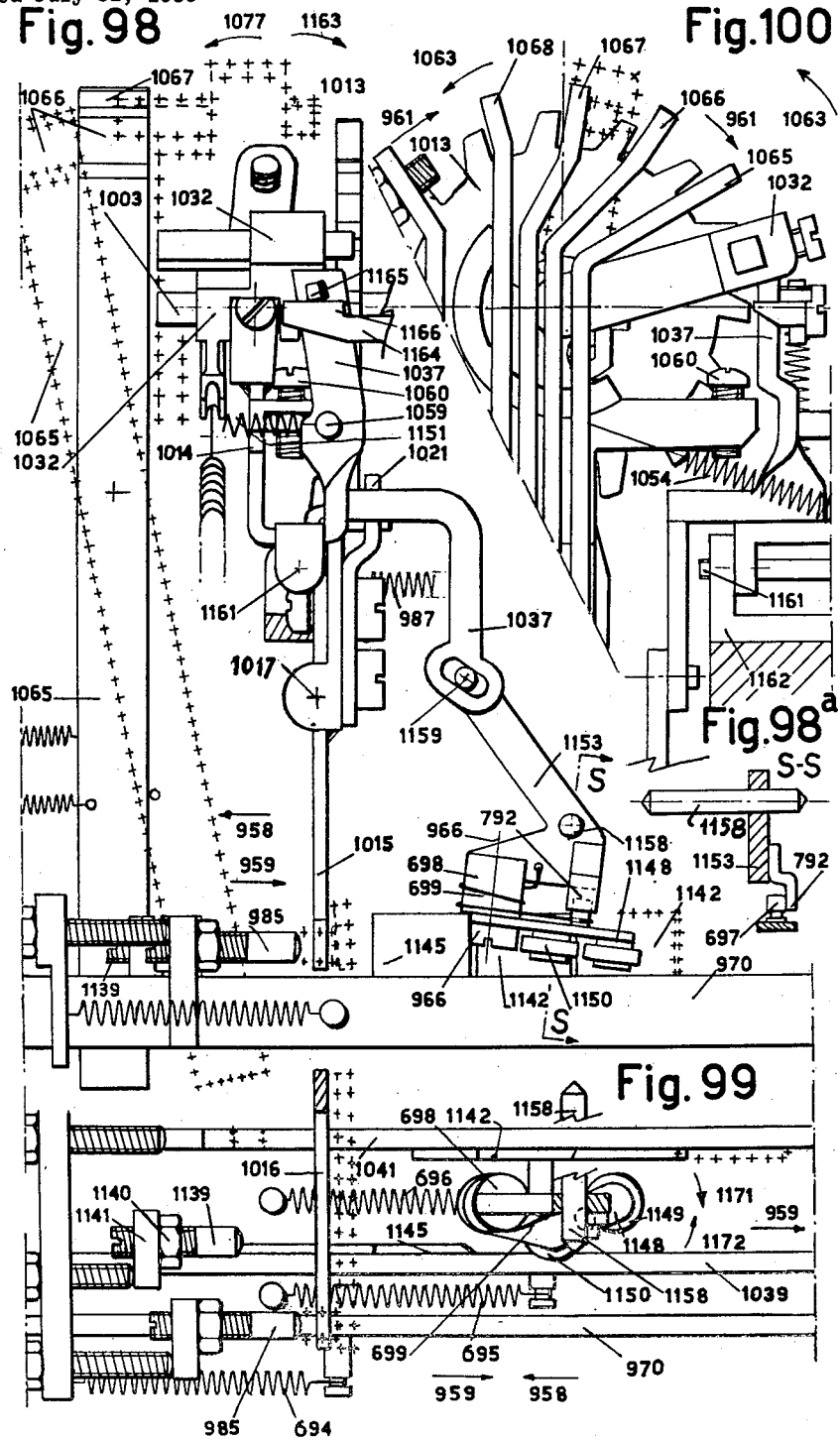

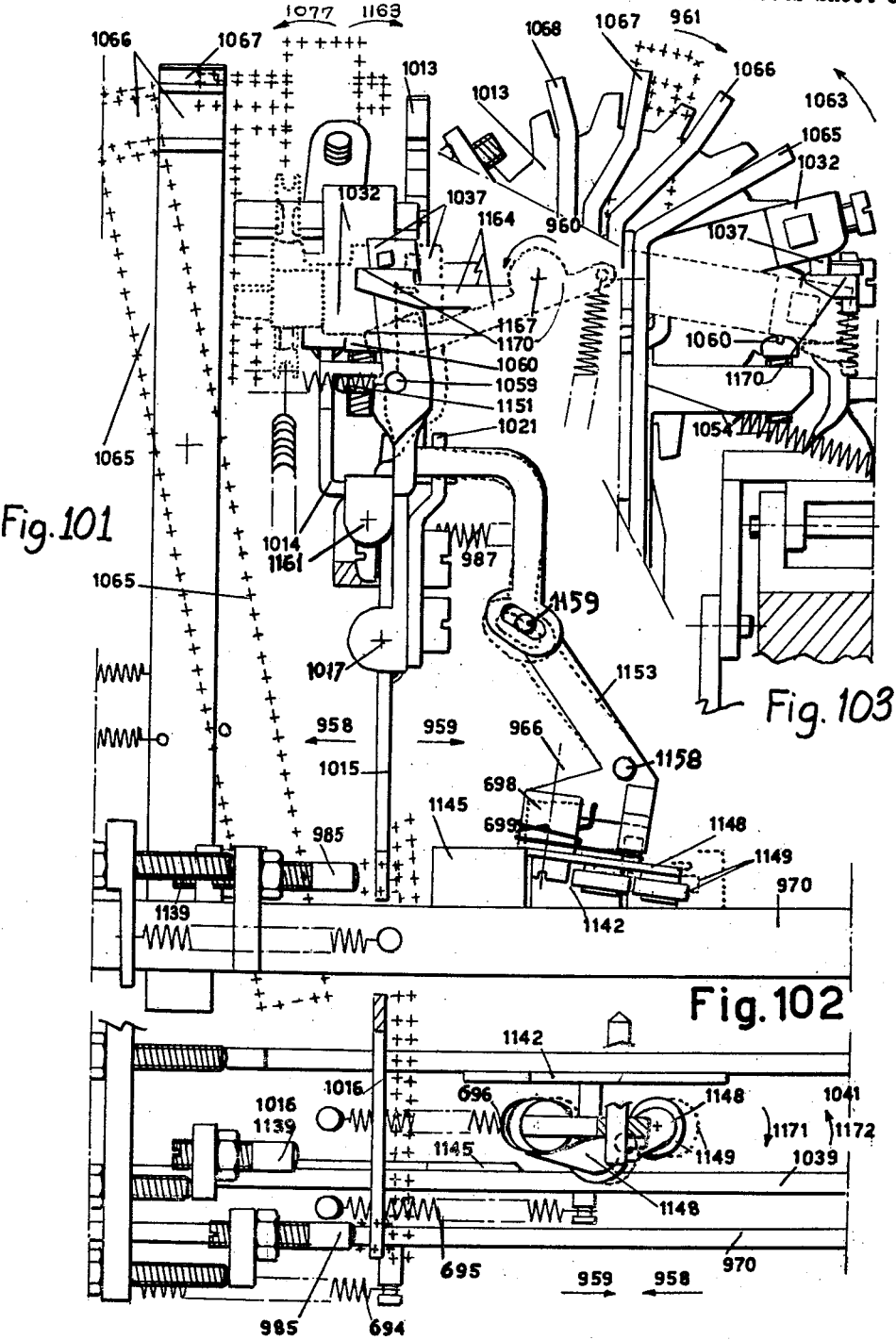

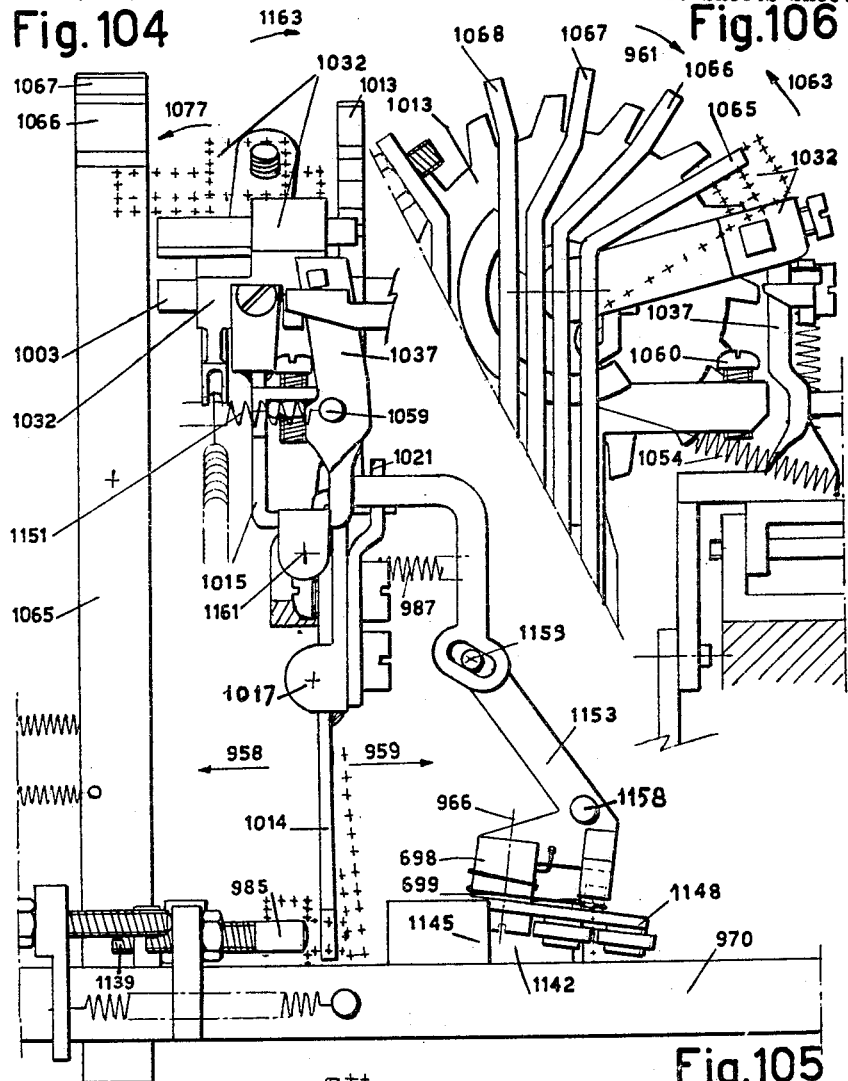
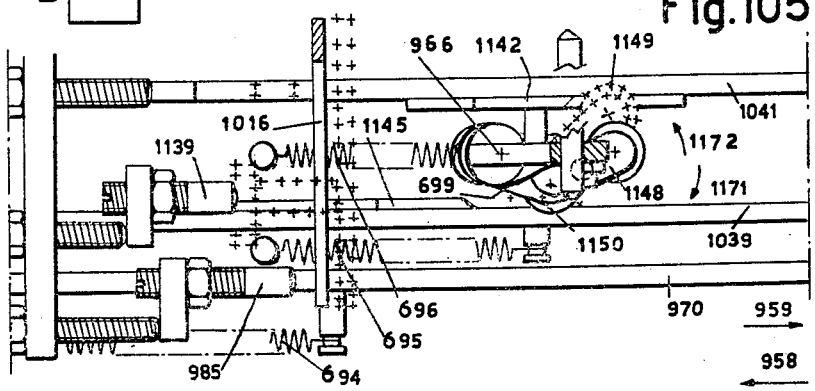

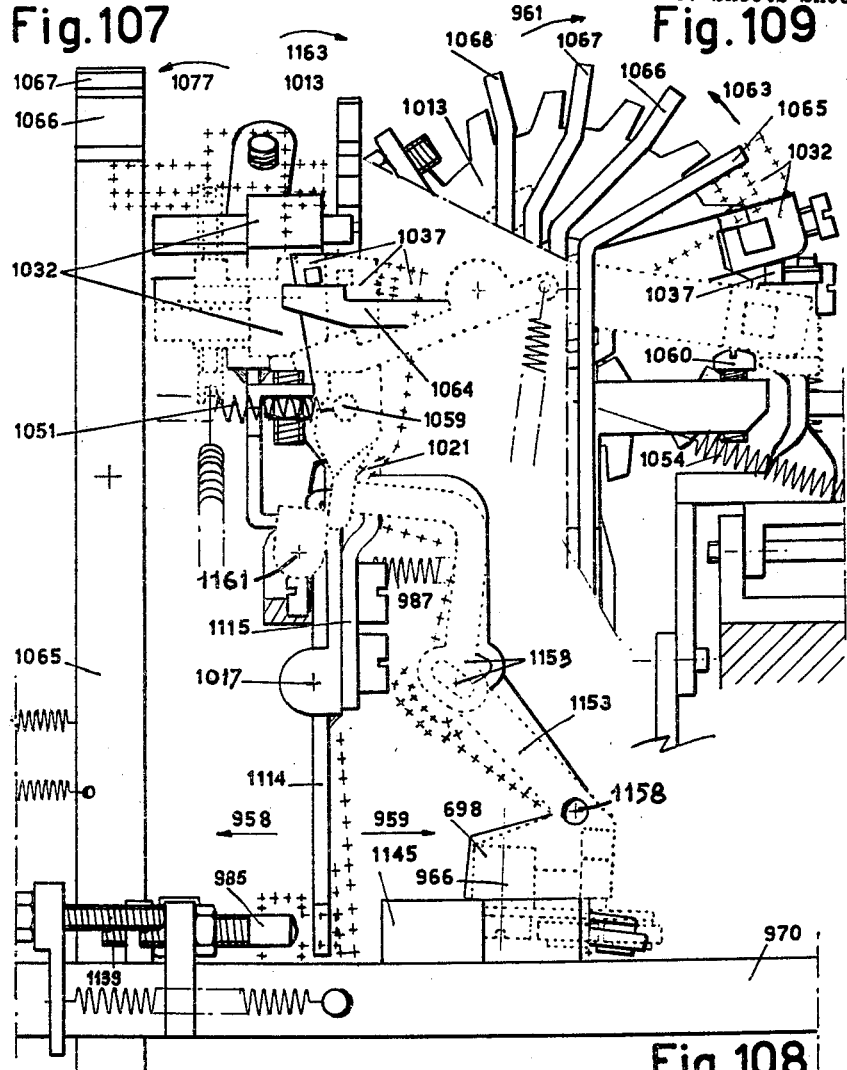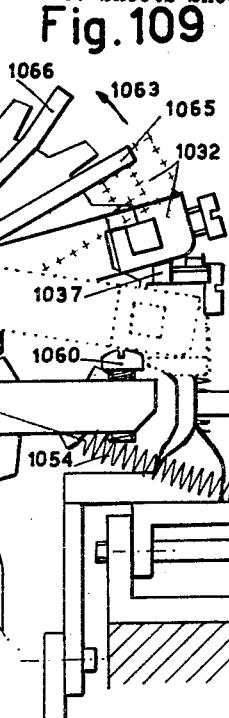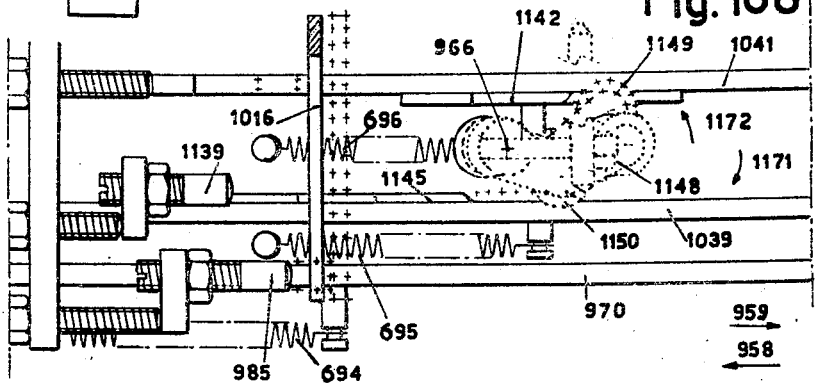

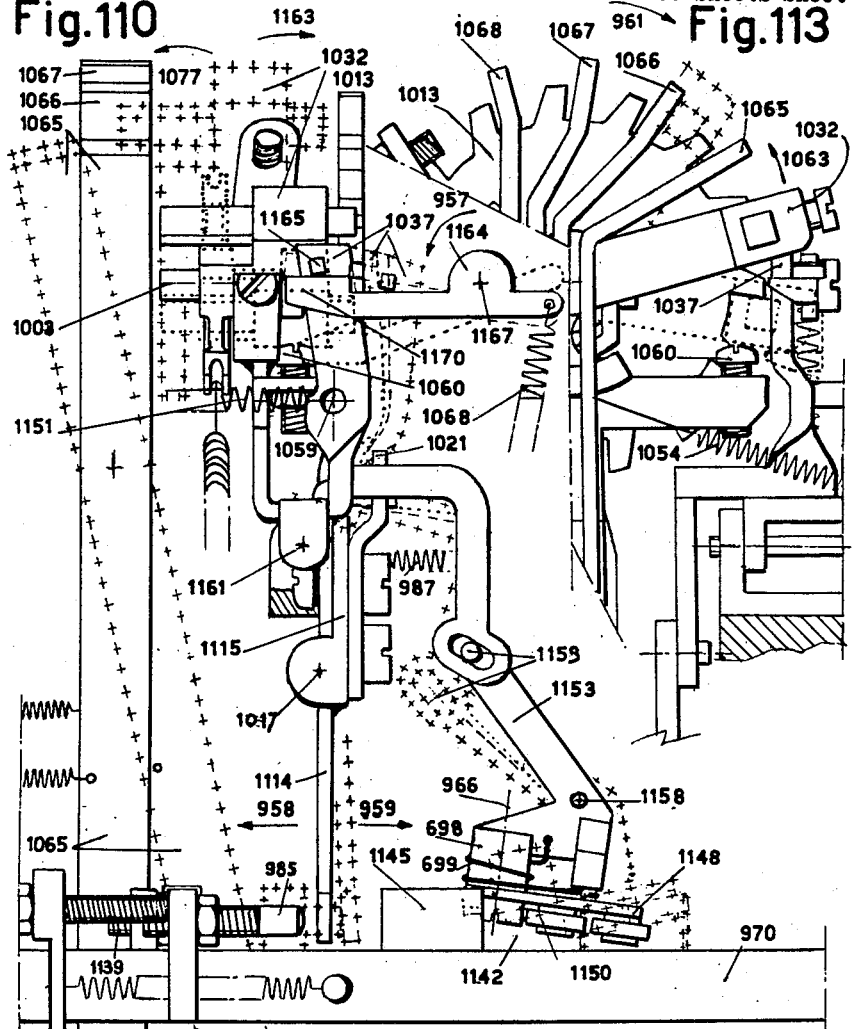
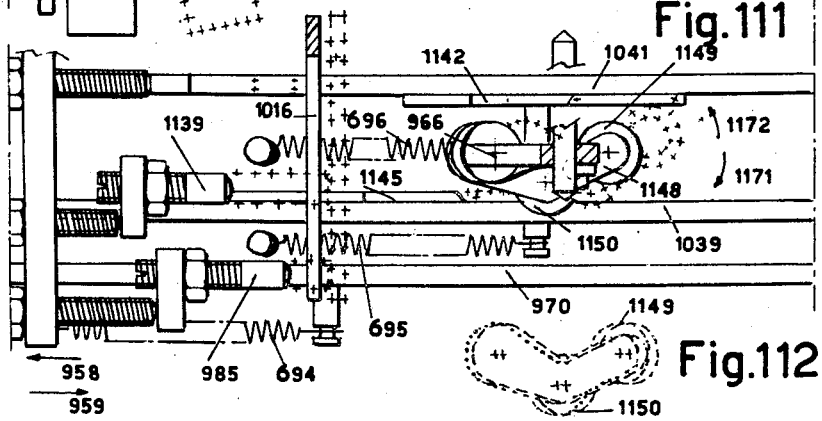

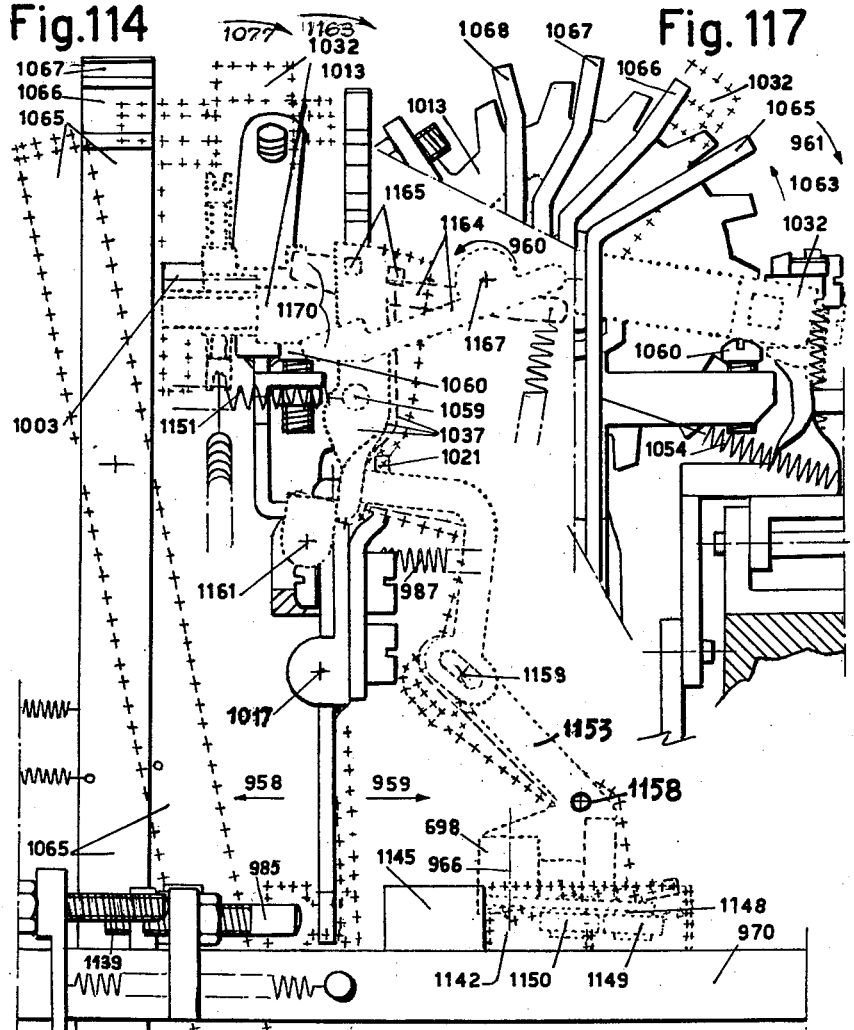
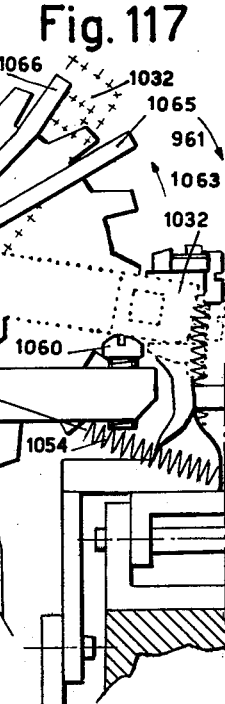
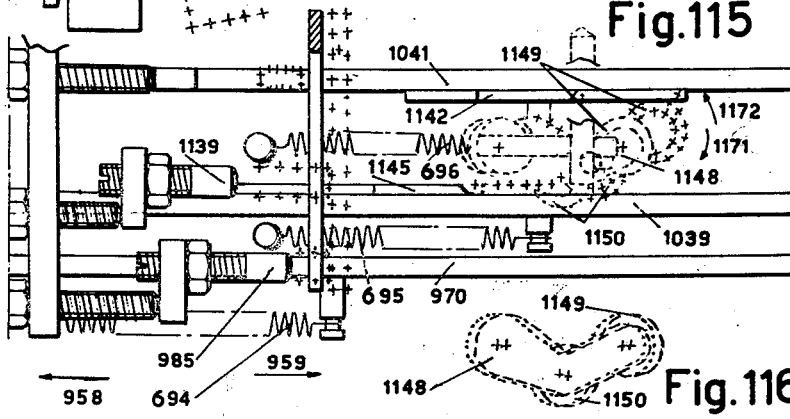
Fig.114, Fig.115, Fig.116, Fig.117

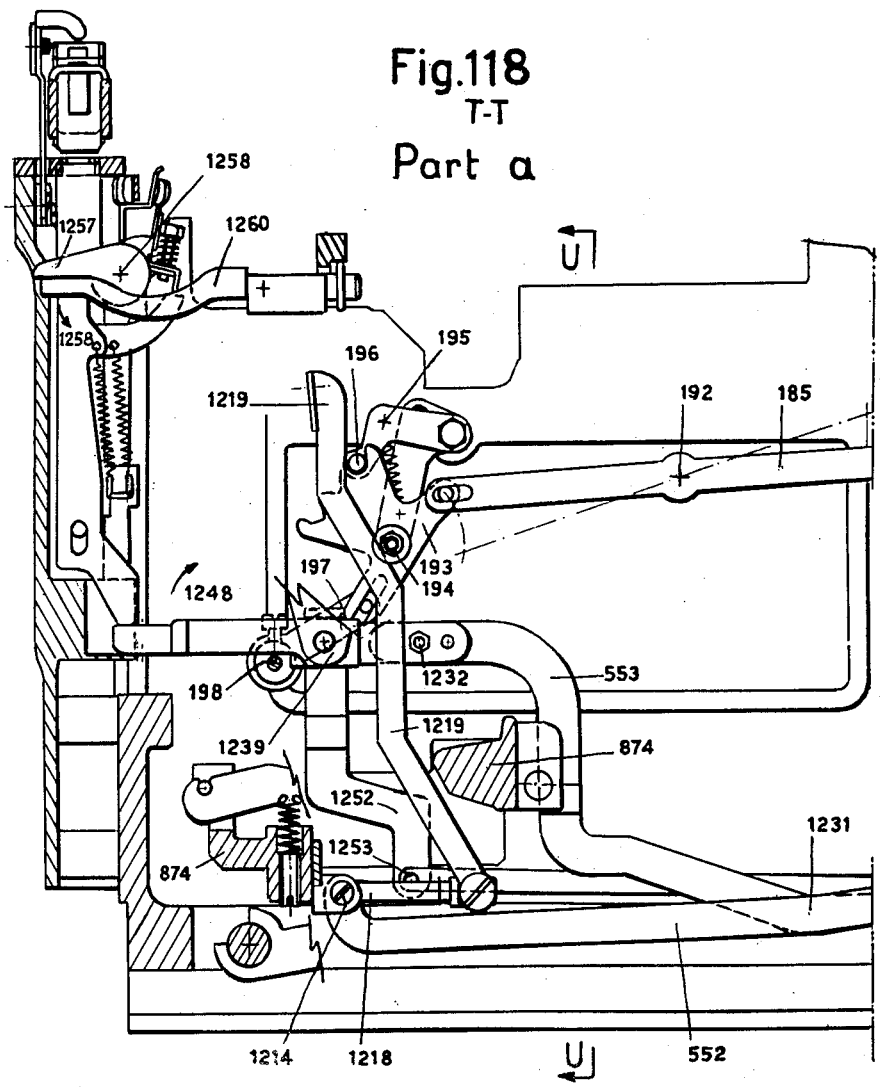
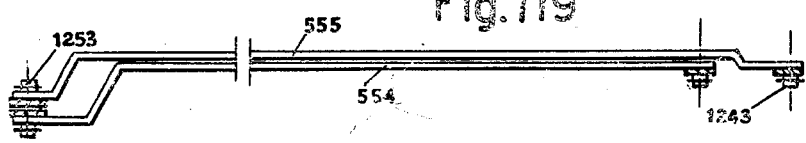

T-T
Part b

Jan. 15, 1963 J. GREMILLET 3,073,427
MACHINE FOR TYPEWRITING, STENOTYPING OR TELEPRINTING, ENABLING
THE SIMULTANEOUS OPERATION OF SEVERAL CHARACTER
AND SPACE KEYS, SINGLE OR MULTIPLE
Filed July 31, 1959 57 Sheets-Sheet 45
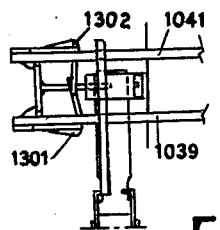
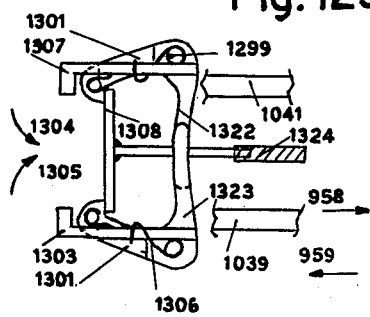
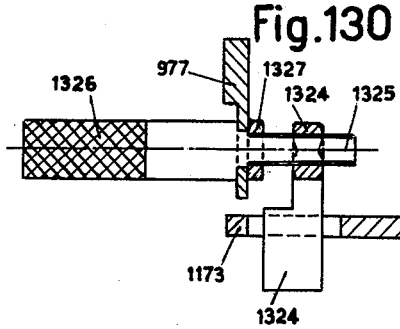
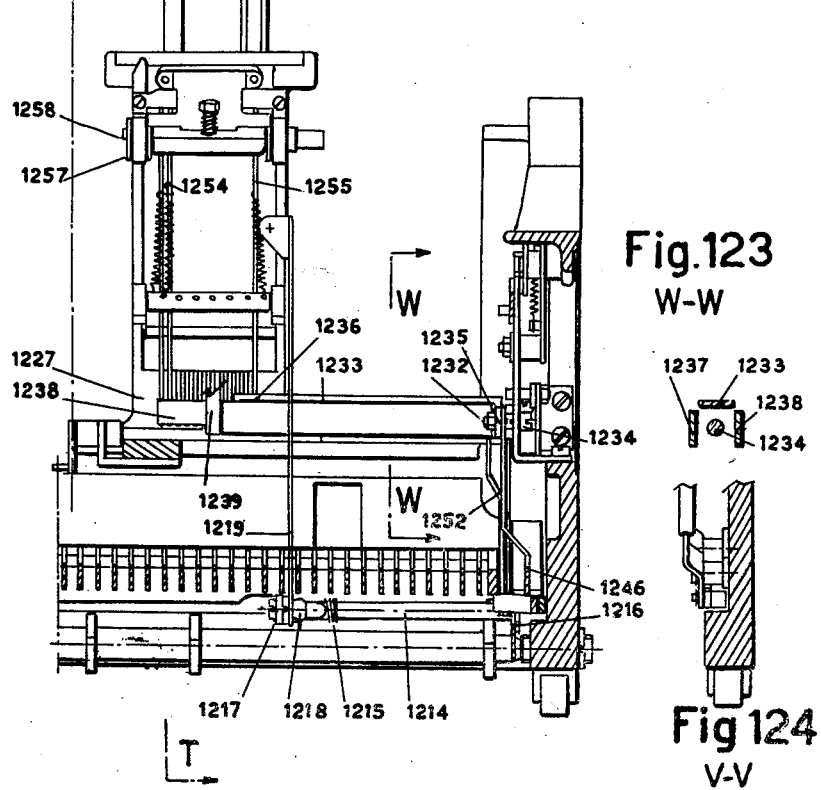
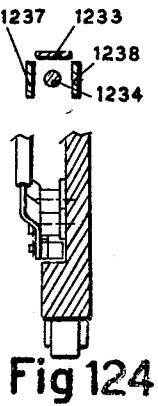

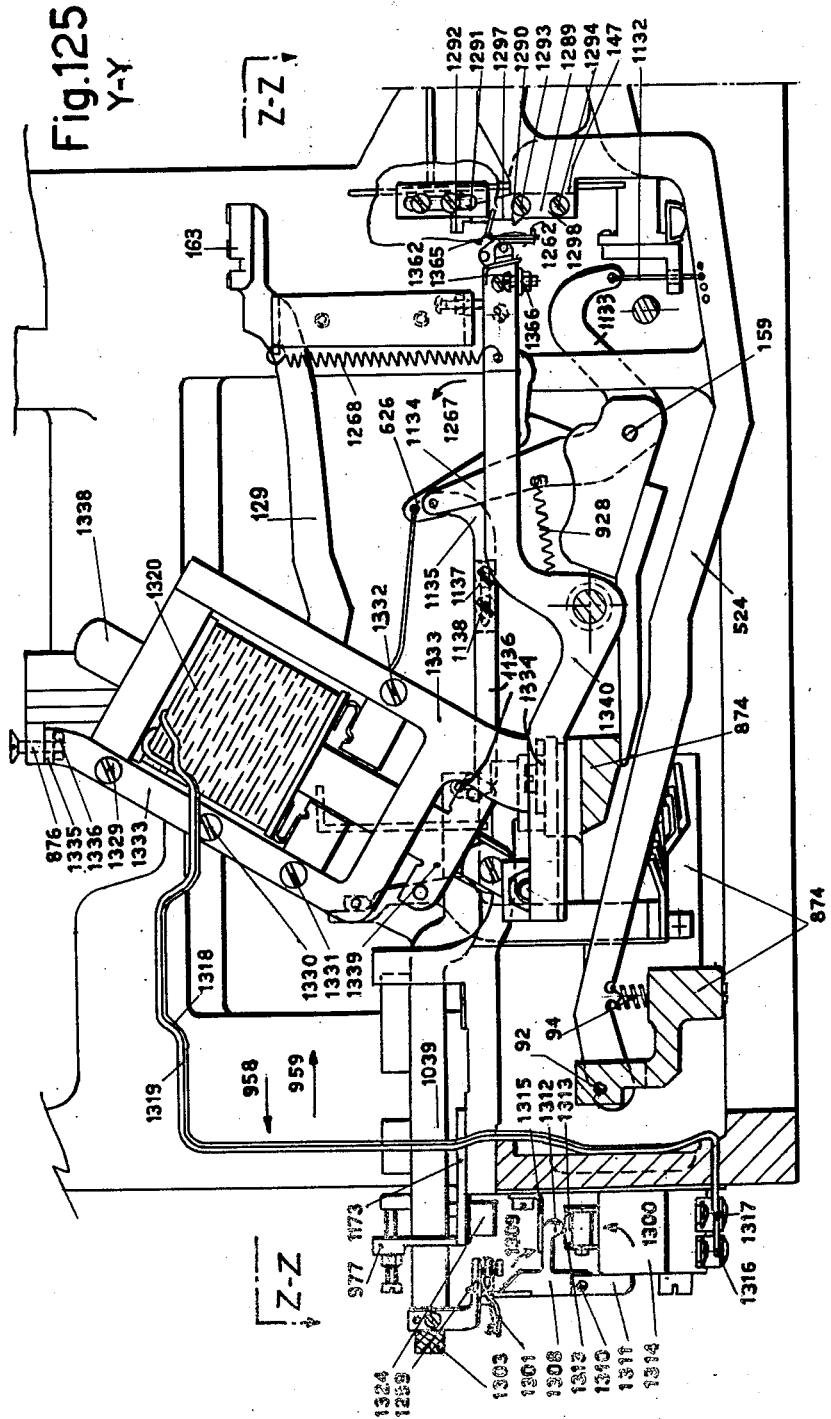

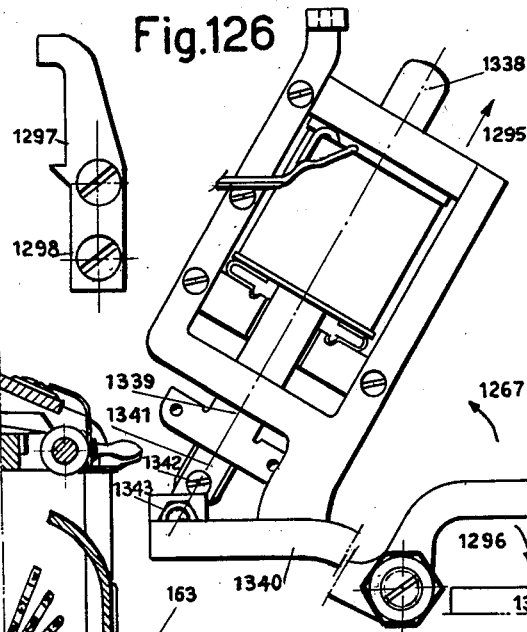
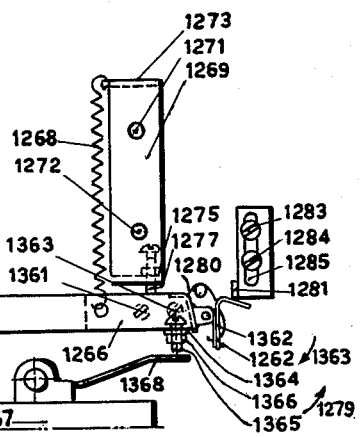
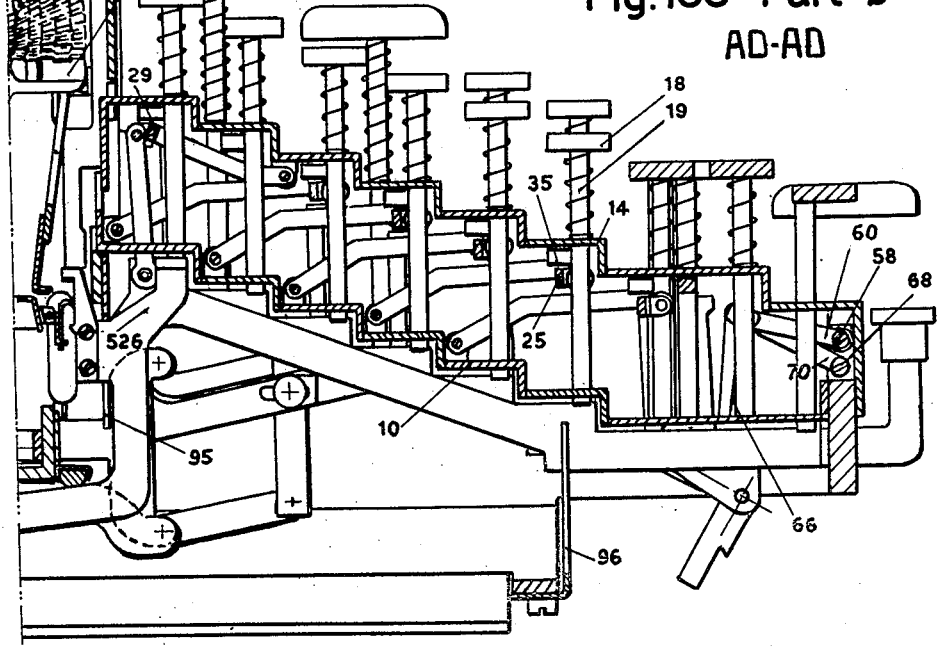
Fig. 126
Fig. 127
Fig. 133 Part b
AD-AD

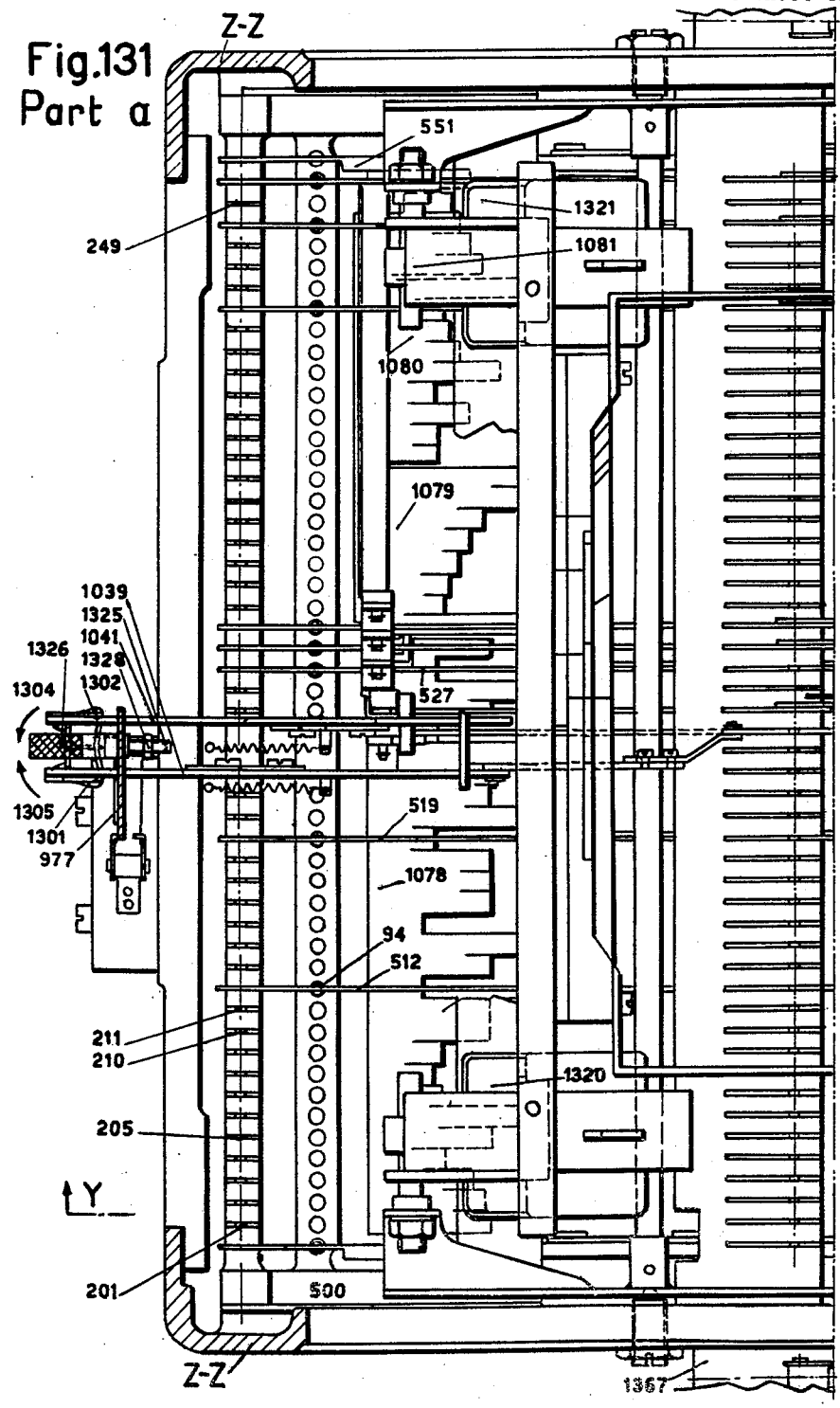
Fig.131 Part a

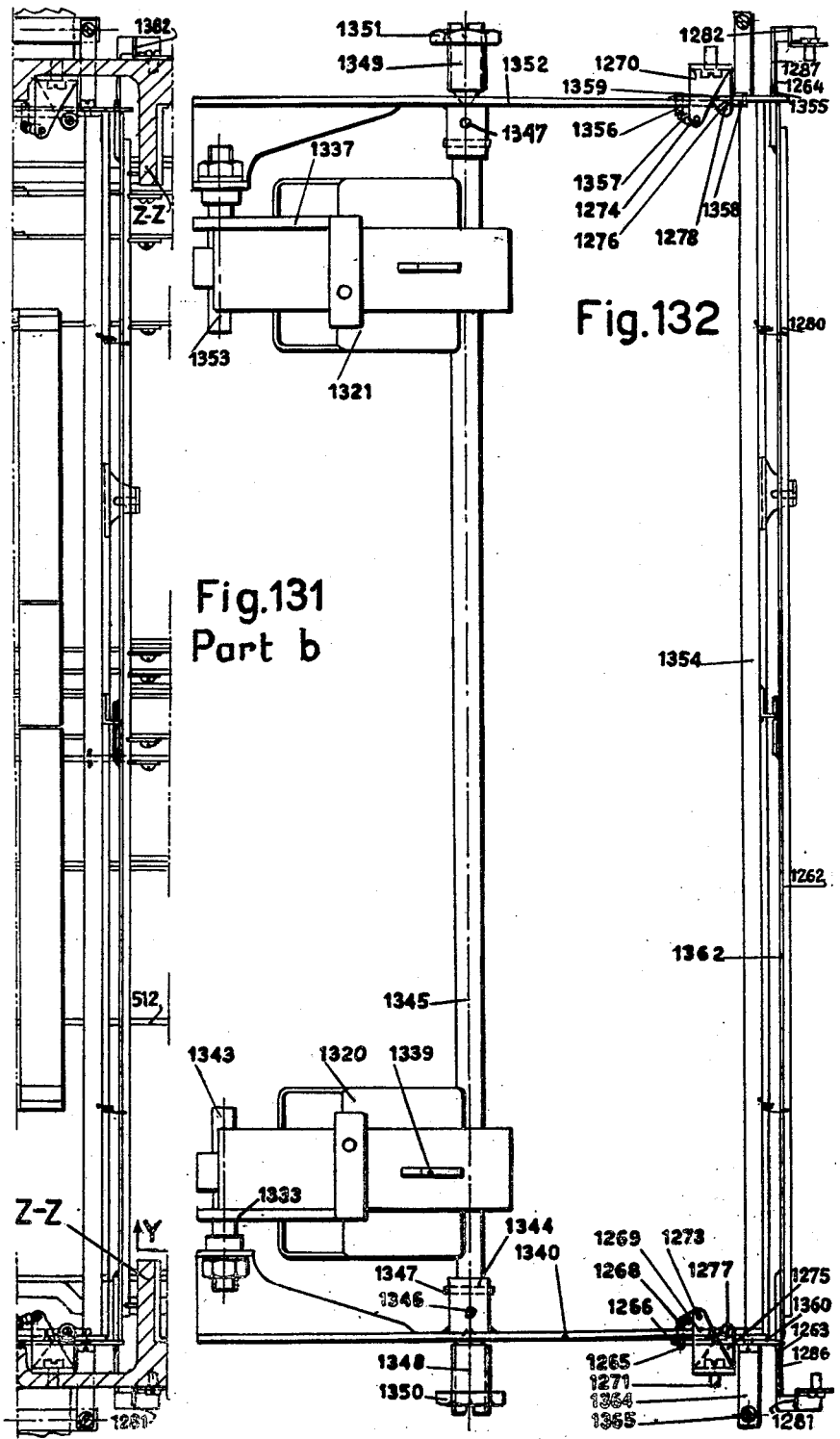

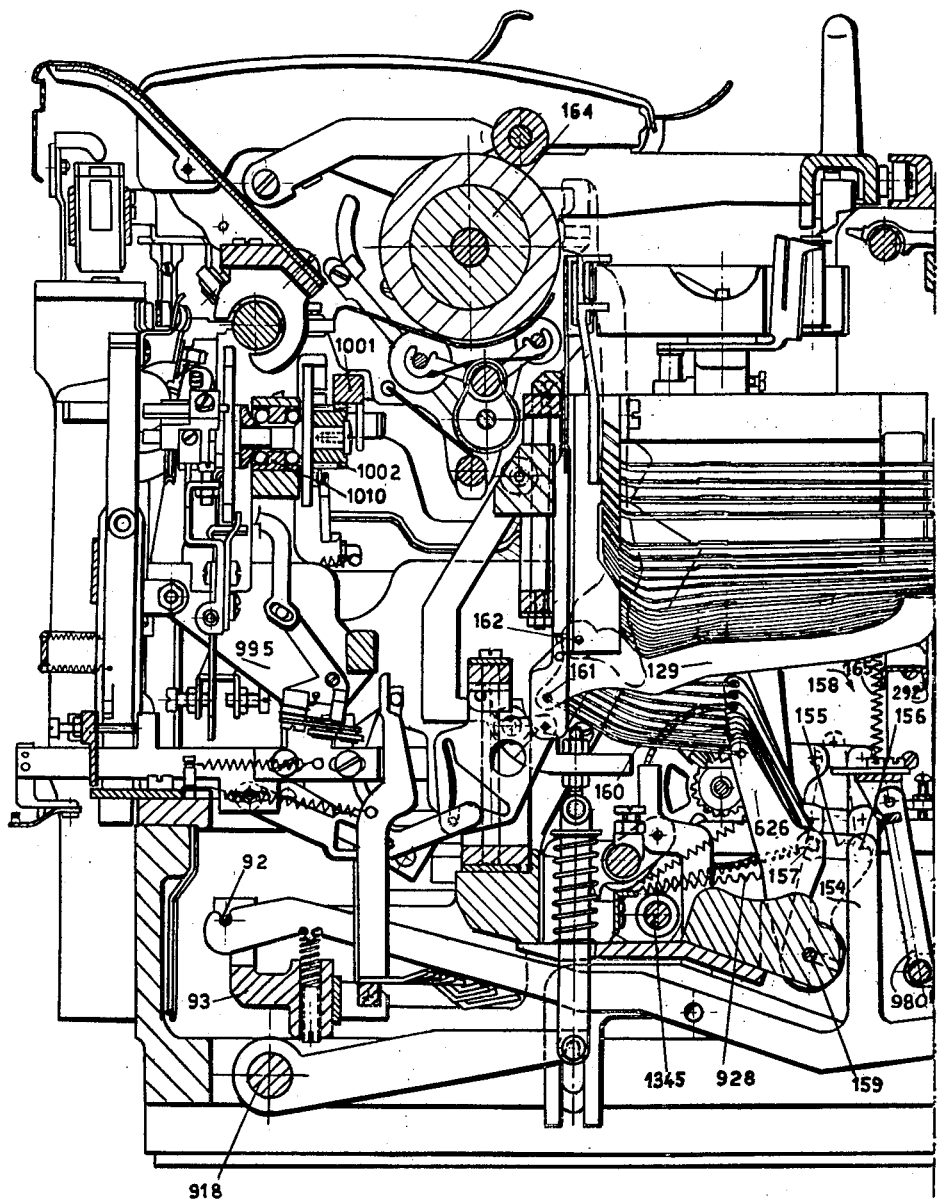
Fig. 133 Part a
AD-AD

Jan. 15, 1963 J. GREMILLET 3,073,427
MACHINE FOR TYPEWRITING, STENOTYPING OR TELEPRINTING, ENABLING
THE SIMULTANEOUS OPERATION OF SEVERAL CHARACTER
AND SPACE KEYS, SINGLE OR MULTIPLE
Filed July 31, 1959 57 Sheets-Sheet 51
Fig.134 Part a
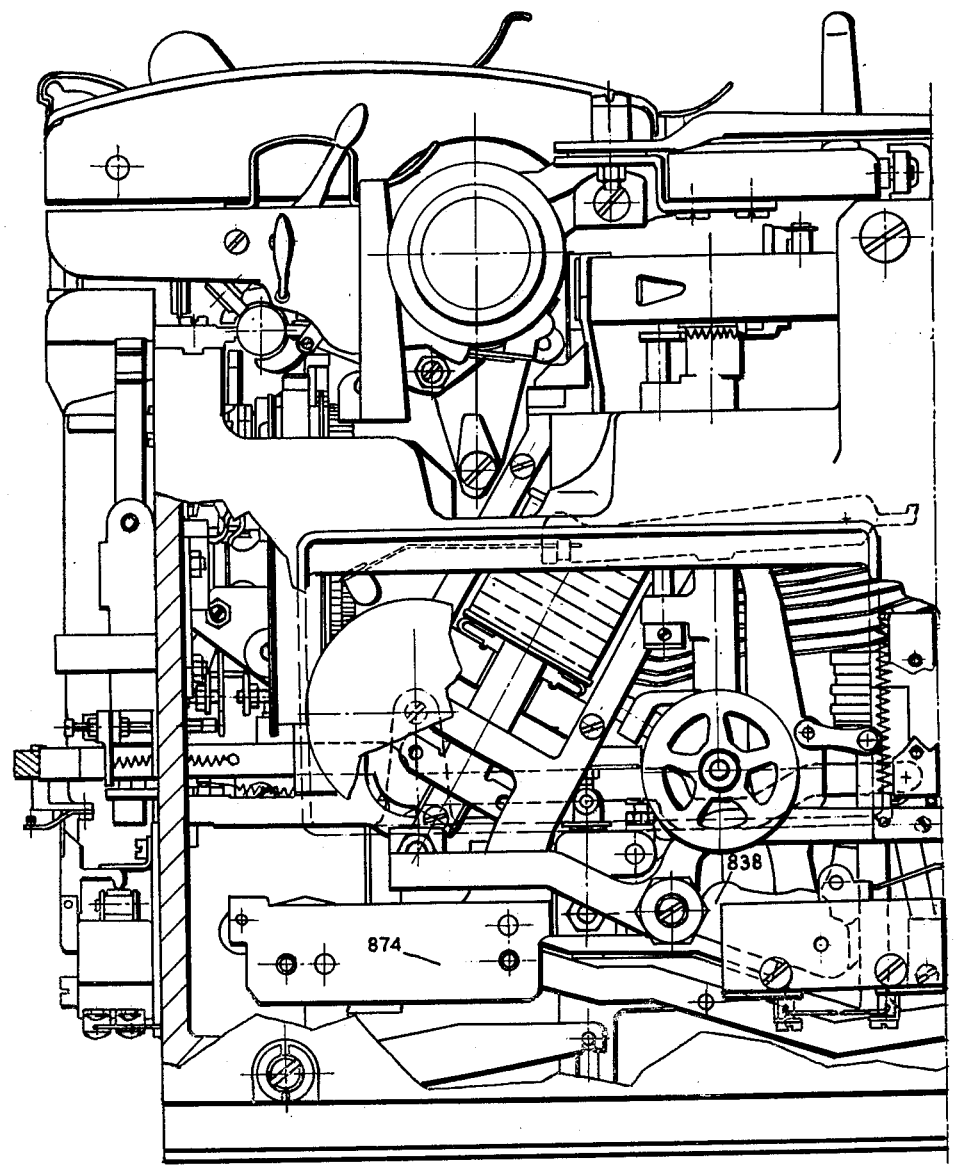

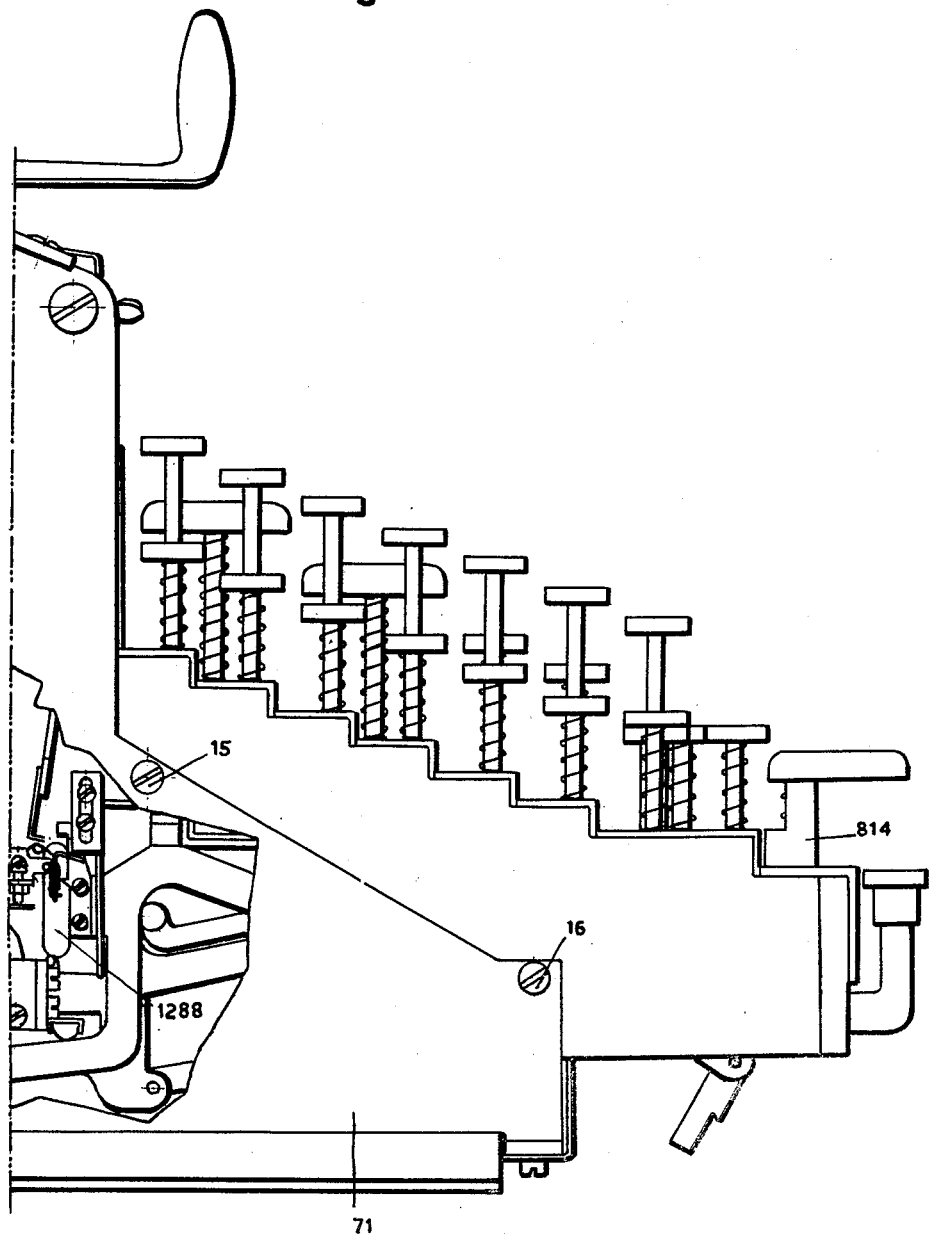
Fig.134 Part b

Fig. 135 Part a
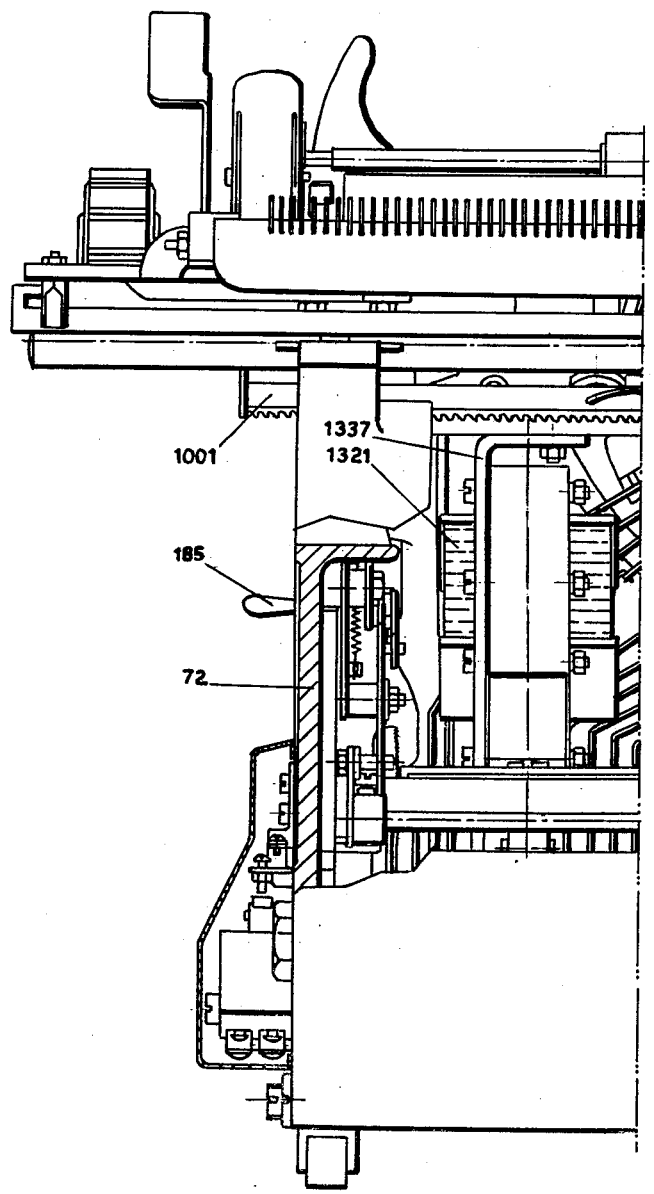

Fig. 135 Part b
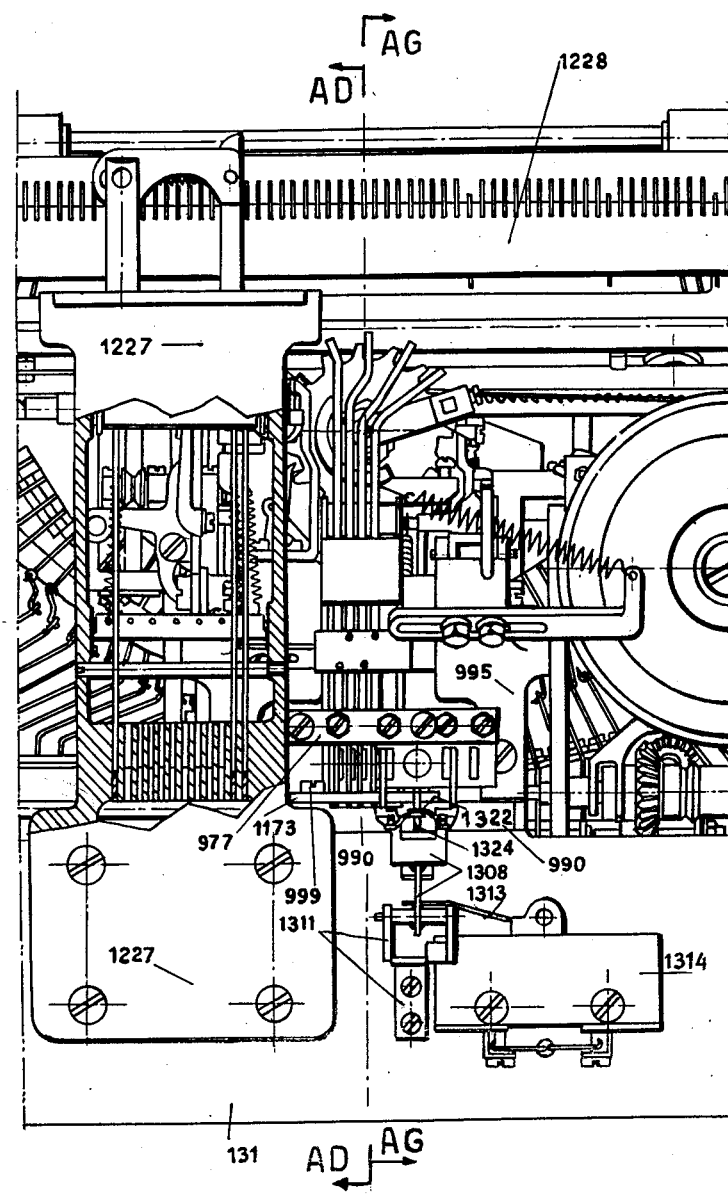

Fig. 135 Part c
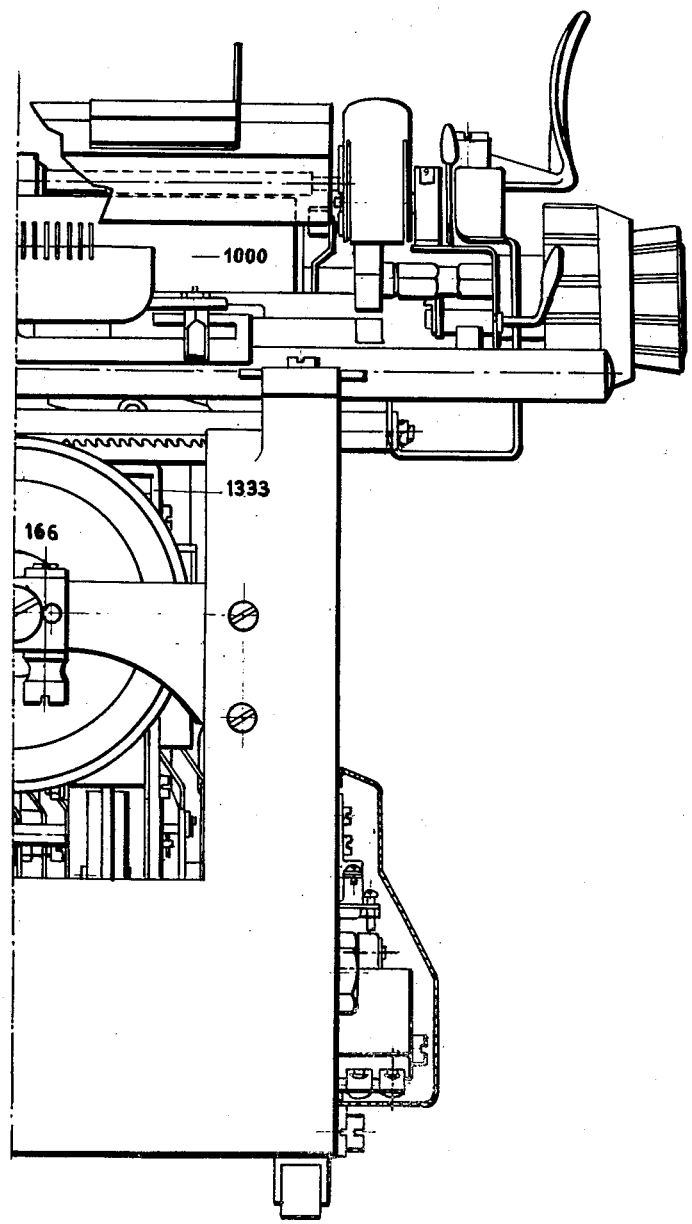

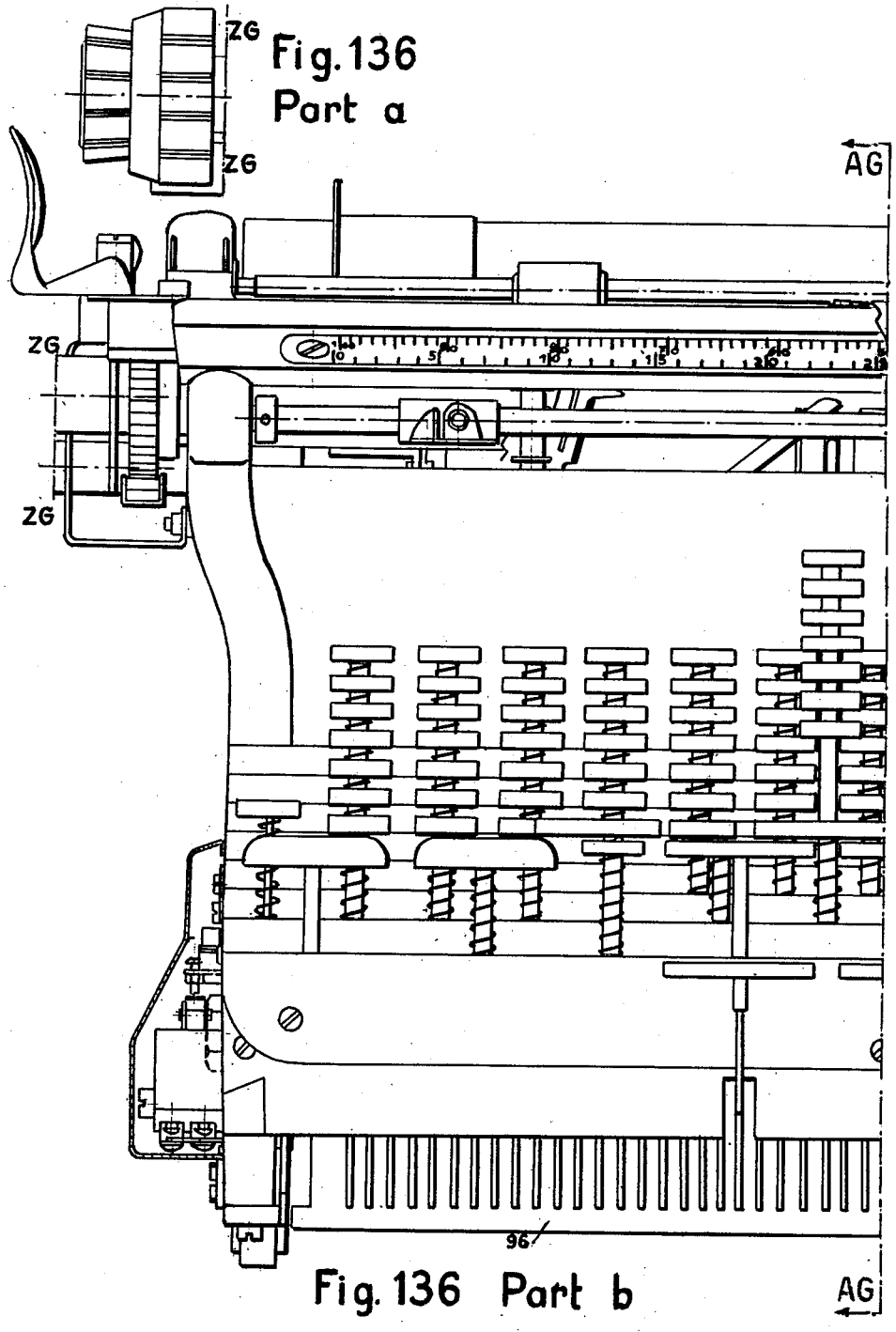

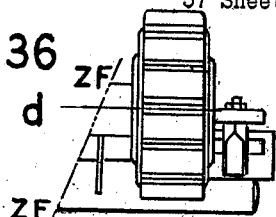
Fig. 136 Part d
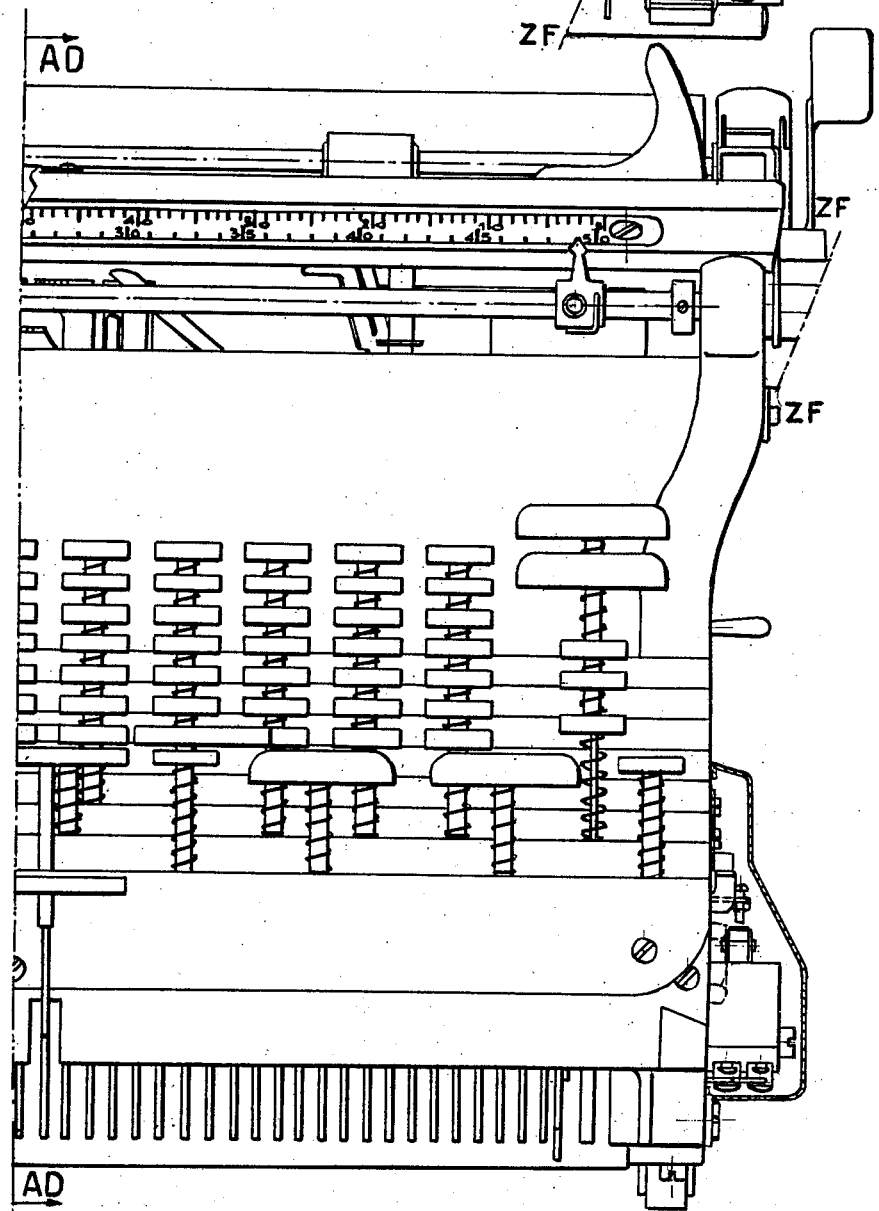
Fig. 136 Part c

United States Patent Office 3,073,427
Patented Jan. 15, 1963

3,073,427
MACHINE FOR TYPEWRITING, STENOTYPING OR TELEPRINTING, ENABLING THE SIMULTANEOUS OPERATION OF SEVERAL CHARACTER AND SPACE KEYS, SINGLE OR MULTIPLE
Jean Gremillet, 64 Ave. Felix Faure, Paris, France
Filed July 31, 1959, Ser. No. 830,871
Claims priority, application France Aug. 2, 1958
63 Claims. (Cl. 197—7)

The present invention relates to a combination of devices which, associated in a machine for typewriting, stenotyping or teleprinting provides means for greatly increasing printing or typing speeds and also for spacing the letters in accordance with the various widths of the different characters.

The increase in the printing speed is obtained particularly by:

The simultaneous operation of several character keys,
The operation, at the same time as the character keys, of the keys producing blank spaces of varied widths,
The simultaneous operation of several type bars by each key of a certain category,
Character blocks of varied widths some of which can consequently carry several characters,
A keyboard, adapted for each group of languages, the structure of which permits a more complete and simultaneous utilization of both hands,
The relative arrangements of the character keys according to mnemonical principles which facilitate the fingering of the keys,
Power actuation of the machine either by electro-magnets or a motor.

The invention also provides for printing successively or simultaneously characters of different widths such as with equal spaces between them.

The characters typed successively or simultaneously are arranged in normal text lines and with normal spaces as in machines designed for orthographic and phonetic writing.

Finally, the rules applied for the composition of the keyboards and the material structure of the latter, permit numerous and simultaneous strokes of the type bars to be made without any exaggerated movement of the hands in fingering the keyboard.

In order to simplify the specification, the text and the drawings describe, as an example, the whole of the mechanisms of the invention in the form of an orthographic typewriting machine. The application of the invention to accounting typewriters or to stenotyping or teleprinting machines comes easily within the scope of the invention.

Any machine built according to the invention can include any or all the devices included in prior art machines. Thus, it can include devices for the simultaneous striking of several keys, without including those for the operation of several type bars, a single key. Likewise, the machine can include type blocks of different widths, each carrying several letters or signs, a single letter or a single sign, all of different widths according to the type bars.

The application of the invention could also be limited to devices for simultaneously striking a space key and a character key.

The machine comprises optionally all the common auxiliary devices which usual alphabetical typewriters comprise. The description includes those in most common use, such as a tabulator key and margin set and release keys.

*What Has Already Been Proposed. Disadvantages of These Solutions*

Typewriters with simultaneous actuation of two or more type bars have already been proposed, but these have not been made industrially because of the disadvantages they present, such as:

Too great a differency by comparison with usual machines thereby requiring new tools for beginning manufacture, and also requiring the abandonment of desirable auxiliary parts and devices which have been proven desirable,
Too high a cost for design and construction that is disproportional to the advantages obtained,
Too large dimensions in comparison with prior art machines,
Too large a range of hand movements in fingering the operating keys, thereby cancelling or reducing the advantages of simultaneously actuating a plurality of type bars.

*The Similarity of Certain Parts and of Certain Auxiliary Devices With the Corresponding Parts of the Usual Machines. Advantages Resulting in Beginning Manufacture*

The new principles and devices of the present invention make it possible to keep all known devices of usual machines which they do not replace such as the carriage, type bars, etc.

These latter devices therefore do not have to be designed, and most of the machine-tools, as well as a part of the existing hand tools can be used, thus facilitating the start of manufacture and reducing the initial costs.

The overall dimensions of this machine are practically the same as those of the usual alphabetical machines.

*Advantages of the Invention With Regard to Stenotyping Machines*

When the machine built is a stenotyping machine, the latter has, in comparison to usual stenotyping machine, the advantage of presenting the text in normal lines, with normal spaces between the characters and between the words, thus enabling an easy reading and checking during the typing and the dictation. The increase in the printing speed resulting from the construction of keyboards, enables an operator for an equal speed of dictation to type more text with more normal spelling.

*Advantages of the Invention With Regard to Teleprinters*

In the case of an orthographic or merely phonetic teleprinter, the increase in speed resulting from the invention reduces the time required for the use of transmission wire or cable as well as the sending and receiving apparatuses, and makes possible the quicker transmission of urgent information such as stock exchange rates, press items, etc.

*The Machines of the Invention Are Optionally Powered*

Any machine built according to the invention can be provided with driving means, such as a motor, for example electric, or electro-magnets, either for powering all operational devices, including actuation of the type bars or for certain of them only, for instance for the carriage return. The invention comprises a particular driving device requiring only one or two electro-magnets.

*Some Essential Features of the Machines of the Invention*

Among the essential features characterizing the machines of the invention, are the following:

A special arrangement of the character keys which are arranged in groups having different striking points,
A utilization of this means to make possible not only the simultaneous fingering of several character keys, but also the simultaneous actuation of several type bars, A device for case shifting whereby the type bars of different groups may be shifted into respectively different case position to type simultaneously the initial letter of a word in upper case and the other letters in lower case, Escapement devices which variably advance the carriage according to the number of characters printed simultaneously and their respective widths, as well as of the number and the width of blank spaces provided between the characters and between the words.

*Limitation of the Descriptions of Certain Known Parts for Simplification*

Diverse parts of the machines of the invention can have the known forms characterizing the corresponding elements of the usual alphabetical typewriters.

For simplification these parts have only been represented or described where necessary to explain their connections with the characteristic parts of the invention and also to show that the necessary spaces for their installation had been reserved.

Thus the details of the carriage either have not been shown or have only been schematically indicated. The same is true of powering the carriage return.

Certain parts have been shifted or modified for space convenience.

Likewise, it has seemed unnecessary to represent the different forms that certain parts may assume, such as for instance, the mechanism for actuating a type bar. As an example only certain forms have been described and represented.

*Extension of the Application to Machines Whose Known Details Are Not Described*

Also, in order to simplify the specification only a typewriter in which the type bars strike the paper by an angular movement around a fixed axle is considered in this text. Nevertheless, the devices, which constitute the invention can be utilized in the other forms of known typewriters with or without memory, with independent type blocks and, in particular, in those in which the characters are carried by sliding parts, and in the teleprinters and stenotyping machines.

In general, the known parts of the machines, when they are represented in the figures, are represented assuming that it is a machine utilizing only manual energy; but all the devices which constitute the invention can also be incorporated into typewriters or stenotyping machines, or teleprinters utilizing power for the different drives, and/or for the printing. The structure of these electrical machines is such that the operation of the machines of the invention by the same process involves but few modifications of the forms described by way of example.

However, it is to be noted in particular that the differences in level between the successive lines of the keyboard can then be smaller, since the travel of the keys can be reduced. The drawings show moreover a special form of power for actuating the type bars by means of one or two electro-magnets.

The form and the functioning of the devices constituting the invention associated in machines with simultaneous operating keys and type bars will be described. For the sake of simplification, only the syllabic machines will be considered; the extension of the invention to non-syllabic machines simultaneously being a matter of course. But, the utilization of these devices in stenotyping machines, as well as the application of certain parts of the invention to alphabetical machines, is also considered

*Order Followed in the Description. Subdivision Into Devices. Order of the Figures.*

By way of example, a machine shown with a key board and having a given material structure will be described in detail, but this description is not to be taken as limitative. Different arrangements of keyboards for different languages will be shown, all these arrangements falling within the scope of the single material structure described.

The keyboards composed for different languages are structurally similar and differentiated only by the different positions of certain characters.

All these compositions of keyboards shown as examples differ only in the choice of the characters on the different type bars and indicated on the corresponding keys. The mechanical elements remain the same.

The keyboards for all other languages are composed according to the rules set forth below and on the basis of the frequencies presented in each language by the different letters and by their associations.

For certain languages or for certain uses, the typing of technical or mathematical texts, etc., the building of machines with identical or similar mechanical elements may be indicated only by increasing slightly the number of keys, type bars and levers, so as to make additional characters available. It seems useless either to describe or represent the corresponding lengthening of certain parts such as guides, different group plates, transverse axles, etc.

Like the usual machines the machines of the invention can be subdivided as follows:

Keyboard,
Striking mechanism,
Mechanism for case shifting (small or capital letters, figures or signs),
Device for moving and raising the ribbon,
Escapement mechanism,
Optionally: all the known auxiliary mechanisms, such as tabulation, etc.,
Optionally: power means for driving the machine devices.

As far as possible the above order is followed in the description. The text refers to the appended drawings which supplement it.

As regards the order and the numbering of the figures, examples of keyboards will be shown first, then the figures corresponding particularly to one or several mechanisms. The order of the descriptions has been followed as far as possible.

Certain of these views are accompanied by drawings of movement and by necessary views of detail.

The drawings or sketches concerning the variations also follow the order of the description.

The views of the whole machine are to be found at the end.

*List of the Figures*

Figure 2:
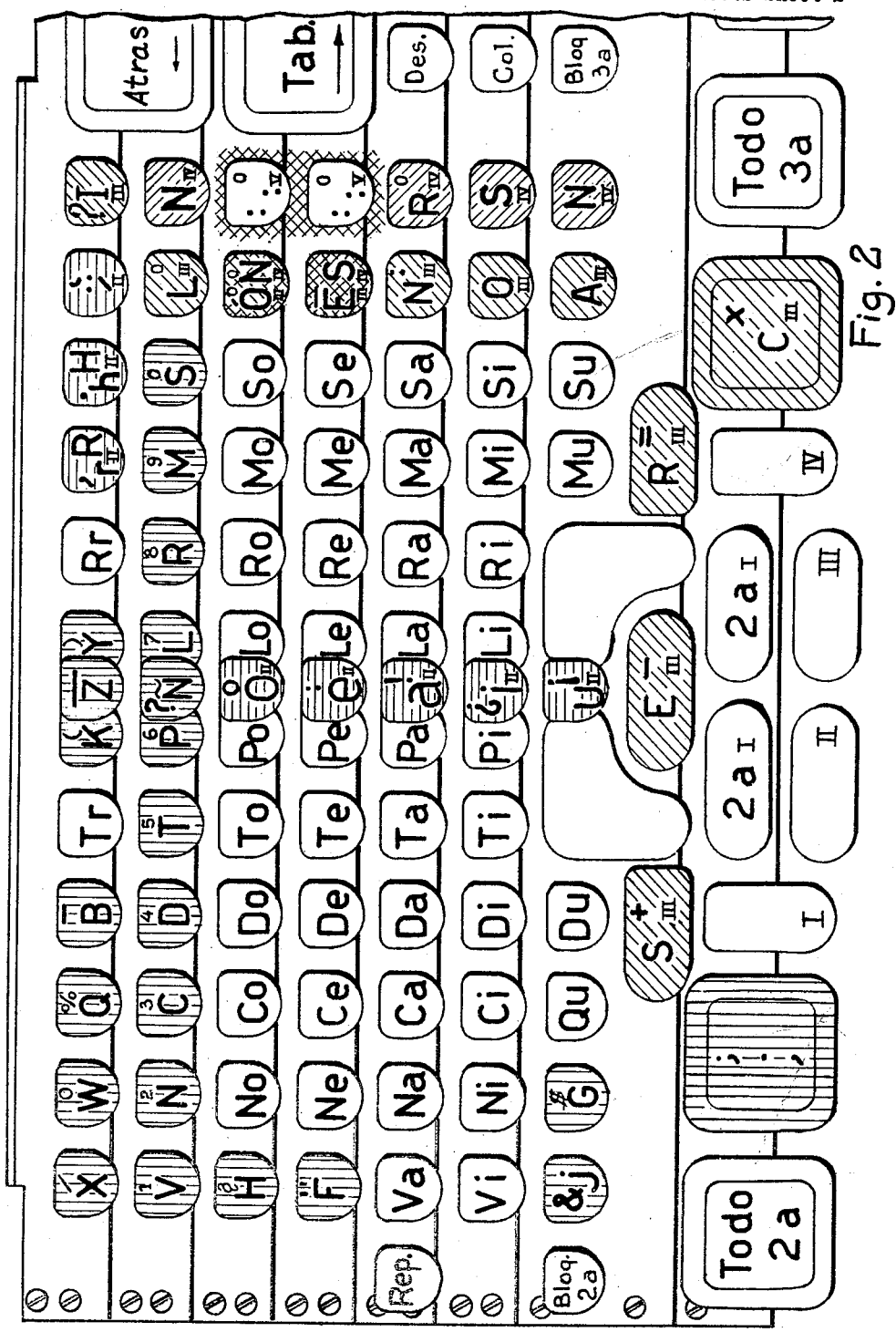
Figure 3:
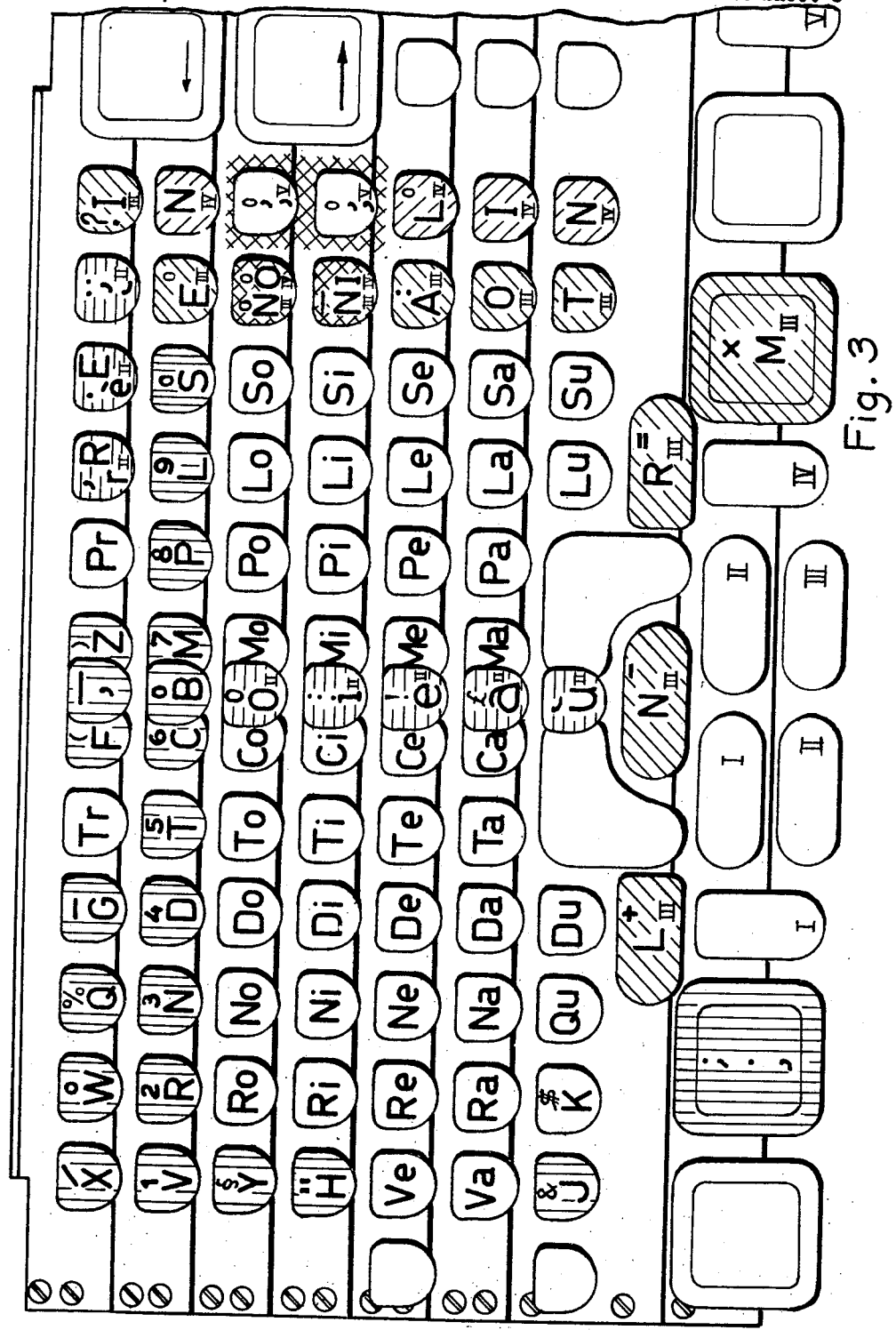
Figure 4:
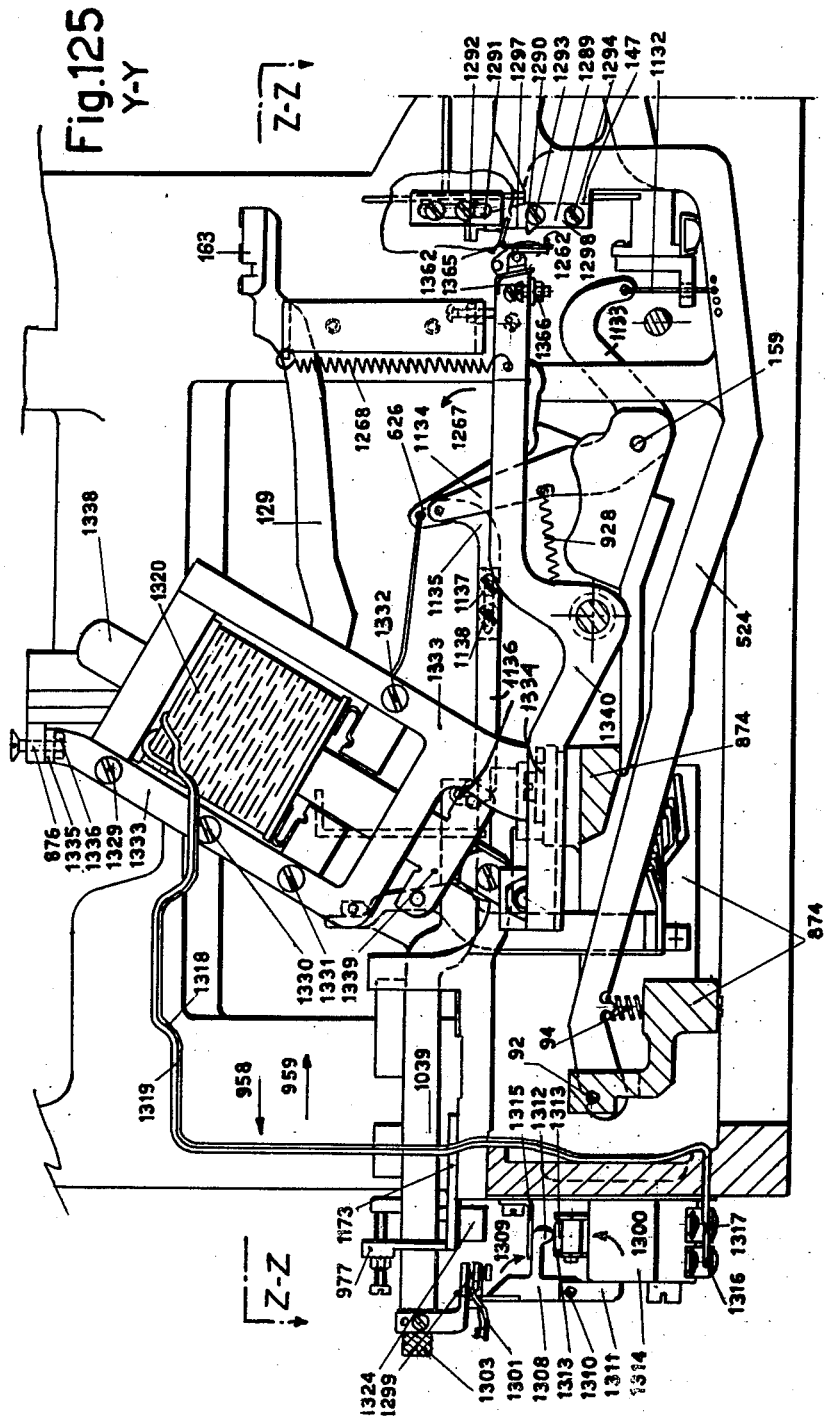
Figure 5:
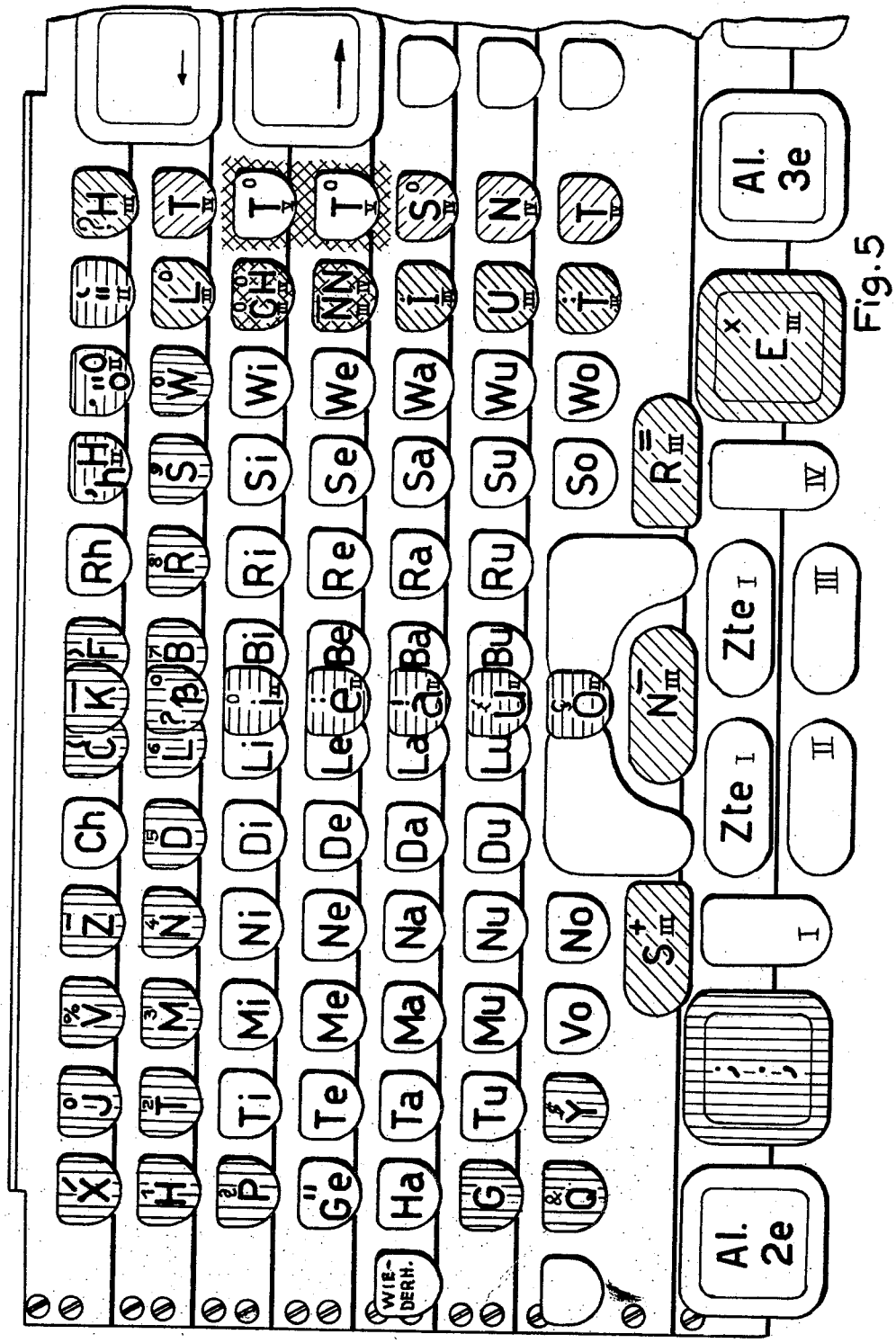
Figure 6:
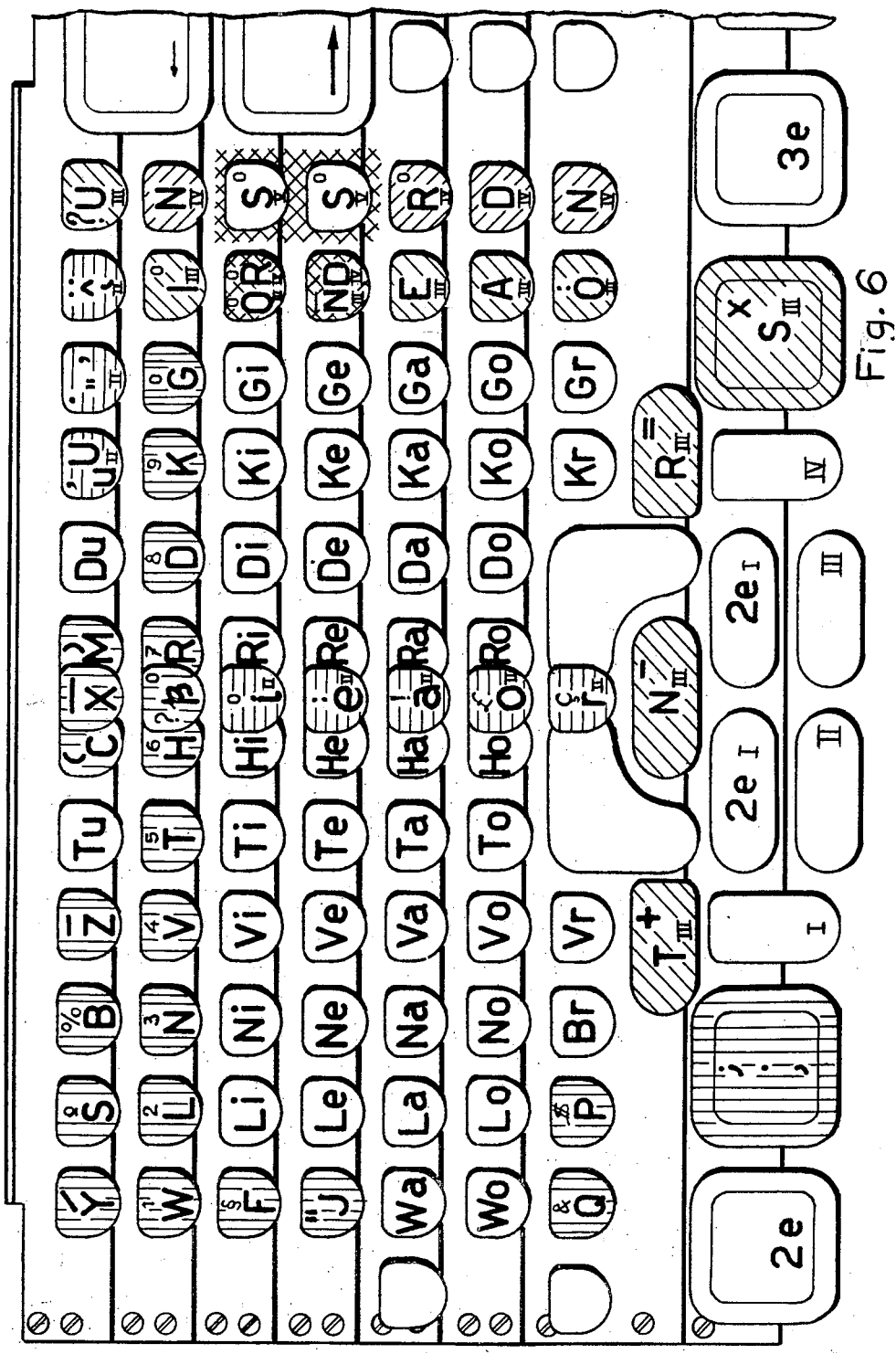

FIGS. 1 to 6, plan views of keyboards of the second type:

FIG. 1—French
FIG. 2—Spanish
FIG. 3—Italian
FIG. 4—English
FIG. 5—German
FIG. 6—Dutch FIG. 7, plan view of a connection-box with cover and keys removed, showing the key-bars, their lugs and cross levers.

FIG. 8, front view of a connection-box with cover and keys removed, showing the cross levers.

FIG. 9, partial view showing modifications in the connection-box, to the lugs of the key-bars and to the cross levers compared to FIG. 8 when the machine is built with the keyboard for the German language as shown in FIG. 5.

FIG. 10, partial view showing modifications in the longitudinal levers shown in FIG. 22, in the case in which the machine is built with the keyboard for the German language as shown in FIG. 5.

FIG. 11, sketch of the normal position of the fingers on keyboards of the second type.

FIG. 12, righthand side view of a connection-box without content and with cover removed.

FIG. 13, cross-section of a connection-box taken along section line AD—AD of FIG. 136.

FIG. 14, plan view of an example of a keyboard of the first type.

FIG. 15, cross-section of a connection-box taken along section line AG—AG of FIG. 136.

FIG. 16, cross-section of a connection-box taken along section line C—C of FIGS. 13 and 15 and section line D—D of FIG. 22.

FIGS. 17a and b, cross-section view of a connection-box showing the longitudinal levers operated by a lug with descending end. Righthand view, the connection-box being sectioned. Each of the cross lugs of key-bar operating each of the levers is shown in the separate section part b.

FIG. 18, side view of a key-bar with lug.

FIGS. 19, 20, 21, front face views of type blocks each carrying several coupled characters.

FIG. 22, plan view as in FIG. 7 showing the assembly of longitudinal levers, their intermediary guide, their front guide and the key-bars with their transverse lugs. This view does not show the lower small connecting-rods, neither does it show the lower cross levers shown in FIG. 23.

FIG. 23, horizontal cross-section taken along section line E—E of FIG. 25 showing the lower small connecting-rods and lower cross levers, complementing FIG. 22.

FIG. 24, left side view of the front parts of the first type of longitudinal levers mounted on deformable parallelograms.

FIG. 25, left side view of the front parts of the second type of longitudinal levers mounted on deformable parallelograms.

FIG. 26, left side view of the front parts of the longitudinal levers not including any upright in the connection-box and any deformable parallelogram and that are in the upper wave under the first lines of the keyboard.

FIG. 27, view similar to FIG. 26 showing the front parts of the longitudinal levers not including any upright in the connection-box and any deformable parallelogram but which, in comparison to those of FIG. 26, present the special feature of being in a lower wave under the first line of the keyboard.

FIG. 28, a partial vertical cross-section of the machine taken along section line G—G of FIG. 29 showing chiefly the mechanism for moving and lifting the ribbon as well as the segments and the setting mechanism in 2nd and 3rd case-shift positions.

FIG. 29, a partial longitudinal vertical cross-section of the machine along section line H—H and AD—AD of FIGS. 28 and 33 showing the same mechanisms as FIGS. 28 and 33.

FIG. 30, a plan view and a cross-sectional view taken along section line J—J of the plan view showing three devices for case-shift.

FIG. 31, plan view of brackets for cushioning group II type bars.

FIG. 32, side view of the brackets shown in FIG. 31.

FIG. 33, partial plan view of the back part of the machine showing the same mechanisms as FIGS. 28 and 29.

Figure 34:
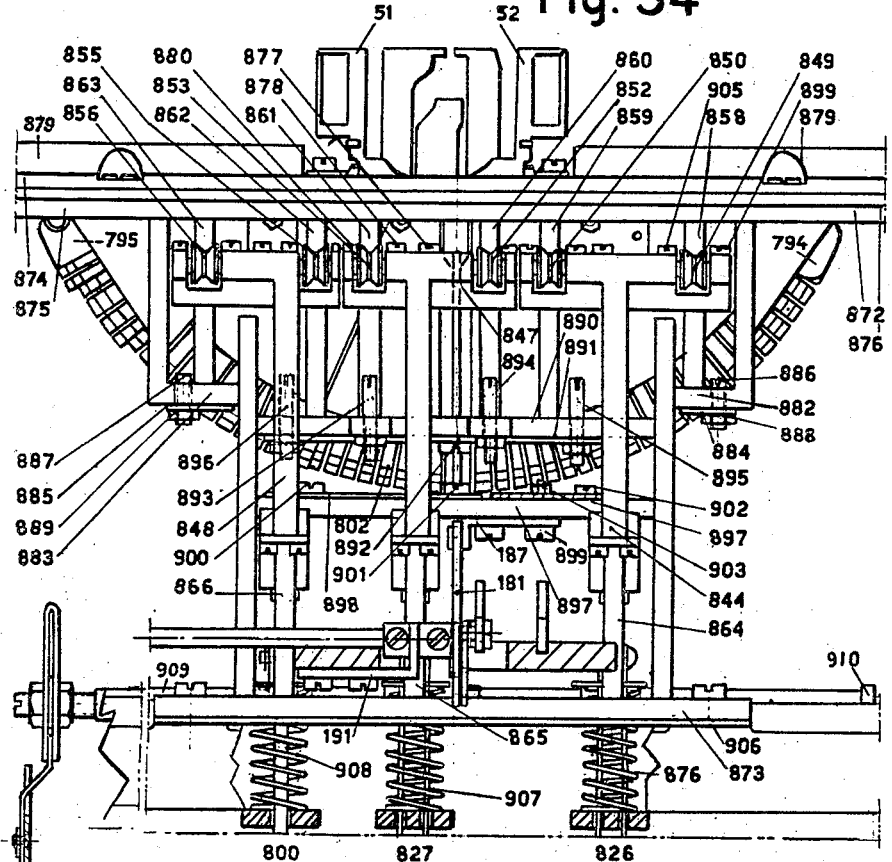

FIG. 34, rear view of the frame-support of the segments and the segments in resting position (1st case-shift position) showing chiefly the arrangement of the segments that enables them to be placed in three case-shift positions.

Figure 35:
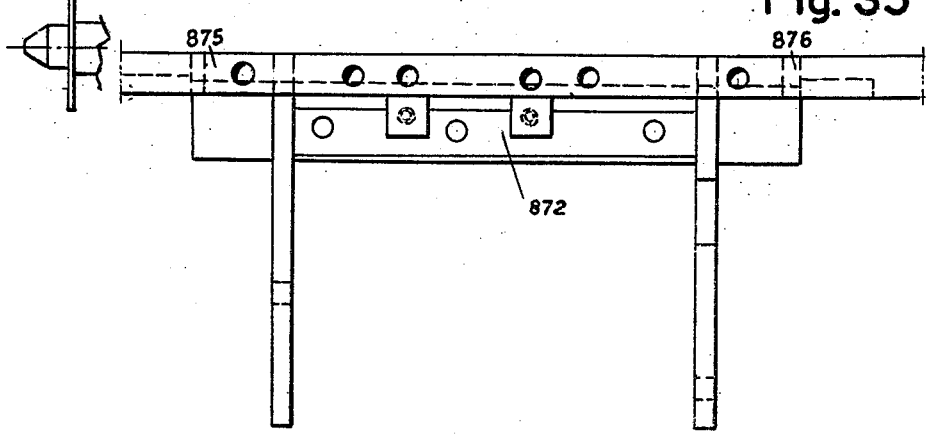

FIG. 35, a plan view of the frame-support of the segments.

Figure 36:
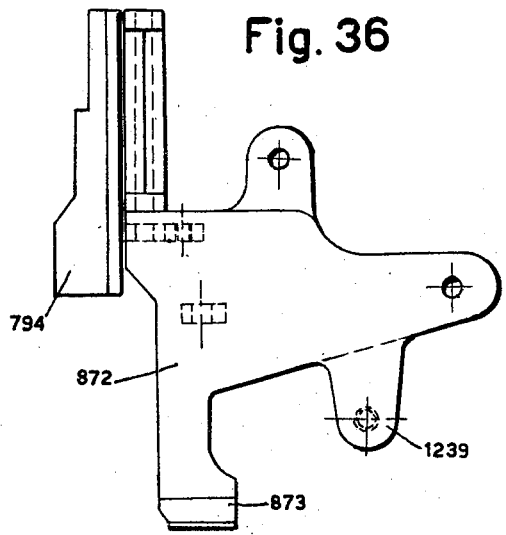

FIG. 36, a side view of the frame-support of the segments showing the segment of the group I in rest position (1st caseshift position).

Figure 37:
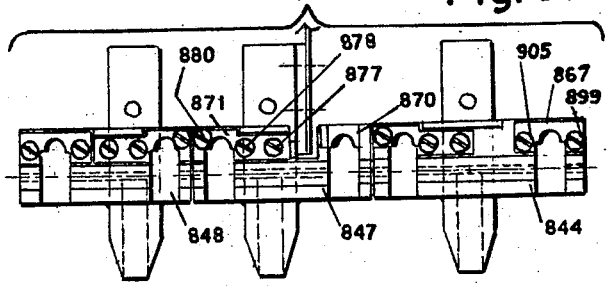

FIG. 37, plan view of three segment supports in their relative positions.

Figure 38:
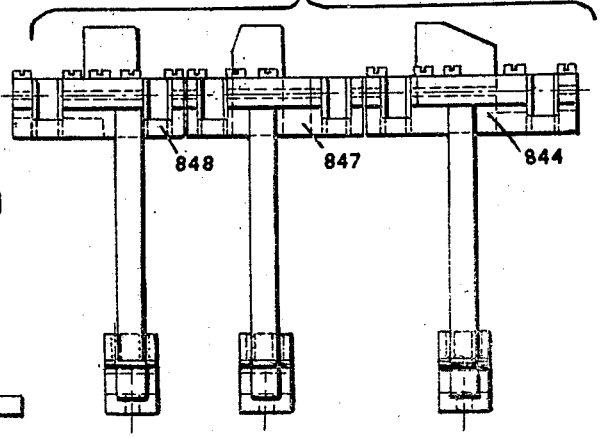

FIG. 38, rear view of three segment supports in their relative positions when all of them are in the same case-shift position (1st, 2nd, 3rd).

Figure 39:
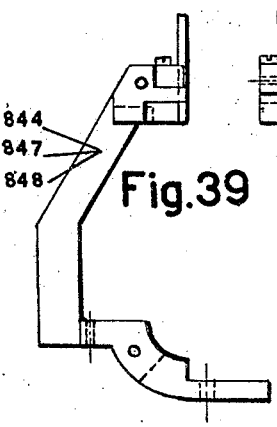

FIG. 39, side view of segment supports.

FIG. 40, rear view of the frame-support of the segments showing the segments, stroke-guides and ribbon-carrier, and a type bar of each of the five groups being in printing position with the segment of group I, the corresponding stroke-guide and the corresponding bar being in 2nd position (capital letters) and the other segments, stroke-guides and type bars being in 1st position (lower case—small letters).

FIG. 41, same view as FIG. 40 but showing segment of group II with the corresponding stroke-guide and the corresponding type bars being in 2nd case-shift position (capital letters) and the segments, stroke-guides and type bars of the other groups being in 1st case-shift position (lower case), no type bar of group I being shown in printing position.

FIG. 42, partial front view of the five segments showing the three stroke-guides and one type bar of each of groups I to V striking in 1st case-shift position (lower case).

FIG. 43, same as FIG. 42, but with the segment of group I, the corresponding stroke-guide and one of the type bars of this group being shown in 2nd case-shift position (capital letters).

FIG. 44, same as FIG. 42, but with the segment of group II, the corresponding stroke-guide and one type bar of this group being shown in 2nd case-shift position (capital letters); no type bar of group I being shown in printing case-shift position.

FIG. 45, same as FIG. 42, but with the segments of groups I and II as well as their stroke-guides and one type bar of each of these groups being shown in 2nd case-shift position (capital letters).

FIG. 46, front view of the end of line set key device and bell device.

FIG. 47, side view of the end of line set key device and bell device.

FIG. 48, side view of two normal single space keys.

FIG. 49, cross sectional view taken along section line L—L of FIG. 29 showing the interspace universal bar, intermediary levers, type bars and their cushions and segments of groups 1 to 4.

Figure 50:
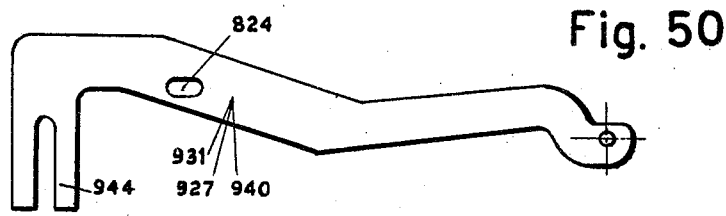

FIG. 50, side view of the intermediary lever for placing in position 2 (capital letters). Right hand view.

Figure 51:
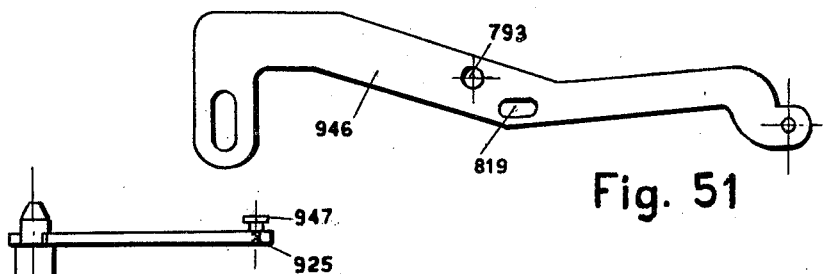

FIG. 51, side view of the intermediary lever for placing in position 3 (figures and signs).

Figure 52:
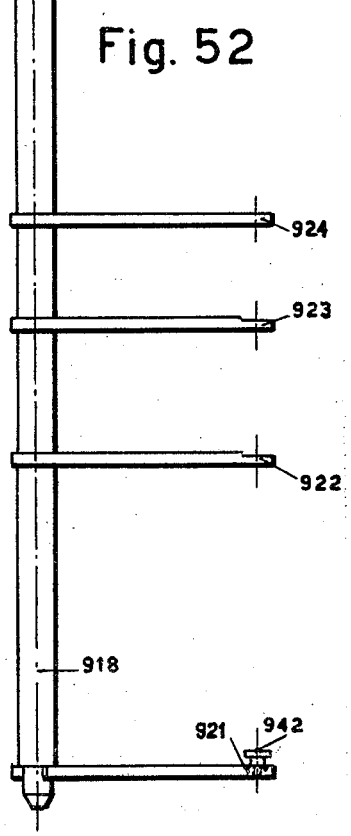

FIG. 52, plan view of the rear axle of position shift with its 5 radial levers.

Figure 53:
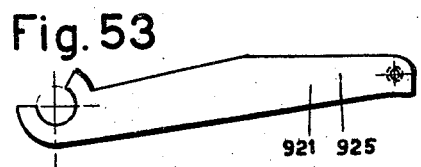
Figure 54:
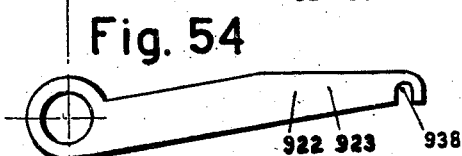
Figure 55:
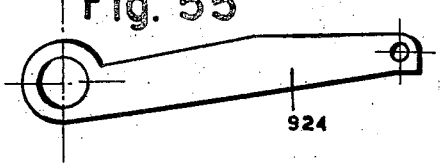

FIGS. 53—54—55, side views of the different radial levers of FIG. 52.

Figure 118:
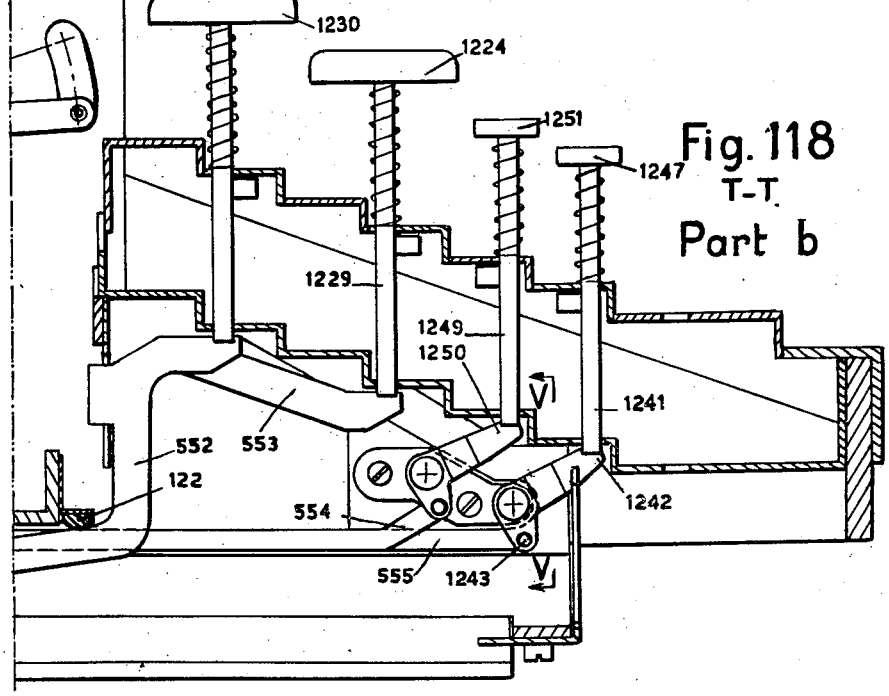

FIG. 56, partial plan view with the base in cross section along section line Z—Z of FIG. 118 and showing the escapement bar, the back group plates with small tongues, the lower part of the escapement device and tabulation device with the location of the segments shown.

FIG. 57, a cross sectional view taken along section line M—M of FIG. 56 showing chiefly the back group plates, their ascending levers and the lower part of the escapement device.

FIGS. 58, 59, 60, details of the lower parts of the escapement bar.

FIG. 61 escapement slide.

FIGS. 62 to 71, Escapement device in rest position.

FIG. 62, front elevation.

FIG. 63, plan view.

Figure 64:
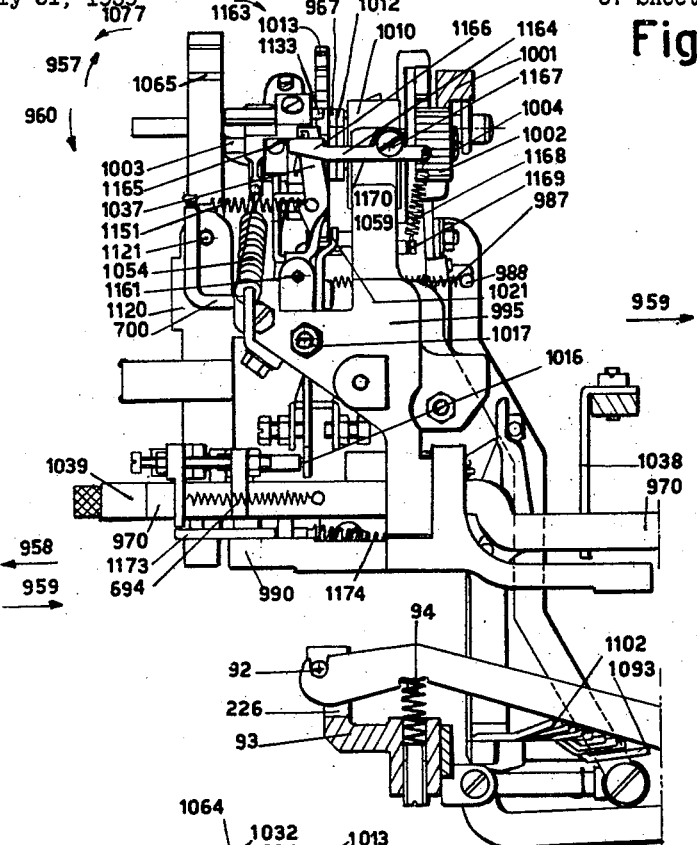

FIG. 64, right side view.

Figure 65:
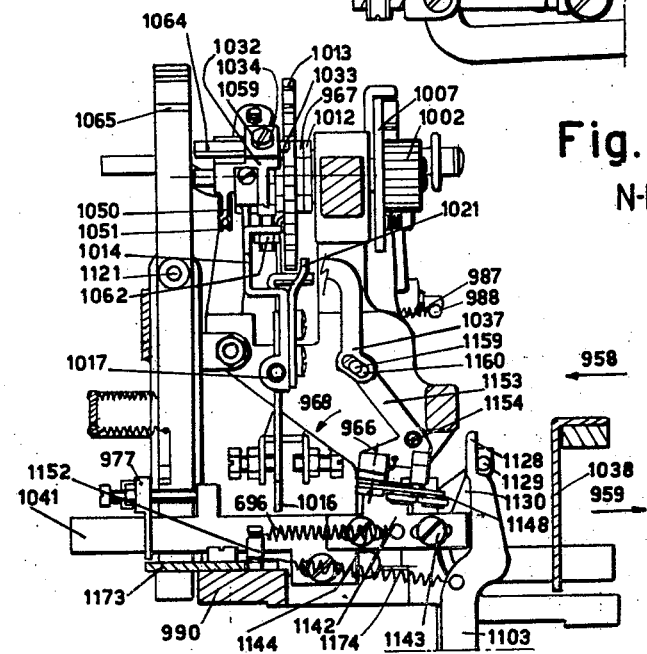

FIG. 65, cross sectional view along section line N—N of FIG. 62.

Figure 66:
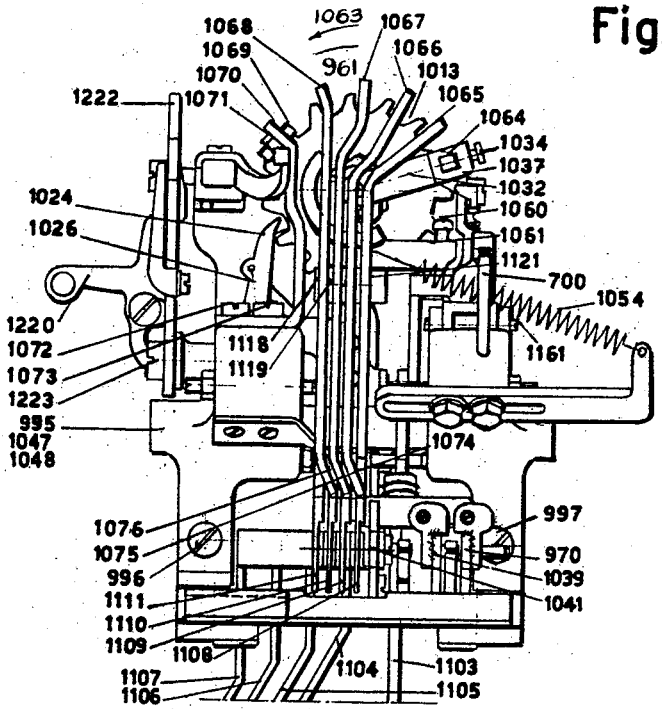

FIG. 66, rear view; the mobile stops support and the back guide of the slides being removed.

Figure 67:
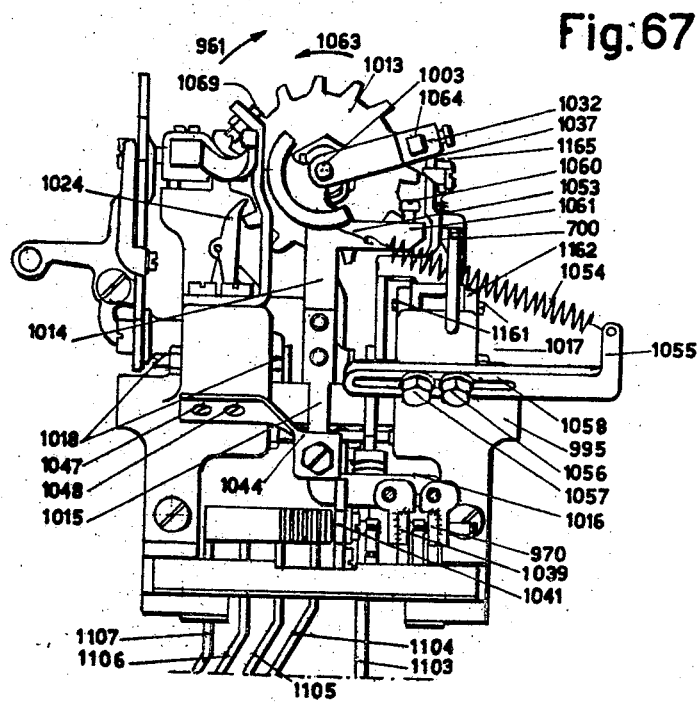

FIG. 67, rear view as in FIG. 66 with the same parts as removed and the mobile stops also.

Figure 68:
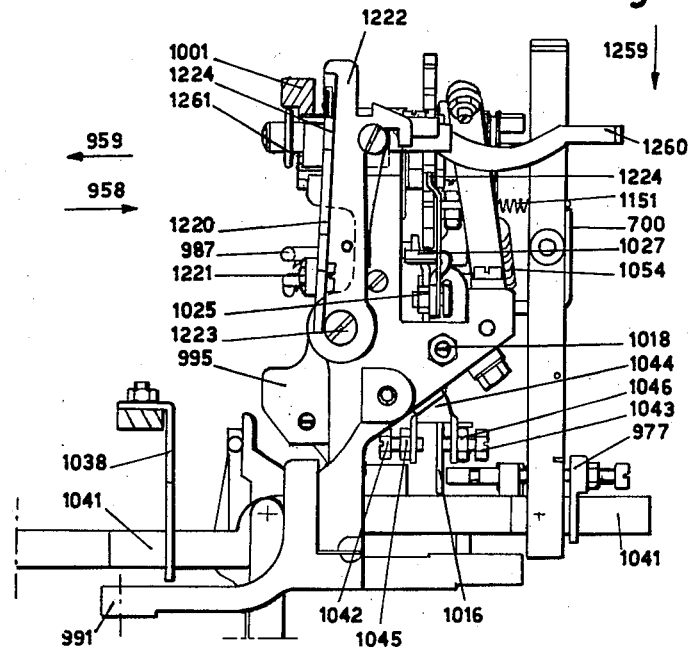

FIG. 68, left side view.

Figure 69:
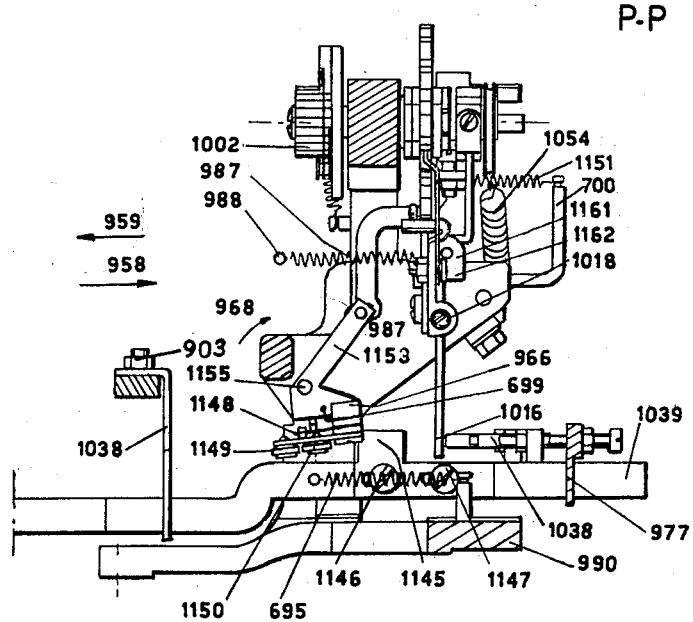

FIG. 69, cross sectional view along section line P—P of FIG. 62.

Figure 70:
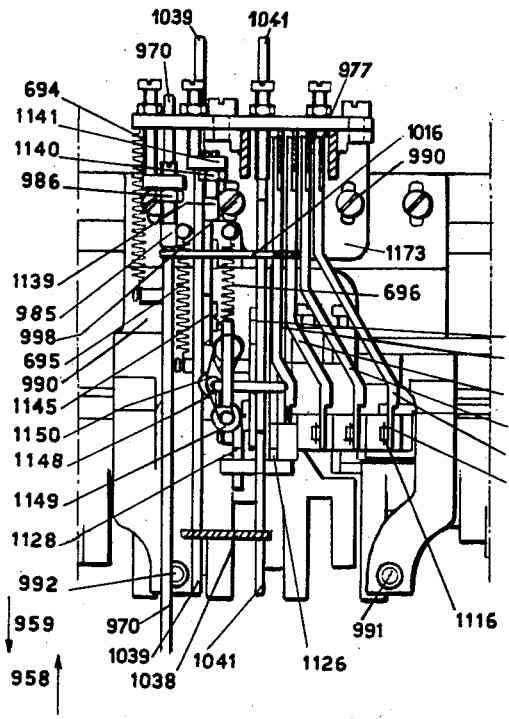

FIG. 70, plan view of the lower part with the escapement block removed.

Figure 71:
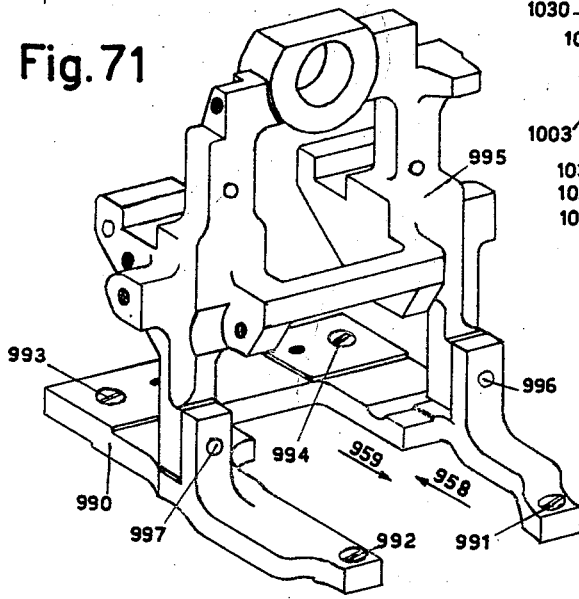

FIG. 71, perspective view of the frame of the escapement block mounted on its shoe.

Figure 72:
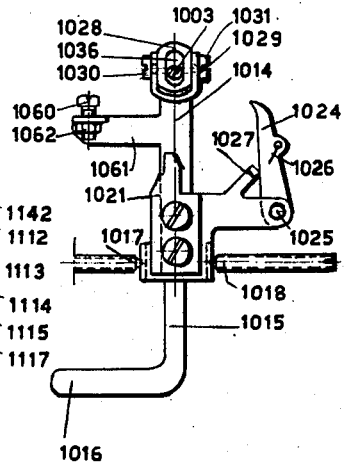

FIG. 72, front view of the dog block without the mobile dog.

Figure 73:
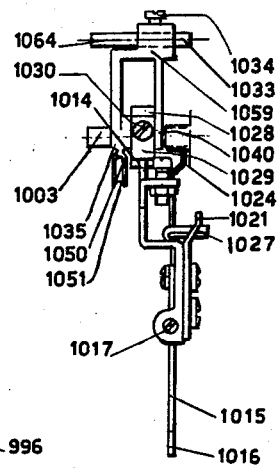

FIG. 73, right side view of the dog block with the mobile dog included.

FIGS. 74 to 76, mobile dog without its tooth.

FIG. 74, left side view.

FIG. 75, rear view.

FIG. 76, front view.

FIGS. 77 to 92, Group plates with small tongues.

FIG. 77, plan view of the set of five plates mounted on their common support.

| Groups | Plan view | Front view[1] | View from the left |
|---|---|---|---|
| I | Fig. 78 | Fig. 83 | Fig. 88 |
| II | Fig. 79 | Fig. 84 | Fig. 89 |
| III | Fig. 80 | Fig. 85 | Fig. 90 |
| IV | Fig. 81 | Fig. 86 | Fig. 91. |
| V | Fig. 82 | Fig. 87 | Fig. 92. |

[1] Cross section along section line R—R of Fig. 77.

FIG. 93, plan view of the plates support with axle and cross bars.

FIG. 94, side view of plates support.

FIGS. 95 to 97, stop of the mobile dog, called "zero stop."

FIG. 95, side view.

FIG. 96, rear view.

FIG. 97, plan view.

FIG. 98a, partial cross sectional view taken along section line S—S of FIG. 98 showing the rollers support and stop.

FIGS. 98 to 117, Views of schematic and partial movements of the escapement device in the six possible cases.

| Case | View from the left | Plan view | View from the back |
|---|---|---|---|
| 1st case | Fig. 98 | Fig. 99 | Fig. 100. |
| 2nd case | Fig. 101 | Fig. 102 | Fig. 103. |
| 3rd case | Fig. 104 | Fig. 105 | Fig. 106. |
| 4th case | Fig. 107 | Fig. 108 | Fig. 109. |
| 5th case | Fig. 110 | Fig. 111 / Fig. 112 | Fig. 113. |
| 6th case | Fig. 114 | Fig. 115 / Fig. 116 | Fig. 117. |

FIG. 118, cross-section view taken along section line T—T of FIG. 122 showing the ribbon color change and tabulation.

FIG. 119, plan view of two tabulation push-rods.

Figure 120:
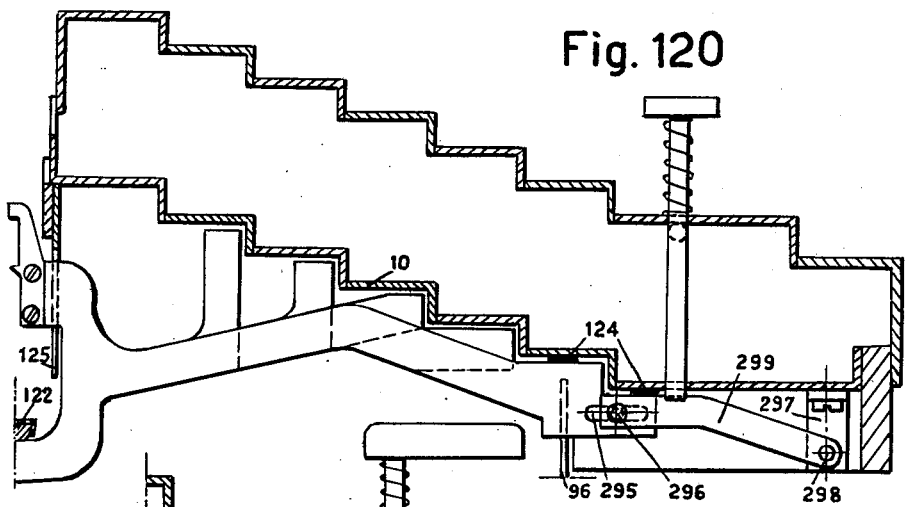

FIG. 120, a view showing the multiplication of the movement of a key of the 7th line.

Figure 121:
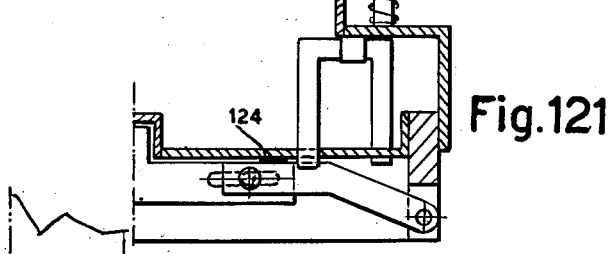

FIG. 121, a view similar to that of FIG. 120 showing the multiplication of the movement of a key of the last line.

FIG. 122, cross-sectional view taken along section line U—U of FIG. 118 showing the tabulation device and color change device.

FIG. 123, crossectional view taken along section line W—W of FIG. 122 showing the tabulation levers, cross parts and their common axle.

FIG. 124, cross-sectional view taken along section line V—V of FIG. 118 showing the tabulation push-rods control levers.

FIG. 125, partial cross-sectional view taken along section line Y—Y of FIG. 131, showing chiefly the entire power device.

FIG. 126, large scale right side view, of one of the small plates with lug fixed on the longitudinal levers for driving by the power device bar.

FIG. 127, partial right hand view showing the power device, the power device bar, the left electro-magnet and the end travel circuit-breaker.

FIG. 128, plan view of the back ends of the characters and space slides with the two switch-on catches of the electro-magnet(s).

FIG. 129, plan view of the power device catches and of their large-scale stop, the slide ends being removed.

FIG. 130, right side view of the stop of the tabulation catches and of the control of its regulation.

FIG. 131, partial plan view showing chiefly the power device with the base being cross-sectioned along section line Z—Z of FIG. 118.

FIG. 132, plan view of the electro-magnets and of the power device.

FIG. 133, cross-sectional view of the machine along its longitudinal axis and section line AD—AD of FIG. 136.

FIG. 134, right side view of the whole machine, the left plate of the base being partially removed.

FIG. 135, rear view of the whole machine with the base and the tabulation chimney partially removed.

FIG. 136, front view of the whole machine.

*General Aspect of the Machine, Its Overall Dimensions, Base and Supports*

The machine of the invention makes provision for printing several letters simultaneously and sometimes an entire word, but nevertheless present the same outer aspect and the same overall dimensions as the usual alphabetical machines.

Two types of keyboards are envisaged. In the case in which the machines are built with a keyboard of the second type described below, this keyboard is only a little extended towards the front of the machine.

A front view of such a machine is given in FIG. 136, a right side view with the base open in FIG. 134, and a rear view with the base open in FIG. 135. The base of the whole machine of the invention is identical or similar to that of a usual alphabetical machine and is consequently composed of a left plate 71 FIG. 134, of a right plate 72 FIG. 135, and of a back plate 131 FIG. 135.

These three plates, either cast or in sheet in particular directly support certain cross axles such as the back axle of position shift 918 FIG. 133 and the axle of the frame for eventual powering 1345. These plates support, other as in the usual machines, a certain number of transverse supporting crossbars, such as the support-guide axle of the longitudinal levers 874 FIG. 134 and the support-guide axle of the intermediary levers 838. The base also supports the carriage rails as well as several frames of sub-groups such as the shoe 990 and the escapement frame 995, the tabulation support 1227 FIG. 135 and several auxiliary supports which will be mentioned in the course of the description.

In the machines having the second type of keyboard, the front of the two lateral plates of the base of the machine 71 and 72 FIGS. 134 and 135 support the connection-box fixed, in the example, on these plates by four screws such as 15 and 16. This connection-box could be fixed by any other known means enabling a quick setting and removal.

*Means Utilized To Enable the Simultaneous Printing of Several Characters*

The keyboard of the syllabic machines of the invention includes keys similar to those of the usual alphabetical machines as well as other keys of particular forms.

The essential purpose of the invention is to accelerate the typing as compared to the usual alphabetical machines, while reducing, rather than increasing, the operator's fatigue. The essential means for doing this comprises an improved keyboard cooperating with adequate mechanisms which makes possible the simultaneous printing of several characters and at the same time to supply blank spaces between the printed words or the signs.

The integration of the spaces in the cumulated escapement will be described further. The simultaneous printing of several characters is obtained by the various following means:

Type blocks carrying several coupled characters of normal width. The use of blocks of normal width carrying several characters of less than normal width is already known.

Several keys simultaneously struck with each printing one character only.

Certain keys, which can be struck either alone, or at the same time as others, each key actuating several type bars.

The present invention makes use of all three of these means.

The first means (with several characters of normal widths) can only be used in a very limited way. In fact, this means increases very quickly the dimensions of the arc formed by a set of type bars in rest position, called a basket, or reduces the number of available bars. The invention, however, provides for the utilization of this means, in combination with the other means stated, which is illustrated by the presence of the type block ON in the illustrated examples.

The second means, several character keys struck simultaneously, each printing one character only, is utilized in a very extensive way in the examples. The solution adopted is based on the formation of several groups of type bars. The bars of each group are centered in such a way that their characters are all printed on a single point distinct from the printing points of the other groups. The printing points of the successive groups are separated from axis to axis by the distance which separates two successive characters in the text.

This solution requires some special features in the construction of the striking device. Thus, in order not to complicate the mechanisms, the groups of keys, of longitudinal levers and of type bars, are juxtaposed in principle from left to right (for the languages written in this direction) in the order of their respective printing points. However, it will be noted that, to facilitate the fingering, certain keys are placed out of their group, and as a consequence there is mixing of the key groups. This mixing of the key groups and the relative arrangements of the keys are essential features of the invention.

However, it is necessary that certain letters, figures and signs be repeated in several groups. This would seem, at first sight, to necessitate an extension of the arc of the basket. But this extension has been avoided by arranging three characters one above another instead of two, on most of the type bars.

The first case-shift position includes chiefly the small letters, the second the capital letters and the third the figures and signs.

Machines having three case-shift positions are already known, but their purpose was different since these were alphabetical machines.

It has been provided, moreover, that characters struck simultaneously could be in different case-shift positions. In particular, it has been provided that the initial letter of a word could be struck simultaneously in capital, corresponding to the second case-shift position, and the following letters in small letters, corresponding to the first case-shift position.

This necessitates in certain cases putting certain groups of type bars simultaneously in different positions. The invention makes this possible by having certain groups of type bars supported by separate segments whose position can be shifted separately or simultaneously.

The mechanism of case position shifting will be described in another chapter.

Finally, the third means stated above, the simultaneous putting into operation of several type bars by means of a single key, is utilized in the described examples, by the use of several mechanical processes. The devices involved are fitted into a connection-box that also supports the keys. The key rods which forms a unit with the keys pass through the connection-box. Some of these individual key rods operate simultaneously several longitudinal and cross levers.

The different type bars operated simultaneously through a single key by necessity belong to different groups. The keys which are therefore common to several groups still further increase the mixing of the different key groups with regard to the composition of the keyboard.

The mechanisms connecting the keys of the keyboard to the type bars can be of any kind, and more particularly similar to those of the different types of normal alphabetical machines operated either with manual or motor drive. The forms are therefore described by way of example.

With the described processes, if several keys each working one or several type bars of different groups are struck simultaneously printed on the paper. If the groups used are adjacent, the printed characters are also adjacent. If one key in a group is struck without striking one in each of the preceding ones blank intervals are left at the printing points which correspond to the striking points of the preceding groups that are left unused.

As many type bars as there are different groups with distinct printing points can be worked simultaneously.

In order that several characters with normal widths may be printed simultaneously and whichever of the three above means be used, it does not suffice that the type bars which correspond to these different characters should correspond to different printing points. It is further necessary that, subsequently to this printing, the carriage should advance by a length corresponding to the set of the characters printed simultaneously and with the requisite blank spaces.

This result is obtained through the escapement mechanism described below. The sum of the single intervals which the carriage has to advance will be called "cumulated escapement."

*Principle of the Simultaneous Striking of Character Keys and of Blank Space Keys*

The increase in speed obtained by the simultaneous printing of several characters is still increased by the fact that the escapement mechanism makes it possible to include in the cumulated escapement corresponding to the struck characters the additional interval corresponding to the striking of one or several blank space keys. One or several single or multiple space keys can therefore be struck either separately or at the same time as character keys.

Finally, the blank space(s) which may result either from characters in certain groups which have not been struck, or from one or several space keys which have been struck at the same time as one or several character keys, precede, come between or follow the typed characters which can be either any letters, figures or signs.

*The Invention Can Be Utilized With Two Types of Keyboards*

The keyboard of a syllabic machine, corresponding to the invention, can be of one of two types that are going to be described successively. The first type is simplest being small-volume, light-weight, and low-price. The second type, of greater possibilities but which is of a somewhat more complex construction is chiefly recommended for office machines. The two types keep the distinction of the type keys and bars in groups with distinct printing points.

In the first type of keyboard, the first means mentioned can be utilized, certain bars carrying several characters with normal width.

The second means is also utilized, distinct groups of type bars with the possibility of striking and operating simultaneously one bar in each of the groups, by striking simultaneously several keys.

But, with certain possible exceptions, the third means comprising working simultaneously several type bars by a single key is not utilized. This third means is a feature of the keyboards of the second type. This means requires the presence of a connection-box, which the machines utilizing the first type of keyboard are not provided with.

However, the means by which blank space keys may be struck at the same time as character keys can be utilized in the machines of the invention, with a keyboard of the first type as well as with a keyboard of the second type.

*Description by Way of Example of a Keyboard of the First Type and Method of Striking on This Keyboard*

The FIGURE 14 shows as an example a keyboard of the first type.

The keyboards of this type have an aspect and dimensions identical to those of the usual alphabetical machines, each character key working only one type bar. To print simultaneously *n* characters, *n* keys have to be struck simultaneously, except when a type bar carries several coupled characters.

This keyboard has three groups of keys numbered from left to right: I, II, III, which correspond to three printing points placed side by side on the horizontal.

The keyboard of FIG. 14 is composed for driving a basket of 42 type-bars.

Group I which is limited by keys 1 for back space, 2 for capital letters shift-lock, 3 for capital letters for the group I alone and by line 4—4, comprises 26 keys. Group II, placed between lines 4—4 and 5—5, comprises 8 keys. Finally, group III comprises 8 keys and is located between the line 5—5 and keys 6 for capital letters second case-shift position, 7 of third case-shift position for all of the groups and 8 for third case-shift position for group I alone. The blank space bar forms the base of the keyboard.

The case-shift positions provided for superposed characters on a single bar are three in number:

Case-shift position 1 is for small letters normal position;
Case-shift position 2 is for capital letters position obtained by operation of key 6;
Case-shift position 3 is for figures and signs position obtained by operation of key 7.

Keys 1, 2, 6, 7 act on known mechanisms, but their positions can be different and a special form will be described hereinafter.

Key 3 places the group I in second case-shift position and key 8 places it in third case-shift position; the possibilities of their arrangement will be seen below.

Three keys can be struck simultaneously, one in each of the groups, plus, if desired, the blank space bar.

In an example on the use of the keyboard of FIG. 14 the figures and the signs are placed in third case-shift position. It has therefore been possible, without increasing the number of keys of the keyboard of the usual alphabetical machines to make room for groups II and III, while placing in the group I all the letters of the alphabet. Other distributions can nevertheless be considered. In particular, it will be noted in the description made for the keyboards of the second type that group I may possibly not include all the vowels. What is said on this subject for the keyboards of the second type would be applicable to those of the first type.

For each language or group of languages the letters in the different groups have to be chosen and arranged taking as a basis, in particular, the following fact: whatever the language, a syllable has at least one vowel which, in the most frequent case, occupies the second place. This letter will be called "basic vowel." It is generally contemplated to have this vowel struck in the group II. This group must therefore include at least all the vowels. This necessity is also at the basis of the composition of the keyboards of the second type which will be described further.

In group I, are placed at least all the letters which are in general at the left of the basic vowel, therefore all the consonants. In FIG. 14 group I comprises the whole alphabet.

In group III, are placed the letters which are the most frequent in third place in the language for which the keyboard is composed. The same holds if more than 3 groups have been created, the letters which are the most frequent in fourth place are placed in group IV and also the same for any following groups which may be created. However, the keyboard in the example of FIG. 14 is limited to three groups.

The arrangement of the letters on the keyboard as a whole is made so as to facilitate the fingering when there are simultaneous strikings, and, taking as a basis the relative frequencies of the different associations.

These processes of choice and arrangement make it possible to limit the total number of keys.

The method of striking to which the composition of the keyboard is intimately linked, provides for the striking of the basic vowel of the syllable in group II. However, one may sometimes have occasion to use alphabetical strokes temporarily or to strike the basic vowel in group III or group I, if it is located there, or even not to utilize group I for a simultaneous striking, or finally, to divide the words without exactly taking into account the separation of the syllables. For the languages which are rich in coupled consonants and chiefly for those in which coupled consonants are often to be found at the beginning of the word, it will be advantageous to provide in group I, special keys with type bars carrying several characters side by side. For example, for a German keyboard, a key SCH operating a unique type bar carrying the three characters S. C, H joined together will be provided for. The character H being printed at the printing point of the group I, whereas the characters S and C are printed on the left of this printing point. In this case, at the same time as the preceding syllable, two additional blank spaces have been struck. This is one of the reasons why the invention has keys providing spaces of several intervals by mechanisms which will be described.

The number of keys per group and the nature of the characters carried by these keys may vary, not only from one language to another, but even for a single language. The number of type bars can therefore be increased or reduced.

Moreover, the groups need not be limited to three. A greater number can be adopted depending, for example, in function of the language considered. The possibility of increasing the number of groups is limited however, on the one hand by the fact that the whole surface of the keyboard has to be reached easily by the operator's fingers and, on the other, by the fact that the increased number entails an increase in the difficulty of striking, and, in consequence, a relative slowing down. The number of groups is also limited by the fact that it increases the complexity and the price of the machine.

The principle of juxtaposed groups of keys has already been put forward. The invention commends itself however, by the distribution of these groups, by the compactness of the whole, by the fact, as it will be noted below, that the groups of keys can be interspersed on the key board, which has been done in an even more characteristic way in the examples of the keyboard of the second type. The invention also includes the specific feature that it can place the different groups in different case-shift positions 1, 2 or 3 so as to strike simultaneously capital letters in case-shift position 2, small letters in case-shift position 1 and figures or signs in position 3. For the sake of simplification the case position shifting, these possibilities have only been realized with the keyboard of the second type. More or less than three case-shift positions could also be provided.

*Similarity of the Machines of the Invention Built With the Keyboard of the First Type to Those Built With the Second Type Keyboard Which Are Described Hereafter*

The machine as it is described hereafter and shown by the drawings by way of example, presents the characteristics of forms which enable it to function with the keyboard of the second type. It has not seemed necessary to show the general assembly of the machine adapted to the keyboard of the first type. In fact, the mechanisms are the same in both cases. The only characteristic difference in the machine having a keyboard of the first type is the absence of the connection-box, described with the examples of the second type keyboards. In the machines utilizing a keyboard of the first type, each key is mounted directly on the front end of an associated longitudinal lever. Like in the usual typewriters, whether it be a machine with a keyboard of the first or the second type, the multiplication of the movement in the sequence of the connections between each key and its type bar being calculated in relation to the line of the keyboard in which the key in question is set, except when these are mounted on deformable parallelograms. This point will be described and reverted to later.

The characteristics of material structure of the keyboards of the second type will now be described.

*Second Type of Keyboard. Material Structure. Examples of Composition for the French and for the English Languages. Rules and Means for Composing a Keyboard for Any Language. Method of Striking on the Second Type of Keyboards*

The material structure of the keyboards of the second type provided for by the invention, the method and means to be utilized for composing similar keyboards for the different languages or groups of languages and the method of striking on the keyboards of this type will now be described.

The second type of keyboard, as well as the mechanisms controlled thereby have been so designed so as to constitute the best compromise between the maximum possibilities for using the hands, and the best mechanical possibilities.

As an example, the FIGURE 1 shows the keyboards composed for the French language. For each of the other Latin languages, it is well to adopt a somewhat different composition taking as a basis, the statistics of frequency of the use and arrangement of letters in forming words. The modifications consist in changing the letters of different keys and of the corresponding type bars. In particular, for certain of these languages, it is desirable to invert certain of the vowels of group II coupled with consonants of group I on each of the lines of the keyboard. The general structure of the keyboard may remain the same. FIG. 2 shows an example of keyboard for Spanish and FIG. 3, an example for Italian.

FIG. 4 shows the keyboard composed according to the same principles for the English language. For the latter case, the number of keys, the form of the keyboard and the corresponding mechanisms are the same as for the keyboards of the Latin languages FIGS. 1, 2, 3. The only difference is in the different distribution of the letters on the keys and on the type bars.

A similar keyboard can therefore be constituted for each of the languages or for each group of languages other than the English language and the Latin languages, by utilizing the same material structure. Only the distribution of the characters on the keys and on the type bars has more or less to be modified. For that purpose, the frequencies of the associations of letters in each language or group of considered languages are taken as a basis.

Thus, FIG. 6 shows an example of keyboard for Dutch and the FIG. 5 an example for German.

In the latter example, it has been found advantageous to bring the G of group I and the E of group II into action by means of the key GE (1st col., 4th line) by reason of the very high frequency of the association GE. On the other hand, key G (1st col., 6th line) operates only the G of group I whereas in the examples for the other languages the latter key operates two type bars. The slight modification resulting from this in the connection-box is indicated below.

For certain languages or groups of languages, it may be found desirable to increase or reduce the number of keys and the associated number of type bars and consequently the number of corresponding connections.

The methods of striking to be utilized on this type of keyboard are the same whatever the language for which the characters have been distributed over the keys and bars.

The mechanisms are the same for all the keyboards, whether they are of the first type described previously or of the second type. These mechanisms will be described later on.

The keyboard of common structure shown as an example in FIG. 4 with characters distributed for printing the English language and FIGS. 2 to 6 for other languages, comprises 104 keys (not including the five additional or multiple space keys whose adoption is optional). These keys comprise:

92 character keys,
2 space keys (eventually five additional or multiple space keys corresponding to the five striking groups),
1 back space key,
4 character case-shift position keys,
2 case-shift position-lock keys, and
3 tabulation keys.

The number of keys can as a matter of fact be increased or reduced.

The 92 character keys are distributed over 13 vertical columns and over 9 horizontal lines.

87 are ranged regularly in the rectangle constituted by the 13 first columns in the 7 first lines.

These 87 keys are usually struck with the fingers other than the thumb, as in a usual alphabetical machine. Nevertheless, those of the 7th the central column, being raised in comparison to the others of the same lines, FIG. 15, can also be struck with either the right or left thumb.

The three character keys of the 8th line, FIG. 4, are struck with the thumb. The thumb keys of the lower part of the keyboard, 8th and 9th line, are lengthened laterally so as to take into account that, for the striking, the end of this finger is horizontal.

The two character keys of the 9th line (2nd and 3rd columns for one of them, 11th and 12th columns for the other), are struck with the part of the palm at the base of the thumb (thenar) of the right and left hand respectively.

The two normal single space keys (Esc*t*) of left and right, whose surface extends from the 7th line to the 8th line are struck by the thumb.

The 4 case-shift position keys are in the 9th line. The two of the middle, 2ndI and 2ndII are struck with the thumb, the two others, All 2nd and All 3rd are struck with the part of the palm, on the little finger side (hypothenar eminence), respectively with the right and left hand. All the palm keys have an increased surface and a rounded edge.

The position-lock keys, Bloc 2nd and Bloc 3rd in 7th line are struck preferably right and left little fingers respectively.

The 14th column, besides one of the shift lock keys, comprises three tabulation keys, whose function is known, as well as the back space key. The tabulation key and the back space key are square and more raised than their adjoining keys of the 13th column, FIG. 133. They are struck either with the side of the little finger or with the extremity of several fingers together. The other keys of this column are rarely utilized.

The additional single space key marked Esc*t*I FIG. 4 and the double space key marked EsctII are struck with the left thumb. The triple space key and the quadruple space key respectively marked Esc*t*III and Esc*t*IV are struck with the right thumb. The quintuple space key marked Esc*t*V is struck either with the right little finger or with the edge of the right hand reversed.

These additional or multiple five space keys are of an optional construction. Their function is detailed further. It is to be noted that among the four of them operated by the thumbs and which are lengthened like the other thumb keys, two are lengthened horizontally and two vertically, the two first corresponding to the thumb extended and the two others to the thumb bent.

The keys of the keyboard FIGS. 1 to 6 are classified in five groups: I, II, III, IV, V (as explained further) corresponding to the five groups of type bars each of which has a distinct printing point and is mounted on a distinct segment, according to the principle already stated with regard to the keyboards of the first type. The five printing points follow in the same order from left to right.

Only one type bar of each of the five groups can be operated at a time. If two or several type bars of a same group were operated at the same time, these bars would either bind or pile up, just as in an ordinary alphabetical machine when several keys are struck at the same time.

The character keys carrying only one letter without Roman numerals are in group I. Those carrying two letters without Roman numerals each simultaneously a type bar of group I and a type bar of the group II. For the other character keys, the Roman numeral indicates the group(s) to which the corresponding key and type bar belong. In the 12th column, the third key operates a type bar provided with a unique block carrying two characters whose striking points are respectively those of groups III and IV. The 4th key of this 12th column operates simultaneously one bar of group III and one of group IV. Two examples of different mechanical means which, with regard to the stroke and the print, give the same result, are accordingly shown.

*Principle of the Action of a Single Key on Two Type Bars*

Most of the keys included in the columns from the 1st to the 11th, except column 7, and located on lines 3 to 6, carry two letters each, a consonant of group I followed by a vowel of the group II.

The same holds for some keys of the line 1 and of the line 7.

The striking of each of these keys causes the simultaneous printing of the two letters indicated on the key. In fact, each of these keys operates two type bars, which reduces the number of keys to be struck simultaneously for printing a group of letters.

These double-action keys carry the most frequent associations of consonant and vowel in the syllables of the language for which the keyboard is composed. (In general the basic vowel and the consonant preceding it.) Moreover, most of these keys are disposed in the centre of the keyboard (middle columns and middle lines), so that for the greatest possible percentage of typing the hands should remain approximately in the same position.

In each of the columns in which a consonant of group I is so coupled with a vowel of group II, which changes according to its line, the line 2 is kept for a key carrying this same consonant noncoupled.

This allows this consonant to be printed alone or to be printed with other letters by simultaneous striking of several keys.

FIG. 136 shows that the keys of the central column the (7th) have the double feature of being raised by comparison with the general level of the other keys of the same line and to be inserted between the columns 6 and 8 which are separated from each other by the normal distance. As a result there is consequently a diminution in the surface of the keyboard. This difference in level between the keys of the central column and the surface of the other keys of each line is maintained in their travel, in order that they shall not collide with the keys of the 6th and 8th columns. Although the edges of these keys of the 7th column overhang the adjoining keys, there is no resulting difficulty in striking the latter, the striking being effected (FIG. 11) with the help of the forefinger directed towards the centre of the keyboard and, consequently, inclined in this direction. The keys can be struck by either operator's hand and, in particular, either with the help of the forefinger, as for their adjoining keys, or by one thumb which, although it must be held almost horizontal, can easily avoid hitting adjoining keys. The median line formed by the raised keys of the 7th column constitutes, moreover, a guide mark easily seen or felt by the operator, and which locates, while separating them, the respective fingering areas of both hands. More than 7 raised keys could be provided and/or they could be distributed differently over the keyboard. Columns of raised keys can, in particular, be provided on the left and on the right of the keyboard and/or the space bars can be so disposed. FIGS. 133 and 136 show furthermore that the keys of the 14th column (auxiliary drives) are also raised.

In the lines from the 3rd to the 7th, FIG. 1, the central column (7th) which is raised is reserved for the key carrying the vowel of group II which is associated with different consonants of group I on the other keys of the same line. The different keys carrying the same consonant of group I and associated with different vowels of group II are located in the same column.

This arrangement makes for great simplicity in the construction of the connection-box (this will be noted below) and, greatly facilitates learning the keyboard for rapid striking. In fact, when the operator thinks, reads or hears a syllable, the initial consonant of the syllable determines the column of the keyboard and consequently the finger which has to strike, and the vowel following this consonant determines the line of the keyboard, that is the height and the distance at which the finger has to strike. The reaction to thought, sound or reading becomes very quickly mechanical.

The columns of character keys which are mostly to the right (columns 12 and 13 for instance), are reserved for keys which drive the type bars of the groups III, IV, V.

These keys, in combination with those of groups I and II or common to these two groups, allow the simultaneous printing in most of the cases of all the letters of a syllable, even when the latter comprises more than two. The consonants of group I, whose frequency before the basic vowels of the syllables is too low for them to be coupled with vowels of group II, are placed on keys of the left part of the keyboard for reasons of mechanical order, for example on the edges of the keyboard, that is, on the first line and the seventh line of the first column. The center keys are thus kept for the letters or associations of letters most utilized.

In group I are all the consonants. The vowels are not to be found there. They could nevertheless be placed there, on condition that the machine be built with a greater number of type bars. Only a few of them could be placed there; for instance in the keyboard for the French language in the group I there could be placed one letter *i*, this allowing the printing of the word "MONSIEUR" in two groups of simultaneous strikings: "MONS" and "IEUR." In the corresponding keyboard of the same machine for the English language in the group I there would then be placed for instance one letter A, the frequency of printing this letter alone being high. Similar exceptions will be deemed expedient for the keyboards for other languages.

The absence of all the vowels or of certain vowels in group I makes it possible to reduce the total number of type bars and therefore of levers and consequently the width of the keyboard and of the machine as well as its cost price.

Certain words or syllables begin by a vowel, for example ANIMATION. When printing the first syllable of such words, a vowel of group II is struck without striking any key of group I, it is as though a simple space key had first been struck, that is this vowel is printed at the striking point II.

So that between the word beginning by a vowel and the preceding word there should not be two spaces instead of one, it suffices that with the end of the preceding word the space key is not struck.

All that is said above concerning the material structure and the composition of the keyboard, as well as the method of striking is valid not only for the example of FIGS. 1 to 6, but also for keyboards that will be composed for languages other than the Latin languages, the Germanic languages and the English language. That is why the letters attributed to the different keys have not been named in this text for the six examples.

In FIGS. 1 to 6 which show examples of keyboards, the character keys corresponding to the different groups (I, II, III, IV, V) are distinguished not only by the indication of the groups in Roman figures, but moreover by the following conventions (it will be noted that for the manufacture these conventions of lines are replaced by differences of colors):

Group I—keys hatched vertically,
Group II—key hatched horizontally,
Groups I and II—blank keys (except the two keys of group V located in the 13th column and the keys for auxiliary functions),
Group III—keys with hatchings ascending from left to right,
Group IV—keys with hatchings descending from left to right,
Groups III and IV—2 checkered keys in the 12th column,
Group V—2 blank keys on checkered background in 13th column The keys for auxiliary functions each carry the abbreviation of the function (FIG. 4):
Back space: back space,
Tab: tabulation,
Pos: setting of tabulation stops,
Dep: release of the tabulation stops,
All 2nd: placing in 2nd case-shift position (capital letters) of the whole of the groups,
2nd I: placing in 2nd case-shift position (capital letters) of group I alone.
2nd II: placing in 2nd case-shift position (capital letters) of the group II alone,
All 3rd: placing in 3rd case-shift position (figures and signs) of the whole of the groups,
Bloc 2nd: Locking of the whole of the groups in 2nd case-shift position,
Bloc 3rd: Locking of the whole of the groups in 3rd case-shift position.

In the keyboards shown as an example for other languages FIGS. 1, 2, 3, 5, 6 each character key belongs to the same group(s) as the key appearing in the same location in FIG. 4 (keyboard for English). Nevertheless, it is worth noting the two following exceptions in the keyboard of FIG. 5 for German:

The 4th key of the 1st column (Ge) which operates the G of group I and the E of group II,
The 6th key of the 1st column (G) which operates only the G of the group I.

The slight modifications resulting from this in the connection-box are indicated further in FIG. 9.

The keys for multiple or additional spacings, which construction is optional, are as follows in FIG. 4:
Esc*t*: 2 single normal space keys,
Esc*t* I: additional single space of group I,
Esc*t* II: space of group II (2 intervals),
Esc*t* III: space of group III (3 intervals),
Esc*t* IV: space of group IV (4 intervals),
Esc*t* V: space of group V (5 intervals).

Whatever the language for which the keyboard is composed, the distribution of the letters, figures and signals on the keys and type bars is conditioned by the material structure of the keyboard and by the groups to which the different keys belong.

Having, on the other hand, determined the relative frequencies of the different associations of letters, signs and keys in the considered language, these statistics are taken as a basis for choosing the characters that will be placed in each of the groups, taking into account the number of type bars available in each of them.

Furthermore, the maximum use possibilities of the hands for the simultaneous strikings of several keys are taken into account. In particular, the differences of skill, of suppleness and of strength of the different fingers are taken into account. Moreover, care must be taken that the hands are used equally. In short, the best fingering has to be determined. This is what has been done as an example for the keyboards shown by the FIGS. 1 to 6. All this work is based on the statistics made for each language.

Certain details of these rules and means are now going to be stated.

It has been noted that the second category keyboard, shown in FIG. 4 with a distribution of characters for English and in FIGS. 1, 2, 3, 5, 6 with respectively different distributions for the other languages, is divided into two parts, a left half and a right half by the seventh column which is raised above the uniform level of the other columns (FIG. 136).

In principle, each hand strikes only the keys of the half which corresponds to its side. Nevertheless, in some cases it may prove desirable to move one of the two hands into the opposite half.

The normal position of the hands, shown in FIG. 11 is the following: the extremities of the fingers (except the thumb) are placed over the keys of the fourth line and respectively above the keys of the following columns:

| Fingers | Left hand column | Right hand column |
|---|---|---|
| Forefinger | 5 | 9 |
| Middle-finger | 4 | 10 |
| Ring-finger | 3 | 11 |
| Little finger | 2 | 12 |

The extremities of the thumbs are respectively on the single space keys as the left (columns 5 and 6) and as the right (columns 8 and 9) lines 7 and 8 for each of the two keys.

For most typing, each hand remains in or close to this median position.

The keys carrying two coupled letters one of which is of group I (generally a consonant) and the other of group II (generally a vowel), will be considered first.

The fourth line is reserved for the basic vowel of group II most used, that is the vowel most frequently located immediately after the initial consonants, in the syllables of the considered language (e in French and in English).

The succeeding upper and lower lines are reserved in the order of the use frequencies of the rest of the basic vowels.

Still taking as a basis the median normal position of the hands, the columns are respectively assigned to different consonants so that the respective frequencies of utilization of these different consonants before the basic vowels, in the considered language, are in a decreasing order corresponding to the decreasing order of the skill of the different fingers. Thus, the fingers in order of skill and in the normal position of the hands, correspond to the columns assigned to the consonants in the order of their frequency of utilization before an associated vowel.

The other consonants of group I which it has been possible to couple individually with a vowel of group II are assigned to the columns 6 and 8 which each forefinger reaches respectively by stretching towards the center of the keyboard, almost without any lateral moving of the hand. It has been noted that the column 12 is reserved principally for letters which are to be found frequently at the third striking point in the groups of simultaneous strokes, that is, after the first vowel in the syllables of the language considered and which, from the mechanical viewpoint, have been placed on type bars of group III supported by segment III. These letters have to be distributed over the different lines of this column so that they will be, in most of the cases, on the same line as the keys of the groups I and II that will have to be struck at the same time or on the following line.

It is to be recalled that column 13 is reserved for an additional letter of this group III (letter A in the examples of FIGS. 1 and 4), as well as to letters which are frequent in the fourth position in the syllables and are consequently placed in the fourth group. In this 13th column have also been placed two keys corresponding to the most frequent letter in the fifth position in the syllables (s in French and in English) and located in the group V. Two keys have, for fingering reasons, been attributed to this same letter. The apportionment, over the different lines, of the letters that are kept for these groups IV and V, is effected according to the rules already stated for the preceding column.

It has been noted that several keys of the 1st line are assigned to consonants of the group I coupled to a same vowel of group II (é in the keyboard for French FIG. 1 and y in the one for English FIG. 4). For reason of mechanical order, mnemonics and fingering, the consonant of each of these coupled keys of the line 1 is the same as the consonant which on other keys of the same column is coupled with other vowels of group II.

In the line 7, the keys of columns 3, 4, 10, 11 are reserved for the connection of the consonant of group I corresponding to each of these columns with one letter of group II (u for French FIG. 1 and h for English FIG. 4). The composition for English gives thus an example where the study of frequencies had led to placing in group II one consonant which is coupled with a consonant of group I. In this same 7th line, the key of column 3 carries Qu in the French keyboard, FIG. 1 and Gh in the English keyboard, FIG. 4. These are two examples where the consonant of group I coupled with the letter of group II of the line is not the same as on the other lines of the column. In the second line, there have been keys set aside for the consonants which, in the same column but on the other lines, are coupled with a vowel. By means of these keys of the 2nd line these consonants can be operated alone or simultaneously with the striking of keys of other groups.

It has been noted that the upper and lower lines of the keyboard i.e. lines 1, 2 and 7, the available keys are assigned to the consonants least utilized at the beginning of a syllable in the considered language, and which, because of this, have not been coupled with letters of group II. However, a key of line 1 is assigned to a vowel of group II which can be struck alone and whose frequency is too low to have a line reserved for it where it could have been coupled successively to the different consonants of group I (it is the letter á ) (a with accent) of group II in the example of FIG. 1 (French) and the letter u of group II in the example of FIG. 4 (English). In the column 7 in relief, the keys of the lines 3, 4, 5, 6, 7 are attributed to letters of group II (generally vowels) which, in the same line but in the other columns, are each coupled with a consonant of group I.

The column I is reserved to couple a consonant which has only to be coupled with vowels of certain lines, taking into account the frequencies in the considered language (P, Po and Pa on the lines 2, 5 and 6 in the French keyboard, FIG. 1, as well as in the English keyboard, FIG. 4).

The other keys of the column 1, in the other lines are attributed to certain low utilization frequency consonants of group I which have not been coupled.

The keys of this 1st column are struck with the little finger moved towards the left, practically without any lateral movement of the hand. The same holds for the 13th column.

Line 8 comprises 3 keys laterally lengthened, so that they can be struck by the thumb placed almost horizontally; those on the left by the left thumb, those on the right by the right thumb, and thaat of the center by either thumb.

These three keys of group III located in line 8 are assigned to the letters most frequently found third in the syllables (S,N,R, in the keyboards in example FIG. 1 for French and FIG. 4 for English and FIG. 5 for German), the central key being reserved for the most frequent of the three (N). The same principle is applied for the composition of the keyboards in example for other languages.

The line 9 comprises: at the center two thumb keys (lengthened), which are keys for case-shift operation in case-shift position 2 (capital letters) respectively for the groups I and II. On the left are two palm keys (square) and two others on the right. The way of striking on these four palm keys has already been described.

Without taking into account the optional space keys immediately to the right, left and below the center thumb keys, the first palm key on the left controls the placing of the whole basket in case-shift position 2 (capitals); the sixth key (on the right) controls the placing of the whole of the basket in case-shift position 3 (figures and signs), the second palm key being reserved for the punctuation signs and the fifth key for a letter of group III (M in the French keyboard FIG. 1 and O in the English keyboard FIG. 4).

The way of striking on the keys of column 14 has already been explained. It has been noted that these keys are reserved for the auxiliary drives:

Line 1: back space,
Lines 2 and 3: tabulation (first key),
Line 4: release of the tabulation stops,
Line 5: setting of tabulation stops,
Line 6: third case-shift position lock (figures) for all the groups, In symmetrical position on the left the lock key of case-shift position 2 (capital letters) for the whole of the groups is to be found.

What precedes gives the principal rules of distribution of the letters, figures and signs on the character keys of the five groups in the different lines and columns.

These rules have as a principal purpose to work out best comprise between the best utilization of the hands and the best mechanical possibilities.

It is still to be stated that the machine has the essential purpose of permitting the simultaneous striking of several character keys and of the blank space keys with the greatest economy of movement. The consequence of this condition requires that the different characters of the different groups be so disposed that the fingering is the most practical for these simultaneous strikings.

As as example, it is to be noticed that the right hand has very frequently to strike simultaneously several keys; for example a key carrying a consonant of group I and a vowel of group II as well as another key carrying a letter of group III. It often has to strike at the same time a key of group IV and sometimes a key of group V.

To facilitate these simultaneous strikings with the same hand, the corresponding keys have been disposed on the same line whenever this is possible or at least on adjoining lines to be accessible simultaneously by different fingers of the same hand.

It is by applying the different rules stated above that one will be able to design keyboards similar to those shown, as an example, in FIG. 4 for the English and FIGS. 1, 2, 3, 5, 6 for other languages and the most advantageous for languages for which no example is shown.

The indication of the letters and signs attributed to each key in the above-mentioned examples will not be repeated in the text. They are easily read on the figures. But they will be found tabulated hereinafter.

FIGS. 133 and 134 show that the character and space keys of the lines 7 and 8 are at the same level. It follows that one can strike simultaneously with one thumb only one of the two single space keys and one of the character keys contiguous to the line 7 and to the line 8, for instance when the group of striking corresponds to the last syllable of the word. The same is the case in which one strikes one of the signs figuring in position 3 on the three keys of the line 8 and which have to be followed by a space. In the examples these signs are the mathematical signs + − = (plus, minus, equal).

This question of simultaneous striking of figures, signs and spaces will be reverted to later herein.

*Simultaneous Printing of Letters or of a Figure and of a Sign Preceded or Followed by a Space*

The particular solutions adopted with regard to the puncutation signs as well as to the mathematical signs have, among others, the two following purposes:

(1) That in the greatest number of cases possible, the space, which has to precede and that which has to follow one of these signs, be made automatically by striking the key corresponding to the sign.

(2) When this result could not be completely attained what has been sought is to obtain, at least automatically, the space which has to follow the sign by striking on the key corresponding to this sign without having to strike on a space key. The space which may have to precede the sign is then struck at the same time as the last letter or the last figure of the preceding group of strokes.

*Case in Which the Sign Is Preceded by Letters*

The space which has to precede the sign will be considered first and separately. It is to be noted in this connection that signs following a word and the signs following a number set a different problem.

The case of signs preceded by letters will first be examined.

With the keyboards of the type presented in FIGS. 1 to 6 the last letter of a word is typed according to the cases:
Either alone,
Or with another letter which precedes it,
Or with several letters which precede it.

Now, in the three cases the space which has to follow the last letter can be struck at the same time.

If after this last letter one has to type a punctuation sign which is not to be preceded by a space, but which has to be followed by a space, which is the case for the comma (,) the full stop (.) the semi-colon (;) then this punctuation sign constitutes an additional last letter of the word. The three cases stated above for the last letter are found again, the sign being struck alone or preceded by a letter or preceded by several letters. At the same time as this sign the space key can therefore be struck so as to produce the space which has to follow it.

Nevertheless, this sign can be struck at the same time as the last letter of the word only if it is to be found on the character block in the same case-shift position as this last letter, that is in general in 1st case-shift position (lower case).

Now, in order to reduce the number of keys and levers, only the comma, which is utilized more frequently than the other punctuation signs, has been placed in this 1st case-shift position (lower case).

On the other hand, the full stop (.) has been placed in case-shift position 2 (capital letters). It can therefore only be struck at the same time as the last letter when the latter is a capital letter. This happens for instance in the striking of titles.

Whatever be the case, all the punctuation signs are usually followed by a single space. This rule is moreover applicable to less usual signs than , . ; : (comma, full stop, semi-colon, colon), such as ! ? (exclamation and interrogation marks).

It will only be considered at first, by way of example, the comma, the full stop and the semi-colon (, . ;) which in the keyboards of FIGS. 1 to 6 are on the same key, but respectively placed in the three different case-shift positions.

The longitudinal lever 508 of FIG. 22 corresponding to the key operating the characters block carrying these three signs is unilaterally linked to the space lever by an axle carrying two radial levers. It follows that the space which must always follow the punctuation sign is automatically provided.

In the keyboards of FIGS. 1 to 6 where there is only one punctuation key, it has been found better to place on the latter the semi-colon and to place on a key of group II the sign "colon" (:) rather than doing the reverse. There are two reasons for this:

(1) An interval is generally reserved before the sign colon, but not before the semi-colon;

(2) The punctuation key causes automatically the interval which follows the sign; now the sign colon is, more often than the sign semi-colon, the last sign type on the line, and this renders useless the striking of a space.

Consequently the sign colon (:) has been placed in 3rd case-shift position above the letters of the group II so as to save a lever and a key. This sign (colon) is struck separately from the last letters of the word which precedes it and, owing to the fact that it is in group II, a space precedes it automatically. A space key is struck simultaneously for the interval which has to follow the sign.

*Simultaneous Striking of a Figure and a Sign*

Now, will be considered the punctuation signs comma (,) and full stop (.) when they are used for separating the figures of a same number in sections of three figures and in decimals (in French the full stop for the first case and the comma for the second; in English the reverse).

Considering that these signs have not therefore to be followed by a space, the solution adopted above would not allow the striking of a number such as 1.234,5 without striking the back space key before the 2 and before the 5, since the punctuation key automatically provides a space after the sign.

The solution adopted in FIG. 4 consists in placing a second comma in 3rd position, above the "yY" of group II and a second full stop in 3rd case-shift position and in group II above the "uU."

This solution presents the advantage, not only of keeping the coupling mentioned above between the punctuation key and the space lever for the striking of the text, but also of making it possible to strike the full stop and the comma at the same time as the last figure which precedes them, since the figures which precede them are also in third case-shift position.

So the number 1.234,5 is struck as follows in five times instead of seven:

1./2/3/4,/5

The mathematical operation signs +, −, +, ×, ÷ plus, minus, equal, multiplied, divided) will now be considered.

The sign—used as a hyphen or a dash has already been placed in 3rd case-shift position group I above the "B."

The letter "xX" is in 1st and 2nd case-shift position group I.

The punctuation sign: (colon) is in 3rd case-shift position on the key of group II above the "eE."

But here are considered the same signs as in the case in which they are utilized with figures as operation signs. They must then be preceded and followed by a single interval. These signs have consequently been repeated in case-shift position 3 group III:

× (multiplied) above the "oO" III,
÷ (divided) above the "hH" III.

Each sign can thus be struck at the same time as the figure of group I which has to precede it and at the same time as a space key for the spacing which has to follow it. The space between the figure and the sign is automatically reserved by the fact that the figure is in group I and the sign in group III.

+ above the S III
− above the N III
= above the R III

With this disposition, the three last and most frequently used signs can be struck with the same thumb and at the same time as the space key.

The sign key and the space key can also be struck respectively with each of both thumbs.

The machine can moreover be built by reserving for these five signs +, −, =, ×, ÷ (plus, minus, equal, multiplied, divided) levers that are linked unilaterally:

Either with the space lever,
Or with the universal plate of group IV.

These two solutions produce automatically the spacing which follows the sign and make it unnecessary to strike the space key. They can be utilized in machines designed for typing technical or accounting works. But in these solutions, the corresponding keys, levers and bars must be distinct from those corresponding to these letters.

In the keyboards shown as an example FIGS. 1 to 6 these solutions have been avoided, so as to obtain a less extended keyboard and a lower number of levers.

Hereafter is an example of what can be obtained with the keyboards of the FIGS. 1 to 6 and the corresponding mechanisms, regarding the simultaneous striking of figures, signs and of one space.

Suppose one wished to type with the keyboard of the example:

2.745,50 ÷ 2×6 + 10−3=8.243,50

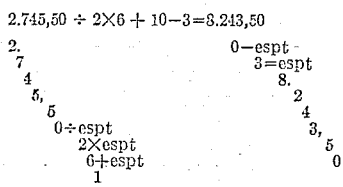

That is 17 strokes or groups of strokes, whereas 36 separate strokes would be necessary with a usual alphabetical machine.

The different solutions described above constitute examples of processes which the invention provides for the separate or non separate signs by spaces which follow them and/or precede them, whether we are concerned with punctuation signs, with mathematical signs or others.

For the constitution of the keyboards designed for the striking of different languages, it will then be possible to choose any of these processes for each of the signs, taking into account in each case:

The size one is willing to give to the keyboard;
The utilization frequency of each sign; taking into account the kind of texts one wishes to have typed most frequently on the machine.

Thus for each keyboard one will have to choose the mechanical process best suited among those described for signs such as:

Percent %
Commercial "and" &
Paragraph §
Etc ...

Simultaneous Striking of Several Figures

When a series of machines is designed for a clientele typing many numbers, it is desirable either by adding more levers, or by eliminating certain signs which are not much used such as the commercal "and" (&), to provide additional characters for the most utilized figures, in 3rd case-shift position on type bars of groups II and III so as to enable the striking in only one group of simultaneous strikings of a number of several digits followed by an interval. For example 10 or 100 or 50 (followed by an interval).

As an example, on the keyboard shown in FIG. 4, an additional zero has been placed in 3rd case-shift position above the "iI" of group II, that is on the line which follows that of the figures of group I. The location on this line is particularly advantageous.

There can thus be printed by one only group of simultaneous strikings all numbers of two digits which end by a zero and the interval following them: for instance 70 or 40 followed by an interval; the keys for the two digits being on lines close to one another.

Likewise, an additional zero has been placed in 3rd case-shift position group III above the "oO" III of the key ON and another additional zero in position 3 group IV above the "oN" IV of the same key ON. These two zeros can only be struck together.

Furthermore, a zero has been placed in case-shift position 3 group V above the "S" V (S five). Consequently, according to the principles already stated, one can strike in one group only of simultaneous strikings:

All the numbers composed of one figure followed by a comma, by two zeros and by one interval. Example 70,00 or 40,00 (followed by one interval),
All the numbers of 4 figures constituted by:
  Any one figure for the thousands,
  A full stop separating the thousands,
  Three zeros for hundred, ten and unit,
  One interval.
Example 7.000 (followed by an interval).

An additional zero has also been placed in case-shift position 3 group III above the "eE" III. This makes it possible by one group only of simultaneous strikings to strike any number of three figures ending in two zeros such as 100 or 200 or 300 etc. . . . as well as the interval following them.

Finally, a zero of group IV placed in 3rd case-shift position above the S IV completes the series.

It is evident that the dispositions of the additional zeros in all the groups, as explained above, make it possible if so desired, not to separate the sections of three figures nor the units from the decimals by a full stop or a comma. One can therefore print in one group only of simultaneous strikings, and without any separation, all the component numbers of a significant figure followed by one, two, three or four zeros, without any separation in sections of three figures. For example, 60000 (this is done for example for the publication of stock quotations on the stock exchange or produce quotations).

Whatever the number of characters (figures or signs composing the number, up to five characters), a space key for obtaining the interval which has to follow the last character can be struck.

Simultaneous Printing or Any Several Figures

The process which has been described with regard to zeros placed in the keyboards in example FIGS. 1 to 6 on the type-keys and bars of the groups other than the first is utilizable for all figures other than the zero. There can consequently be placed in these groups one or several other figures among those most utilized, in particular the number 5 which is much used in the decimal system or the numbers 6 and 2 (second figure of 12) much used in the duodecimal system (dozen, semi-dozen, English currency).

One is, besides, limited only by the number of lever and type bars which are reserved in each group.

*Simultaneous Printing of Two Figures by One Key Operating Two Type Bars*

This result is achieved by the same means as the simultaneous printing of two letters, the use of transverse levers, some of which at one time couple a letter of group I and a letter of group II )1st and 2nd case-shift position) and, at another time, to couple a figure of group I and a figure of group II (3rd case-shift position).

These means have been set forth, and the detail of the corresponding mechanisms is described in another connection.

A machine could be built using only these processes for the simultaneous striking of two figures or more, without any possibility of printing a text. But to obtain at will two letters of two figures with one key only, it suffices, for each of these keys concerned, to place a figure in case-shift position 3, not only on the type bar of group I, but also on that of group II which is operated by the same key.

In the keyboards shown as an example FIGS. 1 to 6 the simultaneous striking of two letters by one same key, one of which is of group I and one of group II, is only ensured by 6 transverse levers passing under the lines 1, 3, 4, 5, 6, 7.

In these examples our concern has in fact been to limit the surface of the keyboard to the needs of the typists who are chiefly typing alphabetic texts.

Nevertheless, one can obtain, with the material structure of these keyboards and the corresponding levers, the simultaneous striking in question. For that it is necessary to transfer to 3rd case-shift position, on type bars of group III, the signs which are in 3rd case-shift position above the vowels of group II. After this modification, so that the signs so removed be still printed at the second striking point, only the back space key has before anything else to be struck.

One places therefore in 3rd case-shift position a figure on the type bar of group II corresponding to the transverse lever of each line, in the following order:

1 for line 1 above the "yY"
3 for line 3 above the "iI'
4 for line 4 above the "eE'
5 for line 5 above the "oO"
6 for line 6 above the "aA"
7 for line 7 above the "hH"

Each of these figures of group II can then be printed at the same time as any figure of group I in the same way as when the simultaneous printing of a vowel of group II and of a consonant of group I preceding it produced. The corresponding associations of two figures will be marked on the keys to be struck, as has been done for the associations of letters of group I and of group II.

*Simultaneous Striking of Several Figures by the Striking of Several Keys*

The FIGURE 2 of group II is placed in 3rd case-shift position on the type bar corresponding to the key at column 11, line 1 above the "uU."

The numeral 8 of group II is placed likewise in 3rd case-shift position on the type bar of the key at column 12, line 1 above the "rR."

The numbers of two figures ending by 2 or by 8 can therefore be obtained in one printing only by the simultaneous striking of two keys, whereas for those ending with 1, 3, 4, 5, 6, 7 only one key will have to be struck.

In the French keyboard the key of column 12, line 1 being the key called the "silent key" which produces no advancing of the carriage, it is necessary for the number of two figures ending by 8 to strike the space bar at the same time. This is not necessary in the keyboards which do not include any silent (for example in the English keyboard FIG. 4).

The particularities of distribution described above constitute an optional variance which is now shown in the drawings of keyboards.

In the examples of mechanisms described, the group II comprises only 8 type bars. It is therefore not possible to utilize the same process for the numbers of two figures ending by 9 or zero. These numbers can therefore only be obtained by two successive strikings.

It is evident that in order to be able to strike the two figures of any number of two figures simultaneously by means of the process described above, it suffices to build the machine by constituting the group II with 10 type bars. (certain signs can then be placed in this group II in case-shift position 1 and 2).

If one wishes all these numbers to be struck without striking two keys for certain of them, it suffices to build the keyboard and the connection-box with 10 transverse levers similar to those described for the vowels of group II and located respectively under 10 different lines instead of 6.

It will be well to adopt these solutions for the machines designed for jobs comprising many numbers.

*Simultaneous Striking of More Than Any Two Figures*

If group II is increased to 10 type bars, it will be well to increase also to 10 bars the group III which in the examples shown by the drawings comprise 9, and that, even if the number of transverse levers of group II is not increased to 10. As a matter of fact, by repeating the 10 figures in 3rd case-shift position on the type bars of group III, as they are to be found in another chapter in 3rd case-shift position on 10 type bars of group II and on 10 type bars of group I, one can then print in one time any number of three figures, whatever the figures which compose it. The principle is the same as for the striking of syllables of three letters. One key is then simultaneously struck for the two first figures of the number and a second for the third figure.

The same could of course be done for the groups IV and V. One is nevertheless limited by the consideration that the machine should not be too bulky and the area of the keyboard not too large.

But one can limit oneself to putting the most frequently used figures in 3rd case-shift position on the type bars of groups IV and V; in particular the zero and the 5. It is also desirable to repeat the full stop, in case-shift position 3 on a type bar of group IV. This full stop, is struck after a section of figures and the comma, which separates the decimals (or inversely for instance for English).

*Simultaneous Striking of Several Figures and Blank Spaces as Well as of Signs*

It is obvious that, when striking letters, if a figure is struck, or simultaneously several figures, a multiple or single blank space key can be struck at the same time.

Likewise, figures and a full stop or a comma or any other sign can be struck simultaneously. According to the group which this sign belongs to, it is placed immediately after the last figure of the group struck simultaneously, or else it is separated from it by a space, or else it inserts itself between two successive figures. In order to obtain these various results, one need only make provision when the machine is being built and the composition of the keyboard being made, that these signs are placed in the 3rd case-shift position in the suitable groups.

It will then be possible to obtain, by one group only of simultaneous strikings and by using the five groups, combinations such as the following: 1.050 or 52,00.

These examples do not require having all the figures in the groups IV and V, but having only those most frequent in the group IV and the zero in the group V.

The combinations of construction stated above, as an example, are not limitative. They are enough to define the principles and the means and allow for all desired applications, in terms of the work provided for the machines built in accordance with the invention.

In conclusion, with regard to the simultaneous striking of several figures, signs and spaces, one proceeds for the construction and for the utilization of the machines in accordance with the same principles, and one uses the same means with regard to the simultaneous striking of letters, signs and spaces. These principles and means as well as the form of the corresponding mechanisms are described in another chapter.

*Main Differences Presented by the English Keyboard FIG. 4 in Comparison to the French Keyboard FIG. 1*

It has been indicated that the French keyboard FIG. 1 and the English keyboard FIG. 4 have been designed, taking into account the respective statistics of frequency of letter utilization in the two languages, in such a way that their material structure and the corresponding mechanisms are identical in both cases. This presents the very great advantage of making possible the manufacture of machines in mass production for both these languages. It has been noted besides that this advtantage will be extended to most of the other languages and in particular to the Latin and Germanic languages.

In this text all the differences between the two compositions will not be indicated. They become evident by comparing FIG. 1 and FIG. 4.

Neither will there be indicated the detail of the statistical works and comparison studies on the advantages afforded by different choices of letters for each of the keys, respectively for both languages.

Only the particularly characteristic differences of composition between these two keyboards will be emphasized here, so as to give a better understanding of how the different rules stated in another chapter are applied in composing a keyboard for a given language, taking into account the possibilities resulting from the utilization of a same material structure of the machine for the different languages or structures presenting few differences.

The comparison of the frequencies has enabled the adoption for the French and for the English of the same vowels of group II coupled with consonants of group I on the lines 3, 4, 5, 6. On the other hand, these frequencies have led to the adoption for purposes of coupling them with consonants of group I: in 1st line, the Y II for the English instead of the é II for the French and besides in line 7 the H II for the English instead of the U II for the French.

This choice in group II of the H which is a consonant has to be emphasized. It is due to the fact that in English an important percentage of syllables comprise at the beginning two consonants the second of which H (for example: THE, WHO, SHE, etc.); the basic vowel is then transferred to the third row.

The adoption in group II of the consonant H mechanically coupled with different consonants of group I (T, W, S) enables the simultaneous printing of three letters of each of the above syllables, on condition that the corresponding vowels exist in group III. For this reason in this keyboard (FIG. 4) all the vowels appear in group III, though they are also in group II FIG. 4.

These particularities of the keyboard composed for the English constitutes an example for the application of the process of the invention to cases in which keyboards are composed for other languages having a high frequency of syllables beginning by several consonants.

One may choose in each case, between this means and the placing in group I of blocks of several coupled characters; this last necessitating the striking of a multiple or single space key at the same time as the preceding syllable or word. (This process has been indicated with the example of SCH for the German language). The two means can besides be utilized jointly in a same keyboard.

Reverting to the keyboard of FIG. 4 for the English language, it is to be noticed that the placing of the consonant H in group II coupled with the consonants of group I affords an added advantage of the possibility of the GH coupling (3rd column, line 7). The presence of this key accelerates the striking, not only of the syllables beginning by GH, but allows also the striking of the endings in GH of GHT in one time.

It will be noticed that in order not to extend too greatly the keyboards according to example FIG. 4 for the English and FIGS. 1, 2, 3, 5, 6 for other languages, the letters of group II of the lines 1 to 7 are not coupled with consonants of group I as numerous as the consonants with which the voiwels I,E,O,A are coupled. They are therefore coupled only on a small number of columns (col. 5 and col. 9 for line 1, columns 3, 4, 10, 11 for line 7). Now, the consonants of group I which, in the French keyboard, are most advantageously coupled with é II, and with U II, are not the same as those most advantageously coupled in the English keyboard which are Y II and on H II.

These considerations, together with the frequencies of the associations of the different consonants of group I with the other vowels of group II, have led to the coupling on certain columns of a different consonant in the English keyboard and in the French keyboard. Thus the T is to be found in the column 5 of the French keyboard FIG. 1. It can therefore be coupled with é on line 1. In the English keyboard FIG. 4 the T is to be found in column 4, which enables it to be coupled with h in line 7.

One could besides, lower by one line the two single space keys which would increase the similarities between the two keyboards with regard to the assigning of the columns to the different consonants of group I. But the space keys would thus be removed farther from the keys located in the upper part of the keyboard. However, it is noted that the same consonant has been coupled in the two keyboards in columns 1 (P), 2 (C), 3 (N) and 11 (S).

Another difference in the French and English keyboards consists in the fact that, in the French keyboard of FIG. 1, the vowel O has not been kept in group III whereas it has been kept in the English keyboard of FIG. 4. In the English keyboard this is justified by the frequency of the associations: tho, who, sho, as well as by the cases when the vowel O is doubled: for instance in POOR, LOOK, BOOK, TOO etc. . . The usefulness of finding the O in group III in the French keyboard is not as great.

Still another difference in the keyboards is that in the French keyboard FIG. 1 the key of line 1, column 12 carries the grave accent in case-shift position 1, the circumflex accent in case-shift position 2 and the diaeresis in case-shift position 3; this key does not cause the carriage to advance. This process is used in the usual alphabetical machines when the keyboard is composed for the French. In the examples FIG. 1 and FIG. 4 this key belongs to the group II. In the keyboard of FIG. 4 for English it causes the carriage to advance normally and carries the R of group II.

The examination of characteristic differences between the keyboards of FIG. 1 for the French and of FIG. 4 for the English will be limited to this. It appears that many keys carry the same characters in both compositions and that both combinations present many similarities.

It seems unnecessary to state the differences of composition between these two keyboards and the examples in keyboards shown for other languages FIGS. 2 to 6, the reasons for these differences resulting from the application of the same rules.

To the keyboard composition shown by way of example in FIGS. 1 and 4 and to the corresponding material structure, different modifications could be made concerning, for instance, the distribution of the characters on the keys, the number of keys, the number of consonants of group I and of vowels of the group II combined, the number of groups, etc.

*Number of Type Bars*

The keyboards presented as an example FIGS. 1 to 6 have been designed to limit the number of type bars to 45 when type blocks of two characters are utilized (column 12, line 3).

If this two character block is eliminated, the 46 slots of the segments can be utilized to place 46 type bars. In the latter case, an additional longitudinal lever is added and one key only instead of two is allocated as a compensation either at the R IV, or at the S V. The key so available can then operate the additional lever N IV. It is obvious that machines conforming to the invention can be built with a higher number of type bars. In this case, the keyboard may include more keys for simultaneously operating several characters.

On the other hand, the movements of the hands, the price of the machine and its overall dimensions are thereby increased. The right limit will be determined by experience with each category of machines, taking into account their intended use.

*Different Colors for the Keys of the Different Groups*

To facilitate the training of typists in the use of the keyboards of the first and second types, the keys corresponding to different groups and to distinct printing points, are colored different. Each of the keys operating type bars of two groups can either be of a color differing from both groups, or carry two colors corresponding to those two groups on different parts of its surface.

Thus, in the examples of keyboard composed for the French language FIG. 1, in the Figs. for other languages, the keys are for example of the following colors:

Those of group I: white;
Those of group II: red;
Those operating each simultaneously a type bar of group I and group II have the left part white and the right part red, or the key being with white background, the letter of group I is black and the letter of group II red;
   the keys of group III are yellow;
   those of group IV are green;
   the two keys which print simultaneously a letter of group III and one of group IV have the left half yellow and the right half green;
   the two keys of group V are with black background, the letter being drawn in white.

*Description of the Connection-Box and Its Location on the Machine*

With regard to the machines of the invention built with a keyboard whose structure is of the second type, the texts above describe particularly the forms of the different keys, their relative dispositions, the groups to which they belong according to the corresponding striking point the features presented by the composition of the keyboards and the striking method.

The connection box comprising the keys, their slide rods, the different connections connecting these slide rods or bars to the longitudinal levers, as well as the casing which contains or supports these elements will now be described.

This connection-box, FIG. 134 is fixed on the front part of the base of the machine. It is therefore to be found above the front part of the longitudinal levers 500 to 553, FIGS. 22 to 27 and FIG. 17.

*Functions of the Connection-Box*

*First function.*—To support each key and its rod.

In any usual alphabetical typewriter, most often each key forms a unit with the longitudinal lever which is operates. It has been noted that this customary arrangement also obtains in keyboards of the first type.

With a keyboard of the second type, certain longitudinal levers are each operated by several keys which act in turn. Now, when one of these keys is struck, it is desirable that the others remain at rest. These different keys which can operate the same lever could not therefore be fixed to or be integral with this lever. The connection-box has, in particular, a function to support each of the keys that are not struck, as well as a slide rod to which this key is joined.

*Second function.*—To guide each slide rod so that all its travels are rectilinear and parallel.

Considering that several keys are struck simultaneously it is advantageous to ensure that the keys all travel similarly. This is one of the reasons for which each key, instead of being joined to the longitudinal lever which it operates, forms a unit with a slide rod. The connection-box presents the advantage of guiding the slide rods. Each slide rod slides into a hole of the box cover and into a hole of the box bottom. It is to be noticed that each key might be mounted on a deformable parallelogram, which would give approximately the same result.

*Third function.*—To serve as fixed point for the return spring of each key, and as a stop so as to limit the return travel of the key rods.

*Fourth function.*—To contain the lugs of the slide rods and the transverse levers. Each of the keys of some categories operates simultaneously several longitudinal levers (generally that of a letter of group I and that of a letter of group II), one of them directly by the lower extremity of a slide rod and the other through either a horizontal lug or a transverse reverse lever.

*Fifth function.*—To contain and support the reverse levers of displaced keys.

In order to facilitate the fingering, certain keys are placed in the keyboard at a point through which the longitudinal lever they have to operate cannot pass through. In the cases in which the distance between the key rod and the lever is great, it is necessary to utilize a transverse reverse lever. The connection-box contains and supports the transverse levers of this category. Such is the case for instance in the structure of the keyboards of FIG. 1 (French) and FIG. 4 (English) for the letters S, N and R of group III.

*Sixth function.*—To support certain auxiliary drives such as: locking in case-shift position 3.

*Description of the Connection-Box*

An example of construction of the connection-box will now be described in detail. For this description, it will be assumed that this box operates with the keyboard composed for the English language which is shown FIG. 4. Each key will therefore be designated by the characters which it carries in this keyboard.

The connection-box is however, the same for all the keyboards shown for other languages in the FIGS. 1, 2, 3, 5, 6 and can be identical or similar for numerous other languages. (The slight difference which it is desirable to make for the German language will be indicated.)

This connection-box is seen:

In plan view in FIG. 7 with the parts it contains, its cover and keys being removed.
In front view in FIG. 8 showing the transverse levers with the cover removed.
In front view but complete in FIG. 136.
In cross section along section line AD—AD of FIG. 136, in FIG. 133 with all the parts it contains.
In cross section along section line AG—AG of FIG. 136, in FIG. 15 and complete in FIG. 134.

The casing of this box is constituted by a bottom 10 in the form of a staircase which can be preferably in one piece, as shown or in several pieces. This bottom is fixed to the two lateral plates, a left plate 11 and a right plate 12 and to the front plate 13.

It also comprises a cover in the form of a staircase 14 constituted by angles having alternately vertical and horizontal surfaces, and in general having one horizontal surface for each line of keys, but having the key lines 7 and 8 whose level is the same on one horizontal surface.

The staircase cover is screwed on to the lateral plates 11 and 12, and is also screwed on to the front plate 13.

The connection-box is fixed by its casing on the front part of the base of the machine by four screws, i.e. two left screws 15 and 16 and two right screws located symmetrically therewith. It can therefore very easily be removed and set back again.

Forms of the Keys and Their Locations

The forms of the keys of the different categories, their surfaces, their relative locations and differences of level have already been disclosed in describing the material structure of the keyboards of the second type. Certain aspects of these are here recalled and detailed.

The keys, other than the thumb and palm keys previously defined, may have a concave surface whose periphery is round or of any known form, utilized on prior art machines. The thumb or palm keys have a widened surface whose form and proportions are illustrated in FIGS. 1 to 6.

FIG. 134 (profile) and FIG. 136 (front) show the other aspects of the keys of these diverse categories. These figures also show the various levels of the different key lines in relation to one another as well as the level distribution by certain keys in relation to those adjoining them in the same line.

In particular, it has been noted with regard to the description of the keyboards that the keys of the column 7 are raised above the other keys or the same respective lines. It has been indicated that between the sixth column and the eighth column there is only a normal distance between axes, the seventh column being located in the middle of this distance and being only separated from its left and right adjoining column by a distance which is half that of the normal distance.

These particularities of the seventh column make it possible to design a keyboard comprising an additional column, without increasing the width of this keyboard. FIGS. 1 to 6 show examples of composition of the keyboard, and plan views of the connection-box. On the right of the keyboard the keys of the fourteenth column are separated from those of the thirteenth column by a space which is wider than that existing between the other columns.

The keys of the fourteenth column constitute auxiliary drives (back space, tabulation, case-shift position lock).

The particularly large space between the thirteenth and the fourteenth columns is chiefly due to mechanical requirements, but it also avoids the confusion that the operator could make between the character keys of the thirteenth column and the auxiliary drive keys of the fourteenth column.

Key Rods and Their Movement

Except for some space keys and auxiliary drive keys, all the keys of the keyboard of FIG. 1 are mounted like the key 18 of FIG. 133. Each key is mounted on a slide rod such as 19 with which it forms a unit. The slide rod, with square section in the examples, passes through the corresponding holes of the cover 14 and of the bottom 10 of the box which serve to guide it. The rod can slide downwards, then upward again. Its travel upwards is limited by a lug such as 17 which butts against the cover 14.

Each key and its rod are held in rest position or brought back to the latter by a compression spring such as 20 mounted on the rod between the key and the cover of the box. However, the rods of the raised keys of the seventh column have their spring, such as 21, mounted on the part of the rod located in the box between the bottom of the box 10 and the lug 22 of the rod, so that the forefingers, when striking the keys of the adjoining columns, should not rub against these springs.

FIG. 16 gives a front view of the lower part of the key rods. It is to be noticed in FIG. 16 that the lower extremity 23 of each rod, seen towards the front, is concave. This extremity is on the contrary slightly convex on its longitudinal section, so as to facilitate the sliding of the longitudinal lever.

So as to deaden the shock of the lugs such as 17 and 22 FIGS. 7 and 15 against the cover 14 and attenuate the noise, rubber or any other similar material is inserted between the lug and the cover; in the example mounted on each lug a small length of rubber tube has been strung. It is the diameter of this tube which is seen in plan on each lug FIG. 7 and in profile FIG. 15.

In order to prevent the keys from rotating on themselves, their rods, such as 19, are square sectioned and slide in square holes; the holes of the bottom 10 of the connection-box correspond to the square sections of the key rods, the holes of the cover are identical and correspond to them vertically. But sections other than square could as well be used, or to each key two round sectioned rods could be made to correspond, as this is done in certain calculating machines.

Action of the Keys on the Longitudinal Levers

The form of the key rods of each category and of the elements transmitting their motion to one or several longitudinal levers will now be successively described. The manner of operating varies in fact according to the keys or categories of keys.

The simplest case is that of the keys such as B or F (FIG. 4) each of which operates only one longitudinal lever which passes under the lower extremity of the key rod. In rest position a longitudinal lever such as 514 (FIG. 22) bears against the end 23 of the key rod FIG. 16.

Another category is that of the keys such as Ne (FIG. 4,) each of which, in addition to the lever with parallelogram such as 810 (FIG. 22) which passes under the lower extremity of the key rod, as in the preceding case, operates a second longitudinal lever by a frame which oscillates on a transverse axle and serves as a reverse lever, These frames are described further. In most of these cases, the longitudinal lever, such as 805 or 810 (FIG. 24), which passes under the key rod, corresponds to a type bar of group I which generally carries a consonant. The second longitudinal lever operated, such as 530 to 534 (FIG. 22), corresponds to a type bar of group II which generally carries a vowel.

This is the case of all the keys of the center of the keyboards of the second type, (of which examples FIGS. 1 to 6). These keys are all those which carry two letters, except the keys "ON" and "NT" of the twelfth column.

It is to be noticed that, among these keys, some of those located in a same column operate the same consonant of group I, differing according to the column, for example, the "N" in the third column (FIG. 4) and that several keys of a same line operate the same letter of group II, generally a vowel, which differs according to the line, for example the "e" for the fourth line.

The means by which several keys of the same line on the same longitudinal lever of group II can operate will be described. The linking between each of these keys and the group II longitudinal lever concerned must be a unilateral linking, so that when one of these keys is struck, the other keys remain in the rest position. This linking can be ensured by any known means. In the example it takes on the following form:

The type bars of group II carrying the letters h, a, o, e, i, y are operated respectively by the transverse bars 24 to 29 (FIGS. 7 and 8) disposed transversely under the key lines. Each of these transverse bars is carried at its extremities by radial levers 30 and 31 for the transverse bar 24 with which it is joined. These pairs of levers are each joined to an axle such as 32 pivoting in its bearings 33 and 34 fixed on the bottom 10 of the connection-box. Each of the sets composed of a transverse bar such as 24, and two radial levers such as 30 and 31 and an associated axle such as 32 constitutes a pivoting frame designed to be displaced rotationally by the action of the key rods in the associated line of the keyboard for actuating one of the longitudinal levers.

Each of the keys such as 18, FIG. 133, on the same line must be able to operate the same longitudinal lever of group II and have its rod 19 provided with a lug 35. The rod 19 is located above the transversal bar 25 corresponding to the same line. The universal bar 25 constitutes the front part of the corresponding pivoting frame.

Each of the bars 24 to 29 (FIGS. 7 and 8) is depressed by the action of a key, each of the frames is similarly pivoting on its axle, and returned to its rest position by springs such as a left spring 252 and a right spring 253.

Each of these transverse bars such as 24 mounts an ear 36 (FIG. 7) to which a pivoting small connecting-rod 37 is pivoted. The lower extremity 38 of connecting rod 37 is mounted on a lug 39 (FIG. 22) and held in position by a clip. The lug 39 is fixed to the associated longitudinal lever 531 which is thus operated by various keys of the corresponding line.

FIG. 22 is a plan-view of the front parts of the longitudinal levers. It is to be noticed that only some of these levers carry a lug such as 39 by which they can be operated by one of the transverse bars 24 to 29, FIGS. 8 and 7, and also a small connecting-rod as indicated above.

FIG. 15 is a cross-section along the sectional-line AG—AG of FIG. 136. It shows the frames whose front parts are constituted by the bars 24 to 29 and shows the lugs such as 53 for the bar 27 which operate these frames. FIG. 13 shows a cross-section of these mechanisms taken along section line AD—AD.

It is to be noticed that the pivoting frame (which comprises the bar 29, FIG. 7), operated by certain keys of the first line and which transmits their movement to a vowel of group II (é in the keyboard of the FIG. 1), is disposed in the opposite way to that of the frames operated by keys of the lines 3 and following. Its axle is fixed, not on the bottom of the box, but under its cover 14 (FIGS. 8 and 15).

The angular form of the levers such as 30 (FIG. 15) allows the latter to move downwards sufficiently without their colliding with the corresponding step of the bottom of the box.

FIG. 8 is a front view of the box, cover removed, and FIG. 7 shows the box in plan view, cover removed. These two figures complete the showing of the relative positions of the different pivoting frames.

These relative positions allow each of the frames to pivot downwards in an angular motion sufficient to enable the key which operates it to have a travel path equal to that of the keys of the usual alphabetical manually actuated typewriters.

Action of a Key Rod by a Transverse Lug

Certain keys have to operate a longitudinal lever which it does not pass under the lower extremity of the key rod, but which laterally is not very far removed from this rod. Thus, rod 54, FIGS. 7 and 22, of the key F of the group I, FIG. 4, has to operate the longitudinal lever 504, FIG. 22, and the rod 55 of key T of group III has to operate the lever 544. In this case, instead of a small stop lug such as 17, FIG. 7, the rod carries a long transverse lug such as 56 for the rod 54 and 57 for the rod 55, and this lug is engaged by an upright of the longitudinal lever concerned. Several examples of this means are shown, FIG. 17. Certain of these transverse lugs comprise a horizontal rod; for example the lug 57. Others have their extremity 131, FIG. 18, offset vertically to engage the longitudinal lever to be operated, which is the case for the lug 104, FIG. 7, and 105, FIG. 18. These two types of lugs will be examined again with regard to the longitudinal levers they have to operate respectively.

The Lateral Displacing of the Action of a Key by a Transverse Lever

In various other cases, in order to obtain an advantageous fingering, despite the compulsory lateral placing of the different longitudinal levers, one has been led to displace laterally, over a relatively long distance, the action of certain keys. The means utilized in these different other cases are going to be described.

In the English keyboard, FIG. 4, the movement of the key S III, eighth line, fourth column, is displaced towards the right to the corresponding longitudinal lever 538, FIG. 22, by the axle 58, FIG. 7. To this axle 58, the two transversely spaced radial levers 59 and 60 are fixed. The axle 58 is supported by the bearings 61 on the left and 62 on the right, fixed on the front plate 13 of the connection-box.

The rod 63 of the key S III carries a lug identical to the stop lug 64, but fixed lower than the latter and engageable by the radial lever 59. The radial lever 60 carries at its extremity a lug 65 on which is mounted a vertical pivoting small connecting-rod 66 (FIGS. 7, 13, 133), whose lower extremity pivots on a lug 67 fixed (FIG. 22) to the longitudinal lever 538.

The action of the key N of group III, eighth line, seventh column, FIG. 1, is displaced by the same process by utilizing the axle 68, FIGS. 8 and 133, which is fixed to the two radials 69 and 70, FIG. 7. On the right has been utilized the same bearing 62 for the two transverse levers of "S III" and of "N III."

The key Z of group I is in first line column (FIGS. 1 and 4) and the corresponding longitudinal lever S III (FIG. 22) is much farther on the right. The displacing of the movement of the key to this lever is obtained by the process described above for "S III" and "N III," with the difference that the axle 73, FIG. 7, which carries two radial levers 74 and 75 has its two bearings 76 and 77 fixed on the same angle which constitutes a part of the cover 14 (FIG. 15) of the connection-box.

The material structure adopted for the keyboards in the examples of FIGS. 1 to 6 has for each of the tenth and eleventh columns of keys and for the keys of the second to the seventh lines a step lever mounted on a deformable parallellogram of the same type as that of lever 805 shown, FIG. 24. They are the lever 816 for the column 11 and 818 for the column 10 (FIG. 22). It is to be noticed that the consonant of group I corresponding to the tenth column, in the English keyboard of FIG. 4, is the "W," that of the eleventh column being the "S."

The movement of the step lever 818 of the tenth column is displaced towards the left, up to the longitudinal lever 518 corresponding to the "W" of group I, by a process similar to that utilized in the cases described above for the keys "S" and "N" of group III (axle 58 and radial levers 58 and 59, FIG. 7).

However, for reason of space, the axle between the two radial levers 78 and 79 (FIG. 23) whose bearings are constituted by the brackets 80 and 81 is replaced by the transverse bar 82, FIGS. 23 and 16. The displacing action of the step lever 816 of column 11 (FIG. 22) is effected in the same way by the transverse bar 83 (FIG. 23) which is carried by the two radial levers 84 and 85 whose bearings are constituted by the brackets 86 and 87.

These four brackets acting as bearings are fixed on the transverse angle 88. They are of the same form as those which carry the levers of case-shift shown in FIG. 51 and described hereinafter. As shown in FIG. 23, the bracket 81 is moreover common to the radial lever 79 and to one of these case-shift levers in the form shown in FIG. 51.

The different means which have just been described and which are common to the examples of composition of keyboards shown, FIGS. 1 to 6 would make it possible to resolve the similar cases which could occur in the particular structures that could be adopted for the keyboards of certain languages other than those described and illustrated as examples.

*Single Space Keys*

In the keyboard of FIG. 4 the two single space keys marked Esc*t* and located in lines 7 and 8 are of a particular form. They operate a common longitudinal lever 524 (FIG. 22) similar to those corresponding to the type bars. The motion of one or the other of the two keys when struck is transmitted for the left key by the lug 89 (FIGS. 7 and 22) and for the right key by the lug 90. These two lugs overhang engage the same upright 91 of the longitudinal lever 524. The means are the same as that in the cases already described and shown, FIGS. 7 and 17 for the key rods which are a little remote from the longitudinal lever they have to operate.

*Travel of the Keys and Width of the Connection-Box*

It has been noticed that between the keys and the cover of the box there is a space for the key to travel of same amplitude as that of the keys of the usual manually actuated alphabetical machines. The distance which separates internally the cover 14 from the bottom 10 of the box, FIGS. 15 and 17 allows the different mobile elements contained in the box to have a corresponding travel.

It is obvious that if the longitudinal levers are actuated by power, the travel of the keys and of the elements contained in the box can be reduced. The keys can then be brought nearer to the cover and the cover can be brought nearer to the bottom. The whole then presents a more reduced thickness. It has seemed unnecessary to show this reduction.

The functioning of the different parts of the connection-box will be detailed at the same time as that of the striking mechanism as a whole.

*Utilization of Several Transverse Levers Corresponding to the Same Line of Keys*

In the examples described and shown by the figures, only one transverse lever has been made available per key line; each of these levers generally corresponding to a vowel.

However, it is within the scope of the invention when this will seem advantageous, and in particular for the printing of certain languages, the disposing, on a same line of keys to provide two or several transverse levers for each line of keys should the complexity of certain languages require it.

For example, whereas the illustrated transversal lever is generally to be found behind the sliding rods of the keys, a second transverse lever could be placed in front of these key rods. It will then be possible to have this second transverse lever operated only by certain of the line keys; the same key being able moreover to operate simultaneously the two transverse levers. So as to enable a given key to operate the second transverse lever, it suffices that the key carries a lug for engaging that lever.

The utilization of the described processes makes possible numerous combinations for the simultaneous operation of different type bars distributed over the different groups by a single key, this being dependent upon the requirements of the language for which the keyboard and the connection-box are designed.

In the usual machines, it is customary to provide a uniform difference of level between the respective lines of keys. On the contrary, the invention provides for the difference of the level between two successive lines to be optionally greater for the upper lines than for the lower lines, so as to take into account the differences of finger reach according to the direction of reach.

This progressively greater difference of level between lines from bottom to top is not shown clearly in the drawings. Nevertheless, it will be noticed in FIG. 134 that the keys of the 7th and 8th lines of the keyboard are at the same level, which is a partial application of the indicated means.

The above feature of the invention will possibly be varied according to the types of machines built and will make it possible to establish the most advantageous number of lines for the keyboard.

This measure is the more useful as the keyboards of the invention corresponding to the second type comprise a number of lines greater than the keyboards of the usual machines.

*Longitudinal Levers*

The assembly of the front parts of the longitudinal levers is shown in plan, FIG. 22. This figure supposes that the connection-box, already described, as well as the keys have been removed, but it shows the key rods, such as 63 which in the example are square in section.

With regard to their respective roles, the different longitudinal levers are classified in categories similar to those that are to be found in the alphabetical typewriters.

The most numerous levers correspond to the character keys and are each connected to one or several type bars.

The longitudinal lever 524 produces the normal single spacings. In another chapter it is explained that the invention provides for several keys and levers producing different lengths of spacings. In the figures is shown only the normal single space lever 524 and that for additional spacing of one interval 512 (FIG. 22).

It has been noticed that the segments carrying the type bars can be placed in three different case-shift positions:

Small letters (in rest first case-shift position)
Capital letters (second case-shift position)
Figures or signs (third case-shift position)

The placing in case-shift position 2 (capital letters) and 3 (figures) is controlled by four levers case-shift 500, 519, 527, 551, each of which has a different action as will be explained in another chapter.

Finally two levers control respectively:

The back space 552, and
The tabulation 553.

The keyboards of the second type comprise two keys corresponding to drives which are not longitudinally levers but push-rods 554 and 555 (FIG. 22). These push-rods on the right of the longitudinal levers operate the tabulation mechanism. They will be described in another chapter.

In FIG. 22 the short lugs such as 22 have not been represented, nor have those such as 64 (FIG. 6) which are fixed on the key rods and have been described with connection-box. These short lugs are all represented in FIG. 7.

The transverse long lugs (FIG. 22) such as 56 have been represented in FIG. 22. They apply the action of certain key bars to operate directly a remote longitudinal lever, such as 504, of the type shown in profile in FIG. 17.

FIG. 22 does not show the back part of a longitudinal lever. The form of this back part is identical for all levers which correspond to the type bars, for the single space levers and for the four case position shift levers. This form, shown in profile FIG. 133 is similar to that of the longitudinal levers of certain usual alphabetical machines.

Two of the case position shift levers 500 and 551 are strengthened laterally, as their front part shows in FIG. 22. The other levers for auxiliary drives are the back space lever 552 and the tabulation lever 553. They have a back part of particular form which shall be described later.

Except for auxiliary drive levers, all the lever back parts seen in plan are rectilinear, parallel to one another and equidistantly spaced apart. They are mounted to pivot on an axle 92 (FIG. 64) which is common to them. This axle 92 is passed through a crossbar 93 of known form which is fixed on the base and has equidistant slots such as 249 (FIG. 131). Each slot can receive a lever. Each longitudinal lever is biased by a return spring such as 94 (FIGS. 24—131).

All the longitudinal levers are moreover guided into the slots of an intermediate guide 95 (FIG. 22) as in certain usual machines. The longest are moreover guided into a front guide 96.

The slots of the back crossbar 93 (FIG. 64), those of the intermediate guide 95 (FIG. 22) and those of the front guide 96 are linearly aligned parallel to the longitudinal axis of the machine.

*Numbering of the Levers and of the Slots of the Guides*

In the description as well as in the figures, beginning from the left of the machine, the following numbering is adopted for the slots in the three above guides, linearly aligned slots of the respective guides being designated by the same last two digits of three digit numbers:

The 52 slots such as 226 (FIG. 64) of the back guide 92 are numbered from 200 to 251,
The 52 slots of the intermediate guide 95 (FIG. 16) from 300 to 351,
Plus 2 additional slots from 352 to 353,
The 52 slots of the front guide 96 from 400 to 451,
The 52 longitudinal levers from 500 to 551,
The back space lever 552 not included nor the tabulation lever 553 which correspond to the additional slots 352 and 353 of the intermediate guide.

The case position shift lever 500, which is guided by the upright 815 in the connection-box, is not guided by the front guide.

This numbering is intended to assign numbers ending by the same digits to the slots which, in the three guides, are linearly aligned and for the longitudinal levers whose respective back part corresponds to the aligned slots.

Each intermediate lever carries a number whose hundred-digit is 6 and whose tens-digit and unit-digit are the same as the two last figures of the numbering assigned to the longitudinal lever which is opposite and operates it. For instance, to the longitudinal lever 526 corresponds the intermediate lever 626.

Moreover, the segment slots which receive the type bars are numbered in their order from the left to the right; this way of numbering being moreover that of the numbering of the segments. The slots are numbered as follows:

Group I: 23 slots from 701 to 723
Group II: 8 slots from 724 to 731
Group III: 11 slots from 732 to 742
Group IV: 1 slot 746.

It will be noticed nevertheless that the segments slots, whose respective numbers end in two given figures are not opposite the longitudinal lever which operates them and that the latter carries in certain cases a number the two last figures of which are different. The latter particularity results from the fact that the number of longitudinal levers is greater than the number of type bars, since certain of them do not operate any type bar.

The step levers, which constitute the front part of certain longitudinal levers, each carry a number beginning with 8 in the hundred-row and ending with the same two figures as the number of the corresponding longitudinal lever; thus, to the longitudinal lever 525 (FIG. 24) corresponds the step lever 825.

*Longitudinal Levers Corresponding to Type Bars and Single Space Lever*

The features presented by the longitudinal levers corresponding to the character keys, as well as the normal single space lever 524 (FIG. 22) will now be specifically described.

The other longitudinal levers will be described succinctly, but they will be examined later with the mechanisms to which they belong respectively.

In the machines of the invention these longitudinal levers operated more or less directly by the character or space keys, have in first place the same roles as in the ordinary typewriters.

But considering that in the machines of the invention, several type bars can be operated simultaneously, sometimes even at the same time as a space key, the corresponding longitudinal levers have additional specific functions intended to condition the amplitude of advance of the carriage.

However, the way of operating the longitudinal levers by keys differs according to the keys. This results in particular, from the fact that certain keys operate simultaneously several longitudinal levers, and also from the fact that, in order to improve the fingering, certain keys are not aligned with the back parts of the longitudinal levers they operate respectively.

These various peculiarities have resulted in giving to the front parts of the longitudinal levers particular forms shown in plan (FIG. 22) and described below. These front parts are located under the connection-box which supports the keys.

Both for the back part and for the front part of the longitudinal levers, different forms could have been adopted. These forms are in fact conditioned in a certain measure by the system of connections which is adopted between the longitudinal levers and the type bars in the known systems.

In particular, when building machines of the invention in which the type bars operate with power help, for instance with rotating cylinder, grooved or smooth, the known forms particular to this case can be utilized at least partly for the diverse connections, and this fact has some influence on the form of the longitudinal levers.

In the example shown by the figures, the form of the front part of the longitudinal levers varies according to the levers and chiefly according to the categories of levers. The form of each lever has been determined according to the relative positions of the lever and of the key which has to operate it, as well as of the means utilized to transmit the motion of each key to the corresponding lever.

All the levers, as these appear in the structure are shown for example in (FIG. 16) in a vertical section taken along section line D—D of (FIG. 22). This (FIG. 22) shows that most of the key rods overlap a longitudinal lever. In this case, the front part of the longitudinal lever 545 biased upwards by its return spring such as 94 (FIG. 64) is in the rest position against the grooved end 23 of a key slide rod such as 23 (FIG. 16). This groove prevents the lever from becoming disengaged from the rod.

The longitudinal levers can be classified in different categories according to the operation of the keys on these levers and according to the profiles of the levers front parts.

The profile of the front part of the different categories of longitudinal levers is shown by the (FIGS. 24 to 27). In order not to complicate the drawing, the (FIG. 22) does not show the lower parts of certain levers. These lower parts are shown by the (FIG. 23) which is horizontal section taken along section line E—E of (FIG. 16.)

The forms of the longitudinal levers of the diverse categories will be examined successively.

*1st. Case in Which Each Longitudinal Lever Is Operated Directly by the Lower Extremity of One Key Rod Only*

The simplest case is that of the longitudinal levers each of which is operated by a single key. They are shown in profile in (FIGS. 26–27 and 17). In certain of these cases, the front part of each lever presents in its plan view (FIG. 22) a straight form such as levers 504 and 545, the back part of the lever and the corresponding key being in line.

In other cases, the lever is bent as are levers 507 and 503 so that this front part should pass under the engaging key rod when the key rod is not in linear extension of the back part of the lever.

In the cases shown in (FIGS. 26 and 27) it has therefore been possible to have the lever pass under the lower extremity of the key rod to be operated directly thereby.

*2nd. Case in Which the Key Rod Operates a Longitudinal Lever Through a Horizontal Lug Placed Transversely and Which Acts on An Upright of the Lever.*

The cases will now be examined in which the longitudinal lever is not only operated by one key only, but in which an exaggerated bending would have been necessary to have this lever pass under the lower extremity of the corresponding key rod. Such is the case for example of the rod 54 corresponding to the key F of group I (FIG. 22).

The key rod 54 carries a transverse lug 56. These lugs are shown in plan view in FIG. 22, the connection-box being removed, and in FIG. 7 in the connection-box with the cover and the keys removed. They are shown in section in FIG. 17. Their lengths are respectively a function of the lateral distance between the key rod and the lever that they operate. This lever is extended upwards by an upright 97 (FIG. 17) which lug 56 engages.

It will be noticed in FIG. 22 that the lateral spacing between the axis of the key rod and the lever and the upright the key rod operates, is generally a multiple of the space separating the back parts of the successive longitudinal levers, which standardizes the counter-bendings and the tools.

In certain cases, such as that of the lever 544, the spacing has been divided, and consequently the lug 57 overlaps the end of the lever.

These transverse horizontal lugs as 56 (FIG. 22) are more or less long and are located against the lower part of the cover 14 (FIG. 17) of the connection-box, as are the other lugs 17 (FIG. 7) whose function is only to limit the upwards travel of the rod which carries them, or these such as lugs 22 which have the additional function of engaging a frame 25. These transverse lugs could also be placed lower, that is at a distance from the bottom of the connection-box sufficient only for their travel, but then the key rod would have to be provided with a second lug such as 17 so as to limit the upward travel.

In rest position each of the uprights such as 97 (FIG. 17) is extended upwards to just contact the lug operates it. The forms of the different uprights are shown (FIG. 17.) The form of the upright varies according to the line of keys of the keyboard to which each upright corresponds, in such a way that, when each lever is depressed, its upright such as 97 passes through a hole such as 98 (FIGS. 7 and 17) in the bottom of the connection-box, this hole being as short as possible. The form is therefore dependent on the horizontal motion of the upright. This motion is a function of the distance which separates each key line from the back axle 92 (FIG. 64) common to all the longitudinal levers, but it is also a function of the height of the upper part of the upright with regard to a horizontal plane passing through the axle of the levers when the rods are vertical.

The holes such as 98, piercing the bottom of the box are shown in plan view in FIG. 7.

The two parallel edges, such as 99 and 100 (FIG. 17) of each upright should theoretically be curved, but for the sake of simplification they are rectilinear, which does not greatly increase the length of each slot.

It is to be noticed that the inclination of these uprights edges of the successive lines of the keyboard diminishes as the distance from the levers axles increase.

The upper edge of each upright, such as 101 (FIG. 17) also has a calculated length for the sliding engagement of the lug thereon. Consequently, this length diminishes for the uprights of the different lines of the keyboard, as the distance from the levers axle increase.

So as to avoid any lateral movement of the upper extremity of each upright, each lug, such as 56 (FIGS. 22 and 17) has a concavity 102 (FIG. 48) at the place of contact with the upright of the corresponding longitudinal lever. The form of these concavities is identical to the groove in the end 23 (FIG. 16) of each key rod.

The FIG. 17 shows the uprights such as 97, of longitudinal levers below the lugs such as 56 each sectioned in the upright plan. The band, such as 103 (FIGS. 17, 22, 7) which surrounds each lug, represents a tube of rubber or any other sound-proof material mounted on the lug to deaden the shock of the lug striking the cover 14 (FIG. 17) of the connection-box, when the key is spring returned to its rest position.

It is to be noticed that, except for their uprights, the levers of this category shown in FIG. 17 have the same forms as those of the category shown in FIG. 26. Such uprights can moreover be utilized with the category of forms shown in FIG. 27.

The largest part of each lug such as 103 and 56 (FIGS. 22 and 7) is covered by a tube of rubber or any other material designed for deadening and sound-proofing by preventing a metal to metal contact of engaging parts.

The characteristics of this means stated above make it clear that if it were used for the raised lines of the keyboard, important slidings of the lug against the upper part of the upright of the lever would result. That is why in the example this means has been used only for the lower lines of keys (7th and 8th), uprights such as 97 of the longitudinal levers 504, 537.

For the six lines of the upper keys, the following variant has been preferred. Each transverse lug such as 105 at the extremity of its horizontal part is extended vertically downwards by a part such as 131 (FIGS. 16–18), parallel to the key rod and which, passing through a hole of the bottom of the box, is extended up to the same level as the lower extremity of the key rod. This descending part of the lug may have the same section as the key rod. It ends, like the key rods which operate directly the lever, by a grooved end such as 23 (FIG. 16), with this variant the longitudinal lever does not have an upright. It has therefore the same profile as those of the longitudinal levers which are operated directly by the lower extremity of a key rod of same line and which are shown in FIGS. 26 and 27.

In rest position, the longitudinal levers such as 535 (FIG. 16) are operated by the extremity of the descending part of a transverse lug engaging a lever. Such is the case for example, of the lever 535.

In this variant, so as to prevent a slight defect in parallelism between the key rod (FIG. 18) and the descending part 131 of the corresponding lug 105 or that the least torsion should cause a bind, the hole of the bottom of the box through which this descending part passes is a little bigger than the section of the latter; only the key rod is guided without any play through the cover and through the bottom.

It is to be noticed in FIG. 17 that, like the levers operated directly by the key rods, the levers operated by a transverse lug, whether they are of the first form (upright levers) or of the second form (a descending lug), may have either a shape which causes them to pass through the upper sheet (for example the lever 504), or a shape like the longitudinal levers shown in FIG. 27 which causes them to pass through the lower sheet indicated by broken lines (FIG. 17).

The transverse lugs which correspond to the second form could, like those of the first form, have when in rest position, their horizontal part either lower than or resting against the cover of the connection-box. In the last case rubber, or of any other sound-proof material is interposed between the contacting parts. It is this first solution which has been utilized in the example. This solution reduces the weight of the transverse lug and reduces the risks of torsion, since the descending part is thus shortened. However, as indicated with regard to the form with upright lever, each key rod such as 254 (FIGS. 17 and 7) has to be provided with a second lug such as 17 which limits the travel upwards.

It is to be noticed (FIGS. 22 and 7) that most of the long lateral lugs, whether they are of the first form or of the second, engage a key rod as for example the lug engages rod 55. But other lugs, for reasons of space engage the rod either in front as does the lug as 56 or behind as does lug 104.

The two above means make it possible when necessary, to have the same key operating simultaneously two longitudinal levers, one of them by the lower extremity of the key, the other by a transverse lug. This is what is done, for example, by the key of the English keyboard of FIG. 4 which carries the characters NT respectively of group III and of group IV and which operates the longitudinal levers 540 and 547.

It is obvious that by increasing the number of the horizontal lugs carried by a given key rod one can operate simultaneously more than two longitudinal levers corresponding to printing points of different groups, and do so independently of the longitudinal levers that this same key can operate by pivoting frames or axles with radial levers as described hereinbefore. Moreover, the same lug can operate in certain cases, several levers.

*3rd. Case in Which Several Keys Operate Directly by the Lower Extremity of Their Rods, but in Turn, the Same Longitudinal Lever Mounted on a Deformable Parallelogram.*

In certain cases several keys operate directly by the lower extremity of their respective rods, but in turn, the same longitudinal lever. Such is the case in the example of several longitudinal levers of group I.

The corresponding form of these longitudinal levers is shown in FIG. 24 with a variant in FIG. 25. In these figures the connection-box is shown partially.

In the example, these longitudinal levers correspond to a letter of group I, generally a consonant, which is operated in turn by several keys in the same column of the keyboard. Such is, for example, the case of the lever 510 corresponding to the consonant N of group I, operated in turn by the keys of the third column of keyboard of FIGS. 1 and 4 and located respectively in lines 2 to 6. Most of the keys of this category operate, in addition to the longitudinal lever which passes under the extremity of their rod, such as the lever 510 (FIG. 22), a second longitudinal lever corresponding to a letter of group II, generally a vowel.

Such is the case for the keys of the third column located in the lines 3 to 6 of the keyboard of FIGS. 1 or 4 which, in addition to the lever 510 of group I, each operate a longitudinal lever of group II.

The longitudinal lever of group I which is operated is the same for those of the different keys of the same column which are on different lines of the keyboard, whereas the longitudinal lever of group II, which is operated at the same time, is different according to the line of the keyboard. However, this key is the same for several keys which belong to the same line of the keyboard, for example Ce, Ne, De, etc. . . . of the fourth line of the keyboard of the FIG. 1.

It has been noticed that the linking of the key rods with the corresponding longitudinal levers of group II is in this case effected by the pivoting frames such as that constituted by the parts 30, 31, 24 and 32 (FIG. 7) contained in the connection-box. These frames are shown in FIGS. 7 and 13.

The different keys which work the same longitudinal lever of group I are on different lines of the keyboard, therefore at different distances from the axis of this lever. Now, this lever must have the same angular movement whatever the key moving it. If this lever were in one piece, such as in the other cases, the different keys would therefore have to have different travels. This would present disadvantages for the operator in a machine where only one key is struck at a time, but these disadvantages would be more serious in the machines of the invention in which several keys are struck at the same time. As a matter of fact, the different fingers which strike at the same time on keys of different lines would have to have movements of different amplitudes.

To prevent the disadvantages, each longitudinal lever has been made up in two parts: the front part mounted on a deformable parallelogram and articulated on the back part. This particular setup is shown in FIG. 24 with a different form in FIG. 25. The uniformity of angular motion is necessary, not only for the action of the lever on the type bar but also for its action on the different elements composing the escapement device, as well as for securing the raising of the ribbon.

The front part of each of these levers is of the step type, a step for each key rod. The way of operating each key rod on this part of the lever is the same as in the case in which the lever is in one piece.

FIG. 22 shows that, in the example, there is a parallelogram lever under each column of keys, i.e. column 1, 2, 3, 4, 5, 6 and 8, 9, 10, 11.

It has already been pointed out that FIG. 22 does not show the lower part of the parallelograms. This FIG. 22 is completed by FIG. 23 which is horizontal cross section along section line E—E of FIG. 25.

In the case in question, the linking between the key rods, such as 107, 108, 109, 110 and 111, (FIG. 24) and the longitudinal lever such as 505 corresponding for example to a consonant of group I (C in the keyboard of FIG. 1) is effected by three parts forming with their bracket such as 112 (FIG. 24) a deformable parallelogram, which is sustained by the angle 88 (FIG. 25). This angle runs laterally through the whole machine. Its extremities, right and left, are fixed on the base by two symmetrical brackets 113 shown on the left in FIG. 22. This angle 88 is to be seen in plan view in FIG. 22 and in vertical section in FIG. 16.

There is a bracket such as 112 in FIG. 24 for each of the deformable parallelograms. On each bracket is pivotally mounted an upper small connecting-rod such as 114 (FIGS. 22 and 24) by an axle such as 115 (FIG. 24) and a lower small connecting-rod such as 116 (FIGS. 23 and 24) by an axle such as 117. These two small connecting-rods are mounted parallel.

The front extremity of each of these two small connecting-rods is mounted so as to pivot about an axle 118 for the upper one and 119 for the lower one on a step lever such as 805. The space between axles 115 and 118 for the upper small connecting-rod is of same length as the space between axles 117 and 119 for the lower small connecting-rod.

The four axles 115, 118, 119, 117 determines the deformable parallelogram. The step lever 805 is pivotally mounted not only on the two small connecting-rods, but also on the front end of the longitudinal lever 505 by the axle 120.

This axle 120, for example, a bearing rivet, slides into the stud-hole 121 arranged in the longitudinal lever 505. The step lever 805 is limited to the necessary length for being acted on by the key bars spaced apart from key bar 107 of second line to key bar 111 of sixth line of the keyboard in the considered case.

This length can differ according to the levers as required. In rest position the upper edge of each of the step levers such as 805 is separated from the bottom 10 of the connection-box by a small distance in the range of one millimeter, so that its return travel is limited by the key rods or by the stop 122 of the longitudinal lever and not by contact with the connection-box. Moreover, bands of rubber or any other sound-proof material are provided such as 123 and 124 interposed in the interstice in question and fixed under the lower part 10 of the connection-box. Such shock-absorbers could on the contrary be fixed on each step of the levers such as 805.

*Functioning of the Longitudinal Levers Mounted on a Parallelogram*

When one of the keys whose rods are spaced apart on the lever steps such as 805 is struck, its rod such as 110 (FIG. 24) descends, compressing its return spring 20. The rod drives downwards the stepped lever 805. The latter, which is supported by two small connecting-rods 114 and 116 pivots the small connecting-rods around their respective front and back axles, deforming the parallelogram 115, 118, 119, 117. The other key rods corresponding to this step lever 805 remain in rest position, supported in the connection-box by their respective return springs.

The stepped lever 805 drives in its descent the longitudinal lever 505 by its pivot axle 120. The lever 505 descends in an angular movement around its back axle 92 (FIG. 64). This lever 505 operates in any one of several well known ways a corresponding type bar. A way adopted as an example will be defined hereafter.

Each longitudinal lever such as 505 (FIGS. 24 and 22) has moreover the other functions that is usual in alphabetical typewriter, such as the action on the devices for escapement mechanisms, for mounting of the ribbon, etc. It will be noted that these actions have special features in the machines of the invention.

The actions exerted by the longitudinal levers mounted with a parallelogram on the different parts of the machine are exerted in the same way by the other longitudinal levers which correspond to character keys, but whose different forms are shown (FIGS. 26, 27 and 17).

Considering that the lever 805 (FIG. 24) is mounted on a parallelogram, its upper edge can only descend parallel to itself. It follows that for a given travel of a struck key whatever its line in the common column, the amplitude of the descent of this step lever 805 is the same. Consequently, the angular movement of the longitudinal lever 505 is also the same, which is necessary to cause the type bar to strike against the paper and to work the other different mechanisms.

FIG. 24 shows a second step lever 828 mounted in the same way as the lever 805 but whose particularities consists in a back extremity 125 for operation by a key rod in the first line, such as 126, and a front extremity 127 for operation by a key rod of seventh line, such as 128.

All the step levers mounted on parallelogram such as 805 (FIG. 23) or 817 (FIG. 25) have their respective front parts guided by a front guide 96 which can be seen in plan view (FIG. 22). This guide runs through the whole machine. Its right and left extremities are fixed on the base of the machine.

Those of the longitudinal levers which have the form of the longitudinal levers such as 505 (FIG. 24) have an extension in the form of a small tongue 130 which enables them to be guided into a slot of the intermediate guide 95. This guide 95 is shown in front view in FIG. 16, in plan view in FIG. 22 and in profile in FIGS. 24 to 27. It runs laterally through the machine and is fixed on the base by the screws 132 and 133 (FIG. 16).

When all the struck keys and their levers return to their rest position, by the action of their respective return springs, the travel of the key rods, such as 109 (FIG. 24) is limited by the contact of their lug such as 53 (FIGS. 7, 15, 24) against the cover 14 of the connection-box, with interposition of sound-proof material. The travel of the other parts is limited by the fact that the longitudinal lever such as 505 runs into the fixed stop 122. This stop is the same for all the longitudinal levers; it runs laterally through the whole machine; it is constituted by a band of rubber or any other sound-proof and elastic material set in a U-shaped part 134 seen in plan view in FIG. 23 and in profile in FIG. 25 and which is fixed by three vertical legs such as 135 (FIGS. 23—22) to the transverse angle 88.

Each of these legs has a stud-hole through which passes the fixing-screw, which make it possible to adjust the height of the stop 122 as in a usual alphabetical machine.

It will be noticed that in the case of the stepped lever 801 (FIG. 22) which corresponds to the longitudinal lever 501 and to the first column of keys of the keyboard (FIGS. 1–4) a double bend has been given to this stepped lever.

Finally, a necessary bend is sometimes given, not to the longitudinal lever nor to the stepped lever but to the small connecting-rods which connect these two parts; such is the case for example for the lower small connecting-rod 136 (FIG. 23) which corresponds to the profile 116 of FIG. 24.

In the example corresponding to the keyboards of FIGS. 1–4 the stepped levers which have the profile shown by FIG. 24 are those in FIG. 22 which carry the numbers 801, 805, 810, 813, 821, 825, 818, 816.

Another form of a longitudinal lever and of a stepped lever mounted on a parallelogram is shown in FIG. 25. All that has been said concerning the form shown in FIG. 24 remains valid, except the following particularities: the longitudinal lever such as 517 (FIG. 25) has no small tongue extension 130 (FIG. 24) as does the lever 525 for guiding this lever into a slot of the intermediate guide 95; consequently, the stepped lever 817 (FIG. 25) is extended into the guide 95 by a small tongue 137. It will be noticed in the chapter on power actuation that in the case of actuation by electromagnets, the action of the actuating frame on the levers is exerted on the back extremity of the small tongues, such as tongue 130 (FIG. 24) or tongue 137 (FIG. 25) which pass through the intermediate guide 95. It follows that in power actuation with the form of longitudinal levers and stepped levers of FIG. 24, it is the longitudinal levers such as 505 which will be acted on whereas in the form of FIG. 25 it is the stepped lever such as 817 which will be acted on.

In the example, the only stepped levers which have the profile shown in FIG. 25 are those which in FIG. 22, carry the numbers 817 and 828.

The forms of the FIGS. 24 and 25 are adopted, or can be adopted, for the different cases in which the same longitudinal lever has to be operated in turn by keys belonging to different lines of the keyboard. This setup on a parallelogram can moreover be extended to all the longitudinal levers, even to those operated by one key only. In the latter case the number of steps is reduced to one only.

FIGS. 26 and 27 show the forms adopted without parallelogram and which are reserved for the cases when the longitudinal lever is operated by one key only of a given line or, if need be, by two keys of lines near each other as in the case for example, of the longitudinal lever 550 (FIG. 22) operated by the two keys S of group V, column 13 of the keyboard of FIGS. 1 or 4.

The FIG. 26 shows profiles of the front parts of the longitudinal levers 138 to 146 which are operated respectively by key rods of the different lines of the keyboard from the first to the ninth, each lever being operated in principle only by one key which is always the same. These levers, in their general form, are similar to those of the usual alphabetical typewriters, with the only difference that their front part is not extended upwards and fastened to the key. The aim has been to give them respective forms which enable all of them to be in the same wave. All of them are extended by a small tongue such as 147 by means of which they can be guided into the intermediate guide 95 and power actuating them eventually.

The longest ones, from those which are operated by a key of line 5, are guided moreover into the front guide 96, and have here a greater height which improves the guiding, such as is shown in FIGS. 26 and 27 under the sixth line of the keyboard. FIG. 27 shows other profiles of front parts of the longitudinal levers 148 to 153. The corresponding levers are operated respectively by keys of lines 2 to 7, but they could be extended if required to the lines 8 and 9.

All that has been said regarding the profile of the lever shown in FIG. 26 is valid for the profile illustrated in FIG. 27; the only difference is in the height at which these levers pass between the intermediate guide 95 and the key rod which operates each of them. These forms of profile are intended to free the area under the first line of the keyboard. This freedom is necessary in certain cases to allow the travel of the lever which is operated by the key of the first line in the same column of keys.

The forms shown by FIGS. 24 to 27 and 17 make it possible to resolve all the cases, whatever the composition of the keyboard, even if the latter is different from the examples of keyboards shown in FIGS. 1 to 6, for instance for the keyboards that may have to be composed for certain languages by increasing or by reducing slightly the number of type bars.

These diverse forms have been utilized under the connection-box for the keyboard of the identical mechanical structure of FIGS. 1 to 6 composed as examples.

A chart indicating the type of profile which has been adopted in the example will be found hereafter. This indication is given by the figure number 24 to 27 and 17, which the chart mentions on the line reserved for each longitudinal lever.

A variant with regard to the action of the key rods on the longitudinal levers is now going to be described.

The longitudinal levers which are mounted with a parallelogram in FIG. 24 and FIG. 25 all have an angular motion of the same amplitude no matter what line of the keyboard the key which one works happens to be.

However, the longitudinal levers which are each operated by one key only (FIGS. 26, 27, 17) have angular motions of different amplitude according to the line of the keyboard on which the operated key is situated.

This combination shown by FIGS. 24 to 27 and 17 is suitable for a machine built to be driven solely by strength of the fingers.

If the machine is built with power actuation of the device for striking by one or two electromagnets, in the form which will be described, it is preferable to standardize to a certain extent the angular motions of the longitudinal levers, motions which are necessary for each type bar to reach the sheet of paper placed on the platen.

It may for instance be deemed advisable for the differences in angular motions of the longitudinal levers other than those mounted with a parallelogram—differences both in relation to one another and to the levers with a parallelogram—not to exceed those that are met with in the combinations described previously, between the levers whose key is to be found in the first line and those whose key is located in the fourth line. A correction would then be deemed necessary for the levers whose single key is more in front (fifth line and following lines).

In order to avoid mounting each of the latter levers on a parallelogram having its junction axis on the same line as those of the FIGS. 24 and 25 (axle 120) the variation described hereafter and shown in FIGS. 120 and 121 can be adopted. This variation is intended to multiply the movement of the key so that the longitudinal lever has an angular movement equal to that of the levers mounted with a parallelogram as in FIGS. 24 and 25.

In the case of FIG. 120 the key is located in the seventh line. So that the longitudinal lever should have the suitable angular motion, an intermediate lever 299 is acted upon by the key rod. This lever is mounted so as to pivot on an axle 298 on a bracket 297 which is fixed on the bottom 10 of the connection-box. The other extremity of this lever is connected with the longitudinal lever by a lug 296 which is fixed on the intermediate lever and passes through an extended hole 296 pierced in the longitudinal lever. It is evident that the motion of the key is thus multiplied. For the keys of each of the lines of the keyboard, it suffices to give to the intermediate lever the length corresponding to the required multiplication.

FIG. 121 shows the application of the same principle for a key of the ninth line which is the last on the keyboard. The key rod being too close to the intermediate lever axle, this rod is not made to act upon the intermediate lever directly, but by means of a lug of the same type as that of FIG. 18 that first contacts the intermediate lever. The intermediate lever is displaced laterally with respect to the key rod so as to prevent the lower extremity of the rod from running it when the key rod is descending.

*Transmission of the Movement of the Keys to the Longitudinal Levers and to the Type Bars*

Whatever the category of keys or of levers among those which have been described, when one or several keys are struck simultaneously, each key rod descends by sliding into a hole in the cover 14 of the connection-box FIG. 15 and through the hole in the bottom 10 which correspond to it. Each key compresses a return spring such as 20 and 21, FIG. 15 which is mounted on the key rod.

When descending the key rod drives the corresponding longitudinal lever, either by its lower extremity or by a lug such as 56 (FIGS. 22 and 17) which acts on an upright of the longitudinal lever or by a lug such as 105 (FIG. 16 or 18) which descends vertically with respect to the longitudinal lever.

It has been noticed that certain key rods drive simultaneously two longitudinal levers, one lever of group I, by a lower extremity, and one lever of group II by a pivoting frame.

The key rod of key "N III" "T IV" (FIG. 1) also drives simultaneously the two longitudinal levers which correspond to these characters, N of group III and T of group IV. It drives that of "N III" by its lower extremity and that of "T IV" by a lug whose extremity descends vertically.

In all the cases each longitudinal lever pivots around the back axle 92 (FIG. 64) common to all the longitudinal levers. This angular movement of each longitudinal lever is identical to that of the key levers of a usual alphabetical typewriter.

In the form of known connections, shown as an example, the longitudinal lever such as 526 (FIG. 133) or 528 (FIG. 49) by a projection such as 154 drives downwards a small connecting-rod such as 155. The latter pivoting around its front axles such as 156 on the longitudinal lever and back axles such as 157 on the intermediate lever such as 626 (FIG. 133) and 49, pulls on this intermediate lever. The latter pivoting forward, around the axle 159 common to all the intermediate levers, pulls in the direction of the arrow 158 by the bent steel wire connection such as 160 on the back extremity such as 161 of a type bar such as 129 axled in the slot 724 of the segment (FIG. 49). The type bars such as 129 are of same form as those of the usual alphabetical typewriters. The bar 129 (FIG. 133) pivots around the axle 162 common to all the type bars of group II. Its character block striking at the end of its travel, the paper which is on the platen 164 of the carriage.

The position of the type bar at end of travel is shown in broken lines on FIG. 133. All the elements of the latter movement are known.

In rest position, the type bar is on the cushion 165 of a known form shown in cross section (FIGS. 133—49). The bracket 292 of this cushion of group II, which is of a special design, is shown in plan view (FIG. 31) and from the left (FIG. 32). It will be noticed that, in the example of the keyboard of the second type described in FIG. 4, the key rods are disposed in perpendicular lines and columns. The keyboard could, however, be given a more usual disposition for instance the keys could be placed in quincunx arrangement, but for that purpose it would be necessary to shape the longitudinal levers accordingly, the latter being then for example obliqued with respect to the longitudinal axis of the machine.

In the example, the slot 215 of the back crossbar (FIG. 56) has not been utilized, nor 315 of the intermediate guide 92 (FIG. 16). The longitudinal lever of corresponding number 515 does not exist. It is also to be noticed in FIG. 22 that several slots of the front guide 96 are not utilized. This results from the fact that the longitudinal levers, which are operated only by the keys of the upper lines of the keyboard, have not been extended up to this front guide, their guiding by the intermediate guide 95 being sufficient.

It has nevertheless seemed practical to build the back crossbar 93, the intermediate guide 95 and the front guide 96 with the whole series of equidistant slots. Moreover, this standardization allows for variations in the number or the form of longitudinal levers, for certain keyboards.

*Offset Between the Axis of the Keyboard, the Axis of the Machine and the Axis of the Assembly of Segments*

The keyboards of the second type have in the right hand part of the machine a greater number of longitudinal levers than in the left hand part, as may be seen in FIG. 22 and consequently a greater number of connections between key levers and type bars, as shown in FIG. 49.

For that reason, the assembly of segments can be placed in such a way that its axis is offset towards the right with respect to the machine axis. Inversely the same result may be obtained by offsetting the keyboard axis towards the left with respect to the common axis of the machine and to set the assembly of segments. The FIG. 136 shows that it is this latter solution which has been adopted in the examples. The axis of the keyboard (auxiliary drives aside) corresponds to the keys of the seventh column which are raised.

*Two Charts Are Given Hereafter*

The first indicates the characteristics of the levers corresponding to each of the keys, as well as the numbers of these levers and of the slots which guide them respectively. Each key is characterized in the two first columns by the line and column of the keyboard at the intersection of which they are to be found. The last three columns indicate the characters corresponding to the key, in the three case-shift positions, for the keyboard composed for the French language and shown in FIG. 1. The second chart indicates, for each key, the characters of the three case-shift positions for each of the keyboards shown as an example in the FIGS. 1 to 6 respectively for the:

French,
Spanish,
Italian,
English,
German, and
Dutch languages.

| Key | | Lever | Back slot | Inner guide slot | Front guide slot | Lever type of fig. No. | R or L counter bending [3] | Stirrup "ST" or "LUG" length [3] | Intermediary lever | Segments slot | Group | Characters French Keyboard FIG. 1 | | |
|---|---|---|---|---|---|---|---|---|---|---|---|---|---|---|
| Line | Column | | | | | | | | | | | Position | | |
| | | | | | | | | | | | | 1 | 2 | 3 |
| 9 | 1 | 500 | 200 | 299 | 399 | ---- | ------ | ------ | ---- | ---- | All | All 2d pos. | | |
| 2/5/6 | 1 | 501 | 201 | 301 | ----- | 24 | R. 1 | ------ | 601 | 701 | I | p | P | 1 |
| 3 | 1 | 502 | 202 | 302 | ----- | 26 | L. 1 | ------ | 602 | 702 | I | h | H | § |
| 4 | 1 | 503 | 203 | 303 | ----- | 26 | L. 2 | ------ | 603 | 703 | I | j | J | " |
| 7 | 1 | 504 | 204 | 304 | 404 | 17 | ------ | LUG 3 | 604 | 704 | I | f | F | & |
| 2à6 | 2 | 505 | 205 | 305 | 405 | 24 | ------ | ------ | 605 | 705 | I | c | C | 2 |
| 1 | 2 | 506 | 206 | 306 | ----- | 26 | L. 1 | ------ | 606 | 706 | I | w | W | ° |
| 7 | 2 | 507 | 207 | 307 | 406 | 26 | 2 L. 1 | ------ | 607 | 707 | I | g | G | $ |
| 9 | 2+3 | 508 | 208 | 308 | 407 | 26 | L. 1 | ------ | 608 | 708 | I | , | . | : |
| 1/7 | 3 | 509 | 209 | 309 | 408 | 26 | R./L. 1 | ------ | 609 | 709 | I | q | Q | % |
| 2à6 | 3 | 510 | 210 | 310 | 409 | 24 | L. 1 | ------ | 610 | 710 | I | n | N | 3 |
| 1 | 1 | 511 | 211 | 311 | ----- | 26 | ------ | ST | 611 | 711 | I | z | Z | / |
| 9 | 4 | 512 | 212 | 312 | 412 | 26 | R. 1 | ------ | Ng | Ng | I | Esct. | | |
| 2à7 | 4 | 513 | 213 | 313 | 413 | 24 | ------ | ------ | 613 | 712 | I | d | D | 4 |
| 1 | 4 | 514 | 214 | 314 | ----- | 26 | L. 1 | ------ | 614 | 713 | I | b | B | - |
| 2à7 | 11 | 516 | 216 | 316 | 437 | 27 | ------ | ST | 616 | 714 | I | s | S | 0 |
| 1à6 | 5 | 517 | 217 | 317 | 417 | 25 | L. 1 | ------ | 617 | 715 | I | t | T | 5 |
| 2à7 | 10 | 518 | 218 | 318 | 433 | 24 | ------ | ST | 618 | 716 | I | l | L | 9 |
| 9 | 5/6 | 519 | 219 | 319 | 419 | 26 | ------ | ------ | 619 | Ng | 2nd pos. gr. I | | |
| 1 | 6 | 520 | 220 | 320 | ----- | 26 | R. 1 | ------ | 620 | 717 | I | k | K | ( |
| 2à6 | 6 | 521 | 221 | 321 | 421 | 24 | ------ | ------ | 621 | 718 | I | v | V | 6 |
| 2 | 7 | 522 | 222 | 322 | ----- | 26 | R. 1 | ------ | 622 | 719 | I | , | ? | 0 |
| 1 | 7 | 523 | 223 | 323 | ----- | 26 | ------ | ------ | 623 | 720 | I | x | X | |
| 7/8 | 5/6/8/9 | 524 | 224 | 324 | 424 | 17 | L. 4 R. 6 | ------ | 624 | Ng | I | Esct. | | |
| 2à6 | 8 | 525 | 225 | 325 | 425 | 24 | ------ | ------ | 625 | 721 | I | m | M | 7 |
| 1 | 8 | 526 | 226 | 326 | ----- | 26 | L. 1 | ------ | 626 | 722 | I | y | Y | ) |
| 9 | 8/9 | 527 | 227 | 327 | 427 | 17 | ------ | ------ | 627 | Ng | 2d pos. gr. II | | |
| 1à6 | 9 | 528 | 228 | 328 | 429 | 25 | R. 1 | ------ | 628 | 723 | I | r | R | 8 |
| 1 | 5/9/10 | 529 | 229 | 329 | ----- | 26 | ------ | ST | 629 | 724 | II | é | E | · |
| 7 | (¹) | 530 | 230 | 330 | 430 | 27 | ------ | ST | 630 | 725 | II | u | U | ç |
| 6 | 1 to 11 | 531 | 231 | 331 | 431 | 27 | ------ | ST | 631 | 726 | II | a | A | ù |
| 5 | 1 to 11 | 532 | 232 | 332 | ----- | 27 | ------ | ST | 632 | 727 | II | o | O | ! |
| 4 | 2 to 11 | 533 | 233 | 333 | ----- | 27 | R. 1 | ST | 633 | 728 | II | e | E | ; |
| 3 | 2 to 11 | 534 | 234 | 334 | ----- | 27 | R. 1 | ------ | 634 | 729 | II | i | I | 0 |
| 1 | 11 | 535 | 235 | 335 | ----- | 17 | L. 2 | LUG | 635 | 730 | II | à | A | . |
| 1 | 12 | 536 | 236 | 336 | ----- | 17 | L. 5 | LUG 5 | 636 | 731 | II | c | A | .. |
| 8 | 10 | 537 | 237 | 337 | 436 | ² 17 | L. 1 | LUG 3 | 637 | 732 | III | r | R | = |
| 8 | 4 | 538 | 238 | 338 | 438 | 26 | ------ | LUG | 638 | 733 | III | s | S | + |
| 9 | 11+12 | 539 | 239 | 339 | 439 | 26 | ------ | ------ | 639 | 734 | III | m | M | x |
| 4/8 | 6/8 | 540 | 240 | 340 | 440 | 26 | R. 1 | ------ | 640 | 735 | III | n | N | - |
| 2 | 12 | 541 | 241 | 341 | ----- | 27 | ------ | ------ | 641 | 736 | III | e | E | 0 |
| 5 | 12 | 542 | 242 | 342 | 442 | 26 | L. 1 | ------ | 642 | 737 | III | u | U | : |
| 6 | 12 | 543 | 243 | 343 | 443 | 17 | ------ | LUG 2 | 643 | 738 | III | i | I | |
| 7 | 12 | 544 | 244 | 344 | 444 | 17 | L. 1 | LUG 2 | 644 | 739 | III | t | T | |
| 1 | 13 | 545 | 245 | 345 | ----- | 26 | ------ | ------ | 645 | 740 | III | a | A | 0 |
| 3 | 12 | 546 | 246 | 346 | ----- | 17 | ------ | LUG 5 | 646 | 741 | III/IV | o n | ON | 00 |

See footnotes at end of table.

| Key | | Lever | Back slot | Inner guide slot | Front guide slot | Lever type of fig. No. | R or L counter bending [3] | Stirrup "ST" or "LUG" length [3] | Inter-mediary lever | Seg-ments slot | Group | Characters French Keyboard FIG. 1 | | |
|---|---|---|---|---|---|---|---|---|---|---|---|---|---|---|
| Line | Column | | | | | | | | | | | Position | | |
| | | | | | | | | | | | | 1 | 2 | 3 |
| 6 | 13 | 547 | 247 | 347 | 447 | 17 | -------- | LUG 2 | 647 | 743 | IV | t | T | |
| 5 | 13 | 548 | 248 | 348 | ---- | 17 | -------- | LUG 3 | 648 | 744 | IV | s | S | 0 |
| 2+7 | 13 | 549 | 249 | 349 | 449 | 17 | -------- | 2 LUG 4 | 649 | 745 | IV | r | R | |
| 4 | 12 | | | | | | | | | | III/IV | n t | NT | 00 |
| 3+4 | 13 | 550 | 250 | 350 | ----- | 17 | -------- | 2 LUG 5 | 650 | 746 | V | s | S | 0 |
| 9 | 13/14 | 551 | 251 | 351 | 451 | | | | | | All | All 3rd. Back space Tabulation | | |
| 1+2 | 14 | 552 | ---- | 352 | ---- | 26 | | | | | | | | |
| 3/4 | 14 | 553 | ---- | 353 | ---- | 26 | L. 1 | | | | | | | |

[1] Col. 3-4-7-10-11.   [2] Low sheet.   [3] The figures indicate the amplitude of the counter-bends and the length of the lugs in number of lever between axes.

| Keyboards | FIG. 1 | | | FIG. 2 | | | FIG. 3 | | | FIG. 4 | | | FIG. 5 | | | FIG. 6 | | |
|---|---|---|---|---|---|---|---|---|---|---|---|---|---|---|---|---|---|---|
| Key | French | | | Spanish | | | Italian | | | English | | | German | | | Dutch | | |
| Line | Col. | 1 | 2 | 3 | 1 | 2 | 3 | 1 | 2 | 3 | 1 | 2 | 3 | 1 | 2 | 3 | 1 | 2 | 3 |
| 1 | 1 | z | Z | / | x | X | / | x | X | / | z | Z | / | x | X | / | y | Y | / |
| 1 | 2 | w | W | ° | w | W | ° | w | W | ° | v | V | ° | j | J | ° | s | S | ° |
| 1 | 3 | q | Q | % | q | Q | % | q | Q | % | g | G | % | v | V | % | b | B | % |
| 1 | 4 | b | B | - | b | B | - | g | G | - | b | B | - | z | Z | - | z | Z | - |
| 1 | 6 | k | K | ( | k | K | ( | f | F | ( | k | K | ( | c | C | ( | c | C | ( |
| 1 | 7 | x | X | — | z | Z | — | , | . | — | x | X | — | k | K | — | x | X | — |
| 1 | 8 | y | Y | ) | y | Y | ) | z | Z | ) | y | Y | ) | f | F | ) | m | M | ) |
| 1 | 10 | éIII | E | , | rIII | R | , | rIII | R | , | yIII | Y | , | hIII | H | , | uIII | U | , |
| 1 | 11 | àII | A | . | hIII | H | . | éII | E | . | uIII | U | . | oII | O | . | "II | " | . |
| 1 | 12 | ‹II | ^ | .. | 'II | ¨ | ‹ | ‹II | ^ | .. | rII | R | £ | ··ii | ¨ | . | ‹II | ^ | .. |
| 1 | 13 | aIII | A | ? | iIII | I | ? | iII | I | ? | aIII | A | ? | hIII | H | ? | uIII | U | ? |
| 2 | 1 | p | P | 1 | v | V | 1 | v | V | 1 | p | P | 1 | h | H | 1 | w | W | 1 |
| 2 | 2 | c | C | 2 | n | N | 2 | r | R | 2 | c | C | 2 | t | T | 2 | l | L | 2 |
| 2 | 3 | n | N | 3 | c | C | 3 | n | N | 3 | n | N | 3 | m | M | 3 | n | N | 3 |
| 2 | 4 | d | D | 4 | d | D | 4 | d | D | 4 | t | T | 4 | n | N | 4 | v | V | 4 |
| 2 | 5 | t | T | 5 | t | T | 5 | c | C | 5 | l | L | 5 | d | D | 5 | t | T | 5 |
| 2 | 6 | v | V | 6 | p | P | 6 | b | B | 6 | r | R | 6 | l | L | 6 | h | H | 6 |
| 2 | 7 | , | ? | 0 | n̈ | N | ? | m | M | 0 | , | ? | 0 | ℬ | ? | 0 | B | ? | 0 |
| 2 | 8 | m | M | 7 | l | L | 7 | p | P | 7 | d | D | 7 | b | B | 7 | r | R | 7 |
| 2 | 9 | r | R | 8 | r | R | 8 | l | L | 8 | m | M | 8 | r | R | 8 | d | D | 8 |
| 2 | 10 | l | L | 9 | m | M | 9 | s | S | 9 | w | W | 9 | s | S | 9 | k | K | 9 |
| 2 | 11 | s | S | 0 | s | S | 0 | eIII | E | 0 | s | S | 0 | w | W | 0 | g | G | 0 |
| 2 | 12 | eIII | E | 0 | lIII | L | 0 | nIV | N | 0 | eIII | E | 0 | lIII | L | 0 | iIII | I | 0 |
| 2 | 13 | rIV | R | | nIV | N | | y | Y | | rIV | R | | tIV | T | | nIV | N | |
| 3 | 1 | h | H | § | h | H | § | y | Y | § | h | H | § | p | P | § | f | F | § |
| 3 | 7 | iII | I | o | oII | O | o | oII | O | o | iII | I | o | iII | I | o | iII | I | o |
| 3 | 12 | on | ON | 00 | on | ON | 00 | no | NO | 00 | on | ON | 00 | ch | CH | 00 | or | OR | 00 |
| 3 | 13 | sv | S | o | :v | S | o | ,v | V | o | sv | S | o | tv | T | o | sv | S | o |
| 4 | 1 | j | J | " | f | F | " | h | H | " | j | J | " | ge | GE | " | j | J | " |
| 4 | 7 | eII | E | : | eII | E | : | iII | I | : | eII | E | : | mn | NN | : | eII | E | : |
| 4 | 12 | nt | NT | - | es | ES | - | ni | NI | - | nt | NT | - | an | A | - | nd | ND | - |
| 5 | 7 | oII | O | ! | aII | A | ! | eII | E | ! | oII | O | ! | iII | I | ! | aII | A | ! |
| 5 | 12 | uIII | U | : | nIII | N | : | aIII | A | : | uIII | U | : | sIII | S | : | eIII | E | : |
| 5 | 13 | sIV | S | O | rIV | R | O | lIV | L | O | sIV | S | O | uIV | U | O | rIV | R | O |
| 6 | 7 | aII | A | ù | iII | I | ¿ | aII | A | £ | aII | A | ‹ | uII | U | £ | oII | O | £ |
| 6 | 12 | iIII | I | | oIII | O | | oIII | O | | iIII | I | | nIII | N | | aIII | A | |
| 6 | 13 | tIV | T | | sIV | S | | iIV | I | | tIV | T | | nIV | N | | dIV | D | |
| 7 | 1 | f | F | & | j | J | & | j | J | & | q | Q | & | q | Q | & | q | Q | & |
| 7 | 2 | g | G | $ | g | G | $ | k | K | $ | y | Y | $ | y | Y | $ | p | P | $ |
| 7 | 7 | uII | U | ç | uII | U | ! | uII | U | ¢ | hII | H | ç | oII | O | ç | rII | R | ç |
| 7 | 12 | tIII | T | | aIII | A | | tIII | T | | tIII | T | | tIII | T | | oIII | O | |
| 8 | 4 | sIII | S | + | sIII | S | + | lIII | L | + | sIII | S | + | sIII | S | + | tIII | T | + |
| 8 | 7 | nIII | N | - | eIII | E | - | nIII | N | - | nIII | N | - | nIII | N | - | nIII | N | - |
| 8 | 10 | rIII | R | = | rIII | R | = | rIII | R | = | rIII | R | = | rIII | R | = | rIII | R | = |
| 9 | 2/3 | , | . | ; | , | . | ; | , | . | ; | , | . | ; | , | . | ; | , | . | ; |
| 9 | 11/12 | mIII | M | x | cIII | C | x | mIII | M | x | oIII | O | x | eIII | E | x | sIII | S | x |

*Character Block Carrying Several Coupled Characters of Normal Width*

With the keyboards of the second type, as with those of the first type, certain type bar character blocks carrying two or even three coupled characters of normal width.

An example of double character is that operated by the key ON in the Keyboards of the second type (FIGS. 1 and 4).

In these cases of multiple characters, each of the letters which are part of the block is considered as being part of the group corresponding to the striking point where it is printed among the characters that are usually printed at one time.

Thus, for example, with the keyboards of FIGS. 1 and 4 composed for the French and for the English languages, in the block carrying ON, the O is considered as being part of the group III and the N as being part of the group IV. In fact, this double character is chiefly utilized for the striking of the syllables "tion," "sion" and others including the group "ion" preceded by a consonant, which is frequent in English and in French. In these cases the O and the N are printed respectively at the striking points of the groups III and IV.

Obviously other keys in the two corresponding groups III or IV must not be struck at the same time. This restriction is only a particular application of the general rule according to which several characters cannot be printed simultaneously in the same group.

The same result could of course have been obtained by operating a key of the type bar carrying O in group III and another key of the type bar carrying N in the group IV.

This case of coupled characters ON is given only as an example. The most advantageous couplings will be chosen for the keyboards corresponding to each language or group of languages on the basis of the statistics of letter frequency combinations.

In these cases when the block with multiple characters is mounted in such a way that its different letters are printed respectively at the striking points of successive different groups, the corresponding longitudinal lever acts on the escapement as a lever of the group corresponding to the last character of the block. Thus, each stroke on the key located in column 12, line 3 corresponding to the block O III, N IV, causes an advance of the carriage corresponding to four single spaces. One can optionally either not strike something at the same time in group V or strike at the same time the S of group V. In both cases there can be struck moreover at the same time a single blank space key.

Besides the invention provides for another arrangement in which the printing points of the different coupled characters do not correspond to their positions in the syllable. Thus, for example, with a keyboard for the German language, one can utilize a block carrying SCH placed on a type bar of group I and preferably on the first bar for reasons of space. The block is disposed in such a way that the H is printed at the normal striking point of group I and the two other characters on the left of the latter.

In these latter cases the machine comprises space keys causing respectively carriage advances corresponding to 1, 2, 3, 4, 5 intervals. The mechanism of these additional and multiple space keys is described in another chapter.

The suitable space key is struck at the same time as the one corresponding to the last letter preceding the printing of the multiple character block so as to arrange beforehand the place required for the characters which will be printed on the left of the normal printing point of group I.

For instance, if the grouping SCH begins a following word, one will be able, with a triple space bar, to obtain a carriage advance corresponding to three intervals, the two last of which will be used when striking the following stroke, for placing the S and the C of the initial grouping SCH, the S and the C of which will be printed to the left of the normal printing point which is occupied by the H and corresponds to group I. The first of the three spaces separates the S from the preceding word. The key drive common to the grouping SCH will then ensure the normal movement of the carriage of one interval only. When the SCH is not at the beginning of a word, two spaces are sufficient. The type bars corresponding to the characters such as the S and the C for the simultaneous printing of SCH and which have to be printed respectively at the printing points "minus one" and "minus 2" could moreover be distinct. In this case, their printing would not be followed by a space. This is the case for the key of accents in the usual machines for the French language i.e. the first key of the 12th column in the keyboard of FIG. 1.

It will be noticed that the multiple space keys present still other advantages.

It will be noted that any double or triple character occupies in rest position, on the cushion of type bars, a place corresponding to the number of letters carried by this block. This reduces the advantages of this solution. In one of the considered examples, the disadvantage has been reduced by placing the double character ON on the last type bar of the group III. It could also have been placed on the first type bar of the group IV. These two points make it possible to take advantage of the additional space separating the groups III and IV one from the other.

Nevertheless, the placing of a type bar in the first slot of the segment of group IV has been avoided and is the reason why there are only 45 type bars instead of 46.

The weight of a multiple character type bar is for the dual action and the surface of the keyboard is reduced by one key but the possibility of utilizing separately O of group III of group IV is lost.

In the first example considered the multiple block SCH would be located on the first type bar of group I, and this would avoid having to diminish the number of type bars on the cushion.

It is obvious that the machines of the invention can also be built without these possibilities being utilized.

*The Carriage and the Power Actuation of Its Return*

In the machines of the invention the carriage can be of any of the known models utilized in the usual alphabetical typewriters. This is the reason why the drawings show it only in a schematic way. The only special feature of the invention shown in the example consists in the fact that the tabulation rack 1228 (FIG. 135) has been offset towards the right of the machine by a length equal to the offset of the tabulation support 1227 which has been made in the same direction. This question is taken up again in the chapter concerning tabulation.

As in the usual machines the return of the carriage can be power operated or not. Nevertheless in the cases of a syllabic machine, considering that the time for striking a line is shorter than in an alphabetical machine, it is particularly advantageous that the carriage be returned by power. In the latter case one utilizes one of the known processes already utilized on the typewriters with or without power striking. The showing of this device in the drawings has therefore seemed unnecessary. But the space required has been reserved to the right and to the left of the escapement device.

*Advance of the Ribbon*

*Description.*—In the typewriters of the invention, it was desirable that the advance of the ribbon, when a group of strokes is struck, should be proportional to the total printing length of all of the characters struck simultaneously and which in the example can amount to five (it matters little whether the blank spaces are included or not). To obtain this result the device for advancing the ribbon could be operated directly by certain elements of the escapement device or it could be operated directly by the carriage. A solution similar to the latter has been adopted in the example. It consists in having the device for advancing the ribbon worked by the springbox containing the biasing spring of the carriage. With these similar solutions the advance of the ribbon corresponds to all the spaces of the cumulated escapement, including any blank spaces either at the same time as the printing of a group of characters or separately.

FIG. 28 gives a front-view of the device for advancing the ribbon of known type, utilized on the usual alphabetical typewriters. It is composed essentially of the axle 40 on which are set the conical gears 41 and 42. In the position of the FIG. 28 the pinion 42 is meshed with the pinion 43 fixed to the end of the axle 44 on the upper extremity of which is mounted one of the two spool supports 45, on which the ribbon is wound. The latter unwinds from the spool 46 mounted on the axle 47 which carries also a bevel pinion 48 identical to the pinion 43. The axle 40 can slide towards the right and return to the position of FIG. 28.

The ribbon starting from one spool and arriving at the other passes, as known, through the guide 49, which is pivotally mounted at one end and into the identical guide 50. Between these two guides it passes through the forklike ribbon support, whose two arms 51 to the right of the striking points and 52 to the left are of known form. This ribbon support is mobile vertically and ensures the lifting of the ribbon in the course of striking according to known principles.

When the ribbon is entirely unwound from one of the spools, its pull on the guide 50 or 49 ensures, by known means the lateral sliding of the axle 40, which disengages for example the pinion 42 from the pinion 43 and meshes the pinion 41 with the pinion 48. The motion of the ribbon then changes direction. The details of this device which is usual will not be described.

The only special feature consists in having the axle 40 operated by the spring-box 166 shown in profile FIG. 29 and in plan view FIG. 33. This spring-box is of a usual form, but in the invention it forms a unit with two toothed wheels 167 and 168.

The toothed wheel 167 is engaged by the pawl 169. The wheel 168 is pivotally mounted the cardan shaft formed by the axle 170 and by the axle 171 mounted on the axle 170 and which revolves in its bearing 172. On the lower extremity of the axle 171 is set the conical pinion 173 which meshes with the conical pinion 174 mounted slidably on axle 40. The support 175 (FIG. 28) of the axle 40 serves as a stop towards the right of the pinion 174 and prevents the latter from moving towards the right and out of engagement with pinion 173.

The carriage then advancing by a single or multiple escapement biased by the spring-box 166, the cardan shaft revolves in the direction of the arrow 176 driving the axle 171 which is slidably on the axle 40. It consequently drives in rotation the axle 40, which as in a usual device, causes the ribbon to advance. The only difference lies in the fact that this advance is proportional to the number of characters being printed simultaneously plus the single or multiple spaced escapement produced simultaneously.

*Raising the Ribbon*

Raising the ribbon, as in a usual alphabetical machine, occurs only at the time of printing, which leaves the writing visible between two successive strokes. To cause this raising of the ribbon, at the time of each striking or group of strikings, any of the known devices on the ordinary alphabetical typewriters are utilized. However, it is necessary that the ribbon carrier, slidably mounted behind the segment must have its upper fork constituted by the two guide-supports 51 and 52 in FIG. 28 with a wider spacing than in the usual machines, since the simultaneous strikings require that several type bars should simultaneously strike the paper between these two supports.

The known device which is adopted must however have its other parts modified for reasons of space and in such a way that it can be operated by one of the parts of the devices which constitute the machines of the invention.

In the example, the movement for raising the ribbon is provided by the slide 1041 in FIG. 29. This slide which is called the character slide has two distinct functions: it ensures the integration of the blank spaces in the cumulated escapement, in co-operation with the space slide dealt with elsewhere in connection with the escapement, and being operated each time that one or several characters are struck, whatever the group, it ensures the raising of the ribbon.

This slide 1041 is fixed to a plate 177 and on which the small connecting-rod 178 is pivotally mounted. The back axle of the small connecting-rod has a threaded extremity which is bolted onto the plate 177 by a nut with washer. The hole in the plate is extended horizontally so as to permit adjustment.

The small connecting-rod 178 carries at its front extremity a lug 179 which passes through the opening of hole 180 with three arms made in the lever 181. The small connecting-rod has, in its center, a hole, approximately triangular, through which passes the lug 182 of the crank-pin 183. This crank-pin can be placed in three positions corresponding respectively to the striking:

In a first color, for instance black;
Without ribbon (striking of stencils);
In a second color, for instance red.

FIG. 33 showing the crank-pin 183 is a plan view. The locking-screw 184 enables the adjusting of the positions of the crank-pin 183 with respect to the positions of the lever 185 (FIG. 118).

The form (FIG. 29) of the hole in the small connecting-rod 178 has been designed to enable this part to move forward when the slide 1041 advances, and this can be done in the three positions that the crank-pin 183 may occupy. The lug 179 which is fastened to the small connecting-rod 178 engages in the hole with three arms of the lever 181 (FIG. 29) either in rest position as shown in FIG. 29 which corresponds to striking in the first color, for example black, or at the upper extremity of the hole which corresponds to the striking in the second color red, or at the intermediary position which corresponds to striking a stencil without ribbon. These three positions correspond to the three positions of the control lever 185 (FIG. 118).

The lever 181 is pivotally mounted on an axle 186 whose support 187 is fixed on the crossbar 897 (FIGS. 29 and 34). The front arm of this lever carries a fixed axle 188 on which is pivotally mounted the lower extremity 189 of the ribbon carrier 190 is constituted by two flexible plates which are spaced apart in so as to receive therebetween the front part of the lever 181 (FIG. 29) the axle 188 passing through two corresponding holes in these plates.

It has been noticed that the ribbon carrier 190 has at its upper end the two guides 51 and 52 (FIG. 28). This carrier is moreover guided by two uprights which pass through slots located in its upper part. These uprights are screwed to the crossbar 879.

*Functioning.*—When striking one or several characters, the corresponding longitudinal lever(s), because of their angular downward motion, drive downward each of the small tongues such as 1093 (FIG. 56) of the plates such as 1078. In all the cases the plate of the group I 1078 or the plate of the group II 1079 pivots around its axle, as already explained and drives in rotation the corresponding vertical lever 1103, the typing (FIG. 62) or 1104. The latter drives forward the slide 1041. It has been noticed that the motion of this slide is necessary to cause in certain cases the integration of the spaces in the cumulated escapement. But moreover the plate 177 (FIG. 29) of this slide, in its travel forward, drives the small connecting-rod 178. In the FIG. 29 this small connecting-rod is shown in the rest position corresponding to the raising of the bi-color ribbon for striking in the most usual color, for example black or blue. The small connecting-rod is held at the suitable height by the lug 182. The small connecting-rod 178 in its motion forward drives by its lug 179 the lower arm of the lever 181. This lever pivots around its axle 186. Its front arm, by its lug 188, drives upwards the ribbon-carrier 190 which slides upward and carries in its ascent the ribbon which passes through the guides 51 and 52 which are integral with this carrier 190, as in a usual machine.

*Shifting the Ribbon Carrier To Change the Typing Color*

The principle of a ribbon shifting mechanism for changing the typing color from one to the other of a dual colored ribbon is known: the control lever 181 (FIG. 29) causes a raising of the ribbon carrier 190 a single or a double distance according to whether the lug 179 of the small connecting-rod 178 is in the hole with three arms of the lever 181 at the lower extremity, such as in FIG. 29 or at the upper extremity of this hole. When the crank-pin 183 has been placed in middle position, the lug 179 of the small connecting-rod 178 does not operate the lever 181, as the lug then slides into the front arm of the hole 180.

In order to change the color, the lever 185 (FIG. 118)

having a front handle, is pivotally mounted on its axle 192. Its back extremity defines a stud-hole. Through this stud-hole passes a lug of the reverse lever 193. This lever, pivotally mounted on its axle 194, can be placed in three positions: that of FIG. 118 corresponding to raising the ribbon a predetermined distance for striking a first color, black or blue for example, a second position corresponding to the striking without raising of the ribbon for striking on stencil and a third corresponding to raising the ribbon a double distance for striking the second color, for example red. The pawl 195 holds the lever 193 in the required position by lever 196 which is meshed in one of the three grooves between the cogs of this lever 193. The lower extremity of this lever carries a stud-hole through which passes a lug which is attached to a radial lever 197. The latter is mounted on the axle 198 shown in plan view in FIG. 33. At the other extremity of this axle is set the crank-pin 183 whose function has been defined above and which carries at its extremity the lug 182 (FIG. 29). It is this lug which maintains the small connecting rod 178 at the suitable height for printing either in the most frequent color, or in the second color, or without ribbon.

The axle 198 is carried by two bearings, one of which 199 (FIG. 56) is fixed on the base of the machine and the other 191 is fixed on the shoe 990 of the escapement frame (FIG. 71).

*Functioning of the Color Change*

To obtain striking in the second color, the operator displaces the handle of the lever 185 (FIG. 118). This lever by pivoting around its axle 192 causes the lever 193 to pivot until the lug 196 of the pawl 195 is in the suitable groove between the cogs of the lever 193. This lever, by means of the radial lever 197, drives in rotation the axle 198 whose crank-pin 183 (FIG. 29) in its angular motion drives, by its lug 182, the small connecting-rod is at the upper extremity of the three-armed opening 180 of the lever 181, causing the lever 181 to double the distance of the ribbon and consequently the change of color. If the handle of the lever 185 (FIG. 118) places the device in middle position, the small connecting-rod 178 is held half-way between its extreme positions. It follows that when it advances under the action of the slide 1041 its lug 179 advances into the front arm of the three-armed opening 180, and motion is not transmitted to the lever 181 and the ribbon does not rise; the characters consequently reach the stencil without any interposition of the ribbon.

The detail of the parts carrying the pawl 195 is not described, this part of the device remaining identical to what it is in the known systems.

The principle of the whole constituted by the drive 185, the axle 192, the crank-pin 183, the small connecting-rod 178, the lever 181 and the sliding ribbon carrier 190 is in fact known, but the forms and the predetermined distances have been designed with a view to the relative positions of the axle of the crank-pin and of the segment and to the available space. The operation by the slide 1041 is also particular to the invention.

*Cushioned Supports for Type Bars*

In the same way as for the stroke-guides, the fact that certain segments have to be lowered independently from the others has prevented the utilizing of a common cushioned support for the type bars. Consequently, for the group I type bars a cushion 933 (FIG. 49) has been adopted whose support 291 is screwed only by its left extremity on to the segment 994 of group I. The cushion 165 of the group II is fixed on a support 292 of a special form shown in FIGS. 32—31. This support is fixed only by its left extremity on the segment support 847. A cushion 294 (FIG. 49) common to the groups III, IV, V is mounted on a support 293 which is also common to these three groups. This support is screwed onto the segment 795 of the group V.

*Device for Case Position Shifting and Stroke-Guides*

It has been noticed that, in the examples, three characters on each type bar have been vertically spaced apart thereon.

There are machines which have three characters for each bar, but for a different purpose. In the invention the aim is to be able to repeat certain letters in several groups. This number of three characters requires an adequate mechanism for case-position shifting so as to obtain the printing of the required character.

In the usual alphabetical machines, there are in general, for the placing in second case-shift position (capital letters), two keys located on the right and on the left of the keyboard. As to the mechanism, in certain machines it allows raising the platen, whereas in others, on the contrary, it allows lowering the segment, that is the type bar basket.

At first sight, in the machines of the invention, either of these two means could be used indifferently, or condition that the mechanism should permit the three relative case-shift positions of the bars and of the platen (small letters, capital letters, figures or signs).

(In the description, these positions will be differentiated by the Arabic numerals: 1, 2, 3.)

But the objective sought was to be able in certain cases, to strike characters corresponding to different positions simultaneously in different groups.

The most frequent case is the one in which one wishes to strike simultaneously several letters forming the beginning of a word or an entire word with the initial letter capitalized and those following in small letters.

When the initial letter is in the group I and the other letters in the following groups, which is the most usual way, it is necessary to be able to place type bars of group I in case-shift position 2 (capital letters) and leave those of the other groups in case-shift position 1 (small letters).

This result is obtained in the following way. It must be remembered that the type bars of group I correspond, in the machines of the invention, to approximately half the total number of type bars (in the examples: twenty-three in group I, out of possible total of forty-six).

Among the two solutions set forth above, the second has been chosen, that is the mobile basket.

The left first segment 794 (FIG. 28) corresponding to group I is independent of the following segments. It is separated from the latter by a vertical slot. This allows lowering this part from the basket into case-shift position 2, while leaving the other segments in case-shift position 1. In this case, if a type bar of group I and one or several of other groups are operated at the same time, the type bar of group I prints a character of the second position (in general a capital letter) while the others each print a character of the first case-shift position (generally a small letter).

It is obvious that this sectioning would make it easy to build the mechanism so as to be able also to lower the segment corresponding to group I down to the case-shift positions 3 (figures), by leaving the rest of the basket in case-shift position 1. For the sake of simplification, in the example, the placing in case-shift position 3 has only been rendered possible for the basket as a whole, that is for groups I to V as a whole.

FIG. 28 shows, in front view, the combination that corresponds, in a usual machine, to the single segment, but which here is sectioned in to as many segments as there are groups of type bars, that is five in the example. (In the description these five segments are differentiated by the Roman figures I to V, like the striking groups to which they correspond respectively.)

It has been explained that these different segments have their center axes laterally displaced with respect to each other in order that the striking points which correspond to the respective groups be displaced the normal interval between two successive characters.

It has been noticed also (FIG. 28) that segment 794 of group I is independent of the segment 802 of group II.

But it has been explained, moreover, that in the examples, in order to reduce the total number of type bars, or in order to make it possible with a given number of type bars to obtain a greater number of syllabic combinations for the simultaneous strikings, all the consonants have not been placed in group I, all the vowels being, on the other hand, in the group II.

It follows that, when one wishes to strike the first syllable beginning with a vowel, or any other group of letters beginning with a vowel, this vowel is struck in the group II, the following letters being typed in the following groups, in their order. It has been explained that, besides the advantage of a smaller number of type bars for the same result, this practice simplifies the fingering. But in order that only the initial vowel should be capitalized, it must be possible to place the segment of group II in position 2 while leaving the following segments in case-shift position 1 (lower case).

The drives could have been built in such a way that, in this case, the segment of group I would be in case-shift position 2 at the same time as the segment of group II, but the separation of the segment of group I and the segment of group II into two separate segments being indispensable for the case just mentioned it was more advantageous in the latter case to lower into case-shift position 2 (capital letters) only the segment of group II. This arrangement also reduces the initial operating inertia.

The FIG. 28 shows that the segment 802 of the group II is separated from the segment 803 of group III by a slot inclined according to a radius of the arc of these segments. It is to be noted that the inclined direction of this slot enables the segment II to be lowered independently of segment III.

The slots separating the segment 803 of group III from the segment 804 of group IV and, on the other hand, the segment 804 of group IV from the segment 795 of group V are also inclined according to radii of the segments they separate respectively; but it is evident that the inclination direction of these slots would not permit lowering the segment III, the segment IV or the segment V without the segment II being lowered at the same time. Now, the direction of the partition slots is imposed by the direction of the adjoining slots in which the type bars are pivoted.

But, in practice, the lowering of the segments III, IV, V, independently of the segment II, would be of little advantage and consequently it has not been provided for. Furthermore, the three latter segments, whose relative displacements are of course necessary, and whose initial material separation is practical for manufacturing are, at the time of setting up, fixed on a common plate that is fastened to the same mobile bracket. None of these segments III, IV, V can therefore be lowered without the others, either in second or in third case-shift position.

However, it was necessary to be able to place simultaneously in case-shift position 2 the whole of the groups I to V, in cases in which one wishes the whole of a word, of a sentence or of a text to be struck entirely in capital letters. The mechanism makes this operation possible.

It is obvious that for the cases in which figures have to be struck, it would be possible to build the mechanism in such a way as to have the segment I lowered into case-shift position 3 (figures), while leaving the following segments in case-shift position (lower case). This would have been sufficient since all the figures are in the group I. But it has been found simpler for the case-shift position 3 (figures) to have only one mechanism, which makes it possible only to lower simultaneously into this case-shift position 3 all the segments I to V. Moreover, in numerous cases it is desirable to take advantage of this common lowering of all the segments into case-shift position 3 for striking, simultaneously or successively, either figures in several groups, or a figure in the group I and signs or letters of case-shift position 3 in other groups.

It is to be noticed moreover that the adoption of this single solution (simultaneous lowering of all the segments) for placing in case-shift position 3 is linked to the form given to the stroke-guides.

*Stroke-Guides*

FIG. 28 gives a front view of the three separate stroke-guides which have been adopted: 806 for segment I, 807 for segment II and 808 for the linked segments III, IV, V.

As in the usual machines, provision is made for guiding each type bar at the end of its stroke by a slot in a special guide so as to ensure a greater regularity of printing, but considering that the bars of the different groups have distinct printing points, it was necessary to have a guiding slot for each group.

At first sight it seems that a single stroke-guide having as many slots as there are groups would solve the problem, but this problem is complicated by the fact that provision is made for shifting the position of certain groups independently of other groups. As a result the stroke-guides of certain groups have to be independent of the stroke-guides of the other groups.

It may be seen that the problem of the stroke-guides is linked to that of the position shiftings. It will be noted that each of the stroke-guides has been fixed on the segment or group of segments corresponding to it.

This solution permits the placing of the different segments in different positions, for example in view of a group of simultaneously operated type bars, the first of which is in capital letters position and the following ones in lower case position (small letters).

The stroke-guide I has a single slot 809, the stroke-guide II has one slot only 796 and the stroke-guide III, IV, V: 3 slots 811, 812, 797 corresponding respectively to each of the three latter segments.

Now, if the upper parts having the slots had been disposed at the same height for the three stroke-guides, there would not have been enough metal between the successive slots, when the latter are part of different stroke-guides. It is to be noticed in FIG. 28 that the solution adopted in the example consists in placing the upper part of the stroke-guide 807 of group II lower than the upper part of the other stroke-guides I and III, IV, V, the latter overhanging the stroke-guide II.

The different stroke-guides are fixed respectively on the corresponding segments (the single stroke-guide III, IV, V being however, fixed on the segment III which is fixed to the following ones.

So as not to be compelled to bend the type bars of group II too far from their ends, the vertical distance has been limited between the lower part of the slots of the stroke-guide 806 of group I and the upper part of the stroke-guide 807 of group II to the necessary distance for enabling the segment I to be lowered into case-shift position 2 with its stroke-guide, without the latter coming into contact with the stroke-guide II when this latter has remained in case-shift position I. It is to be noticed in FIG. 34 that the forms given respectively to the three stroke-guides enables the separate lowering into case-shift position 2, either of the segment I, or of the segment II without any stroke-guide running the risk of interfering with another one.

However, the displacement mentioned above would not allow the lowering of the segment I and of its stroke-guide into case-shift position 3 (figures) without having previously or simultaneously lowered group II and its stroke-guide into case-shift position 3. For the sake of simplification, this possibility has not been gone into as it offers little interest.

Summary of the Case-Shift Position Provided in the Example

In the example, the case-shift keys and the case-shift mechanism have been set up in such a way that only the following operations are possible:

Lowering of segment I alone into case-shift position 2 (capital letters) by depressing the thumb key marked "2ndI" FIG. 4, 9th line of the keyboard, Lowering of segment II alone into case-shift position 2 (capital letters) by depressing the thumb key marked "2ndII" FIG. 4, 9th line of the keyboard, Simultaneous lowering of all the segments I to V into case-shift position 2 (capital letters) by depressing the left palm key marked "All 2nd" FIG. 4, 9th line of the keyboard, Simultaneous lowering of all the segments I to V into case-shift position 3 (figures) by depressing the right palm key marked "All 3rd" FIG. 4, 9th line of the keyboard.

Description of the Device

REMARK APPLYING TO THE FUNCTIONING IN ALL THE CASES

The four keys of FIG. 4 mentioned above each operate a longitudinal lever of form similar to those corresponding to the character keys. However, in the example the key of the first lever marked "All 2nd" FIG. 4 is fixed to a cap 814 (FIG. 134) fitted directly on an upright 815 (FIG. 7) of the corresponding longitudinal lever 500 (FIG. 22). This key could also be mounted on a sliding rod like the other keys.

Each of the four longitudinal levers 500, 519, 527, 551 (FIGS. 22, 33) has a corresponding intermediate lever. These four levers (FIGS. 22—28—29—33—50—51) are numbered in the order 931, 927, 940, 946.

They are pivotally mounted respectively on the front brackets 820, 798, 822, 823 (FIG. 33). These brackets (FIG. 22) are identical to the lower part of the brackets such as 112 on which are fixed the small connecting-rods of the parallelograms shown in FIG. 24. These brackets 820, 798, 822, 823 are also fixed on the transverse angle 88 (FIG. 22) fixed to the base. Each of the four intermediate levers such as 940 is moreover linked so as to be pivoted with the corresponding longitudinal lever such as 527 (FIG. 29) by a bearing screw such as 939 screwed on the longitudinal lever and sliding in a keyway 824 of the intermediate lever (FIG. 50). Reversing this structure would give the same result.

The forms of the four intermediate levers are shown in (FIGS. 50, 51).

The levers which place one or several segments in case-shift position 2, effect the above junction at the point 824 (FIG. 50) where the screw 939 in FIG. 29 is fixed and designed to obtain suitable travel about equal to the travel of the character keys for lowering the segment.

Such is the case for the intermediate levers 927, 940, 931 corresponding to the keys: "All 2nd," "2ndI," "2ndII," FIG. 4.

In the case of the longitudinal lever 551 (FIGS. 22, 23) and of the intermediate lever 946 corresponding to the key "All 3rd," which places all the segments in case-shift position 3 the junction is effected by the axle 937 located at the point 799 (FIG. 29) so as to obtain, with a key travel of the same amplitude as in the preceding cases, a lowering of the segments of a double distance. This axle 937 slides in the keyway 819 (FIG. 51).

The four drives for case-shift position can optionally:

Either not be power operated,
Or be power operated like the drives for characters with the process described further in the example,
Or be power operated by any other known process, for example by electric motors as utilized in the alphabetical typewriters.

The segments I and II are respectively connected with the two identical pulling devices 826 and 827 (FIG. 28). The linked segments III, IV, V are connected to a similar pulling device 828 which differs from the preceding ones only by some features stated below. The details of these three devices are shown in section through their axis with front and plan view (FIG. 30). It is to be noticed that the springs 836, 907, 908 are of different strengths by reason of the different weights of the corresponding segments or groups of segments.

The pulling device corresponding to segment I comprises the following parts:

Lower axle 829 with clip 830;
Two pulling rods 831 and 832 each constituted by a flat plate with a lower and an upper hole for pivotally mounting the pivot pin 829 and the upper pivot pin 833 with its clip 834.

Each of these flat plates has a horizontal surface such as 835 which presses on the compression spring 836 (FIGS. 28 and 30). The lower part of this spring rests on the fixed bracket 837 which is screwed under the crossbar 838 (FIG. 29). This bracket has two slots 839 and 840 (FIG. 30) for the passage of the two pulling rods 831 and 832 which pass inside the spring 836. The upper pivot pin 833 with clip 834 passes through the upper holes of the two pulling rods as well as through the lower hole 841 of the pivot 842. The pivot pin 833 therefore links in a pivoting way the pivot 842 and the two pulling rods 831 and 832.

The lower part of the pivot 842 is threaded and passes through the smooth hole presented by the lower part of the segment bracket 844, to which it is fixed by the nuts 845 and 846.

The pulling device 827 of the segments 802 (FIG. 28) of group II is fixed to the mobile bracket 847 (FIGS. 34, 30) of this segment, in the same way as the pulling device 826 is fixed to the mobile bracket 844.

The pulling device 828 connected to the three segments 803, 804, 795 of the groups III, IV, V is a little different from the preceding ones.

The two pulling rods such as 831 and 832 (FIG. 30) are replaced by the single pulling rod 843 (FIGS. 28, 30). The reason for this will be explained below.

Each segment bracket such as 844 or 847 shown from the rear (FIG. 34) for the segment 794 of group I, 847 for the segment 802 of group II and 848 for the segments of the groups III, IV, V, has two upper rollers such as 849 and 850 and a lower roller such as 851 shown in dotted lines (FIG. 29) for the segment I. Each of the upper rollers such as 853 (FIGS. 34, 29) rests on an upper upright such as 861 (FIG. 34). Each of the lower rollers such as 851 (FIG. 28) rests on a lower upright such as 864 for the segment I.

The disposition (FIG. 34) comprising the upper rollers 849, 850, 852, 853, 855, 856, each behind their upright such as 858 and the lower rollers 851, 854, 857 (FIG. 28) before their upright such as 861 (FIG. 34) is by the fact that the assembly of the segments such as 802 of the group II, their brackets such as 847 and type bars in rest position on their cushion, has a center of gravity in front of the uprights.

This overhand tends to press the upper and lower rollers against their respective uprights. Nevertheless, in order to prevent them from possible movement through inertia of the assembly on each segment bracket such as 847 shown in detail in FIGS. 37, 38, 39 for the segment bracket of the group II, an adjustable shim such as 871 for the right upper upright of the segment of group II has been disposed, opposite each roller with regard to the upright. Each shim has a semi-circular cup of same radius as the upright and in which the upright slides. These shims are held screwed on the bracket, screws such as 877, 878, 880 for the right upper shim 871 of the segment II, the others by screws such as 899 and 905 for the left upper shim 867 of the segment bracket of group I (FIGS. 34, 37).

Each of the screws of the shims passes through a lengthened hole of the shim regulating the position of the shim. The forms of these shims are shown in FIGS. 38, 37, 39.

The upper uprights 858 to 863 (FIG. 34) and lower ones 864, 865, 866 (FIG. 28) are all cylindrical rods of same diameter. They are mounted in holes in the crossbars of the segments frame-support 872 (FIG. 34) shown alone in FIGS. 35, 36. This frame-support is screwed (FIG. 29) through its shoe 873 onto the crossbar 874 fixed on the base of the machine. The frame-support 872 has its right and left upper extremities respectively 875 and 876, bolted to the base of the machine. Its lower part is screwed onto the crossbar 874 (FIG. 29), fixed to the base of the machine. The upper bolts fixed at the same time the upper crossbar 879 (FIG. 34) on the frame-support 872. The latter fixing is completed by screws which are not shown. The crossbar 879 strengthens the frame-support, and serving as an upper stop for all the segments and preventing the six upper uprights 858 to 863 from being forced upwards. These six uprights severally have their upper extremities engaged in a hole pierced through in the upper crossbar 874 of the frame-support 872.

The left and right upper uprights respectively 863 and 858, have their lower extremity in a hole of the crossbar 882 and of the crossbar 883 of the frame-support 872. The plates 884 and 885 which prevent the uprights 858 and 863 from being forced downward are held by the threaded rods 886 and 887 screwed in a tapped hole of the crossbars 882 and 883 with counter-nuts 888 and 889.

The upper projections of the two threaded rods 886 and 887 being adjustable, serve as downward stop for the left upper part of the segment bracket 844 and for the right upper part of the segment support 848.

The four central upper uprights 859 to 862 have their lower extremities in the holes of the crossbar 890. They are suggested by the plate 891 fixed under the crossbar by the screw 892 and by the counter-nuts screwed onto the threaded rods 893, 894, 895 and 896. The upper extremity of each of these threaded rods serves as adjustable stop to the different segment supports (two for each support (counting the threaded rods 886 and 887).

The three lower uprights 864 to 866 (FIGS. 34 and 28) have their upper extremities in holes of the crossbar 897 of the frame-support and their lower extremities in holes of the shoe 873 of this frame.

The uprights 865 and 866 are locked upwards by the plate 898 fixed onto the crossbar 897 by the screws 900 and 901. The upright 864 is locked by the upper part of the front-guides of the slides 1041 and 1039 (FIG. 68) fixed on same crossbar by the screw 902 as well as by the nut 903 of the bolt 899 whose head fits also under the bracket 187 of the ribbon lifting lever 181.

The lower extremities of the lower three uprights 864, 865, 866 are locked by the plate 906 screwed under the shoe 873 of the frame-support (FIG. 29).

The compression springs 836 of group I, 907 of group II and 908 of the groups III, IV, V of the three pulling devices hold the three assemblies consistuted by the three supports and their segments, pressed against the upper crossbar 879. The strength of each of these springs is established with relation to the weight of the corresponding assembly including the segment(s), the mobile support and the pulling device.

The combination described makes it possible by pulling on the lower part of one, two or three pulling devices, to lower the corresponding segment(s) by compressing the springs; each spring thereupon returning its associated aseembly to its rest position.

Instead of the device described with rollers on uprights, the machines of the invention could be mounted with any other known device which would permit the displacement of each segment or group of segments, for example with rectilinear vertical roller bearings.

The device for case-position shifting further comprises the axle 909 (FIGS. 28, 29, 33) mounted on two bearings 910 and 911, which are bolted onto the crossbar 838 (FIG. 29). This axle carries three identical bosses 904, 912, 881 (FIG. 28) on which are fixed respectively stop-screws 913, 934 and 943 with a counter-nut such as 914 for the screw 934. The lower extremities 915, 916, 917 of the mobile supports of the segments, respectively, but against the screws when the corresponding segments are lowered into case-shift position 2 (capital letters).

Furthermore, the intermediate lever of which the form 946 is shown in FIGS. 28, 51 is mounted on the pulling rod 935 by the axle 937 which pivotally passes through the hole 793. The pulling rod is held on the axle by a clip 936. Its upper part has the extension 926 so that when lowering it does not disconnect from the plurality of the springs such as 928 (FIG. 133) which are the return-springs of the intermediate levers such as 648 (FIG. 49). It thus prevents the pulling rod when lifted from butting against these springs for striking. The upper part 926 of this pulling rod (FIG. 28) is constituted by a cap. It is fixed so as to pivot onto the lever 930, which is set on the axle 909.

The device also comprises the back axle 918 (FIGS. 29—52) whose left and right points are mounted on cups 919 and 920 (FIGS. 28 and 33) screwed onto the base and locked by a counter-nut. The form of this axle is shown in FIG. 52 with the five radial levers 921 to 925 to it and which are shown in FIGS. 53, 54, 55.

FUNCTIONING OF THE MECHANISM FOR CASE POSITION SHIFTING

*Functioning in the Case of Placing in Case-Shift Position 2 of the Segment I Alone*

When one depresses the key "2ndI," FIG. 4, for placing segment I alone in case-shift position 2, this key drives its longitudinal lever 519 (FIGS. 22, 33) in an angular movement around the back axle 92 (FIG. 29) common to all the longitudinal levers.

With suitable mechanical advantages this lever 519 drives the intermediate lever 927 (FIGS. 50 and 33) by the axle 939 (FIG. 33). The lever 927 by its rear extremity drives the axle 829 (FIG. 28) downwards, which drives the whole pulling device 826 and the segment 794 of the group I downwards until the front lower part 915 of the mobile support of this segment meets the stop 913 of case-shift position 2.

The segment 794 is moved with its type bars, its bars cushion 933 (FIG. 49) and its stroke-guide 806. The spring 836 is compressed and it will be noted that this spring is designed to permit a greater travel when the segment concerned is placed in case-shift position 3 (figures).

*Functioning in the Case of Placing in Case-Shift Position 2 of the Segment II Alone*

When one depresses the key "2nd II," FIG. 4, for placing the segment II alone in case-shift position 2, key drives its longitudinal lever 527 (FIGS. 22, 33). This lever sets in motion the intermediate lever 940 (FIGS. 50 and 33) and the whole pulling device 827 (FIG. 28) of the segment 802 of group II, exactly in the way described for the lowering into case-shift position 2 of the segment 794 of group I alone.

In the two above cases the back axle 918 and its five radial levers 921 to 925 (FIGS. 52, 33, 29) remain in rest position. As a matter of fact, in the case of the segment I being lowered, the axle 829 (FIG. 28) does not drive the radial lever 922, details of which are illustrated in FIG. 54, since it is under the recess 938 of this lever, this recess being open towards the bottom. The same result is achieved for the same reason in the case of lowering of the segment 802 of group II alone.

Functioning in the Case of Placing in Case-Shift Position 2 of the Segments I to V When one depresses the key "All 2nd," FIG. 4, for placing in case-shift position 2 the segments I to V, this key drives its longitudinal lever 500 (FIGS. 22, 28) in angular movement. The latter, by the axle 939, drives the corresponding intermediate lever 931 which, revolving around its front axle 941, drives by its rear extremity the axle 942 (FIG. 33) which forms a unit with the radial lever 921 (FIGS. 33, 52, 53). The latter drives in rotation the back axle 918. It follows that the five radials 921 to 925 which are all fixed on this axle, revolve in a movement of same amplitude, their extremities remaining consequently aligned. The radial lever 922, by its extremity and its recess 938 (FIG. 54) drives downwards the lower axle 829 (FIG. 28) and the whole pulling device 826 and the segment 794 of group I up to case-shift pistion 2, as when the key "2ndI," FIG. 4, is depressed.

Nevertheless, the intermediate lever 927 (FIG. 33) corresponding to the latter key, remains in rest position; in fact, the axle 829 slides in the fork 944 (FIG. 50) which constitutes the back part of this intermediate lever 927. The longitudinal lever 519 (FIGS. 22, 33) and its key "2ndI" therefore also remain in rest position.

The radial lever 923 (FIGS. 33, 54) drives in the same way the axle 929 of the pulling device 827 of the segment II (FIG. 28) and the segment 802 of the group II is lowered into case-shift position 2 in the same way as when the key "2ndII," FIG. 4, is lowered. As for the device of group I, and for the same reason, neither the intermediate lever 940 (FIGS. 28, 33) nor the longitudinal lever 527 nor the key "2ndII" are driven.

The radial lever 924 (FIGS. 33, 55) drives the axle 932 (FIG. 28) which drives in the same way the segments of groups I and II are driven, the whole pulling device 828 and the support 848 of the segments 803 of group III, 804 of group IV and 795 of group V which are, as noted, mounted on a single plate and fastened to the support 848. It is to be noticed in FIG. 33 that not any key, longitudinal lever, nor intermediate lever correspond to this third pulling device. The latter (FIGS. 28, 30) presents the feature of having only one pulling rod 843 instead of the two pulling rods 831 and 832 (FIG. 30) for the two other pulling devices. This pulling rod 843, being the only one to pass between two longitudinal levers 532 and 533 (FIG. 28) can be of a stronger section than the pulling rods such as 832 some of which, as noted, must pass between longitudinal levers such as 519 and 520 at the same time as an intermediate lever such as 927.

It is to be noted that the single action on the key "All 2nd," FIG. 4, has lowered all the segments into case-shift position 2. Their travel downward is limited by the lower parts 915, 916, 917 of the three segment supports 844, 847 and 848 (FIGS. 34, 28) pulling the three retractable and adjustable stops 913, 914, 943, which in this case, however, are not retracted.

Functioning in the Case of Placing in Case-Shift Position 3, the Segments I to V When the key "All 3rd," FIG. 4, of case-shift position 3 for the segment I to V is depressed is driven in an angular movement its longitudinal lever 551 (FIGS. 22, 33). The longitudinal lever by its axle 945 drives the intermediate lever 946 (FIG. 51) which by its rear part, drives downwards with it the axle 947 fixed on the fifth radial lever 925 (FIGS. 33, 52, 55) of the axle 918 and drives this axle in rotation to cause an identical angular movement of the five radial levers 921 to 925, as in the case of lowering into case-shift position 2 of all the segments, by the action of the key "All 2nd." But the movement is twice as far, thereby lowering the segments down to the third case-shift position (figures).

As a matter of fact, when the intermediate lever 946 descends, it drives the pulling rod 935 (FIG. 28) which, by its action on the lever 930 (FIG. 29), causes the axle 909 of the retractable stops 913, 934, 943 (FIG. 28) of case-shift position 2 to revolve. The device is calculated for its stops to withdraw early enough so as not to be met by the lower extremities 915, 916, 917 of the supports 844, 847, 848 of the different segments, when the latter descend by the action of the same key. Nothing prevents, therefore, that all the segments be lowered to case-shift position 3 (figures) against the adjustable stops 886 and 895 (FIG. 34) for segment I, 894 and 893 for segment II and 896 and 887 for segments III, IV, V.

Locking in Case-Shift Position 2 and 3 All of the Segments

It has been noted that case-shift postion 2 corresponds to the capital letters and case-shift position 3 chiefly to the figures and to certain signs.

When one wishes to print only one character of case-shift position 2, one depresses the key of case-shift position 2 corresponding to the segments concerned and one holds it during the striking, without any locking in this position. If, on the contrary, one wishes to strike a considerable number of characters of case-shift position 2, one after another, as for instance for the striking of a title in capital letters, whatever the segmen(s) concerned, one depresses the key "All 2nd" which positions in position 2 all the segments and one holds the latter in case-shift position 2 by the locking device which is going to be described and which is actuated by the key "Bloc 2nd."

When one wishes to print a character of 3rd case-shift position, whatever the segment(s) involved, one has at one's disposal, in the example only the key "All 3rd" (FIG. 4) which when depressed places segments I to V in 3rd case-shift position simultaneously. But, as for the printing in 2nd case-shift position, if one wishes to print a considerable number of characters in 3rd case-shift position, for instance for the striking of a chart of figures, one utilizes a locking device. This device is actuated by the key "Block 3rd" (FIG. 4).

The locking devices in case-shift position 2 and in case-shift position 3 are identical and disposed respectively one on the left of the keyboard and the other on the right, under the corresponding keys. Only the one for locking in 3rd case-shift position, shown in FIG. 29, will consequently be described.

The key "Bloc 3rd" is fixed to a sliding rod 948 (FIGS. 29 and 7) mounted like the rods of the character keys, but which in the example is rectangularly sectioned and longer. It carries on its lower extremity a lug 949 in dotted line FIG. 29. This lug passes through a stud-hole 950 of a reverse lever 951 pivotally mounted on its axle 952. This lever has a cog 953 in the front edge of its descending arm 954. The longitudinal lever 551 corresponding to the key "All 3rd" carries laterally a projection 955 shown in dotted lines in FIG. 29 but seen in plan view in FIG. 22.

Functioning

Depressing the key "All 3rd" drives the lever 551. If the key is released, this lever returns to rest position. But if, while holding the key depressed placing the lever 551 in lower case-shift position, the key "Bloc 3rd" is also depressed, its rod 948 (FIG. 29), drives by its lug 949, lever 950 in an angular movement around its axle 952. The lower extremity 954 of this lever 950 engages the projection 955 of the longitudinal lever 551. While still holding the key "Bloc 3rd" one then releases the key "All 3rd." The lever 551 biased upward engages its projection 955 behind the cog 953 of the reverse lever 950, which locks the segments in case-shift position 3 (figures). The flexing of the longitudinal lever suffices to prevent the segments from rising again with the slight lifting that preceeds the engagement. The segments supports 844—847 and 848 (FIG. 34) therefore remain against their stop such as 895 and 886 in case-shift position 3 for the support of the segment I.

When, later on, the key "All 3rd" is pressed down again, the longitudinal lever 551 flexes slightly, which disengages its projection 995 from behind the cog 953 releasing the lever 951. The return spring 956 (FIG. 29), mounted on the key rod 948, causes the key "Bloc 3rd" to go up again and the reverse lever 951 to pivot towards its rest position. The cog 953, as it disengages, releases the longitudinal lever 551 to return towards its rest position, when the key "All 3rd" is released.

The above two locking devices are only described and shown by way of example. In their stead any of the known means utilized in the usual alphabetical machines for locking in a case-shift position would serve.

Pedal Drive for Case Shifting

The position shift can be controlled by pedals. It suffices to connect each pedal to the corresponding longitudinal lever by a pulling part.

This solution has more to commend it in the invention than in an alphabetical machine. In the machines of the invention, the keys for case position shifting are more numerous, the rate of their utilization is higher because of the increase in the striking speed, and, moreover, both hands are busy simultaneously with striking characters.

Possibility of Adopting More Than Three Case-Shift Positions

More than three characters can be superposed on the bars and therefore more than 3 case-shift positions can be provided for. One can for instance place the signs in fourth case-shift position or have only one type of letters (capital or small) while keeping three or four case-shift positions, so as to have a greater number of signs available and facilitate the placing of the figures in the different groups. In fact, this solution makes it possible in particular to intensify the striking of the numbers by groups of figures with the process utilized for the syllabic striking. This question of simultaneous striking of several figures is developed in another chapter.

End of Line Locking and Bell

The machine of the invention comprises, like the alphabetical machines, a device announcing by a bell to the operator the approach of the end of the line and which, some strokes afterwards, at the end of the line, locks the stroke by an automatic hooking of the longitudinal levers. A push-rod enables the unlocking for additional strikings.

Some parts of this device are known. Others are designed or adapted in order to be accommodated in the available space. This device is shown in front view in FIG. 46 and in profile in FIG. 47, the left plate of the base being removed. The front part of the carriage carries a digit 747. On the other hand, an axle 748 is mounted on the upper part of the base of the machine. On this axle 748, a toothed rack 749 is pivotally mounted. A cam 750 is mounted so as to slide on the axle 748. This cam has two slopes 774 and 778. It carries a hooking device in the rack 749. A lever 751 enables the operator, by pressing on a projection 752, to release the cam 750 from the rack and to cause this cam to slide, in known manner.

Under the rack 749 is fixed an axle 753 on which a push-rod 754 is pivotally mounted; the latter carries a lug 755 disposed on a fixed cam 756 secured to the base. The push-rod 754 carries a second lug 757. The push-rod 754 carries a third lug 786 which will enable optional unlocking, the functioning of which will be described. A bell 758 is set on the base. Its hammer 759 has a handle with a flexible part 777, and is pivotally mounted on its axle 760. Its front part 761 is in rest position under the lug 757. The push-rod 754 has a projection 762.

The longitudinal levers such as 502 have a small tongue 147 to guide them into the intermediary guide 95 on which is fixed, in the case when the machine is power driven in the form described in another chapter, a lengthening plate such as 1289, which presents a hook-like projection such as 1292. A plate 763 is fixed on a crossbar 764 having towards the top two extensions 765 and 766 pivotally mounted by their axles 767 and 768 on their brackets 769 and 770 which are screwed to the base of the machine. The lower part 771 of the plate 763 is bent almost to the horizontal towards the front at the height and angle suitable to allow this bent part, when advancing, to get under the hook of the projection 1292 which is integral with the longitudinal lever. The upright 765 fixed on the plate 763 has an extension 772 whose extremity 773 is, when in resting position, disposed under the extremity 762 of the push-rod 754 but at a certain distance from the latter.

The pivoting complex formed by the plate 763 and its extensions is biased backwards by a return spring 787 whose front part is hooked on a projection 788 which is attached to the upright 765 of the plate and whose back extremity is hooked to a bracket 789 mounted on the base. When in rest position this spring 787 holds the plate 763 against a stop 790 mounted on the base. A bracket 791 screwed inside the base of the machine carries at the same time the set cam 756, a back extension 776 on which the boss 780 of the hammer 759 rests and the upper extensions 781 and 782 defining holes through which the unlocking push-rod 779 slides.

This push-rod is biased towards the front by a spring 784. On the push-rod 779 is fixed a washer 783 which, in rest position, rests against the vertical part 782 of the bracket 791. This washer serves as a rest to the return spring 784 which returns the push-rod 779 to its rest position. This spring is mounted on the cylindrical part of the push-rod 779 between the two vertical parts 781 and 782 of the bracket 791. On the back part of the push-rod 779 is set moreover a washer 785 with the function of increasing the surface of the push-rod when it is pushed backwards, this surface acting on the lug 786 of the push-rod 754, to release the end of line lock.

Functioning

When striking, the finger 747 moves towards the left with the carriage and meets the first slope 774 of the cam 750. It pushes the cam downwards; this causes the rack 749 to pivot around its axle 748, and this tends to displace the push-rod 754 in the direction of the arrow 775. But the lug 755, acted upon by the set cam 756, diverts the motion of the push-rod extremity. The second lug 757 acts on the back extremity 761 of the hammer 759 causing the latter to pivot around its axle 760, which drives it away from the bell 758. Because of the deflection of the push-rod 754, after a certain travel, the lug 757 releases the extremity 761 of the hammer and the latter falls back to the stop on the front extension 776 of the bracket 791. Owing to the flexibility of its rod 777, the back part of the hammer continues its course, strikes the bell and comes back in rest position, as known.

The finger 747, continuing its travel, meets the second slope 778 of the cam 750, the effect of which is to continue lowering the push-rod 754 whose extremity 762 meets the extension 773 fixed to the plate 763. It follows that the latter and its bracket pivoting around the axles 767 and 768, swings the bent extremity 771 of the plate and settles under the hook 1292 set on the longitudinal lever 502, thereby locking the latter.

The extremity 771 of the plate is extended from left to right of the machine in front of all the longitudinal levers that one wishes to lock at end of a line, the levers of certain auxiliary drives included if desired, for instance the one for back spacing. If one wishes that certain longitudinal levers should not be locked, it suffices not to provide these levers with a hook such as 1292.

Whatever the position of the push-rod 754 in the course of its travel, the lug 786 is always opposite the back extremity of the unlocking push-rod 779.

When the longitudinal levers such as 502 are locked and the operator wishes to execute some additional strokes, he presses on the push-rod 779. The latter slides backwards by compressing the spring 784. Its back extremity meets the lug 786 and causes the push-rod 754 to pivot around its axle 753, which disconnects its extension 762 from the extremity 773 fixed to the locking plate 763. When the operator releases the push-rod 779, the spring 784 biases it back to its rest position.

If the machine is not powered the extension 1289 and its hook 1292 fixed on the guiding small tongue 147 of each longitudinal lever can be eliminated.

The hook constituted by the bent extremity 771 of the crossbar 763 is then placed lower, so that it hooks directly the lower part of the small tongue 147. To do this one needs only to lengthen the uprights 765 and 766 or to lower the axles 767 and 768 with the pivoting plate and to lengthen one of the vertical connections of the device.

*Signalling Lamp of End of Line*

In the machines of the invention the end of the line is reached with a greater frequency than with the alphabetical machines because of the greater speed of printing. There is consequently even more point in signalling this end of the line. The invention could therefore optionally provide for an electric lamp which is switched on each time the end of the line is reached.

The contact can for example be made by the meeting of a finger carried by the push-rod 754 (FIGS. 46 and 47) with the lever of a micro-contact mounted on the base. This micro-contact and the finger which operates it are not shown.

*Escapement—Foreword*

The essential problem to be resolved now is that of the carriage advance, that is, the problem of the escapement mechanism for advancing of the carriage.

In a usual alphabetical machine the striking, either of a character, always alone, or of the space bar, causes an advance of the carriage by a constant length for successive strikings.

In the machines of the invention it is necessary that the strikings, or groups of successive simultaneous strikings, accompanied or not by a striking on a space key should advance the carriage by various lengths. These lengths must vary with the nature of the single or simultaneous strikings and in particular with the groups to which these strikings correspond.

This advance of various lengths can be obtained, like the constant advance in an alphabetic machine, by an escapement mechanism in which the escapement is effected, either on the teeth of one or several racks, or on the teeth of one or several wheels.

In the known alphabetical machines the escapement devices which utilize several toothed racks do so in order to make it possible, either to utilize different widths for certain characters, or to modify in a constant way the spacing of the printed text for a certain number of successive strikings. The aim is therefore different from that sought in the machines of the invention.

The wheel escapement presents some advantage in comparison to the rack escapement. In particular, by choosing the radius of the wheel properly, the size of the teeth can be made greater and spaced out more than on a rack, thereby rendering the mechanism less delicate. This is the reason why a wheel escapement is preferred and will be described more in detail.

One of the advantages of the invention consists in the fact that the escapement mechanism of only one wheel that is going to be described makes possible successive escapements of various lengths as required. This is why a mechanism of varied escapements utilizing several wheels or several racks will not be described.

The escapement mechanism, shown by way of example, with the machine which is fully described will now be described. Certain variants will subsequently be described more schematically.

*Possibilities of the Escapement in the Machine, Described Entirely as an Example*

CONDITIONS SOUGHT

It has been noticed that the keys, the type bars and the segments are separated into five groups which, with regard to the striking, are comparable to five devices for striking which are juxtaposed from left to right in the order of their numbers and which can simultatneously print one character each on the paper, the five characters being printed side by side. Only one character of each group can be printed at the same time. One can print simultaneously only in group I, or in groups I and II, or in I, II, III, or in I, II, III, IV, or in I, II, III, IV, V.

In these different cases the carriage has to advance 1, 2, 3, 4 or 5 lengths or intervals.

One may choose to print nothing in one or several of the groups preceding the last in which one prints. For instance one can print from group II and print nothing from group I. This changes nothing in the advance of the carriage which, in the example, will be of two intervals.

The group(s) in which nothing is printed can be among those comprised between the first and the last in which one is printing. For example one can print from group II and IV while printing nothing in I or III. This does not change the advance of the carriage which will be, in this example, of 4 intervals. There will be blanks at the striking points corresponding to the groups in which nothing is being printed, that is from groups I and III in the example.

In all the cases the advance of the carraige corresponds to a number of intervals equal to the number of the order of the highest group numbered struck and mostly includes intervals on the right of the groups struck. This total escapement is called the "cumulated escapement corresponding to the characters."

It will be explained further that this number is increased by one interval when a single space key is struck at the same time as the character keys.

This increase in the cumulated spacing is called "integration of the normal blank space."

Multiple space keys are provided for. These can be struck simultaneously with the character keys, on condition that the total cumulated escapement does not go beyond the capacity for which the device has been built.

In the example this total capacity is 6 intervals. But it will be noted that the machines of the invention can be built with a cumulated escapement capacity greater still by extending the same processes. Conversely they can be built with fewer than five groups with a minimum of only one single space.

For the purposes of the machine the escapement mechanism must cause in each of the stated possible cases an advance of the carriage by the number of spaces equal to the number of the characters and blank spaces which correspond to the group of simultaneous strikings.

Each of the multiple space keys provided drives a plate of one of the groups I—II—III—IV—V that will be described later on.

It will be noted that provision is made for building the devices for the integration of single or multiple spacings by increasing the travel of a mobile dog from its starting point, or from its return point.

It is this latter solution which will be described in detail for the integration of the normal single spacing. However, for the integration of multiple spaces the device with extension of the travel of the mobile dog from its starting point will be chiefly described.

It has been said that in the machines of the invention the keyboards and the connection-box, as well as the other devices already described, such as the case position shift, could be utilized with an escapement device of a different model than that shown in the examples. For instance one of the known means could be adapted. It would be necessary nevertheless that this device should be able to give the same results, with regard to the number of spaces of the escapement and its variations in terms of the number of characters and of spaces struck simultaneously.

In the examples shown by the drawings, it has been assumed that the machine was built with an escapement device comprising, in particular an escapement wheel, a mobile dog and a set dog, both of them mounted on a tilting dog block. This part of the escapement device is taken from the corresponding part of certain escapement devices utilized on known alphabetical typewriters. It will be noticed nevertheless that the escapement mechanism as a whole is specific to the invention.

*Description of the Escapement Mechanism*

The escapement mechanism comprises four parts:

(1) On the front of the machine, the universal bar 969 (FIGS. 49 and 56) located in front of the intermediary levers and secured to an escapement slide 970.

(2) Two normal single space keys already described in FIG. 1 and a series of connections which transmit the motion from these keys to the space slide 1039 (FIGS. 56—69).

(3) On the back of the machine, plates of the groups I to V; 1078—1079—1080—1081—1082 (FIGS. 56—57) respectively, each forming a unit with a vertical lever such as 1107 (FIG. 62) which transmits its motion to the escapement block and to a third slide called a character slide 1041. The levers of the plates are numbered in the order of the latter 1103—1104—1105—1106—1107 (FIGS. 57 and 62).

(4) The escapement block which constitutes the main part of this mechanism. In the example the block is supported by the shoe 990 (FIG. 71). This shoe is fixed by 4 screws 991 to 994 of which two on its rear fix it to the base of the machine and two on the front on the shoe fix it to the case position shifting mechanism frame-support. On this shoe is fixed the escapement frame 995 held onto the shoe by two screws 997 and 996 FIG. 66.

*Description and Functioning of the Escapement Bar and of the Elements Which Cause the Disengaging of a Mobile Dog When Characters Are Struck*

The escapement universal bar 969 is located in front of the intermediary levers such as 616 FIG. 49 of the groups I and II.

It carries screwed and adjustable thereon, small tongues such as 971. Each of these tongues corresponds to one of the intermediary levers. When one of these intermediary levers advances as an effect of the striking of the corresponding key, it meets the tongue approximately 4 millimeters before the end of its travel, and then drives the latter up to the end of its travel.

The curve radius of the bar 969 FIG. 49 varies according to the respective parts of the bar. Each part has been determined so that the amplitude of the motion of the bar is the same, whichever intermediary lever that operates it.

The escapement universal bar is fixed onto the escapement slide 970 by two screws such as 972 located in the holes 973 and 974 of the bar and the holes 975 and 976 of the slide. This slide passes through a hole in the back guide 977 common to this escapement slide 970, to the space slide 1039 and to the character slide 1041.

The escapement universal bar 969 is pivotally mounted between points 978 and 979 on its tilting support 980. This support is pivotally mounted between bearing points 981 and 982 which are screwed on the brackets 983 and 984 which are in turn screwed onto the transverse angle 88 fixed to the base of the machine.

The escapement slide 970 carries a push-screw 985 with counter-nut 986, which, when the slide moves forward, as an effect of a stroke, meets the foot 1016 of the dog block 1014—1015. This dog block, mounted between 2 bearing points 1017 and 1018, can consequently tilt. When it has been tilted as an effect of a stroke, it is subsequently returned to its rest position by its return spring 987, the other extremity of which is fixed onto the adjustable spring-hook 988 fixed in a hole of the escapement frame and locked by the screw 989.

Instead of utilizing an escapement universal bar operated as in the examples, by intermediary levers, one can, as in certain alphabetic machines, place this bar in a slot located in the peripheral part of the segment which is concentric to the latter; this bar then being operated by the heels of the type bars. In this case the universal bar, instead of acting on the dog block by pulling, acts by pushing. To obtain the same effect, it suffices to have the dog block driven higher than its axle. The setting up of such escapement universal bars being known, it will not be described.

Nevertheless, with this process, it is necessary to utilize two escapement universal bars each having its support, one of them corresponding to the segment of group I and the other to the segment of group II. In fact, a single bar would unite the segment I and the segment II and would prevent placing them separately in position 2 (capitals).

With the first variation described and adopted in the drawings, the single bar is always operated by an intermediary lever of group I or of group II or both of them simultaneously.

With the second variation, if a key in the group I and a key in the group II are struck simultaneously, the two escapement bars are operated, although the action on one only would suffice. If one key of group I or one key of group II is struck, only the bar corresponding to the group in which it was struck is operated, and this suffices to tilt the dog block.

*Means Utilized to Obtain the Cumulated Escapement Corresponding to the Characters*

(The mechanism for integration of the bland spaces in the cumulated escapement will be described further.)

As in the usual alphabetical machines, a toothed rack 1001 is fixed onto the carriage 1000. This toothed rack 1001 is mounted to pivot so as to permit its disengaging from the pinion 1002 on which it is meshed in rest position and during the striking.

This pinion 1002 is mounted free on the escapement axle 1003 on which it is held by a screw 1004.

It is not rotatable on this axle in one direction by the action of a pawl 1005 the axle of which 1006 is fixed on the disc 1007 which is secured to the escapement axle 1003.

The spring of the pawl 1008 is fixed on a lug 1009 mounted on the disc 1007.

The escapement axle 1003 is mounted in ball-bearings 1010 housed in the upper part of the escapement frame 995. The front cup 1011 of the ball-bearing 1010 is formed by the base of the disc 1007. The back cup 1012 is screwed on the escapement axle 1003, for taking up any play. The periphery of this cup has six faces for wedge keys. The escapement wheel 1013 is also screwed onto the escapement axle 1003 behind the back cup 1012. It acts as counter-nut for this cup.

The front part 967 of the wheel hub is also hexagonal.

The wheel and the pinion are of a type utilized usually in the escapements of alphabetical typewriters which use an escapement with a fixed and a mobile dog. The pinion is on the front of the escapement frame and the wheel at the back of the latter. These relative dispositions could be different.

The dog block, shown in front view in FIG. 73 with the the parts carried, is constituted by an upper part 1014 and a lower one 1015. The lower part is screwed slidably on the upper part. It can be interlocked in a fixed way after adjustment of the height of the block foot 1016. The dog block is pivotally mounted between two bearing points 1017 and 1018 and held by with counternuts 1019 and 1020 (FIGS. 63—62). The fixed dog 1021 (FIGS. 62 and 64) is set on the block by two screws 1022 and 1023 which pass through holes in the fixed dog, lengthened for adjustment.

As in certain usual escapements, a pawl or crutch 1024 (FIGS. 66 and 68) the function of which is to lock the escapement wheel, during the back spacings or return of the carriage, is pivotally mounted on the dog block 1014—1015 (FIGS. 73—72) by its axle 1025. Its return spring 1026 is fixed on the dog block. The projection 1027 of the dog block constitutes a stop of the pawl 1024. A push-ring 1028 (FIGS. 72—73) of the mobile dog is mounted in the fork 1029 by which the upper part of the dog block ends. This ring pivots on two cylindrical bearing screws 1030—1031 locked in place by their heads.

The mobile dog 1032 (FIG. 63), details of which is given in FIGS. 74—75 and 76 carries an adjustable double tooth 1033—1064 (FIGS. 64, 65—73) which passes through a hole of its head 1059. This double tooth is locked after adjustment by a screw 1034. It will be noticed that the front tooth 1033 works on the wheel whereas the back tooth 1064 butts on the mobile stops. The mobile dog is mounted so as to slide on the back extension of the escapement axle 1003 (FIGS. 64—73). The push-ring 1028 (FIGS. 72—73) is also mounted on this axle, but between the two legs 1040 and 1035 of the mobile dog. The mobile dog is mounted so as to slide without play on the axle, the ring 1028, however, has its hole 1036 lengthened vertically so as to allow for the arc made when tilting the dog block 1014—1015.

In rest position, the escapement wheel is locked by the tooth 1033 (FIGS. 65—62) of the mobile dog 1032; this mobile dog being itself locked by the stop called "zero" 1037 (FIGS. 64—66). This locking prevents the advance of the carriage as in a usual alphabetical machine.

The tilting of the dog block is limited in two directions by the stop screws 1042—1043 (FIGS. 68—67) mounted on the fork-like bracket 1044 with the counternuts 1045—1046 (FIG. 68). This bracket 1044 (FIG. 67) is fixed on the escapement frame 995 by two screws 1047—1048 (FIG. 67). The tilting of the dog block simultaneously brings about the meshing of the fixed dog 1021 (FIG. 62) and the disengagement of the front tooth 1033 of the mobile dog 1032 (FIGS. 63—65).

When the mobile dog has released the wheel 1013, the space between the fixed dog 1021 (FIG. 62) and the tooth such as 1049 of the wheel it has to lock, allows a slight rotation of the wheel corresponding to a single interval fraction. This effect called the "first stroke of escapement" is the same as in the usual machines.

The detailed FIGS. 74 to 76 of the mobile dog 1032 show that it comprises a section 1050 whose periphery presents a groove 1051. At the end of this groove is a hook 1052 for hooking a pulling thread 1053 (FIG. 67), for example in nylon. At the other extremity of this thread is hooked the return spring 1054 of the mobile dog. The fixed extremity of this spring is hooked on a bracket 1055 fixed on the escapement frame 995 by two screws, 1056 and 1057 which pass through a long keyway 1058 which permits the adjustment of the spring tension.

The mobile dog 1032 (FIG. 67) is co-axial with the escapement wheel 1013. It is mounted free to turn on the escapement axle 1003 and is biased in rotation by its spring 1054 in the direction of the arrow 1063. This rotation occurs as soon as the front tooth 1033 (FIG. 64) of the dogs 1032 (FIG. 67) is disengaged from the escapement wheel 1013.

*Functioning of the Escapement Bar and of the Elements Which cause the Tilting of the Dog Block, in the Cases in Which One or Several Characters Are Stuck Simultaneously Without Any Striking of Space Keys*

Any striking of the character or spacing keys causes the tilting of the dog block.

It is the way in which this tilting is obtained in the different cases that is going to be examined.

The cases can first be classified in three categories:

Striking of one or several characters without any blank space,
Striking of a blank space key without character striking,
Simultaneous striking of one or several characters and of one blank space key.

(It will be explained later on that these three categories can be subdivided into six cases.)

For the time being only the above 1st category will be examined (striking of characters without spacing), but the cases will be distinguished according to the groups of the struck characters.

*Functioning*

One can strike in one group only (group I or group II), or simultaneously in group I and group II or at same time in group I or group II or in both, but at the same time in one or several of the groups III, IV, V. Before taking up again separately these diverse cases, in which one or several characters are struck without spacing, what is common to all these cases in their manner of functioning will first be described.

It has been said that several characters cannot be struck at the same time in the same group. However, in practice, character keys are not struck in one or several of the groups III, IV, V without striking at the same time keys in group I or in group II or in groups I and II, or on a single blank space key.

When one character only or several characters are struck simultaneously, the dog block 1014—1015 (FIG. 67) tilted on the impact of the push screw 985 (FIG. 70) of the escapement slide 970 on the foot 1016 of this dog block.

When one space key alone is struck, it is the push-screw 1139 (FIGS. 69—70) of the space slide 1039 which meets the foot 1016 of the dog block. But this case of striking a normal single space will be examined further in detail.

It has been noticed, in connection with the mechanism for striking, how the striking of a character key of any group drives a longitudinal lever and how this longitudinal lever drives the corresponding intermediary lever such as 626 (FIGS. 49—133) in an angular movement towards the front of the machine. This intermediary lever transmits the motion to a type bar such as 129 by means of connections. An intermediary lever of group I or group II a few millimeters before the end of its travel, meets a corresponding small tongue, such as 971 of the escapement universal bar 969 (FIG. 56) to drive the universal bar up to the end of its travel.

The escapement universal bar drives with it the escapement slide 970. The described setup keeps this bar and the slide almost horizontal in the course of their movement forward. In fact, the travel being only in the range of 4 millimeters is very short compared with the distance of the lower axle of rotation of the bracket between the points 981—982 (FIGS. 49—56) to make any inclination negligible.

The escapement slide 970, in its movement forward, drives its push-screw 985. The latter meets the foot 1016 (FIG. 70) of the dog block and drives the latter up to the end of travel, and this causes the dog block 1014—1015 (FIGS. 65—67) to tilt.

The dog block pivots its axle constituted by the points 1017 and 1018. Its upper part 1014 moves therefore backwards in the direction of the arrow 1077 (FIG. 24), driving with it the push-ring 1028 (FIGS. 72, 73). The latter pushes the mobile dog 1032 (FIGS. 67, 63) by its lower part in the same direction, to slide this dog on the escapement axle 1003 (FIGS. 64, 67) and disengage it from the escapement wheel 1013.

The fact that the push-ring 1028 (FIGS. 72, 73) is mounted to pivot on its axles 1030 and 1031 enables the latter to remain vertical in spite of the inclination of the upper part 1014 of the dog block.

The tilting of the dog block, while causing the disengagement of the mobile dog 1032, causes the meshing of the fixed dog 1021.

Each of the subdivisions of the first case when only characters are struck is now going to be taken up again.

*Case in Which a Character of Group I Is Struck Without Striking in Any Other Group and Without Space Striking*

When one character of group I is struck without striking any in any other group, the corresponding intermediate lever, approximately 4 millimeters before the end of its travel, meets the corresponding small tongue such as 971 of the escapement bar 969, drives the latter in its travel, and this causes the tilting of the dog block and the escapement, as described above.

*Case in Which One Character of Group II Is Struck Without Striking Any in Any Other Group and Without Striking Any Space Key*

It has been noticed in FIG. 49 that the escapement universal bar 969 passes in front of the intermediate levers of group I and in front of those of group II. As a result, when a character of group II is struck, the corresponding intermediate lever drives the escapement bar 969 and the escapement slide 970 forward, exactly as in the case in which a character of group I alone is struck.

The tilting of the dog block and the disengaging of the mobile dog occur in the same way.

*Case of Striking of One Character Simultaneously in the Group I and in the Group II, Without Any Striking in Other Groups. Space Striking*

In the case in which a character is struck simultaneously in the group I with a character in the group II, it is evident that the result on the dog block is the same as when one strikes in only one of these two groups. As a matter fact, the two corresponding intermediate levers, in general, drive simultaneously the escapement bar 969. Nevertheless, when one of the intermediate levers has some lead on the other it alone words the bar, but the result is the same.

*Case in Which One Character Is Struck in One or Several of Groups III, IV, V Without Any Space Striking*

The escapement bar 969 could have been extended up to in front of the intermediate levers of groups III, IV, V.

If so, in whatever group a character had been struck, the effect on the dog block would have been the same as when one strikes solely in group I, group II or in groups I and II simultaneously.

But in practice a character is never struck in one or several of the groups III, IV, V without at the same time striking some in the group I or in the group II or in the groups I and II simultaneously or without striking a single blank space key.

The action of the intermediate levers operated in one or several of the groups III, IV, V, on the escapement bar, would have therefore been superfluous, since the required movement of the escapement bar is in any case caused by the levers of one of the groups I and II or by the levers operated simultaneously in these two groups. When one space key has been struck the dog block is tilted by the spacing slide 1039.

Taking this fact into account, the arc formed by the escapement bar has been limited to the arc to which the intermediate levers of the groups I and II correspond. This simplifies the device and reduces the inertia of the whole.

The result is that, when one character is struck in one or several of the groups III, IV, V, the escapement bar 969 is driven only by the intermediate lever(s) operated in the groups I or II or I and II and the result on the dog block and on the dogs is the same as in the preceding cases. (The effect is still the safe if the dog block is tilted by the space slide.)

*Means Utilized to Obtain an Escapement Differing According to the Groups in Which the Characters Are Struck*

Up to now only the way in which the dog block is tilted and the mobile dog disengaged, while the fixed dog meshes, has been examined.

The means utilized to obtain an escapement of different amplitude according to the groups in which characters are struck simultaneously are now going to be examined.

For the time being the case of cumulated escapement corresponding to the striking of the characters, without any increase for the integration of a blank space, will be considered. According to the group(s) in which a key struck simultaneously, the mobile dog 1032 (FIG. 76) travels an angle corresponding to one, two, three, four or five teeth of the escapement wheel 1013.

*Description of the Stops of the Moblie Dog*

The mobile dog 1032 is rotated in the direction of arrow 961 (FIG. 66) by the escapement wheel 1013, under the action the return spring of the carriage. The mobile dog 1032 finds its travel limited normally by the stop 1037 "zero stop" (FIGS. 64 and 66). In rest position it remains against this stop. It will be noticed however, that if the preceding multiple strikings have been made simultaneously on one or several character keys and on a space key, this "zero" stop has been retracted and the mobile dog, in its return travel, has gone to the adjustable stop screw 1060 (FIGS. 66, 65, 72) called "stop minus one" and mounted on the arm 1061 of the dog block 1014, 1015 with counter-nut 1062. (The cases in which mobile dog starts from this position will be examined further).

The mobile dog, when disengaged, is driven in rotation in the direction of the arrow 1063 (FIG. 67) by the action of its spring 1054. In this direction, a series of four mobile stops 1065, 1066, 1067, 1068 (FIG. 66) is found in the travel of the back tooth 1064 of the mobile dog (FIGS. 65, 66). It will be noticed that one or several of these stops are retracted by the eventual striking of one or several characters in groups II, III, IV, V. The number of retracted stops depends on the number of the highest group among those in which a character has been struck.

When a character has been struck in group V, all four stops are retracted and the mobile dog 1032 is only stopped by the end of travel adjustable stop-screw 1069 screwed on its bracket 1070 with counter-nut 1071.

The bracket 1070 is fixed on the escapement frame 995 by screws 1072 and 1073.

The four mobile stops 1065 to 1068 as well the elements which retract them eventually are going to be described.

It is the retraction of one, two, three of these mobile stops or of all four, when characters are struck in one or several groups other than group I, which causes an escapement with the number of spaces equal to the number of the group highest in order in which a character has been struck. No account is taken here of the increase of this cumulated escapement, by the actuation of a blank space key, which will be explained later.)

The four mobile stops are connected unilaterally by the hooking projections 1074, 1075, 1076 (FIG. 66) in such a way that when one of these stops is retracted, it drives in the direction of the arrow 1077 (FIG. 64) those which precede it, but not those which follow it.

Escapements with a mobile dog and a fixed dog are currently utilized in the usual alphabetical typewriters, but the mobile dog in these machines does not have its axle in the extension of the escapement wheel axle. It follows that its angular displacement can only be very limited. If this displacement corresponded to a great number of intervals, that is to the escapement of a great number of teeth in the wheel, the tooth of the mobile dog would be no longer on the same circumference as the teeth of the wheel.

Unlike what occurs in the usual escapement mechanisms, in the escapement of the invention, described here, the mobile dog being co-axial with the escapement wheel, can have an angular displacement which, theoretically, can reach the whole circumference of this wheel. The tooth of the mobile dog remaining always on the same circumference, can therefore always mesh with the wheel, whatever the angle covered.

In practice, the maximum travel of the mobile dog corresponds to as many teeth of the escapement wheel as there are striking groups in the machine, plus the number of teeth corresponding to the blank space of one or several intervals which can be struck simultaneously with the striking of characters in all the groups.

In the machine of the invention, shown by example, it has been notice that there are five groups and one blank space of one single interval only can be struck at the same time as the simultaneous striking of five characters. It follows that the maximum angle that the mobile dog has to travel, in certain cases, corresponds to six teeth of the wheel.

In the usual alphabetical machines, the travel of the mobile dog, and consequently that of the carriage, are identical with successive strikings. They generally correspond to the escapement of one only tooth of the wheel and, on the other hand, to the uniform interval between two successive characters. However, in certain known machines this spacing can, optionally, be doubled, but in a constant way, so as to obtain momentarily a more spaced out printing.

In others the travel is single or double, according to the characters which are struck, and this makes it possible to utilize characters of two different widths. This has been, for instance, used for the Arabic language.

Finally, in certain machines the travel of the mobile dog is single, double or triple or even increased more than that, which makes it possible to obtain different spacings according to the characters being more or less broad, for example i, n, m. But in these different machines, the principle of the escapement mechanism used is totally different from that of the invention.

The aim and the result are also different. In the first of the known machines, the amplitude of the escapement is modified by a special drive so as to obtain afterwards a more spaced printing, for example for the striking of a title.

In the others, the purpose was to obtain varied spacings in relation to the width of the characters struck successively and one only at a time.

In none of them does the varied escapement have as a purpose or result to obtain the simultaneous striking by several type bars.

The latter devices could nevertheless be utilized in the machines of the invention, on condition that they be adopted thereto, but this would solve the problem only partially. In fact, firstly the total capacity of escapement of these devices, that is the number of teeth of the wheel that they can skip in one time, is greatly inferior to what the escapement mechanisms of the invention allow. Secondly, the known devices in question do not solve the problem of the integration of the blank spaces struck at the same time as the characters. (How the escapement device is completed so as to permit this integration will be described below.)

*Description of the Back Group Plates or Back Group Bars and of Their Junction With the Retractable Stops of the Mobile Dog.*

The longitudinal levers operated by the character keys have been described previously and it has been said that their back part is identical or similar to that which is found in certain usual alphabetical typewriters.

In the example it is these back parts of the longitudinal levers whose motion is utilized to cause the release of the mobile stops of the escapement. (Other parts among those that are set in motion by each striking of characters could be used.)

For that purpose has been disposed, under the assembly of back parts of the longitudinal levers such as 509 (FIG. 22) of each group, a universal group bar such as 1078 for the group I (FIGS. 77, 56).

For reasons explained previously, there is a universal bar for each group, group I included, although for this group there is no mobile stop to be retracted. The reason for this detail will be explained further.

All these universal bars of group are shown in plane view (FIG. 56) in the machine and in FIG. 77 assembled only. They are shown each separately in plan view in FIGS. 78 to 82; in front, but sectioned in their horizontal part along section line R—R of FIGS. 88 to 92. They are the plates with small tongues 1078 for group I, 1079 for group II, 1080 for group III, 1081 for group IV and 1082 for group V.

The support 1083 (FIG. 93) common to the five plates is constituted by a plate which has at the front end three arms 1084, 1085, 1086. This support is fixed to the crossbar 874 (FIGS. 29—57).

The plate 1078 of the group I is mounted so as to pivot between two points 1087 and 1088 (FIG. 94.) The left point is screwed through the arm 1084 of the support, with counter-nut 1089.

The four other plates corresponding respectively to each of the following groups have their back part extended downwards by vertical plates such as 1090 and 1091 (FIG. 84) for the one of group II, and each of them having a hole of same diameter as the axle 1092 (FIG. 93) common to these four plates. These descending parts are mounted on the axle. The four plates thereby pivot on the same axle 1092. This axle is constituted by a round sectioned rod with a threaded reduced diameter at its left end. This left end is screwed butts through the arm 1085 of the support until the unreduced ends abuts arm 1085 and the pointed end 1038 extends therebeyond. The pointed end 1038 mounts the right part of the plate of group I. Washers or distance-pieces 1093—1094—1095 are also mounted on the axle 1092 in order to laterally space the plates 1079 to 1082.

The front part of each plate is cut into small tongues such as 1093 (FIG. 56). A small tongue corresponds to each of the longitudinal levers which themselves correspond to character keys. The lengths of the different tongues are designed according to what keyboard line the key is found that operates the corresponding longitudinal lever. In fact, for each keyboard line, the amplitude of the angular motion of the longitudinal lever is different (except for the longitudinal levers which are mounted with deformable parallelograms, such as those shown in FIGS. 24 and 25.) The differences in lengths of these small tongues correct for these differences in amplitude so that the angular motion of the plate(s) is of the same amplitude, whatever longitudinal levers is operated. To the nine lines of the keyboard correspond therefore nine types of small tongues, with different lengths and forms.

But all the longitudinal levers, mounted with parallelograms, have an identical angular motion which would be that caused by a key that would be mounted between the second and the third line. Therefore a tenth small tongue length has been added corresponding to the position of a fictitious key which would be on the vertical of the axle 120 (FIG. 24) which drives the longitudinal lever, in the case in which the latter is mounted with a parallelogram. Examples of these ten types of small tongues 1093 to 1102 can be seen in profile in FIG. 64. The profiles of each plate are moreover shown in FIGS. 88 to 92.

When the machine is built by mounting all the levers on parallelograms, all the tongues are of same length. This has been discussed in another chapter. Another simple way of eliminating the differences in amplitude will be described further.

The principle of the plates with small tongues under the longitudinal levers is already known. In fact, in the usual typewriters such plates are already utilized, but in these machines their function is not to retract escapement mobile stops, and, moreover, they do not individually correspond to a particular group of type bars having a common and distinct striking point from that of the type bars of the other groups.

It will be noticed further that in the invention the group bars still have other functions (lifting the ribbon and integrating the blank spaces).

Each of the plates II, III, IV, V presents a projection extending towards the left and shown in FIGS. 56, 57 and 77, 88 to 92, 83 to 87, 78 to 82, 94, 93 and which displaces the movement of each of these plates towards the center of the machine, that is in the area above which the escapement device is located. In the same way as the plate 1078 of the group I (FIGS. 57, 77, 88 and 83) is extended upwards by its lever 1103, the plate 1079 of the group II (FIG. 84) is secured to its lever 1104, the plate 1080 of the group III (FIG. 85) is secured to its lever 1106 and the plate 1082 of the group V (FIG. 87) is secured to its lever 1107.

The levers of the plates of groups II, III, IV, V are connected respectively to the lower extremities 1108, 1109, 1110, 1111 (FIG. 66) of the rods of the corresponding mobile stops by the small connecting-rods 1112, 1113, 1114, 1115, shown in plan view in FIG. 70.

At its front extremity each of these small connecting-rods is mounted so as to pivot on a lug such as 1116 which is secured to the corresponding lever such as 1107 for the group I (FIG. 87); each small connecting-rod is held on the lug by a clip such as 1117. Each small connecting-rod has its back part mounted to pivot on the lower extremity of the rod of the retractable mobile stop which corresponds to it, such as the rod 1111 for the small connecting-rod 1115 of the group V (FIG. 66). In the example this pivot fixing is carried out for each small connecting-rod by means of a bearing rivet so as to reduce the lateral dimensions.

The FIG. 66 shows, from the rear of the machine, the retractable stops 1065 for group II, 1066 for group III, 1067 for group IV and 1068 for group V. These retractable stops have the function of stopping the back tooth 1064 of the mobile dog 1032 in its travel, when the front tooth 1033 (FIG. 64) of this dog is disengaged from the escapement wheel 1013.

Each of the rods 1108 to 1111 (FIG. 66) which carry the retractable stops 1065 to 1068 is constituted by a plate of rectangular section provided on each of its two lateral faces with a circular boss in the form of a washer such as 1118 and 1119 for the stop rod 1111 of the stop 1068.

These bosses maintain the required spacing between the rods of the adjoining stops and the support 1120 (FIG. 64). Each stop has a hole in the middle of the boss. The stops are mounted by means of this hole on a common axle 1121 (FIG. 64) which passes through the holes of the left and right sides of the support 1120. The right extremity of the axle is screwed in the right side of this support. Each stop can pivot on the axle 1121.

The support 1120 comprises a shoe 1173 fixed on the shoe 990 of the escapement by screws 998 and 999 (FIG. 70) passing through lengthened holes for adjustment in the longitudinal direction.

In rest position, that is when not retracted, the retractable stops 1065 to 1068 are always on the path that is followed by the back tooth 1064 of the mobile dog 1032 as soon as its front tooth 1033 is disengaged from the wheel 1013.

It has been noticed that beyond the mobile dog 1068 of the last group the adjustable fixed stop constituted by the screw 1069 is still to be found on this path.

*Functioning of the Retraction of the Stops of the Mobile Dog*

When the striking of a character key of a given group operates the corresponding longitudinal lever such as 529 (FIGS. 22 and 56) of group II, this lever, in its angular movement downwards, drives the small tongue such as 1122 above which it is located and consequently drives the plate or universal bar such as 1079 of the same group, which then moves in an angular movement around its axle 1092 (FIG. 62). The corresponding lever such as 1104 which secured to this plate undergoes the same movement and pulls the corresponding small connecting-rod such as 1112 (FIG. 70) forward (arrow 959). The latter causes the mobile stop rod to pivot such as 1108 (FIG. 66) around its axle 1121 (FIG. 64). The upper part of this rod, which acts as a stop such as 1065, is consequently released from the path of the mobile dog.

If a character key is struck at the same time in several groups, the above motions take place simultaneously in each of these groups and the corresponding stops are retracted simultaneously. It has been noticed that all the mobile stops are connected unilaterally and that if one of them is released it drives the preceding one by its lug such as 1076 for the stop 1068 of group V (FIG. 66).

This unilateral connection is strengthened by similar hookings of each lever of a group plate with the preceding one (FIG. 62) finger 1123 of the lever 1105 of group III, finger 1124 of the lever of group IV and finger 1125 of the lever of group V. These hookings of the stop rods among themselves and of the levers among themselves have as an effect, not only to cause a stop of a group in which no key would have been struck to be retracted, if this group precedes a group in which a striking has been made, but it has still the effect of preventing a release of any stop from being made with delay in comparison to the release of a stop which would follow it (for example if the corresponding striking is made with a delay with respect to the one made in a following group).

Nevertheless, the lever 1104 of the plate of the group II is not connected with the lever 1103 of the plate of group I.

*Functioning of the Escapement in the Case in Which Only a Character Key Is Struck in Group I and Without Striking Any Blank Space Key*

When a character key is struck in group I without striking any in any other group, and without striking a space key, the mobile dog 1032 (FIG. 66), as soon as it is disengaged from the wheel 1013, biased by its spring 1054, revolves in the direction of the arrow 1063 until it meets the mobile dog 1065 of group II, which, in this case, has not been retracted.

When the key and the corresponding levers return to their rest position, the mobile dog meshes again in the wheel 1013. In this case it has skipped a tooth. The wheel, released by the fixed dog 1021 (FIG. 62), revolves in the direction of the arrow 961 by the action of the return spring of the carriage 1000 contained in the springbox 166 of known type (FIG. 135) by driving the mobile dog up to its rest position against the stop 1037 called "zero stop" (FIG. 64). The escapement and the advancing of the carriage have then been of one single interval. In this case the functioning of the escapement is similar to what it is in the usual alphabetical machines which utilize a fixed dog and a mobile dog.

*Functioning When a Character Is Struck in Group II Without Striking Any in the Groups III, IV, V and Without Any Space Striking*

When a character is struck in group II without striking any in groups III, IV, V and without spacing, the corresponding longitudinal lever such as 529, driven downwards by the corresponding key rod, drives in its travel downwards the small tongue such as 1122 which corresponds to it. The latter drives in an angular movement around the axle 1092 (FIG. 62) the plate 1079 of group II as well as the lever 1104 which is secured to it. The upper extremity of this lever pulls on the small connecting-rod 1112 (FIG. 70), the latter causes the stop rod 1108 (FIG. 66) of group II to pivot around the axle 1121 (FIGS. 64, 65), and this retracts the stop 1065 from the path of the mobile dog.

The latter, when it is disengaged, being pulled by its spring 1054 (FIG. 66), moves angular in the direction of the arrow 1063 until its back tooth 1064 is against the second retractable stop 1066 of group III. Considering that the first stop 1065 is retracted by the action of the parts set in motion at the same time as any key of group II, it is obvious that this stop will be retracted even if a character of group II is struck without any in group I being struck.

When the longitudinal lever returns to its rest position and when the mobile dog meshes again in the escapement wheel, its front tooth 1033 has therefore skipped two teeth and in the course of the return of this mobile dog, to its rest position against the stop 1037 called "zero" the carriage advances two intervals, and this was the aim to be achieved.

*Functioning in the Case in Which a Character Is Struck in Group III Without Striking Any in Groups IV or V and Without Space Striking*

When a character is struck in group III without any being struck in group IV or V and without any spacing, the corresponding longitudinal lever such as 544 (FIG. 56), set in motion by the corresponding key rod, drives the corresponding small tongue and consequently the plate 1080 of group III, and this causes the tilting of the stop 1066 (FIG. 66) in the way already explained for the stop 1065 of group II.

In general, a character of group III is not struck without striking at the same time a character of group II. In this case, the most frequent, the stop 1065, which corresponds to group II, is therefore also tilted as in the preceding case, by the action of the longitudinal lever of group II operated at the same time as the longitudinal lever of group III. But, even if in some cases a character is struck in the group III without any striking in group II, the stop 1066, which corresponds to group III, by its retraction drives the preceding stop 1065 owing to the unilateral linking constituted by the projection 1074 which is secured to the stop of group III, this linking being moreover doubled by the finger 1123 (FIG. 62) which is secured to the lever 1105 of the plate 1080 of group III.

In all the cases in which a character of group III is struck, the two stops 1065 and 1066 being retracted, the mobile dog, when it is disengaged, continues its rotation movement until its back tooth 1064 (FIG. 66) is in contact with the third stop 1067 of group IV. When afterwards the mobile dog meshes again, it has thus skipped three teeth of the wheel and in the course of the return of this dog against the stop 1037 called "zero stop" the carriage advances three intervals.

*Functioning of the Escapement in the Case in Which a Character Is Struck in Group IV Without Striking Any in Group V and Without Spacing*

When a character is struck in group IV without striking any in group V and without spacing, the stop 1067, which corresponds to group IV, is retracted in the same way as explained for the stops of the preceding groups, and it drives in its retraction the preceding stops 1066 and 1067 by the unilateral linkings, and this has the effect of letting the mobile dog revolve against the stop 1068 of group V which is not retracted.

The mobile dog skips therefore four teeth and, during the return of the mobile dog to its rest position against the stop 1037 called "zero stop," the carriage advances four spaces.

*Functioning of the Escapement in the Case in Which a Character Is Struck in the Group V Without Any Space Striking*

If a character is struck in the group V without any space striking, the stop 1068, which corresponds to this group, is retracted in the same way and it drives the preceding ones. The mobile dog therefore revolves up against the fixed stop 1069. It skips five teeth and, during the return of the mobile dog against the stop 1037 called "zero," the carriage advances five intervals.

It is obvious that machines corresponding to the invention can be built with either less or more than five groups. It suffices to reduce or increase the number of mobile stops and to move either forward or back accordingly the fixed stop 1069 on the path of the mobile dog or of its back tooth.

*Action of the Lever of the Group Plate With Small Tongues of Group II on the Character Slide*

DESCRIPTION

The lever 1104 of the plate with small tongues of group II, (FIG. 62), besides its described action on the corresponding stop rod 1065, presents with respect to the levers of groups III, IV, V, the following particularity: its upper part is extended higher than its junction with the horizontal small connecting-rod 1112 by a finger 1126 (FIG. 62) which is to be found behind the lug 1127 of the slide 1041 called the character slide, and this constitutes part of the lever 1103 of the plate of group I ends also with finger 1128 located behind the lug 1129 of the character slide 1041. The lug 1127 and the lug 1129 are constituted by one and the same rod which passes through the projection 1130 (FIG. 65) of the slide 1041 and is secured to the latter.

The group plate 1078 of group I (FIG. 62) and its lever 1103 are held or returned to rest position by a spring 1174 (FIG. 64) hooked, on the one hand, to the mast 1152 of the shoe 990 and, on the other, to the lug 1131 of the lever 1103.

FUNCTIONING

When a character key is struck in one of the groups II, III, IV, V or in some of them, it has been seen that the lever 1104 of this group II is always driven forward, even if no character has been struck in the group II, and this owing to the unilateral linkings by the fingers 1123, 1124, 1125 (FIG. 62.)

In all these cases, the lever 1104 of group II, by its upper extremity 1126, thus drives the character slide 1041 forward in its travel (arrow 959). But in these cases, if no character has been struck in the group I, neither the corresponding plate 1078 of group I, nor its lever 1103 are driven, for no hooking links them to the following groups. They remain in rest position despite the weight of the plate and although the lever 1103 is no longer held by the lug 1129 of the slide 1041, since the later advances. As a matter of fact, the plate 1178 of group I and its lever 1103 are then held in their position by the return spring 1174 (FIGS. 64, 65).

*Action of the Lever of the Plate With Small Tongues of Group I on the Characters Slide*

It has been noticed that if a character is struck in group I only, the corresponding universal bar 1078 (FIG. 62) and its lever 1103 are driven in an angular movement around their axle by the longitudinal lever corresponding to the character struck. It follows that the lever 1103 acting on the lug 1129 by its upper extremity 1128 drives the characters slide 1041 forward, (arrow 959, FIG. 63), but the lever 1104 of group II and its plate 1079 of group II remain in rest position.

In fact, when no action is exerted on them, the plates II, III, IV, V are held in rest position respectively by the return springs 962, 963, 964, 965 (FIG. 63) of the rods of the mobile stops. If on the contrary characters are struck at the same time in group I and in one or several other groups, the lever 1103 of group I and 1104 of group II both simultaneously drive the slide 1041. This slide, called character slide, is therefore always driven forward when one or several characters are struck in any groups.

The character slide 1041 has two distinct functions:

It causes the rising of the ribbon, (This function has been examined in another chapter);

Its motion, combined with the motion of the space slide 1039, ensures the integration of the blank space in the escapement when one single space key is struck at the the same time as several character keys. It is this latter function which is going to be examined at present at the same time as the whole device for integration of the blank spaces.

It will be noticed in the chapter concerning power operation that the characters slide 1041 has, besides, and jointly with the space slide, a third function consisting in connecting the electro-magnets.

*Single Space Device. Description and Functioning of the Single Space Keys, of the Space Slide and of the Connections Which Link These Keys to the Space Slide*

In a usual alphabetical typewriter the single spacing can only be effected alone, without any striking of a character.

In the machines of the invention, the spacing is produced by one or the other of the two keys "Esc*t*" FIG. 4 according to the thumb available. These two keys, whose setup is similar to that of the character keys, both drive the same longitudinal lever 524 by their respective horizontal lugs 89 and 90 (FIG. 22).

This lever 524 is of same form as the ones of the character longitudinal levers such as 549, which are controlled by keys of same line. It has an upright similar to those shown in FIG. 17 for certain character levers. But this upright is of a width enabling it to be operated by one or the other of the lugs 89 and 90.

This longitudinal lever 524 by pulling rod 1132 (FIG. 125) controls the intermediate lever 1133 which is mounted on same axle 159 as the character intermediate levers. But this intermediate lever 1133 has a special form, so as to avoid the acceleration produced by the connections of the intermediate levers corresponding to characters. This lever 1133 has two arms. On the extremity of its upper arm 1134 is pivotally mounted the front extremity of the small connecting-rod 1135. The back extremity 1136 of this small connecting-rod is pivotally mounted on the front extremity of the space slide 1039 (FIG. 69, 70). The small connecting-rod is in two parts fixed together by the screws 1137 and 1138.

The holes for the screws are lengthened in one of the two parts for adjustment of the small connecting-rod length. The slide 1039 is mounted so as to slide in the front guide 1038 and in the back guide 977.

The intermediate space lever 1133—1134 is designed to have a length so that, with a travel of the space keys equal to the travel of the character keys, the space slide 1039 has a travel identical to that of the character slide 1041.

Any of the two space keys Esc*t* FIG. 4 can be struck, either along or at the same time as one or several character keys.

One of the two space keys being struck, the motion is transmitted by the parts stated above to the space slide 1039 which advances (arrow 959). The escapement push-screw 1139 (FIG. 70) mounted with counter-nut 1140 on the projection 1141 of this slide, meets the foot 1016 of the dog block 1014—1015 (FIG. 67), and this causes the dog block 1014—1015 to be tilted in the same way as if it were pushed by the push-screw 985 of the escapement slide 970 (FIG. 70).

*Description of the Push-Plates, of the Rollers Device, of Its Lever, of the "Zero" Stop, of the Locking Device of the Latter and of the Stop Called "Minus One"*

Now to be described are the parts which, in certain cases, transmit the motion of the space slide 1039 and of the characters slide 1041 (FIG. 70) to the stop 1037 called "zero stop" in order to retract the latter.

On the characters slide 1041 a push-plate 1142 is fixed by two screws 1143 and 1144 (FIG. 65) which pass through holes in this plate, these holes being lengthened horizontally for adjustment.

On the single space slide 1039 (FIG. 69) is fixed in the same way a plate 1145 similar to the plate 1142 by the screws 1146 and 1147. It is to be noticed that the plate 1142 is positioned further forward than the plate 1145. This displacement makes it possible to receive the rollers support 1148, described hereafter, with a lateral overall dimensions made smaller by displacing also one of the two rollers in the longitudinal direction.

This rollers support 1148 (FIGS. 69, 65) is shown in plan view in FIG. 70. In rest position, it is so placed that, when the character slide 1041 is advanced, its push-plate 1142 does not meet the roller 1149 which is to be found on its side. On the other hand, this position is such that, when the space slide 1039 advances, its push-plate 1145 (FIGS. 69 and 70), after a dead run, meets the roller 1150 which is to be found on its side. The behavior of this roller device in each of the six possible cases will be described further.

The rollers support 1148 is held or returned to rest position (arrow 958) by the return spring 1151 (FIG. 64) hooked, on the one hand, on a lug of the stop 1037 and, on the other, on a support 700 fixed on the escapement frame 955.

The rollers support 1148 (FIGS. 98, 99) is mounted so as to pivot in a slightly inclined plan with respect to the horizontal, on its axle 966. This axle is fixed on the lower extremity of the lever 1153.

The rest position, the rollers support 1148 is against the stop 792 which is secured to the lower part of the lever 1153. It is held in this position or returned to it by a spring 699. In the example this spring is of steel wire with an extremity fastened through a hole at the bottom of the lever 1153. This spring is wound around the cylindrical part 698 of the lever. Its other extremity is hooked on the grooved mast 697. This mast is secured to the roller support 1148. It is the meeting of the upper extremity of this mast with the stop 792 which limits the travel of the rollers support 1148 in the direction of the arrow 1171 by the action of the spring 699.

The lever 1153 is pivotally mounted by its axle 1158 on two points in a vertical plane between two cup screws 1154 and 1155 (FIG. 62) screwed onto the escapement frame 995 with counter-nuts 1156 and 1157. The lever 1153 (FIG. 98) is secured to the lower extremity of the "zero" stop 1037 by the lug 1159 (FIGS. 65—98) which is fixed to the lever 1153 and slides, owing to the divergence of the arcs, in a keyway 1160 defined in the lower extremity of the stop 1037.

The stop 1037 is shown in detail in FIGS. 95, 96, 97.

This stop 1037 is pivotally mounted on its axle 1161 (FIGS. 66, 64, 98). This axle is fixed on the bearing 1162 detail of which is given in FIGS. 98 and 100. This bearing is screwed on the escapement frame 995. It has been noticed that the "zero" stop is held or returned to its rest position by its return spring 1151.

When the "zero" stop 1037 pivots around its axle 1161 in the direction of the arrow 1163, which retracts it from the path of the mobile dog, it is locked in this position by the pawl 1164 (FIGS. 98 and 64). The lug 1165 (FIGS. 64, 67, 98) which fixed to the stop 1037 is stopped in its return travel by the stop 1166 of the pawl. In fact, as soon as the lug 1165 has run past this step, the pawl 1164 pivots around its axle 1167 (FIG. 64) defined by a bearing screw, by the action of its spring 1168 the other extremity of which is hooked onto the grooved lug 1169 which is itself fixed on the escapement frame 995.

When the "zero" stop is retracted from the path of the mobile dog 1032, the latter, in its return travel in the direction of the arrow 961, runs past its normal rest position shown in FIGS. 66 and 100. It continues its rotation up to the position called "minus one," that its against the stop 1060.

*Advantage of Linking Unilaterally Certain Sign Keys With the Space Lever, Example: Punctuation Key*

In a text, certain signs (for example those of punctuation) are generally followed by a blank space. There is consequently an advantage in linking the corresponding keys with the space longitudinal lever so that their operation should cause the motion of the latter (without any reciprocity). It has been said that this arrangement has been provided for by the punctuation key (2nd key of 9th line) (FIGS. 1 and 4) which corresponds to the signs: full stop, comma, semi-colon, which is secured to the space longitudinal lever 524 (FIG. 22) by a suitable unilateral linking. The same arrangement can be adopted for other characters which, if they are placed in group II, will then be preceded and followed easily respectively by blank spaces. This is advantageous, for example, for any character which, in the language for which the keyboard has been made, is generally printed alone (such as the letter á in French) or at the end of a word. But it is still necessary for the type bar to carry, in all the positions, only characters which would fulfill this condition.

The unilateral linking can consist in a projection of the key rod being extended above the space longitudinal lever 524 (FIG. 22). The same result can be obtained if the longitudinal lever which corresponds to the considered key acts on the space longitudinal lever 524.

Whether the action on the space longitudinal lever 524 be exerted by the key rod concerned or by its longitudinal lever, it happens sometimes that these elements are laterally remote from the space longitudinal lever they are to operate. In this case they utilized for the motion reversal one of the processes which have been described in the chapters concerning the connection-box and the longitudinal levers (for example, a transverse horizontal lug on the key rod with an upright on the space lever or horizontal lug with vertical extremity as in the cases shown in FIG. 17 or reversal by a transverse axle with radial levers, as was done for the motion reversal of the keys S III and N III).

It has been noticed that, with the keyboards given as an example in FIGS. 1 to 5, it is the latter means which has been provided optionally, for having the space longitudinal lever operated by the punctuation key.

These optional unilateral linkings of certain character keys with the space longitudinal lever have not been shown in the drawings considering that other similar linkings are shown and the ones which will be adopted may vary according to the languages.

*Functioning of the Escapement Device With Possible Integration of Blank Spaced in the Different Possible Cases. Statement of the Six Possible Cases*

The functioning of the escapement device with possible integration of a blank space, in the different possible cases, is now going to be described.

If the cases are classified according to the nature of a single striking or of simultaneous strikings, three different categories already stated are to be found at first:

Characters (single or multiple) with spacing,
Spacing without characters,
Characters (single or multiple) plus spacing.

Each of these three categories is subdivided into two cases according to whether before striking the mobile dog was:

Either in position "zero" (against the stop "zero" 1037 (FIG. 64) (non-retracted); this position is shown in FIGS. 98, 100; or in position "minus one" (against the stop "minus one" 1060 (FIG. 66), the stop 1037 called "zero" having been retracted in the course of the preceding striking or group of strikings).

This position is shown in dotted lines in FIGS. 101, 103.

Before striking, the mobile dog is in position called "minus one" when the preceding group of strikings included a spacing and one or several characters. Finally, there are consequently the following six possible cases:

| No. of the cases | Strikings made | Position of the mobile dog before striking |
|---|---|---|
| 1st | Characters | "Zero". |
| 2nd | do | "Minus one." |
| 3rd | Spacing | "Zero." |
| 4th | do | "Minus one." |
| 5th | Characters plus spacing | "Zero." |
| 6th | do | "Minus one." |

*Restatement of Some Details of the Functioning of the Escapement Device*

Before examining successively the detail of functioning of the escapement, with regard to the eventual integration of the blank spaces in the six possible cases stated above, certain features of the escapement device are going to be explained or recalled.

The position of the mobile dog 1032, when it is against the stop "zero" 1037 is called "position zero." The position against the fixed stop 1060 called "stop minus one" is called "position minus one."

It has been noticed that there are three slides (FIGS. 56 and 70) located in the following order from left to right:

Escapement slide 970, returned by spring 694;
Space slide 1039, returned by spring 695;
Character slide 1041, returned by spring 696.

The escapement slide 970 has a shorter travel than the others. For example, approximately 4 mm. if the two others have a 10.5 mm. travel.

The character slide 1041 causes the lifting of the ribbon each time it advances, the three slides have the two common following functions:

To cause the dog block 1014, 1015 (FIGS. 72, 73) to be tilted, which is necessary for any escapement, whatever the cases in which characters and a blank space key have been struck simultaneously (but that only if this stop were not already retracted, having been so by the preceding stroke or group of strokes. In the latter case, it suffices that the slides prevent this stop from returning to its rest position).

It will be noticed that when the machine is powered, by means of one or two electro-magnets, the space slide and the character slide have the additional function of connecting electro-magnet(s).

The functioning of the escapement with regard to the way in which the dog block is tilted, either by the escapement slide 970 (FIGS. 56, 57, 63), or by the space slide 1039, or simultaneously by these two slides, has already been explained.

It has also been explained how in the cases of striking of one or several characters the amplitude of the escapement varies according to the groups of strikings in which these characters have been struck, these variations of amplitude being obtained by the retraction of one or several of the mobile dogs 1065 to 1068 (FIG. 66).

It will now be explained especially how to obtain the advance or the additional of advance of the carriage which has to correspond to a striking on one of the single space keys.

Among the six cases stated, it is to be noticed that the first two do not include any space striking, the following four include one space striking.

For each of the six cases the functioning of the principal parts which are set in action will first be successively examined. The functioning of the six cases will afterwards be summarized in a table.

The aims to be achieved are to obtain, either the advance corresponding to one single space striking effected alone (3rd or 4th case), or the increase of the spacing corresponding to the characters, when, in addition to the latter, a single space key (5th or 6th case) is struck at the same time.

To achieve this latter aim, a device has been so worked out that the stop called "zero" 1037 (FIG. 66) will be retracted when the character slide 1041 and the space slide 1039 (FIG. 70) advance at the same time (5th and 6th case) and, on the contrary will not be retracted when only one of these two slides advances (cases 1, 2, 3 and 4).

The retraction of the stop "zero" is obtained through the following means:

When the rollers support 1148 is displaced by the combined action of the two slides 1039 and 1041 (FIG. 70), it causes the lever 1153 (FIGS. 65, 69, 110) to pivot around its axle 1155 in the direction of the arrow 968.

The upper extremity of the lever 1153 drives in rotation the stop 1037 around its axle 1161. The upper extremity of this stop called "zero" moves from its rest position shown in full lines in FIG. 107 in the direction of the arrow 1163 up to its position at end of travel shown in hole crossed lines and then, when it returns, is stopped by the pawl 1164.

The "zero" stop is thus retracted out of the return path of the mobile dog 1032. If it were not kept back, it would return in the path of the mobile dog 1032 before the latter has passed through the position called "zero," and would prematurely stop it in this position.

When before striking the "zero" stop 1037 in already retracted and locked by the mobile dog, as shown by the dotted lines in FIG. 101, the advance of the rollers support 1148 has the effect, first of preventing the stop 1037 from returning on the return path of the head 1059 of the mobile dog 1032 and afterwards of retracting this stop again.

It has been said that, whatever the case, by striking characters or spacing keys, the dog block is tilted, the fixed dog 1021 meshes with the wheel, while the mobile dog 1032 is disengaged. As soon as the latter is disengaged, it revolves on the axle 1003 (FIG. 67) in the direction of the arrow 1063 (FIG. 103) in an angular movement the amplitude of which varies according to the groups in which it has been struck, as it has been explained. Afterwards, the mobile dog having met a stop and the dog block tilted towards its rest position, the mobile dog meshes again while the fixed dog disengages, releasing the wheel. The latter revolves in the direction of the arrow 961, leaving the carriage to advance; the wheel drives the mobile dog and this simultaneous movement of the carriage, of the wheel and of the mobile dog continues up to the time when the mobile dog meets a stop.

If the stop called "zero" 1037 has not been retracted, it is this stop which stops the return motion of the mobile dog. The advance of the carriage, counted in number of single intervals, has in this case been equal to the number of teeth of the wheel skipped by the mobile dog in its travel (arrow 1063) (FIG. 100), that is assuming the mobile dog was started from the zero position. As a matter of fact, in this case, the return path of the mobile dog is equal to its starting path.

But if, before its disengagement, the mobile dog were at the position called "minus one," that is against the stop 1060, considering that on its return it would stop at the position "zero," the stop zero not being retracted, its return path is shorter than its original path. In this case, however, the amplitude of the advance of the carriage is the same as in the preceding case.

The amplitude of advance of the carriage is therefore not conditioned by the amplitude of the motion of the mobile dog, in its original travel (direction of the arrow 1063), but by the amplitude of its angular motion in its return travel (direction of the arrow 961).

Now if, when the mobile dog returns, the stop "zero" 1037 is retracted, it does not stop the mobile dog at the position "zero." The mobile dog therefore continues its travel to the stop 1060 called "minus one." The carriage has therefore advanced by one more single interval than in the preceding cases. This excess of escapement takes place whatever the starting point of the mobile dog has been, at the time of its disengagement (position "zero" or position "minus one").

The consequence of the preceding is that the amplitude of the escapement, which is a function of the groups in which characters have been struck, is also increased by one single interval each time that the two slides 1039 and 1041 (FIGS. 70, 99), by their combined action, drive the roller support 1148 forward since this action has as a consequence the retraction of the stop 1037 called "zero."

Each time that the combined action of the two slides 1039 and 1041 has retracted the stop 1037 called "zero," the mobile dog 1032 (FIG. 114), on its return, passes behind this stop, but in its course up to the stop 1060 called "minus one" (FIG. 117) it meets the back extremity 1170 of the pawl 1164 (FIGS. 114, 117) and drives it in its travel. The pawl pivots then around its axle 1167 in the direction of the arrow 960, and this has the effect of releasing the lug 1165 from the stop 1037 called "zero."

This stop 1037, by the action of its return spring 1151, pivots around its axle 1161 and tends to come back to its rest position shown in full lines in FIG. 98. The same is true of the lower lever 1153 and the roller support 1148. But this assembly is stopped in its travel by the fact that the stop "zero" 1037 meets on its travel the head 1059 of the mobile dog 1032.

The stop 1037 and the combined parts of the device stop therefore respectively in the positions in which the FIGS. 101, 102, 103 show them, in dotted line. It is to be noticed that the head of the mobile dog 1032, after having released the "zero" stop 1037 from its pawl 1164, prevents the stop from coming back entirely to its rest position, shown in full lines in FIG. 98. On the other hand, in the course of the following striking or group of strikings, and whatever the case, the dog block 1014, 1015 being progressively tilted in the direction of the arrow 1077 and the mobile dog retracting backwards so as to disengage itself, the "zero" stop 1037, being no longer locked by the mobile dog head 1032, resumes its travel and follows the mobile dog until it comes to its rest position shown in full lines in FIG. 101 and on the other figures of the escapement in rest position. When, after its travel in the direction of the arrow 1063, FIG. 103, the mobile dog returns to its rest position, it will then find again the "zero" stop on its path and it will be stopped at the position "zero" against this stop.

The return travel of the "zero" stop acted upon by its return spring 1151 is stopped at its rest position by the extremity 1170 of the pawl 1164, which, for this defines a straight angle.

If the following group of strikings comprises characters and spacing, it will be noticed that a new combined action of the two slides 1039 and 1041 will again keep back the "zero" stop 1037, and this will prevent the latter from following the mobile dog 1032 in its withdrawal for disengagement and return to its rest position on the path of this mobile dog. In this event, the "zero" stop will then not be kept back by the mobile dog 1032 at the time of its return, and then locked by the head 1059 of the latter. It will then find itself again in the same position as before this new group of simultaneous strikings. In this case again the return travel of the mobile dog will have been greater than if it had been stopped by the zero stop and the escapement will be increased by a single interval.

The joint action of the character slide 1039 and of the space slide 1041 on the roller support 1148 and consequently on the lever 1153 as well as on the stop 1037 in each of the six possible cases of striking as stated above will now be examined.

As indicated in the figures nomenclature, the six possible cases are represented schematically in the FIGS. 98 and 117. In these figures the full lines show the different parts in rest position, that is corresponding to the position "called zero," also shown in the FIGS. 62, 64, 66, 68, 63, 65, 67, 69, 70 of the whole escapement.

The diverse mobile parts are moreover shown, either entirely or partially, in the different other positions corresponding to each of the six cases, by other than full lines. A line of the same kind corresponds to the same position for all the parts in all the figures listed above.

A line formed by crosses (++++) corresponds to the end of travel. The dashes (— — — —) correspond to the position in which the stop 1037 called "zero" is kept back by the pawl 1164. A dotted line corresponds to the locking of the stop 1037 called "zero" by the mobile dog 1032 when the latter is meshed in the escapement wheel 1013 and is itself against the stop 1060, that is, in the position called "minus one."

*Detail of the Functioning Successively in the Six Cases*

1ST CASE—SEE FIGURES 98, 99, 100

One or several characters are struck simultaneously, but without any single space key being struck, the mobile dog 1032 being before striking at the position "zero" shown in FIG. 67 and in full lines in FIGS. 98 and 100, that is, locked by the stop 1037 called "zero stop."

When one or several characters are struck simultaneously, the character slide 1041 (FIG. 99) advances with its push-plate 1142. The end of travel of the latter is shown in cruciform lines (FIG. 98). But normally the roller support 1148 is then in the rest position and the right roller 1149 is not on the path of the push-plate 1142. If ever it were to be found there, the device having not yet returned to its rest position, the push-plate 1142 would push the roller 1149 by causing its support 1148 to pivot in the direction of the arrow 1171 until the roller 1149 is out of the way of the plate 1142 which would continue afterwards to advance without any action.

The escapement slide 970 advancing, its push-screw 985 meets the foot 1016 of the dog block 1014, 1015.

In both cases the characters slide 1041 returns afterwards to its rest position in full lines in FIG. 99.

In both cases the lever 1153 and the stop 1037 called "zero," being held by the spring 1151, have remained at their rest position in FIG. 98 in full lines. The mobile dog 1032 at end of return travel is then stopped against the stop 1037 "zero" in FIG. 98.

It has been explained that if the number of characters struck is greater than one, one or several of the mobile stops such as 1065 and 1066 in FIG. 98, have been retracted.

The amplitude of the escapement corresponds therefore to the number of characters struck and has not been increased, this because no space key has been struck. The rollers support 1148 and its lever 1153 have had no action on the amplitude of the escapement.

The fact that the device is mounted in such a way that the push-plate 1142 of the character slide 1041 does not cause the rollers support to pivot, when no space key is struck, reduces inertia and wear.

2ND CASE—SEE FIGS. 101, 102, 103

One or several characters are struck simultaneously, but without striking one of the single space keys: "Esc*t*," FIG. 4, and the mobile dog 1032 being before striking at the position called "minus one" shown in dotted line in FIGS. 101, 103, that is, the "zero" 1037 being retracted and locked by the mobile dog head 1032.

In this case, before any striking, the character slide 1041 and space slide 1039, with their respective push-plates 1142 and 1145 and the rollers support 1148 are in the relative positions shown in FIG. 102. The slides are in rest position shown in full lines, but the device with rollers 1148 and stop "zero" 1037 (FIG. 101) are already a little advanced (dotted line) owing to the fact that the stop 1037 could not come back to the rest position, being locked by the mobile dog 1032 in position "minus one" (dotted lines).

When character(s) are struck, the character slide 1041 advances (direction of the arrow 959). As in the first case, is push-plate 1142 (FIGS. 101 and 102) normally does not meet the right roller 1149, and this presents the same advantage as in this first case. It is to be noticed that the two first cases are the most frequent of the six possible cases. The escapement slide 970 advancing, its push-screw 985 meets the foot 1016 of the dog block 1014, 1015. The mobile dog 1032 disengages itself, and therefore draws back and releases thus the "zero" stop 1037. The latter, as well as the lever 1153 and the rollers support 1148, come back to their rest position shown in full lines. The mobile dog, after its starting in the direction of the arrow 1063, its meshing again and its return is therefore stopped by the stop 1037 called "zero" FIG. 101 (full lines). The amplitude of the escapement corresponds to the characters struck and has not been increased. This is because no single space key has been struck.

3RD CASE—SEE FIGS. 104, 105, 106

One of the two single space keys "Esc*t*" FIG. 4 is struck, but without any striking of character keys and the spacing device being, before any striking, in the position called "zero" shown in full lines, as in the first case: that is the mobile dog 1032 being locked by the stop 1037 called "zero." The character slides 1041 and space slides 1039 and the roller support 1148 are in the relative positions shown by FIG. 105. In this case, the escapement slide 970 and the characters slide 1041 remain in their rest position shown in full lines.

When striking one of the space keys "Esc*t*" FIG. 4 the space slide 1039 advances; its push-plate 1145, after a dead run, meets the left roller 1150 which, in rest position (full lines), stands on its way. It drives it back to the point where it no longer stands in its way, and this causes the roller support 1148 to pivot around its axle 966 in the direction of the arrow 1172, without the rollers support 1148 or its lever 1153 advancing; the latter being held in rest position by the spring 1151. The space slide 1039 and its push-plate 1145 continuing to advance, the spring 699 holds the left roller 1150 against the right face of this plate 1145, all rollers and of their supports remaining in the end of travel position (FIG. 105) (cross lines). The roller 1150 revolves without advancing, and this avoids any friction. Approximately 4 mm. before the end of travel of the space slide 1039, its push-screw 1139 meets the foot 1016 of the dog block 1014, 1015 and tilts the dog block.

When the space slide 1039 and its push-plate 1145 come back to their rest position (full lines) the left roller 1150 rolls in the opposite direction on the plate 1145 which draws back to the point where the front edge of this plate 1145 goes beyond the roller. Then the roller support 1148 pivots in the direction of the arrow 1171 by the action of its spring 1151 to its rest position (full lines) which it occupied before the striking.

The rollers support 1148 not having advanced, its lever 1153 and the "zero" stop 1037 have remained in their rest position (full lines), FIGS. 104 and 105. The stop 1037 has therefore not been retracted and the mobile dog 1032 is stopped by it in zero position, when it returns (FIG. 106, arrow 961).

Considering that in this case no character had been struck, none of the mobile stops 1065 to 1068 (FIG. 66) has been retracted. The mobile dog 1032, after disengagement, has then revolved in the direction of the arrow 1063 (FIG. 106) but has been stopped by the stop 1065 of group II, after having skipped one tooth only of the wheel. It has afterwards meshed again, and then has returned to the zero position (full lines, FIG. 106) in causing the carriage to advance by only a single interval.

The movements of the mobile dog and of the escapement have therefore been identical to what they are when one character of group I alone is struck, whereas however the escapement corresponds, in the case described here, to the striking of a single space key.

4TH CASE—SEE FIGS. 107, 108, 109

One of the single space keys Esc*t* FIG. 4 is struck, but without striking any character. The difference with the third case consists in that the escapement device is, before any striking, in the position called "minus one" and shown in dotted line, FIGS. 107, 108, 109, that is the mobile dog being against the stop 1060 called "minus one" and the stop 1037 called "zero" being locked by the head 1059 of the mobile dog 1032.

Before any striking the three slides 1041, 1039 and 970 are in rest position (full lines), FIG. 108, but the device with rollers 1148 is already a little advanced owing to the fact that the "zero" stop 1037 could not return to its rest position, being locked by the mobile dog 1032 (assembly) in dotted line, FIGS. 107, 108, 109.

In this case, as in the third case, the escapement slide 970 and the character slide 1041 remain in their rest position.

When striking the space key, the space slide 1039 advances. Its push-plate 1145, after a dead run, meets the left roller 1150. Nevertheless, the dead run is a little longer than in the third case, since the roller support and consequently the left roller are, before any striking, already a little advanced (dotted lines).

The push-plate 1145 drives back the roller 1150 until it is no longer in its way, and this causes the rollers support 1148 to pivot around its axle 966 in the direction of the arrow 1172 and without the roller support 1148 nor its lever 1153 advancing, the latter being held by the spring 1151 of the stop called "zero." The push-plate 1145 continuing to advance, the spring 1151 (FIG. 105) holds the left roller 1150 against the right face of this plate 1145, FIG. 108. The roller revolves without advancing, and this avoids any friction. A little before the end of travel of the space slide 1039 the space push-screw 1139 which is mounted on this slide meets the foot 1016 of the dog block 1014, 1015 which it tilts. This has the effect, as in all the cases, of causing the mobile dog 1032 to retract so as to disengage it from the wheel 1013. Now, in retracting, the mobile dog releases the stop 1037 called "zero" which it was locking, and this enables the latter to follow it. This stop 1037 as well as the lever 1153 and the rollers support 1148 return to their rest position shown in full lines. This latter part of the functioning is the same as in the second case, with, however, the difference that when it retracts to its rest position, the roller support 1148 is at first compelled to remain pivoted in the direction of the arrow 1172. It will only be able to come back in the direction of the arrow 1171 by the action of the spring 1151 when the space slide 1039, returning to its own rest position, the push-plate 1145 will have gone beyond the position of the left roller 1150 releasing consequently this roller. Up to that moment the action of the spring 1151 applies the roller 1150 against the right face of the push-plate 1145. The roller rotates in one direction or in the other depending upon whether it advances or retracts with respect to the movement of the plate and consequently of the space slide 1039.

The stop 1037 called "zero" having returned to its rest position (full lines) FIG. 107, will stop the mobile dog 1032 in position "zero" (full lines) in its return travel. The stop 1037 arrives in fact at its rest position before the mobile dog passes through this position.

In this fourth case, the mobile dog 1032, at the time of its disengagement, starts from the position called "minus one" shown in dotted lines, FIG. 109. It rotates in the direction of the arrow 1063. Considering that no character has been struck, none of the mobile stops 1065 to 1068 has been retracted. The mobile dog is consequently stopped by the mobile stop 1065 of group II. It meshes again afterwards in the wheel 1013, having thus skipped two teeth of this wheel. It returns afterwards up to position called "zero," shown in full lines, FIG. 109. It has therefore left the wheel rotating and left the carriage advancing by one only single interval. The escapement corresponds therefore exactly to the single space required. It has in fact already been explained that the advance of the carriage is a function, not of the amplitude of the movement of the mobile dog 1032, when it starts in the direction of the arrow 1063, but of the amplitude of its return movement in the direction of the arrow 961.

It is to be noticed that in this fourth case the movement of the mobile dog is the same as in the second case when is struck one character of group I alone without any spacing and the mobile dog starting from the position "minus one."

5TH CASE—SEE FIGS. 110, 111, 112, 113

One or several characters are struck simultaneously and at the same time the one or the other of the two normal single space keys Esc*t* FIG. 4. The different parts of the device for integration of the spaces and of the escapement device are, before any striking, in the position called "zero" shown in FIGS. 110, 111, 113 in full lines. In particular, the stop 1037 called "zero" is not retracted and locks the mobile dog 1032.

The relative positions of the space slide 1039, of the characters slide 1041, and of the rollers support 1148 are shown in full lines in FIG. 111.

When striking, the three slides advance: the escapement slide 970, the space slide 1039 and the character slide 1041. It is known that the two latter have a movement of the same amplitude (in the example approximately 10.5 mm.) and their movements are theoretically simultaneous and of the same speed. Nevertheless, they can have some advance; in relation to one another this lack in synchronization proceeding either from imperfections in the construction, or from the fact that the operator does not depress the different keys at the same time or at the same speed. The escapement mechanism is conceived in such a way as to palliate these irregularities, as it will be explained.

However, the functioning will first be described assuming that the two slides in question advance at the same time and at the same speed. The motion drawings correspond to this case.

It has been noticed that the escapement slide 970 advances only at the end of travel of the intermediate levers and only by approximately 4 mm. in the example. Its travel is the same in all the cases in which characters are struck; it is shown in FIGS. 99 and 102 in connection with the first and second cases.

The push-plate 1145 of the space slide 1039, after a dead run, meets the left roller 1150 and drives it back, causing the roller support 1148 to pivot in the direction of the arrow 1172 around its axle 966.

During this pivoting the roller support does not advance as it is held by the return spring 1151 of the stop 1037 called "zero."

But at the same time, the character slide 1041 has advanced, theoretically at the same speed as the space slide 1039. Now, it will be noticed that in starting from the rest position, the push-plate 1142 of this character slide to meet the corresponding right roller 1149, has to travel a shorter distance than that which has to be traveled by the push-plate 1145 of the space slide 1039, to meet the corresponding left roller 1150. Considering that this particularity of the setup, when the right roller 1149, is pivoting, arrives at the position beyond which it would get in the path of the push-plate 1142, the latter, in general, has already arrived at this lever. It follows that the right roller 1149, in general instead of getting in this path of the plate 1142, butts against the left face of this plate.

The pivoting of the roller support 1148 being thus stopped and the space slide 1039 continuing to advance, the push-plate 1145 of this slide continues to push on the left roller 1150. But this roller being no longer able to move in the direction of the arrow 1172, cannot withdraw from the passage which is followed by this plate 1145. The plate 1145 drives therefore the roller 1150 with it forward (direction of the arrow 959), and this drives, in the same movement forward, the rollers support 1148 and its lever 1153; this lever pivoting around its axle 1158 by its upper part drives the lower part of the stop 1037 called "zero." This stop 1037 pivots around its axle 1161 in the direction of the arrow 1163 to the end of the travel of the space slide 1039 and of the characters slide 1041. The positions of the end of travel are shown by crosses, FIGS. 110 and 111. At that time the lug 1165 which is carried by the lug 1037 has been carried beyond the meshing position by the pawl 1164. The FIG. 111 only shows the rest position (full lines) and end of travel (crossed lines). The back positions are shown in FIG. 112.

It is to be noticed that, from the moment when the right roller 1149 is against the left face of the push-plate 1142 which is carried by the characters slide 1041, the following variations can occur:

Either the space slide 1039 and the characters slide 1041 have advanced at the same time and at the same speed and continue to do so up to the end of their travel; in this case the roller 1149 does not receive.

Or, one of the slides advances faster than the other. In this case, the right roller 1149 revolves in one direction or in the other according to the slide which advances the faster, and this avoids a friction.

It can also happen that, contrarily to the theoretical functioning and for one of the reasons stated above (imperfection of construction or lack of synchronism of the strokes) the push-plate 1142 of the character slide 1041 has not yet reached the level to which the right roller 1149 is brought, when the latter arrives on the path which is followed by this plate 1142. In this case, the plate 1142, not stopping the roller 1149, the roller support 1148 continues to pivot in the direction of the arrow 1172, owing to the push which continues to be exerted by the push-plate 1145 of the space slide 1039 on the left roller 1150. If this happens, the left roller 1150 can sometimes pivot until it escapes the push of the plate 1145. From that moment the plate 1145 runs beyond the roller 1150 and the latter rolls on the right face of this plate 1145. This plate, by continuing to advance, therefore does not cause the roller support 1148 to advance in the direction of the arrow 959, but in this case, the right roller 1149 has entered the path which the push-plate 1142 of the character slide 1041 has to travel. This plate 1142, by continuing to advance, at last meets the right roller 1149. From that moment it drives it in its travel and causes the roller support 1148 to advance. As a matter of fact, the right roller 1149 cannot withdraw by pivoting of the roller support 1148 in the direction of the arrow 1171, since the left roller 1150 is then stopped against the right face of the push plate 1145 of the space slide 1039.

Therefore, in this case, the rollers support 1148 advances, but it is pushed by the character slide 1041, whereas in the theoretical case it is pushed by the space slide 1039. From the moment when the characters slide 1041 advances with a speed superior to that of the space slide 1039, the left roller 1150 changes its rolling direction on the right face of the push-plate 1145 of the space slide 1039.

Therefore, whether the advance of the space slide 1039 and characters slide 1041 happens at the same time and at the same speed or not, the rollers support advances by the same length and retracts the stop 1037 called "zero" beyond its meshing position.

On the other hand, the escapement slide 970 has advanced like in the other cases of striking of characters and its push-screw 985 has met the foot 1016 of the dog block 1014, 1015, causing the latter to tilt.

As soon as the space slide 1039 or character slide 1041 returns to its rest position (direction of the arrow 958, FIG. 111) the rollers support 1148 comes back in the same directions, pulled by the spring 1151, driving the return of the stop 1037 to its rest position (full lines, FIG. 110), but the movement of these parts is very quickly stopped by the pawl 1164 which has pivoted in the direction of the arrow 957 by the action of its spring 1168 around its axle 1167.

During that time, the mobile dog 1032, after having disengaged, rotates in the direction of the arrow 1063, by skipping a number of teeth in relation to the number of characters struck. (FIGS. 110 and 113) are the assumption that it has been struck in group II. Afterwards, the mobile dog, meshed again, comes back in the direction of the arrow 961 to its rest position. But the stop 1037 called "zero" being retracted, the mobile dog 1032 does not find it on its way back. It continues therefore its travel up to position "minus one" against the stop 1060.

The return travel of the mobile dog is thus increased and the carriage advances by one additional single intervale which corresponds to the striking on the space key effected at the same time as the striking of one or several characters.

6TH CASE—SEE FIGS. 114, 115, 116, 117

One or several characters are struck simultaneously and at the same time, one or the other of the two space keys Esc*t*, FIG. 4, the escapement device and the integration of the spaces being, before striking, in the position called "minus one" shown in dotted lines in FIGS. 114, 115, 117. It is known that in this position the stop 1037 called "zero" is retracted and stopped against the mobile dog 1032. The starting position is therefore the same as in the second and fourth cases.

Considering that in this sixth case, characters and spacing are struck at the same time, the only difference presented by this case as compared to the fifth case is constituted by this particularity of starting position and the differences which result from it for the starting travels of the different parts.

The positions in respect to starting of the escapement 970, space 1039, character slides 1041 and of the roller support 1148 are shown in dotted lines in FIG. 115. The layout with crosses indicates the end of travels.

When striking, the three slides 970, 1039, 1041, advance. Their respective movements are exactly the same as in the fifth case, the eventual anomalies of synchronization stated for this fifth case included.

Before striking, the stop 1037 called "zero" being locked by the mobile dog 1032, the latter having prevented it from coming back completely to its rest position (in full lines, FIG. 110), it follows that the roller support 1148 (FIG. 115) is slightly advanced (dotted lines) with respect to its rest position (full lines, FIG. 111). Consequently, the push-plate 1145 of the space slide 1039 meets the left roller 1150 (FIGS. 115 and 116) only after a dead run longer than in the fifth case. However, when it meets it, the effect is the same as in the fifth case; that is, that the space slide 1039 causes the roller support 1148 to pivot in the direction of the arrow 1172. The character slide 1041 having advanced theoretically the same length as the space slide 1039, the right roller 1149 meets the push-plate 1142 of the character slide, as in the fifth case. From that moment, as the pivoting of the roller support 1148 can no longer continue, this support is driven forward (arrow 959) by the push-plate 1145 of the space slide 1039 as in the fifth case.

It is to be noticed that from the moment when the mobile dog 1032, FIG. 114, which locked the stop 1037 called "zero," withdraws in the direction of the arrow 958 by disengaging itself, the stop 1037, pulled by the action of the spring 1151, has a tendency to follow the mobile dog 1032 and to complete its travel to its rest position shown in full lines in FIG. 110 in connection with the fifth case. But considering that the roller support 1148 (FIG. 115) is pushed forward by the space slide 1039, as explained above, the stop 1037 called "zero" is on the contrary returned to beyond its retracted position by the pawl 1164 (FIG. 114) as in the fifth case. As a matter of fact, from the moment when the roller support 1148 is pushed forward (arrow 959) by the push-plate 1145 of the space slide, the movements of all the parts of the escapement device and of the integration of spaces are the same as in the fifth case. This identity of movements in the fifth and sixth cases subsists in the adjustment. The identity of the movements of all the parts continues during the return of the slides up to their respective rest position (full lines). As in the fifth case, in the course of the return, the "zero" stop 1037 is therefore kept back (dashes, FIG. 114), and then released by the mobile dog 1032; finally, it is stopped in the locked position shown in dotted lines in FIG. 114 and prevented from returning to its rest position by the same mobile dog 1032 which, not being stopped by the "zero" stop 1037, pursues its return travel up to the position "minus one" (dotted lines in FIGS. 114 and 117). FIG. 116 shows also in dotted lines the position that the rollers support 1148 takes when the stop 1037 is stopped by the mobile dog 1032.

The mobile dog 1032, having continued its travel up to the position "minus one" shown in dotted lines in FIG. 117, the amplitude of the escapement that the striking of the character(s) alone would have produced is increased by one single interval corresponding to the striking of the space key, exactly as in the fifth case. The only difference between the fifth case and the sixth case is in the position of the parts at the start, but not in the final effect.

TABLE OF THE SIX CASES

What is explained above successively for the six possible cases, in respect to the movements of the three slides 970, 1039, 1041, their action on the dog block 1014, 1015 and on the roller support 1148, the action of the latter on the stop 1037 called "zero," as well as the amplitude of the resulting escapement, is summarized in the following table.

The escapement device is completed by diverse other elements which are adaptations of means utilized in the escapements of the usual alphabetical machines. They are the back space device and the connections which connect the tabulation device to the escapement device. These auxiliary parts of the escapement device are shown by the drawings. As they are of known forms they will not be described.

| 1 | 2 | 3 | 4 | 5 | 6 | 7 | 8 | 9 |
|---|---|---|---|---|---|---|---|---|
| No. of the cases | What is struck | Position of the stop "zero" 1037 and of the mobile dog before striking | Advancing slide | Slide which tilts the dog's block. | Movement of the roller's support and its action on the stop "zero." | Position stop "zero" at the return of the mobile dog. | Number of teeth skipped by dog at the start and of intervals covered at return | Position of the mobile dog after its return |
| 1 | n Characters without interval. | Stop nonretracted. Dog position "zero." | Of characters 1041 and escapement 970. | Of escapement 970. | Does not move. No action. | Not retracted. | n at start, n at return. | Locked by stop "zero" (position "zero"). |
| 2 | n Characters without interval. | Stop retracted. Dog position "minus one." | Of characters 1041 and escapement 970. | Of escapement 970. | Draws back when the stop "zero" is (unratcheting) released. | Not retracted. | n+1 at start, n at return. | Locked by stop "zero" (position "zero"). |
| 3 | 1 interval without character. | Stop nonretracted. Dog position "zero." | Of space 1039. | Of space 1039. | Pivots, then comes back without action. | Not retracted. | 1 at start, 1 at return. | Locked by stop "zero" (position "zero"). |
| 4 | 1 interval without character. | Stop retracted. Dog position "minus one." | Of space 1039. | Of space 1039. | Pivots. Returns without action. Draws back in "rest position." | Not retracted. | 1+1=2 at start, 1 at return. | Locked by stop zero (position "zero"). |
| 5 | n Characters plus 1 interval. | Stop nonretracted. Dog position "zero." | The three: 970, 1039, 1041. | Of escapement 970 and space 1039. | Advances. Retracts stop "zero" (and ratches it). Draws back in position locked by dog. | Retracted. | n at start, n+1 at return. | Locked by stop "minus one" (position "minus one"). |
| 6 | n Characters plus 1 interval. | Stop retracted. Dog position "minus one." | The three: 970, 1039, 1041. | Of escapement 970 and space 1039. | Advances a little more and retracts (ratches) again stop "zero." Draws back in position locked by dog. | Retracted. | n at start, n+1 at return. | Locked by stop "minus one" (position "minus one"). | when the synchronism among the movements of the three slides is altered by the lack of simultaneity in the strikings of characters and spacing or by slight imperfections The form, the relative dimensions and the disposition of the different parts of the escapement device correspond to the form and to the disposition of the other elements of the machine; but they could be different, in particular, if another device for striking were chosen among those known. This other device for striking would then be adapted to the devices particular to the invention as has been done for the device for striking chosen for the example.

*Obtaining of Multiple Spacings by Utilizing the Escapement Device Corresponding to the Strikings of Characters*

A description will now be given of the structure and the functioning of the devices which, in the machines of the invention, make it possible either separately, or at the same time as the striking of characters, multiple spacings, that is superior to a single interval.

In the usual machines there is the possibility of obtaining multiple spacings by the device called "tabulation." Such a device has been adapted in the machines of the invention, as is explained in another chapter. The tabulation devices make it possible, as known, to obtain multiple spacings the right extremity of which is determined previously by the setting of tabulation stops. These extremities, after a given adjustment, are therefore in each case always located at the same spot in each of the successive lines. The devices of the invention make it possible on the contrary to provide spaces of varied lengths at any place of the line and variable according to the lines.

This result is obtained by utilization of the escapement device properly so called (dog block and escapement wheel, mobile stop of the mobile dog, integration device of the single spaces). These different devices have been described in another chapter. For obtaining multiple spaces with these devices is now going to be explained.

It has been noticed that, when one of the single space keys is struck, without any striking of characters, this striking provokes the disengagement of the mobile dog 1032. The latter revolves in the direction of the arrow 1063 up to against the mobile dog of group I, 1065. It meshes again afterwards and comes back to its rest position against the stop called "zero" 1037. Its return travel corresponds to one escapement of one single interval which, in this case, remains blank, since no character has been printed. It will be noticed that, in this case, the striking having been made through one single space key, it is the space slide 1039 which has caused the tilting of the dog block.

*Description of the Device by Means of Which an Additional Spacing of One Interval Corresponding to the Group I May Be Obtained.*

The concerned device consists in disposing an additional longitudinal lever 512 (FIG. 22) in the group I, that is at a place such as, in its angular movement, this lever would drive the back plate with small tongues 1078 of group I, as the longitudinal levers of characters of this group do. But this additional lever operates no type bar. In the example, the latter 512 (FIG. 22) has a form similar to that of the longitudinal levers of characters and is located in the same wave as the latter ones. To this lever corresponds a key Esc*t* I FIG. 4, column 4, line 9 which can either be mounted directly on the corresponding longitudinal lever, or be mounted on a sliding rod, like the character keys. It is this latter solution which is adopted in the examples.

*Functioning*

The key Esc*t* I being struck, drives the longitudinal lever 512. The latter imparts to the plate 1078 of group I (FIGS. 56, 57) the same movement as if a character of group I had been struck. The effect on the escapement is the same as in the case of striking of one character (1st or 2nd of the 6 possible cases described above), but, as nothing is printed, the escapement which is of one single interval, corresponds to one single blank space.

The result in the text is therefore the same as if one of the two single space keys Esc*t* FIG. 4 had been struck.

But if, at the same time as the key Esc*t* I of the additional lever 512, one of the two normal single space keys Es*pt* FIG. 1 is struck, the effect, insofar as the escapement is concerned is the same as if a character of group I and this normal single space key (5th or 6th of the six possible cases described above had been struck simultaneously). This latter key causes the retraction of the stop 1037 called "zero," FIGS. 110 and 113 or 114 and 117. It follows that the mobile dog, after having been stopped by the mobile dog 1065 of group I, comes back and, as it does not meet the stop 1037 called "zero," extends its return travel to the stop 1060 called "minus one." The escapement is therefore of two intervals.

Considering that the key Esc*t* I does not cause any printing, the escapement of two intervals so obtained corresponds to a blank space of two intervals.

*Description of the Device by Means of Which are Obtained Additional Spacings of Several Intervals, Each Interval Corresponding to One of the Striking Groups.*

So as to be able to obtain with the machines of the invention multiple spaces greater than two single intervals, it suffices to place an additional longitudinal lever in each of the groups II, III, IV, V (this number of groups can be greater). Each of these levers operates the corresponding back group plate, as has been explained for the group I, but without operating any type bar. It follows that the total escapement obtained corresponds to a blank space of several intervals whose number depends on the group to which the space key struck belongs.

All these additional longitudinal levers may have a form similar to that of the longitudinal levers corresponding to the character keys of the lines of the keyboard in which the keys of these additional levers are respectively placed.

These additional longitudinal levers may be placed between the longitudinal levers of characters, as for example, the longitudinal lever 512 for group I. Such additional longitudinal levers are not shown in the figures which show the longitudinal character levers, but the corresponding keys in the examples of the keyboards of second type, for instance, FIG. 4, have been illustrated.

In order to place these levers one can for instance: suppress a letter in each of the groups in question or place these levers between the character levers as shown for column 7 they are (FIGS. 1–61) i.e. by reducing the space between columns by half; or else the machine can be widened in the proportion corresponding to the additional column.

It is obvious that these additional levers could also be placed lower than the plane of the longitudinal charcater levers. In this case, they would act respectively on the corresponding group plates, not by pushing, but by pulling, by means of a small pulling rod, articulated if need be.

*Functioning*

If the multiple space key corresponding to the additional longitudinal lever of group II is struck, the action on the escapement device is the same as when a character of group II is struck. In particular, the mobile stop 1065 (FIGS. 110—113) of group II, being retracted, the mobile dog 1032, having been disengaged, continues its initial travel in the direction of the arrow 1063 to the mobile dog 1066 of group III.

Its return travel to the stop 1037 called "zero" constitutes an escapement of two intervals and, as no character has been printed, this escapement corresponds on the paper to a blank space of two single intervals.

If, at the same time as the multiple space key of group II, "Esc*t* II," FIG. 4, a normal single space key Esc*t* is struck, the latter causes the retraction of the stop 1037 called "zero," FIGS. 110—113, and this enables the mobile dog to continue its travel to the position called "minus one" against the stop 1060. The escapement and consequently the blank space has thus been increased by one interval and corresponds to three intervals.

More generally, if a multiple space key of a group of order $n$ is struck, the mobile dog corresponding to the plate of this group is retracted as if a character of this group $n$ had been struck and the mechanism already described causes an escapement of $n$ single intervals which, since no character has been printed, corresponds to a multiple blank space of $n$ single intervals. It is nevertheless to be noted that the striking on a multiple space key of group $n$ entails the withdrawal of the mobile dogs corresponding to the groups of the preceding order, as in the case of striking of characters because of the unilateral linkings of the levers of group plates and of the stop rods, as has already been explained in another chapter. But if $n$ is greater than two and if no key has been struck at the same time in the group I nor in the group II and if neither of the two normal single space keys Esc$t$, FIG. 4, has been struck at the same time, the dog block is not tilted and there is no escapement. If therefore one wishes to obtain a blank space of $n$ characters, $n$ being superior to two, without striking one of the normal space keys at the same time as the multiple space key of group $n$, it is necessary, at the same time as the latter, to strike, either the space key of group I, which operates the longitudinal lever 512, or the multiple space key of group II.

A blank space of $n$ single intervals is then obtained. The situation is therefore the same as in the first or second of the six possible cases described, except for the difference that there has been no printing.

If, at the same time as the multiple space key of group $n$, one of the two normal single blank space keys Esc$t$, FIG. 4, is struck, the striking of the latter causes the increase of amplitude of the escapement, as in the case of striking of characters accompanied by the striking of a single space key and as has been explained above for the case of striking of multiple space keys of group I or group II.

One then finds oneself back again in the fifth or in the sixth of the possible cases described above, with the only difference that there is no printing.

The total escapement and consequently the total multiple blank space is then of $n+1$ intervals. If, as in the example, the machine is built with five groups, the blank space obtained can therefore reach $5+1=6$ intervals.

The device so described makes it possible to strike, at the same time as a multiple space key of group $n$, one or several characters of groups with a group number lower than $n$. The space in this case, instead of being of $n$ intervals or of $n+1$ intervals, according to the case, is reduced by a number of intervals equal to the number of characters so struck. The characters are located on the paper at the same spot as if they had been struck alone without any striking of multiple space key. The remaining blank space is therefore sometimes separated in several parts by these printings. Thus, for example if, at the same time as the multiple space key of group IV, a character has been struck in the group II, this character being located at the same place as if it had been struck alone, there follows after it a blank space of $4-2=2$ intervals. If, at the same time a normal single space key had been struck, there would have been after the character a blank space of $4+1-2=3$ intervals. But if, in these two cases, no character has been struck in group I, there follows an additional blank space of 1 single interval at the printing point corresponding to group I, that is which is located in front of the impression of the character of group II which has been struck.

In other words, if, at the same time as group characters with group number below $n$, is struck, the multiple space key corresponding to group number $n$ is struck, the escapement is of same amplitude as if a character had been struck in the group $n$ and if, at the same time, a normal single space key Esc$t$ is struck, the total cumulated escapement is of $n+1$, but the characters of lower group numbers that have been struck are printed at the printing points corresponding to their respective group numbers in the total space of $n$ interval or of $n+1$ intervals.

*Different Widths Reserved for the Different Characters*

The escapement device of the invention makes it possible to reserve widths proportional to the width of certain characters. Thus, for example, it is desirable that a greater place be reserved for "M" and "W" than for "I" and "O."

This result is already obtained in certain usual alphabetical machines, but by devices very different from those of the invention and much more complex.

In the case in which the machine is alphabetical, the device of the invention makes it possible to utilize a very great number of different widths which can range up to at least five intervals or spaces. This possibility can be utilized to the maximum for the striking in languages whose characters are of very different widths, for instance in the Arabic language.

In the case in which the machine is alphabetical, there is no limit to the utilization of these different widths. They can be utilized for the different characters, whatever their place in the syllables.

When the machine is syllabic, widths greater than the most usual one can only be reserved, without any utilization limit, for only two categories of characters:

FIRST CATEGORY

They are those which are always loacted in last position in the group of characters struck simultaneously. In this case, the striking of the corresponding key produces an escapement of greater amplitude by one of the following means:

*First means.*—The longitudinal lever corresponding to the character considered has been disposed so that it acts on the back group plate with small tongues which corresponds to a group with a higher group number than the group to which the beginning of the striking point of this character belongs. For example, if the letter M of group III operates group plate IV, one provides a double space width for the printing of this letter. If it operates group plate V one provides a triple space width.

*Second means.*—The construction is made so as to establish a unilateral linking between the longitudinal lever of the character considered and the longitudinal lever of normal single spacing or with a multiple space lever of a group with a higher group number. Striking on the key corresponding to this charatcer then has the effect of integrating an additional space (single or multiple) in the cumulated escapement.

Second category of characters for which greater widths can be reserved, if the machine built according to the invention is syllabic—

In the case of a syllabic machine, greater widths than the customary one can also be reserved for characters which are always located in first position in the group of simultaneous strikings. The means utilized in this case is the same as that which has been described for the utilization of blocks of multiple characters at the beginning of the groups of strikings, such as for example "ch" or "sch" for the Germanic languages. It has been said that the utilized means in this case consists in striking a single or multiple space key at the same time as the striking, or the group of simultaneous strikings, which has normally to precede the striking of a wider character.

It is evident that this process might be used to reserve a double or triple space width, for instance, for the "M" or the "W" of group I.

Third category of characters for which a number of spaces can be reserved, if the machine built according to the invention is syllabric—

These are the characters which, in a syllabic machine, are located neither in last position nor in first position in the group of simultaneous printings. For these characters greater widths than the most usual can be reserved by one or the other of the two means described above on the sole condition that to the right of these wider characters should be struck at the same time only characters whose striking point is located (because of the groups they belong to) beyond the width reserved for the wide characters considered. For instance, if, for the letter "M," two intervals are reserved, and if this letter is struck in group III, the latter occupies on the paper the striking points 3 and 4; consequently, one can only strike, at the same time as this "M," characters of group V (higher than V if the machine comprises more than 5 groups).

It is obvious that in all the above described cases one has to reserve, on the cushion of type bars in rest position, the necessary spaces for the wider characters to be disposed either between the others or to the right or left of the others.

The excess spaces which may occur between the last character of any given group and the first character of the following group can be utiilzed for this purpose.

Within a group of characters one can take advantage of the fact that certain characters can be narrower than the average (for example I or J) to place beside one of the, or between two narrow characters, a character wider than the average (for example M or W).

The above explanations suffice to enable one to adapt the means indicated for utilizing or supplementing the devices previously described. It has therefore not seemed necessary to have these means shown in the drawings.

*The Movement Which Displaces the Mobile Stops Can Be Communicated by Parts Other Than the Longitudinal Levers*

In the escapement device that has just been described the movement of the longitudinal levers initiated by coming from the keys to operate the group stops by group plates which has been given as an example.

This movement could also be communicated by a category of parts other than the longitudinal levers. In fact, all the elements of the same kind set in motion by the keys (for instance: intermediate levers or type bars, etc.) have movements of identical amplitude. The movement could therefore be taken from any of these categories of parts to operate group bars similar to the plates with small tongues already described.

However, it will be well that the movement necessary to bring about the tilting of the dog block and the movement necessary to operate chiefly the characters slide and, subsidiarily, the raising of the ribbon, be taken on distinct categories of main parts and by means of different connections. This will permit the separate adjustment of the two categories of movement. Moreover, one can then start the action on the mobile stops of the mobile dog from the beginning of the travel of the keys, and cause the tilting of the dog block only around the end of travel of the keys.

This is what has been done in the mechanisms of the machine described entirely as an example.

One can nevertheless choose other moving parts to bring about the actions in question, while keeping the two above advantages.

But another consideration has contributed to choosing the longitudinal levers to operate the mobile dogs. If one chooses, for instance, the heels of the type bars one is hindered by the following particularities:

The group bars are curved, and this renders more complex the mechanism which transmits their movement to the center of the machine opposite the mobile dogs;

The segments displace themselves separately from lack of others, and this complicates the support of these group bars.

If the intermediate levers are chosen, one has also to utilize curved group bars so as to obtain movements of same amplitude for the different strikings in the same group.

Whether the type bars or the intermediate levers are chosen, the striking is harder than if one chooses the longitudinal levers.

In spite of the above reservations, the machines of the invention can be built by using such variations.

*Variations for Setting Up the Mobile Dog and Fixed Dog*

In the described example the mobile dog 1032 is mounted so as to slide in the direction of the arrows 958 and 959 (FIGS. 63 and 64) and is centered on the axle of the escapement wheel 1013 to drive the wheel from the rear. The fixed dog drives the wheel from the front. Now, the movement could be reversed, the mobile dog driving the wheel from the front and the fixed dog driving the latter from the rear.

The drive of the mobile dog can cause the latter to slide on the axle of the wheel, as has been seen in the example in FIGS. 62, 64, 66, 68, 63, 65, 67, 69 or on an axle which will be proper to it but which will be fixed with reference to the frame. Nevertheless, the mobile dog instead of sliding could also revolve simply around an axle which would be proper to it and which would move with it. For example this axle could be supported by the dog block.

One can also set up the assembly constituted by the dog block and the parts it carries, as well as the axle of the rotating mobile dog, on a tilting support with double pivoting as the universal escapement bar 969 is mounted. A rod secured to the assembly and so mounted then slides through a hole of a fixed part hold the assembly approximately horizontal.

*Form of the Mobile Dog and of Its Return Spring*

It is evident that the rotating mobile dog 1032 can have forms differing from those of the FIGS. 62, 64, 66, 68, 63, 65, 67, 69. In particular its form will be influenced by the form of its return spring as well as by the form and position of the fixed and mobile dogs which have to stop it.

Its spring can be of any form, for example in spiral or helicoidal disposed around the axle or be a single blade, or one can utilize a coil-spring extended by a cable or thread (for instance of nylon) hooked onto a sector of a grooved pulley, as in the example of the FIGS. 62, 64, 66, 68, 63, 65, 67, 69.

*Escapement Mounted on Racks*

An escapement mounted directly on a rack without an escapement wheel can be provided. In fact as a rack can be considered as a cog-wheel with an infinite radius, the case of the escapement on rack is but a special case of the escapement on wheel. Therefore, in principle, all the devices envisaged up to now are still valid. It suffices to arrange them accordingly.

*Back Space Device*

In the machines of the invention, the back space device is similar to one of those utilized in the usual alphabetic machines. An adaptation has nevertheless been necessary, i.e. in the function of the lateral position of the corresponding longitudinal lever 552, FIG. 22.

This lever 552 has a form which makes it possible to operate by means of a key mounted similarly to the adjoining ones. In the keyboards given as an example in FIGS. 1–6 and following as well in FIG. 118, this key 1230 has its sliding rod located in line 2, column 14. Considering that this drive requires on the part of the operator a heavier push than that necessary for depressing the other keys, a wide-surfaced key has been adopted for it. This key can be operated either by several fingers or the fist. For this reason, this key is on a higher level than its adjoining ones on the same lines, FIG. 133.

The lever 552 (FIGS. 22—16) is secured to the axle 1214 (FIGS. 118—122) pivotally mounted on a right-hand bearing 1216 screwed (FIG. 125) and a left-hand bearing 1217 which is secured to the support 1083, FIGS. 56, 57, 94. The axle 1214 carries a second lever 1218 which operates a pulling rod 1219, FIGS. 122—118. On the axle 1214 is mounted a return spring of the assembly 1215. What follows is of a known form and is utilized in certain usual machines. It comprises the lever 1220 (FIG. 62) whose axle 1221 is constituted by a bearing screw, FIG. 68, screwed on another lever 1222 whose axle, perpendicular to the axle 1221, is also constituted by a bearing screw 1223 screwed on the escapement frame 995.

Functioning

When the key 1230 for back spacing column 14, lines 1 and 2 is depressed, the latter, by its rod imparts to the longitudinal lever 552 (FIGS. 22—118), an angular movement that the latter transmits to its axle 1214 (FIG. 122) and to the lever 1218 which is secured to it. The latter, by its extremity, pulls the pulling rod 1219 downwards. This pulling rod operates the lever 1220 (FIGS. 62, 68). The following movements are identical to those of the similar parts in a usual machine: the lever 1222 (FIGS. 66, 68) by pivoting causes the upper part 1224 (FIG. 62) of the lever 1220 to be meshed in the rack 1001 of the carriage, and then pivoting of the lever 1220, FIGS. 62, 68, acting on this rack, moves it with the carriage in the direction of the arrow 1225, FIG. 62, which causes the pawl 1005 to skip one tooth on the pinion 1002. The operator having released the key, the longitudinal lever 552 is biased upwardly by the spring 1215 (FIG. 122) and all the parts return to their rest positions shown by the figures, the carriage having a tendency to return in the opposite direction, but being stopped by the pawl 1005 which has skipped a tooth of the pinion 1002. The back spacing of one interval has thus been effected.

As a matter of course the machines of the invention can be built with any other back space device already known by adapting it to function in the space available.

Tabulation

In the machines of the invention, the tabulation device is an adaptation of one of the known tabulation devices utilized in the usual alphabetical machines. Some of its parts have had to be redesigned or displaced, so as to reserve the required room for the other parts of the machine. An important particularity of this adaptation is the fact the tabulation support 1227 (FIG. 135) has been thrown off center towards the right of the machine with regard to the axle of the latter, so as not to coincide with the back part of the escapement device nor with a connecting device of electro-magnets. Consequently, the tabulation rack 1228 fixed on the carriage and constituted by the tabulation stops and their bracket, has been displaced by the same distance towards the right of the carriage relative to the middle of the cylinder.

The support 1227 and the parts it contains, as well as the rack 1228, are identical to those utilized on certain usual machines. The support is screwed to the lower back part of the base of the machine. In the FIG. 135, where the machine is seen from the rear, the frame of the chimney has been broken away to show the parts which are in the lower part of this support and their disposition with regard to the other parts of the machine. It will be noticed that this support of usual type, has only three connections that is, the one for stop setting (key POS), the one for tabulation (key TAB) and, the one for stop release (key DEP, FIG. 4).

The three keys: for tabulation 1244, for stop setting 1247 and for stop release 1251 are located in the last column on the right of the keyboard, FIGS. 4 and 118. The tabulation key 1244 is of same surface and of same form as the palm keys already described; it occupies in this column the lines 3 and 4.

The key for stop setting (POS.) 1247 is on the 6th line and the key for stop release (DEP.) 1251 is on the 5th line. In the example these three keys are mounted on sliding rods with return springs, like the character keys already described. The tabulation key 1244 is on a higher level than the adjoining keys of the same line, so that it may be depressed, either with several fingers or with the reversed hand towards the right without the adjoining keys being touched. The keys for setting and releasing the stops are also raised in comparison to their adjoining ones of the same line.

The rod of the tabulation key 1229, FIG. 118 acts on the corresponding longitudinal lever 553 in the same way as each character key on its longitudinal lever. The lever 553, from its front extremity down to its lowest point, 1231, has the same profile as the longitudinal levers of characters of the FIG. 26, whose key is on the same line; its travel upwards is limited by the stop 122 common to all the longitudinal levers. To facilitate setting, this lever is in two parts, its front part being fixed to is backt par by the bolt 1232, and by two lugs 1230 and 1244 fixed on the lever 553. The back part 1233 of this lever takes on the form of a stirrup so as to transmit movements to the left part of the tabulation support 1227. The axle 1234, on which this lever is pivotally mounted, passes through a hole in its two vertical parts 1235 on the right and 1236 on the left. This axle is common to the tabulation lever described and to the levers for stop setting 1237 and for stop releasing 1238. These two latter levers 1237 and 1238 have a part in the form of a stirrup like the lever 553. The three stirrups have suitable forms and dimensions for enabling them to be mounted on the same axle 1234 and to make by turns the necessary movement around this axle without driving the two other levers.

The section, FIG. 123 taken along section line W—W of FIG. 122 shows the respective positions of the transverse parts of these three stirrups and of their axle. The left bearing 1239 (FIGS. 118—56) of the axle 1234 is constituted by a projection of the frame-supports of the segments, FIG. 36. The right bearing 1240 (FIG. 56) of this axle is screwed onto the base of the machine. The key for setting the stops 1247 acts by its rod 1241 on the reverse lever 1242 (FIG. 118) which, by a lug 1243 with clip acts on the push-rod 555. This push-rod has its back extremity mounted so as to pivot on an axle 1245 (FIG. 56) which is secured to the lower part 1246 of the stop set lever 1237 is held by a clip as axle 1245. The push-rod 555, FIGS. 118 and 56, when the key is lowered, drives the lever 1237 (FIGS. 56—123) in an angular movement around its axle 1234 in the direction of the arrow 1248, FIG. 118.

When the stop release key 1251 is lowered, the latter, by its rod 1249, acts similarly on a reverse lever 1250 which, by the push-rod 554, transmits the movement to the lower part 1252 of the stop release lever 1238, FIGS. 56—123, the lower part on which it is mounted so as to pivot by an axle 1253 in the same way as the push-rod 1244 on its own lever, but in the opposite direction, as shown in FIG. 56. The back extremities of the three levers 1236, 1238, 1237 (FIG. 56) are located in parallel in the tabulation support 1227 (FIGS. 56—122) and in the suitable slots to act respectively on the corresponding vertical push-rod contained in the aforesaid support, FIG. 122, tabulation push-rod 1254 stops set 1255 push-rod and stops release push-rod 1256.

The support 1227, the three vertical push-rods 1254, 1255, 1256 which it contains and the different elements on which they act, as much in this support as beyond, are identical with those utilized in certain usual alphabetical machines. They will therefore not be described. It is only useful to point out that in case of tabulation the lever 1257, FIGS. 118-122, driven by its axle 1258 in the direction of the arrow 1259, drives the lever 1260, FIGS. 68 and 63; and the latter, by its roller 1261 raises, as is known, the rack 1001 (FIG. 68) of the carriage 1000 (FIG. 135), and this disengages it from the pinion 1002 (FIG. 62) so as to enable the translation of the carriage up to the following stop of the tabulation rack 1228, FIG. 135.

The above description shows that the tabulation device with its drives could be adapted to the machines of the invention, although the latter ones do not exceed the overall dimensions of a usual alphabetical typewriter. Other tabulation devices among those known could be utilized as well, on condition that they be adapted to function in the space available.

Powering

Any machine built according to the invention can be powered by any of the known means, for example by an electric motor or by electro-magnets.

In the case in which an electric motor is utilized, the different levers and connections of the striking device can have known forms other than those utilized in the examples and shown by the drawings.

One can for example adopt the way of driving often used in the alphabetical machines, comprising a smooth rubbered cylinder or a grooved cylinder revolving around its axle and from which the connections take their motion. In this case, the cylinder is disposed in the customary area.

In the back part of the machine, such as it is detailed in FIGS. 135—131, enough space remains on the right and on the left of the escapement so as to dispose the electric motor, as well as the driving device, as usual. It is therefore not necessary to stipulate this disposition.

However, this way of driving by rotating cylinder, which is very adequate in the case of successive single strokes does not correct the variation in time which occur in theoretically simultaneous strokes; these variations are brought about by the different fingers of the operator not descending in exactly the same time.

This is one of the reasons why, in the example shown by the drawings, a particular way of driving has been provided, utilizing either one, or optionally two, electro-magnets. This power device particular to the invention will be described further. Among other advantages, it corrects at least partially the slight variations in the time of strikings which should be theoretically simultaneous, that is, which belong to the same group of strikings and correspond to the same cumulated escapement.

In the syllabic machines of the invention, power operation offers greater advantages than in the alphabetical machines. In fact, the operator having the possibility of printing simultaneously several characters and producing at the same time the spaces, can, within a given time, print a much greater number of words. The expenditure of energy which is required in a given time is greater in the syllabic machine than in an alphabetical machine, though it is not increased in the same proportion as the printing speed. Consequently, the help of a motor or electro-magnets is more valuable in the syllabic machine and contributes more to increase printing speed and to the reduction of fatigue than in the alphabetical machines.

Description of the Power Device

A description will now be given of the special power device provided by the invention, in which energy is supplied by one or, optionally, by two electro-magnets. This device comprises essentially the following elements:

Each of the longitudinal levers has a projection. A transverse bar, called motorization bar, is operated by the electro-magnet(s) and moves downwards, maintaining its orientation. When one or several keys are struck simultaneously, the corresponding longitudinal levers complete an electric circuit which energizes the electro-magnet(s). The magnetic pull by the magnets causes the power to drop abruptly. The device is mounted in such a way that only the projections of the levers which have begun their travel are on the path of the bar. Each projection can form a unit and is secured to its lever, as in the example which is going to be described, or is constituted by a pawl which engages under the power bar.

Close to the end of their travel the levers are automatically disconnected from the bar, either by the pawl being driven back by a fixed cam, or by the path of the fixed projection diverging from the path of the bar.

In the two cases, the levers continue their travel by momentum to make the printing. The circuit is cut off at the end of travel, according to the setting, either by the levers, or by the power bar, or by both.

The levers and the power bar return to rest position biased by their respective return springs.

A description will now be given of a particular form of this device shown as an example in the drawings.

The whole device is shown in profile from the left of the machine in FIG. 125 and in plan view in FIG. 131.

It comprises the mechanism for closing and breaking the circuit, and the electro-magnets with the driving mechanism of the longitudinal levers.

The mechanism for closing and breaking the circuit comprises, in particular, two symmetrical pawls 1301 and 1302, details are shown (FIGS. 128, 129) of which pivotally mounted one on a support 1303 fixed on the back extremity of the space slide 1039, and the other on a similar support, fixed on the back extremity of the character slide 1041. These two pawls are acted upon to pivot in a horizontal plane, respectively, in the direction of the arrows 1304 and 1305 by respective springs such as 1306. In rest position, the space pawl 1301 and the character pawl are both engaged on the upper extremity of the lever 1308. This lever can pivot in a vertical plane in the direction of the arrow 1309 (FIG. 125) around its axle 1310. This axle is mounted on a support 1311 (FIGS. 125—135) screwed to the base of the machine.

The front extremity 1312 of the lever 1308 (FIG. 125) is on the lever 1313 (FIG. 135) of a micro-contact 1314 of any known model. In rest position the front extremity 1312 of the lever 1308 is against the stop 1315 which is screwed to the back face of the base of the machine. On the terminals 1316 and 1317 (FIG. 125) of the micro-contact 1314 are fixed the two wires 1318 and 1319 of the electric circuit which passes through the two electro-magnets 1320 and 1321, FIGS. 131 and 132.

The micro-contact 1314 is switched on in such a way that, in rest position, that is when its lever 1313 is in raised position as in FIG. 135, the circuit is cut. When this lever is lowered the circuit is completed.

The lever 1313 is biased to a raised position by the action of a not visible spring contained in the casing of the micro-contact 1314. The respective front parts of the pawls 1301 and 1302 comprise an extension 1322 for the pawl 1301 and 1323 for the pawl 1302, FIG. 129. These extensions are directed towards the center of the device (FIG. 135) and are counter-bent so as to superpose themselves without butting one against another, when either of the two pawls or both pivot on their respective axles.

The device comprises, moreover, a stop in the form of a plate 1324 (FIGS. 125—135) disposed vertically at an equal distance from the two slides and at a height to meet the extensions 1322 and 1323 of the two pawls (FIGS. 131—129) when these pawls advance.

This stop is mounted in such a way that it can be easily moved forward or backwards so as to adjust the length of the travel that the extensions 1322 and 1323 of the two pawls have to cover before reaching it. This is a hieved by the following setup: the stop in the form of a plate 1324 (FIGS. 125—129) is extended upwards and passes through a slot of the shoe 1173 of the support 1120 of the mobile dog, FIG. 64. This slot guides the plate, when the latter is brought nearer or farther from the pawls. This plate is secured to a ring mounted free to rotate on the axle 1325, FIGS. 131, 128. The back part 1326 of this axle is extended beyond the mechanism and is milled so that the fingers can easily cause the axle to rotate. The diameter of its front part being smaller than the remainder, the ring of the stop plate 1324 cannot slide backwards on the axle. This ring is moreover prevented from sliding on the axle towards the front by a washer 1327 fixed on this axle, after mounting the ring. The front part of the axle is threaded. It is screwed in an upright 1328 (FIGS. 131—130) which is fixed onto the shoe 1173, FIG. 64. Consequently, when the axle is screwed or unscrewed, the plate gets farther or nearer from the pawls.

The two electro-magnets 1320 and 1321 are identical and are mounted symmetrically on the right and left parts of the machine. Only the setting of the left one 1320 will be described.

These electro-magnets are of known type. They are built for the required power and for the current that one wishes to use. For instance, alternating 110 volts, 50 cycles.

The electro-magnet 1320 is fixed by screws 1329, 1330, 1331, 1332 (FIG. 125) to the vertical part of the support 1333. The lower extremity 1334 of this support, shown in dotted lines is bent horizontally and screwed onto the crossbar 874 (FIGS. 29 and 125) which is itself fixed on the base of the machine. The upper extremity 1335 of the support 1333 is bent horizontally and fixed by the nut 1336 under the upper crossbar 875, 876 (FIG. 34) of the segments support which is fixed to the base.

The support 1337 (FIG. 132) of the right electro-magnet 1321 is symmetrical with the left one and mounted in a symmetrical way with regard to the axis of the machine.

Each electro-magnet comprises a plunger rod such as 1338 (FIG. 125) the shocks of which are deadened at the end of travel by a stop of rubber or any other elastic or sound-proof material. The lower extremity such as 1339 of this plunger rod (FIG. 127) is coupled to the lever 1340 by a small connecting rod 1341 pivotally mounted on the axle 1342 and on the axle 1343 which is bolted to the lever 1340, FIGS. 125, 132. This lever has a tube 1344 (FIG. 132) adjusted on the cylindrical rod 1345 and fixed on the latter by conical pins such as 1346 and 1347. The rod is mounted so as to pivot between two bearing points 1348 and 1349 screwed in the base of the machine and adjustable, with counter-nuts 1350 and 1351.

To the left lever 1340 and to the axle 1343 corresponds the right lever 1352 and an axle 1353, the form and mounting of which are symmetrical with regard to the axis of the machine. On the front parts of these levers is set the crossbar 1354 (FIG. 132). This crossbar is secured on the right to the plate 1355 which carries on its back part a fixed lug 1356 which extends through the lever 1352 and has a grooved projection used for fastening an end to the return spring 1357 thereto. The plate 1355 is fixed to the lever 1352 by two screws 1358 and 1359, the latter not visible in FIG. 132. The left plate 1360 is fixed to the lever 1340 in the same way as the one on the right with the only difference that the central screw 1361 (FIG. 127) has a head countersunk in the plate.

A rigid pivotally mounted frame (FIG. 132) comprises: the left lever 1340 and right lever 1352, their back fixed axles 1343 and 1353, the rod 1345 forming the pivoting axle of the frame and the front cross 1354. This combination can pivot on the points 1348 and 1349.

On the front crossbar 1354 is pivotally mounted the power bar 1362. The latter has its lower edge 1262 bent forward at a right angle to engage the longitudinal levers for power actuation; this engaging will be described further. The angle section (FIG. 127) of this pivoting bar gives, moreover, to the latter a good rigidity with a light weight. The bearings of this power bar 1362 are constituted by the front extremity of the plates 1360 and 1355. The pivotal power bar 1362 (FIG. 132) carries on the left the axle 1263 and on the right the axle 1264. The latter has its extremity mounted free in a hole of the plate 1355. The left one 1263 passes free through a smooth hole of an additional reinforcing plate 1360. This plate is mounted on the lug 1265 which has been consequently extended and is held by the screw 1361 (FIG. 127) which is screwed onto the lever 1340 and holds at the same time the plate 1266 and the plate 1360. The latter is secured to the crossbar 1354. Theoretically the rigid frame pivoting between the points 1348 and 1349 could be in one piece, but its composition as described makes it possible to introduce its different parts into the machine separately to facilitate mounting and dismantling.

The pivoting rigid power is acted upon in rotation in the direction of the arrow 1267 (FIG. 127) by two identical return springs, on the left 1268 and on the right 1357 (FIG. 132) whose lower extremities are hooked respectively on the lugs 1265 and 1356 and whose upper extremities are hooked on the supports 1269 and 1270. These supports are of a symmetrical form with regard to the axis of the machine and are screwed inside the base of the machine by two screws such as 1271 and 1272 (FIG. 127) for the left one. Their upper parts 1273 and 1274 and lower parts 1275 and 1276 are bent horizontally towards the axis of the machine. The lower parts carry the adjustable stop screws 1277 and 1278 with counter-nuts, which limit the travel of the pivoting rigid frame; the levers 1340 and 1352 butting on these screws.

The pivoting power bar 1362 is acted upon in rotation in the direction of the arrow 1279 (FIG. 127) by a spring 1280. But in rest position its travel is limited by the adjustable stops 1281 on the left and 1282 on the right, FIG. 132. The latter ones are fixed on the outer part of the base of the machine (FIGS. 127, 131) by two screws such as 1283 and 1284 for the left one and which pass through a stud-hole such as 1285 enabling the adjustment of the stop. These stops are located on the outer part of the base so as to facilitate their adjustment. It follows that the pivotal power bar 1362 (FIG. 132) has its left extremities 1286 and right ones 1287 extended. They pass through two holes arranged in the base such as 1288, FIG. 134, the extended form of which enables the travel of the power bar 1362 downwards.

On the small tongue such as 147 (FIG. 125) of each of the powered longitudinal levers such as 502 or 524 (FIGS. 22 and 125) is screwed a plate such as 1289 which has a triangular lug such as 1290, the upper part 1291 of which has a projection 1292. This projection has no function in the power actuation. It has only as an end of line stop, as has been described. The triangular lug 1290 receives the action of the power bar 1362 when the latter is lowered. The holes in the plates such as 1289 for passage of the screws such as 1293 and 1294 are enlarged so as to enable the adjustment of the triangular lug vertically and horizontally. Each plate such as 1289 can, after adjustment, be optionally welded on the corresponding longitudinal lever such as 524, or soft-soldered.

*Power Functioning*

It has been noted in the description of the escapement device that the space slide 1039 (FIGS. 128, 129) advances each time that a single space key is struck, that the characters slide 1041 advances each time that a character key is struck and that the two slides advance at the same time when a space key and a character key are struck simultaneously.

Considering that each of these slides carries at its back extremity a pawl 1301 for the space slide and pawl 1302 for the characters slide, these two pawls being, in rest position, engaged the lever 1308 (FIG. 125), each time that a character key or a space key is struck, the corresponding slide, by advancing, drives this lever 1308 by its pawl in an angular movement in the direction of the arrow 1309 around its axle 1310. The front extremity 1312 of the lever 1308 drives in its travel downwards the lever 1313 of the micro-contact 1314. When a character key and a space key are struck simultaneously, the lever 1308 is driven either simultaneously by the two pawls, or by the one which, eventually, has a lead on the other.

As soon as the keys have traveled a few millimeters, the triangular lugs such as 1290 (FIG. 125) of the corresponding longitudinal levers are lower than the lower raised edge 1262 of the power bar 1362, by reason of the corresponding lowering of these longitudinal levers. The device is adjusted in such a way that at that moment the micro-contact 1314 closes or completes the electric circuit which energizes the electro-magnets 1320 and 1321. The latter being energized, their plunger rod such as 1339 (FIG. 127) is displaced suddenly in the direction of the arrow 1295. They drive respectively and simultaneously the levers 1340 and 1352 (FIG. 132) in the direction of the arrow 1296 (FIG. 127) by the small connecting-rods such as 1341 and the axles such as 1342 and 1343. The rigid frame constituted principally by these levers 1340 and 1352, the cylindrical rod 1345 (FIG. 132) and the front crossbar 1354 moves therefore in an angular movement around its axle in the direction of the arrow 1296 (FIG. 127) on the points 1348 and 1349, FIG. 132. The power bar 1362 being driven in this movement, consequently leaves its stops 1281 and 1282. It pivots then at the same time on its axles 1263 and 1264 in the direction of the arrow 1279 (FIG. 127) by the action of its return spring 1280. It follows that its lower edge 1262, while descending, advances until it is in contact with the vertical part such as 1227 (FIG. 125) of the longitudinal levers which correspond to the keys struck, and the lugs of which such as 1290 are already lower than this edge 1262. It will be noticed that in the power plate such as 1289, the upper vertical back edge such as 1297 which is above this triangular lug; this lower part of the edge is further in front than the upper part, as shown in FIG. 126. It follows that when the lower raised edge 1262 of the motorization bar 1362 butts against the vertical parts such as 1297 above the lugs such as 1299 of the levers which have been lowered by striking, this raised edge of the power bar is not in contact with the vertical edge such as 1298 which is under the triangular lugs of the levers which have not been lowered by strikings. The raised edge 1262 of the motorization bar 1362 has therefore no propensity to drive these latter levers by friction in the course of its lowering. On the other hand, this raised edge, continuing its descent, meets simultaneously or successively the triangular lugs of all the levers whose descent had been started by striking. Considering that this descent of the power bar 1362 is much more rapid than the descent of the longitudinal levers caused by the striking of the operator, the continuation of the movement of the longitudinal levers downwards is caused no longer by the energy of the fingers but by the energy of the electromagnets. It is to be noticed that, although the front part of the rigid pivoting frame and consequently the crossbar 1354 runs over an arc around the axle 1345 of this pivoting frame, the lower raised edge 1262 of the power bar 1362, from the moment it has met the plates of the longitudinal levers, runs over the same arc as these plates and their triangular lugs on which the power bar acts. This arc has as center the axle 92 (FIG. 125) of the longitudinal levers. The raised edge such as 1262 remains therefore stopped against the vertical parts such as 1297 of the plates and the engaging of the triangular lugs is not affected by the divergence of the two rotation arcs. If only character keys have been struck, it is the corresponding pawl 1302 (FIGS. 131, 130, 129) which, advancing with the characters slide 1041, drives the lever 1308 (FIG. 125) and brings about the switching on of the electromagnets. As soon as the extension 1322 of this pawl meets the fixed stop-plate 1324, the slide 1041 continuing to advance, this stop-plate compels the pawl to pivot its axle 1299, FIGS. 125, 129, and this releases the lever 1308. The latter, by the action of the return spring which the micro-contact 1314 comprises, rotates in the direction of the arrow 1300 to its rest position; in this position its front part 1312 is against the stop 1315. The lever 1313 (FIG. 135) of the micro-contact being thus again raised, the circuit is broken and the electromagnet(s) are deenergized. The pivoting rigid frame (FIG. 132) comprising the levers 1340 and 1352 as well as the front crossbar 1354 pivots in the direction of the arrow 1267 (FIG. 125) to its rest position, biased by the two return springs 1268 and 1357 driving the power bar 1362. As soon as the extensions 1286 and 1287 of the latter meet respectively the stops 1281 and 1282, FIG. 132, the bar 1362 pivots itself in the direction of the arrow 1363 up to its rest position shown by the figures. This results in withdrawing its lower edge 1262 (FIG. 125) from the path followed, on their return upward, by the triangular lugs, such as 1290, of the longitudinal levers which had been lowered for striking.

From the moment when the electro-magnets have been switched off and when the rigid pivoting frame has stopped its travel downwards to return upwards, the longitudinal levers which had been driven downwards continue their travel by momentum until stopped by the corresponding characters such as 163 mounted on the type bars such as 129 meet the cylinder (with interposition of the paper and ribbon) for printing.

The longitudinal levers subsequently return upwards to their rest position by the action of return spring such as 94. In the example the return of the different parts of the striking device is facilitated by springs such as 928 fastened to the intermediate levers such as 626, as is known.

It is obvious that any longitudinal lever other than the one for spacing and those for characters can be powered by the same process; these other longitudinal levers can for example be the back spacer, tabulator or any other operating as an auxiliary drive.

The power device such as it has just been described comprises only the micro-contact 1314 permitting the electric circuit to be open in rest position and closed during the beginning of their travel. This micro-contact suffices for the device to function. A second circuit switch-off device is nevertheless provided, operated by any part (front or back) of the pivoting rigid frame shown in FIGS. 132 and 127, a little before its end of travel.

At first sight, this second micro-contact is unnecessary; but it presents the following advantages:

*First advantage.*—In the case in which accidentally the entire device did not come back to its rest position, because one of the parts got struck, or because one return spring failed, this circuit switch-off around the end of travel would prevent the electro-magnets from remaining energized and deteriorating by overheating. This switch-off is arranged to place slightly later than the one provided by the release of the pawls 1301, 1302 when the latter release the reverse lever 1308.

*Second advantage.*—This second circuit switch-off permits the functioning of a repetition device which will be described further.

A description will now be given, by way of example, of a form of execution of this second circuit switch-off device.

The lever 1340, part of the rigid pivoting frame shown in FIG. 132 carries in projection towards the left of the machine, a finger 1364. On this finger is mounted a push-screw 1365 with counter-nut 1366. The threading provides an adjustment of the switch-off place on the travel path. At a suitable distance from the rest position of this screw, is a second micro-contact 1367 which can be identical to the first micro-contact 1314 (FIG. 135). This second micro-contact 1367 is disposed in such a way that, a little before the end of its travel, the screw 1365 meets the lever 1368 of the micro-contact. The circuit which includes the electro-magnets are connected to the terminals of this micro-contact, so that, contrarily to what happens for the micro-contact 1314, the circuit is opened when the lever 1368 is operated and closed when this lever is brought back to its rest position by its return spring.

*Functioning*

When, because of a striking or of a group of simultaneous strikings, the pivoting frame and in particular the lever 1340 moves in an angular movement in the direction of the arrow 1296 (FIG. 127) by the action of the electro-magnets, the screw 1365 of the finger 1364, a little before the end of its travel, engages the lever 1368 of the micro-contact 1367 and drives this lever in its travel, and this switches off the circuit.

It is evident that the finger 1364 could as well be set on the similar lever 1352 on the right, at the corresponding place, or be in any other place of the rigid pivoting frame, provided that this place is sufficiently remote from the axle 1345. It could, in particular, be set on the front crossbar 1354. In any case, the corresponding micro-contact 1367 would be disposed accordingly.

One can also optionally dispose on the right of the pivoting frame a finger and a micro-contact identical to the one on the left which has just been described, so as to obtain a double cut-off, and thus increase the safety.

The power operation by means of one only or, optionally, of two electro-magnets, which has just been described, constitutes one of the means comprised by the invention for accelerating the striking and reducing the fatigue. It is obvious that it is possible to use the invention only partially and consequently this means can be utilized without having to utilize all the other means comprised by the invention.

*Means for Adjusting the Force of the Stroke*

In order to be able to adjust the strength of striking, in particular in an operation in which a number of strokes are simultaneously made, the invention provides for the placing of a rheostat in the electric circuit when the machine is powered by means of electro-magnets. This rheostat has not been shown.

*Means for Using Power Proportional, to the Number of Letters to Be Printed*

In a usual alphabetical machine, considering that in all cases only one character at a time is printed, one can proportion the power of the stroke to the surface of the character carrier by each bar.

In the machines of the invention the number of characters printed simultaneously varies from one to a number of striking groups; five for instance. If only one electro-magnet is used the latter is calculated so as to have sufficient power for printing simultaneously the maximum number of characters provided for.

If two electro-magnets are used to operate the powered pivoting frame described, they can both be actuated in all the cases of spaces and character strokes and whatever the number of characters to be printed simultaneously is.

The invention however, optionally provides for, proportioning, within a certain limit, the power to the number of characters, this being done by following means.

The two electro-magnets are disposed as has been described but only the left one 1320 (FIGS. 132, 131) is switched on by the slide(s). The right electro-magnet 1321 is switched on only when characters are struck in one or several groups of the larger numbered groups, for example, group III and following ones. To obtain this result a micro-contact, which can be of same type as the one 1314 shown in FIG. 135, is disposed under the machine, in such a way that its lever is operated by the group bar 1080 (FIG. 77) of group III when the latter is operated by a striking in group III or in one of the following groups. For this purpose the micro-contact is mounted on a support which is fixed on the base. The group bar 1080 is provided with a finger which acts on the lever of the micro-contact. This assembly which is very simple, is not shown. Other methods can be adopted as well, and in particular the following variation.

The micro-contact is disposed in such a way that its lever is operated, not by group III bar 1080, but by its lever 1105 (FIGS. 90, 62) which is secured to the group bar 1080. One can for example, for this purpose, extend the lever 1105 upwards, higher than the lever of the small connecting-rod 1113, FIG. 70. The micro-contact can then be fixed either on the escapement frame 995 (FIG. 71) or on its shoe 990. These various simple assemblies are not shown.

*Repetition Device*

In the case of power operation by one only or two electromagnets, as has been explained, one can optionally obtain automatic repetition of a given character or of a given group of characters, struck simultaneously with or without spacing or with only one spacing, by pressing an additional key called "repetition" "REP" FIG. 1, at the same time as the key(s) which normally produces the printing of these characters and of this spacing.

A part of this result is already achieved in certain usual electrical alphabetic machines, but this possibility is limited to some characters, moreover struck separately (for example the underlining stroke and the full stop stroke) as well as to the spacing. Furthermore, in these machines this partial result is obtained by means differing from those that are going to be set forth and it comprises the utilization of a motor with continuous rotating motion.

It has been explained that the machines of the invention can be powered by means of this known means utilizing an electric-motor and a constantly revolving smooth or grooved cylinder on which, by clutching, connections are made with characters corresponding to the struck keys. In this case it is very easy to adapt the known partial repetition device to the machines of the invention.

In the case in which, on the contrary, the machines of the invention are powered by means of one or two electro-magnets, they can optionally comprise the complete repetition device which is going to be described. In a first embodiment the repetition key acts by preventing the pawls 1301 and 1302 (FIGS. 131, 129) from releasing in the course of their travel the reverse lever 1308, FIG. 125. For that purpose the repetition key brings about the removal of the stop 1324 from the travel path that is followed by the extensions 1322 and 1323 of the pawls 1301 and 1302.

This repetition key can, for instance, either give rise to the displacement of this stop 1324 upwards, or to its advance. For that purpose the acting part of the stop is articulated on its base. This withdrawal of the stop has the effect of keeping the circuit of the electro-magnets closed when the pawls 1301 and 1302 advance.

In a second embodiment the key called "repetition" is mounted with connections which, instead of acting by retracting the stop 1324, FIG. 125, act by having the lever 1313 (FIG. 135) of the micro-contact 1314 lowered. This lever is therefore held in the position which corresponds to the closing of the circuit, so long as the repetition key is depressed.

The connections between the petition key "REP" FIG. 1 and the part on which it has to act, according to the adopted variation, have not been represented. They are in fact very simple and can for instance consist of push-rods or pull rods and reverse levers of known types.

The two above embodiments assume that the machine has been mounted not only with the micro-contact 1314 which would be indispensable even if the machine did not have the repetition device, but also with the second micro-contact 1367 (FIGS. 132, 127) and eventually a third on the right. It has already been explained that the second micro-contact, and eventually the third, have the function of opening the circuit in which are connected the electro-magnets when the pivoting frame and consequently the power bar 1362 are sufficiently lowered.

When the repetition key is depressed, it impedes opening the circuit by the back micro-contact 1314, FIG. 135; it is therefore necessary that the circuit be opened at the end of the travel of the power bar, otherwise, the electro-magnets would hold this bar lowered and the latter would not return and engage again the lever for which the repetition of descent is desired. The second micro-contact 1367, and eventually an identical micro-contact on the right, constitutes not only a safety device but is indispensable for obtaining the effect of the respective striking of an electrical bell which is desired in bringing about the repetitive strikings.

This process makes possible the repeated striking of any character of the keyboard without any limitation. It allows in particular the printing of double letters, of repeated figures, for example in numbers such as 222, of any repeated signs such as the full stop, the underlining stroke or any other. The same process also permits the repetition, without any limitation, of the lowering of the lever which produces the single space or a multiple space, and this is obtained by a single lowering of the fingers, pressing simultaneously the repetition key and the space respectively. Movements of the carriage to the desired length are thus obtained. It suffices to release the space key and the repetition key when the spacing reaches the desired length.

Functioning of the Repetition Device

One or several normal character keys or single or multiple space keys being pressed, the longitudinal levers are driven as in the normal case, at first by the action of the fingers, then, the circuit being switched on, they are driven for the rest of their travel by the electro-magnet(s), as in the normal case. Considering that the repetition key has been depressed, the latter prevents the opening of the circuit by the micro-contact 1314, FIG. 135, either by retracting the stop 1324 (FIG. 125) in the first variation, or by the action on the lever 1313 of the micro-contact 1314 in the following variation. But, a little before the end of travel of the power bar 1362, FIGS. 125, 132, the circuit is nevertheless switched off by the second micro-contact 1367, FIG. 125.

The rigid pivoting frame comprising the levers 1340 and 1352 (FIG. 132) and the powered bar 1362 goes therefore up again as in the case of normal striking. However, as soon as this group has effected a certain part of its return travel, considering that the finger 1364 has ceased to act on the micro-contact 1367, the circuit is closed again. Nevertheless, the power bar continues its travel upwards by momentum, added to the effect of the return springs 1268, 1357 (FIG. 132) and this in spite of closing the circuit of the electro-magnets resulting from the release by the finger 1364 of the micro-contact 1367. The bar 1362 reaches thus its rest position, or at the least runs beyond the position in which the longitudinal levers have been kept lowered, for which the lowering repetition and their engaging lugs such as 1290 (FIG. 125) are desired. The momentum no longer, acting or acting less, the action of the electro-magnets becomes again preponderant and the power bar 1362 lowers again, driving again the longitudinal levers corresponding to the keys which have not been released. The same cycle recurs as in an electric bell as long as the repetition key "REP"

(FIG. 1) has not been allowed to return to its rest position.

It is evident that if for the first cycle several normal keys have been depressed, either printing ones, or space ones, or of both categories, one can, after one or several actions of the corresponding longitudinal levers, allow one or several of the lowered normal keys to return to their rest position. In this case, the repetition is continued with only the longitudinal levers the keys of which are held down. These levers may correspond to printings or to spacings. One can even, after any number of new cycles, release successively one or several other normal keys among those which had been lowered for the first cycle.

One can also, after one or several cycles, lower one or several additional normal keys of printing or of spacing. In the following cycles the corresponding longitudinal levers are then driven by the power bar at the same time as those which had been so driven in the course of the preceding cycle, if the corresponding keys have not yet been released.

This possibility of repetition which is broader and more varied than those afforded by the known processes, makes for increase in printing speed and diminution of fatigue which are the chief aims of the invention.

Partial or total extension of the applications of the invention to:

Alphabetical typewriters (for example, make possible the simultaneous striking of the bank spaces and of characters).
Accounting typewriters (alphabetic or syllabic).
Stenotyping machines.
Teleprinters.

The invention limited to certain of these parts, can be applied to the alphabetical machines with a view to improving these. Thus, it permits the execution of an alphabetical machine with variable escapement according to the character struck, the characters being, for example, of varying widths. For that purpose an escapement device similar to that described is adopted, which conditions the advance of the carriage to the group to which the character struck belongs. The type bars or the keys which control them are classified respectively in different groups, each group corresponding to an escapement of given amplitude. These groups can be disposed in the order of amplitude of their respective escapements, as in the syllabic machine described. Each group then corresponds to a proper area of the keyboard. (Contingent upon certain interconnections.) However, if one prefers, the keyboard can be allowed to keep its customary aspect. For that purpose one can, for example, place under the back part of the longitudinal levers several group bars similar to those of the FIGS. 77, 88, 89 to 92, but by placing parallel certain of them, as has already been done in certain usual typewriters. This process being known, it will not be described in detail.

It has been noticed that the mobile parts which operate the group bars can be other than the longitudinal levers. Whatever the variation chosen, each group bar corresponds to a given character width.

To obtain this result a known means may for example used, which consists in providing the levers (or the parts of another series) with projections. The projections of the levers which correspond to a bar are on the same line and displaced with regard to those of the levers of the other groups of characters.

In such an alphabetical machine with variable escapement according to the width of the different characters, one will be able to allow the simultaneous striking of a character and of a blank space by the described means in connection with the syllabic machines.

It is to be noticed that in such a machine the escapement universal bar cannot be limited to the groups I and II like the bar 969, FIG. 49. The escapement bar, whatever the series of parts which operates it, must be extended before all the groups.

The utilization of the invention, limited to a part of the described means, enables also the simultaneous striking of a character and of a blank space in an alphabetical machine whose escapement does not vary according to the widths of the characters.

In what precedes, the machines for alphabetic or syllabic typewriting have only been considered. It is nevertheless evident that the invention, can also be used with accounting typewriters, teleprinters or stenotyping machines. For this latter case, it will suffice to keep only the necessary characters for each of the sounds to be provided for. One will therefore have a machine with reduced keyboard enabling a great striking speed and presenting the advantage of offering the text in horizontal lines, which facilitates reading in comparison with the printing of the known stenotyping machines, and requiring a smaller surface of paper.

These stenotyping machines (as provided above for the machines for typewriting) can be equipped with characters blocks of different widths, having different spacings. This makes it possible in particular, to utilize certain characters blocks each carrying several letters corresponding to a same syllable.

It goes without saying that, in all that precedes, only precise cases which have merely indicative and not limitative meaning have, in general, been considered the sections or parts of machines which are identical or similar to the corresponding elements of the usual typewriters have not been described, and all the improvements which these receive can be utilized in connection with the devices constituting the present invention.

My invention being described, I claim:

1. Printing machine, in which several characters of different cases can be printed simultaneously, while at the same time are provided, at distinct printing points disposed successively in the writing direction, comprising a mobile carriage, a keyboard comprising type keys, space keys and function keys, type bars operated by the type keys, each of the type bars comprising any number of cases, and, in each case, any number of characters, the type bars being distributed over several groups each having a distinct printing point, the printing points of the different groups being disposed successively in the writing direction in the order of the groups, a first combination of single type keys each operating one type bar only, a second combination of multiple type keys each operating at least two type bars, some of the single keys and of the multiple keys being disposed according to a matrix constituted by columns and lines making between themselves any angle, several multiple keys of the same column operating some of the type bars of a first set of type bars which each belong to different groups of type bars, several multiple keys of the same line operating some of the type bars of a second set of type bars which each belong to groups of type bars different from one another and different from the groups of bars of the first set of type bars, the printing points of all these groups being disposed successively in the writing direction, so that a multiple key disposed at the intersection of any column and line simultaneously operates type bars belonging to the first set and corresponding to several keys of the column and type bars belonging to the second set and corresponding to several keys of the line, this multiple key consequently controlling the simultaneous printing of several characters, some of the single keys operating also one of the type bars operated by the multiple keys, the machine comprising also means to modify selectively the case position of the different groups of type bars, each independently of the others, so as to print simultaneously characters of different cases located on type bars belonging to different groups, and finally means for producing a carriage displacement whose amplitude is proportional to the number of characters printed simultaneously, this amplitude being augmented by the number of blank spaces provided before, between or after the printed characters.

2. Printing machine in which several characters, of different cases, can be printed simultaneously while at the same time spaces are provided at distinct printing points disposed successively in the writing direction, comprising a mobile carriage, a keyboard comprising type keys and function keys, type bars operated by the type keys, each of the type bars comprising any number of cases, and, in each case, any number of characters, the type bars being distributed over several groups each having a distinct printing point, the printing points of the different groups being disposed successively in the writing direction in the order of the groups, a first combination of single type keys each operating one type bar only, a second combination of dual type keys each operating two type bars, some of the single keys and of the dual keys being disposed according to a matrix constituted by columns and lines making between themselves any angle, several dual keys of the same column operating one single type bar belonging to the first group of type bars, several dual keys of the same line operating one single type bar belonging to the second group of type bars, whose printing point is immediately next to that of the type bars of the first group, so that each dual key disposed at the intersection of any column and line simultaneously operates two type bars the one corresponding to several keys of the column and the other corresponding to several keys of the line and so that this key consequently controls the simultaneous printing of two characters at adjoining printing points, the type bar of the first group operated by several dual keys of a given column being also operated by a single key located in the same column, the type bar of the second group operated by several dual keys of a given line being also operated by a single key located in the same line, the machine comprising also means for modifying selectively the case position of the different groups of type bars, each independently of the others, so as to print simultaneously characters of different cases located on type bars belonging to different groups, and finally means for producing a carriage displacement whose amplitude is proportional to the number of characters printed simultaneously augmented by the number of blank spaces provided before, between or after the printed characters.

3. Machine according to claim 2 in which the dual type keys, which operate simultaneously two type bars, are distributed over the central part of the keyboard and in which the single keys operating one type bar only, not operated by the dual keys, are distributed on the periphery of the key board.

4. Machine according to claim 2 in which some of the keys operating type bars belonging to groups others than the first and the second are distributed over the keyboard in the order of the numbers of the groups of type bars, in the writing direction, and keys of the different groups overlap one another so as to permit the simultaneous utilization of different fingers of both hands, thumbs, and of the other parts of the hand, such as the left and right parts of the palm, and so as to avoid displacements of the hands in relation to their most frequent position.

5. Machine according to claim 2 in which the single type keys operating one type bar only of the first group are distributed on the highest lines of the keyboard as well as on the first column of the keyboard, in the writing direction and on the last lines in the lower part of the keyboard.

6. Machine according to claim 2 comprising, in the last lines in the lower part of the keyboard, keys lengthened laterally and designed to be operated by the thumb and keys, whose surface is increased laterally and longitudinally, designed to be operated by the palm of the hand.

7. Machine according to claim 2 comprising at least one column of single type keys raised in relation to the keys of the other columns and inserted between two columns of dual type keys.

8. Machine according to claim 7 in which those of the single keys of the raised column which are disposed on the same line as several dual type keys operate the same type bar as the dual type keys of this line.

9. Machine according to claim 1 in which the type bars comprise three cases, the small letters being in the first case, the capital letters in the second case, the figures and signs in the third case.

10. Machine according to claim 1 in which the longitudinal axis of the keyboard is displaced transversely with respect to the axis of the machine.

11. Machine according to claim 1 comprising a base, a connection box, carrying the type keys and the function keys, mounted removably on this base, this connection box comprising a cover and a bottom presenting respectively opposite steps, holes bored in the opposite steps, key rods carrying the keys proper and each sliding without pivoting into a pair of holes bored in the aforesaid steps, so that the keys all move parallel to one another, return-springs returning the different key rods to rest position, and at least one stop carried by each key rod so as to limit the upward movement of the key.

12. Machine according to claim 11 comprising longitudinal levers operating the type bars and controlled by the type keys, the multiple type keys each operating simultaneously several longitudinal levers operating type bars belonging to different groups.

13. Machine according to claim 12 in which each of the multiple type keys operates a longitudinal lever by the lower tip of the key rod and carries at least the lug which operates at least one other longitudinal lever.

14. Machine according to claim 11 in which the connection box comprises pivoted transverse levers each operating a longitudinal lever and in which several multiple type keys of the same line of the keyboard operate, in a unilateral way, the same transverse lever.

15. Machine according to claim 14 in which the multiple type key rods operating a transverse lever each carry a lug operating the aforesaid lever.

16. Machine according to claim 11 comprising longitudinal levers controlled by the keys of the keyboard and intermediary levers disposed between the corresponding key and corresponding longitudinal lever so as to permit each key laterally distant from the corresponding longitudinal lever to operate the latter.

17. Machine according to claim 16 in which the intermediary levers are articulated on the connection box.

18. Machine according to claim 1 comprising a longitudinal space lever, two independent space keys, symmetrical in relation to the longitudinal axis of the keyboard, and means unilaterally connecting these two space keys to the longitudinal space lever so that the latter can be operated by either one of the two space keys, without driving the other key.

19. Machine according to claim 18 in which both space keys each have a form covering the normal location of three keys disposed in a triangle.

20. Machine according to claim 11 comprising longitudinal levers operated by the type keys and the function keys, in which some of the longitudinal levers are each located in one and the same vertical plane, whereas other longitudinal levers are counterbent outside their principal vertical plane so that their front part can be operated by the key rod associated with the considered longitudinal lever.

21. Machine according to claim 11 comprising longitudinal levers operated by the type keys and the function keys, at least one axle around which the back part of the longitudinal levers is articulated the front part of these levers being located under the connection box.

22. Machine according to claim 11 comprising longitudinal levers operated by the type keys and the function keys, in which some of the longitudinal levers are operated by one key rod only and other longitudinal levers are operated independently by several key rods operating each in its turn.

23. Machine according to claim 11 comprising longitudinal levers operated by the type keys and the function keys, means bilaterally linking some of the keys with at least one longitudinal lever, means unilaterally linking some of the keys with one longitudinal lever only and means unilaterally linking several keys of the same column of the keyboard to the single longitudinal lever operating a type bar.

24. Machine according to claim 23 in which certain longitudinal levers which each operates at least one type bar and which are operated each by several type keys of the same column, said keys being unilaterally linked to each of said levers, the said longitudinal levers comprising two parts, namely one front part and one back part, the front part being articulated on the back part and being mounted on a deformable parallelogram of which one of the vertical sides is fixed while the other movable vertical side is solid with the front part of the longitudinal lever, so that the front part of this lever can move parallel to itself when acted upon by one of the keys of the column, and so that, for the keys belonging to the different lines having an equal distance to travel, the angular movement of the back part of the longitudinal lever is always of the same amplitude whatever the line of the keyboard in which the struck key is located.

25. Machine according to claim 24 in which the front part of certain longitudinal levers is constituted by a bar provided with steps on its upper part, each step being overhung by the rod of a key of the column, and in which the deformable parallelogram comprises a fixed support solid with the base of the machine, two small parallel connecting-rods articulated on this support and articulated also on the front part of the longitudinal lever, these small connecting-rods constituting the upper and lower sides of the parallelogram while the front part of the longitudinal lever constitutes the front part and the support the fixed back part.

26. Machine according to claim 1 comprising a combination of stroke-guides, each stroke-guide being associated with a group of type bars, the different stroke-guides ensuring the guiding of the upper part of each of the type bars operated at the same time.

27. Machine according to claim 26 in which the stroke-guide of the first group and the stroke-guide of the second group are independent of one another and are also independent of the stroke-guides of the other groups.

28. Machine according to claim 26 comprising several segments, each segment being associated with a corresponding group of type bars, the stroke-guide of a given group of type bars being fixed on the corresponding segment.

29. Machine according to claim 26, comprising at least three character cases and at least three type bar groups respectively supported by at least three segments, in which the stroke-guide of the second group, when in its rest position, is located at a level lower than that of the stroke guides of the other groups.

30. Machine according to claim 29 in which the character blocks of the type bars of the second group present a lateral thinning between the character of the second case position and the character of the third case position, so as to enable the character block of the bars of the second group to pass between the stroke-guides of the first and third group, when the segment carrying the type bars of the second group is brought into second case position, with the segments of the other groups remaining in the first case position.

31. Machine according to claim 1 in which the type bars comprise three cases, comprising means for bringing separately the type bars of the first group into second-case position, means for bringing separately the type bars of the second group into second-case position, means for bringing the type bars of all the groups into second-case position, and means for bringing the type bars of all the groups into third-case position.

32. Machine according to the claim 31 in which the keyboard comprises at least four position-shifting keys, namely a second-position key for the first group to bring the type bars of the first group separately into second case position, a second position key for the second group to bring the type bars of the second group separately into second case position, a second-position key for all the groups to bring the type bars of all the groups into second case position, and a third-position key to bring the type bars of all the groups into third-case position, the keyboard comprising moreover, a locking key in second case position and a locking key in third case position.

33. Machine according to claim 32 comprising several movable independent segments respectively associated with at least three different groups of type bars, the segment of the first group constituting half the total of the segments, that is occupying a quarter of a circle and being separated from the segment of the second group by a vertical slit, the segment of the second group being separated from the segment of the third group by an oblique slit.

34. Machine according to claim 33 in which the segments of the groups other than the first and second ones are fixed on the same movable support.

35. Machine according to claim 33 in which the segments of the first and second groups are displaced symmetrically by half an interval with respect to the longitudinal axis of the machine.

36. Machine according to claim 33 in which each of the segments of the groups other than the first and the second ones is offset by a single interval in relation to the segment which precedes it.

37. Machine according to claim 33 comprising four position-shifting keys, an axle carrying one radial lever and carrying moreover three retractable and adjustable second-position stops disposed respectively in the path of the segments of the first, the second and the other groups, a position-shifting axle carrying five radial levers, means linking three of these radial levers respectively to the segments of the first, second and other groups, return-springs for these segments, means connecting another of these radial levers to the longitudinal lever operated by the second position key for all the groups and means connecting another of the radial levers to the longitudinal lever operated by the third position key.

38. Machine according to claim 37 in which the longitudinal lever operated by the second position key for all the groups is connected with one of the radial levers carried by the position shifting axle, so that when this longitudinal lever is operated by the aforesaid key, it causes the angular movement of the position shifting axle on itself and of the other radial levers which then exert respectively a traction on all the segments of the different groups, the adjustable stops of second position then limiting the motion of the segments at the second position when the corresponding key is operated.

39. Machine according to claim 37 in which the longitudinal lever operated by the third position key is connected with a radial lever carried by the position shift axle and is also connected with the radial lever carried by the other axle which carries retractable second position stops, so that the latter radial lever is operated by the aforesaid longitudinal lever in such a way that the second position stops are retracted when the third position key is operated, the machine comprising moreover adjustable stops limiting the run of the segments in third position.

40. Machine according to claim 37 comprising a longitudinal lever of second position for the first group operated by the second position key of the first group, a traction device for the segment of the first group operated by the aforesaid longitudinal lever and a second position stop limiting the motion of the segment of the first group.

41. Machine according to claim 37 comprising a longitudinal lever of second position for the second group operated by the second position key for the second group, a traction device for the segment of the second group operated by the aforesaid longitudinal lever, and a second position stop limiting the motion of segment of the second group.

42. Machine according to claim 1 comprising an escapement device which comprises a rack mounted to pivot on the carriage, a pinion with which the rack is engaged, an axle mounted to turn on the escapement frame and on which is mounted a pinion, this pinion being free to turn on the axle in the direction of the carriage return and locked in the other direction by at least one pawl, one escapement toothed wheel fixed on the aforesaid axle, an escapement universal bar operated by the keys of the keyboard, an escapement slide fixed on the escapement universal bar, an adjustable projection carried by the escapement slide, a return-spring of the escapement slide and of the escapement universal bar a dog block mounted to oscillate, a fixed dog carried by the dog block, which is disengaged from the escapement wheel when the aforesaid device is in rest position, a mobile dog coaxial with the escapement wheel carried by the dog block and mounted to pivot and slide in relation to the escapement wheel axis, so that this mobile dog will meet each time the teeth of the escapement wheel in the same way although the angular movements of this dog are of very varied amplitudes, a zero stop against which the mobile dog stays at rest in rest position, a tooth of the mobile dog being then engaged with the escapement wheel in this position, retractable stops each corresponding to a group of type bars, these retractable stops being distributed along the path of the mobile dog, a fixed stop limiting the maximum angular movement of the mobile dog in the case in which all the retractable stops have been retracted, and means for retracting automatically the retractable stop corresponding to a given group, when a type key of the group considered or a space key of the group is operated.

43. Machine according to the claim 42 comprising a group universal bar, associated with each group of type bars and which is disposed in such a way as to be displaced by one of the elements that each key of the group considered sets in motion, elastic means returning the group universal bars to rest position, and means connecting the different group universal bars to the retractable stops so that the latter are retracted outside the path of the mobile dog, when the corresponding keys are operated, these retractable stops being all located on the path of the mobile dog when they are at their rest position.

44. Machine according to claim 43 in which each of the group universal bars is mounted to pivot on an axle.

45. Machine according to claim 42 comprising means linking unilaterally each of the retractable mobile stops of the mobile dog with the stop which precedes it on the starting path of the mobile dog, so that, when one of the stops is withdrawn, all the preceding ones are also withdrawn at the same time, even those which might correspond to a group in which no key had been struck.

46. Machine according to claim 43 comprising means unilaterally linking each universal group bar and the group universal bar corresponding to the preceding group.

47. Machine according to claim 42 in which the dog block at its upper part comprises a fork, a ring being mounted pivotally on this fork, the axle of the escapement wheel running through the aforesaid pivoting ring, the mobile dog comprising a hub, this hub being run through by the axle of the escapement wheel, and being divided into two parts in such a way that these two parts, strung on the escapement wheel axle, are located on both sides of the pivoting ring, so that, when the dog block is tilted, its upper part drives the ring it carries, along the axle common to the escapement wheel and so to the mobile dog, and that the ring pushes the mobile dog causing it to slide along the axle, what disengages the mobile dog from the escapement wheel whereas the fixed dog engages with the escapement wheel.

48. Machine according to claim 42 in which the means are provided for retracting the zero stop, when one of the space keys has been struck at the same time as type keys, so as to increase the amplitude of the return angular movement of the mobile dog and consequently to obtain a blank space following the printing of the characters.

49. Machine according to claim 43 comprising at least one space key, one space longitudinal lever operated by these keys, a space slide operated through the space longitudinal lever, elastic means returning the space slide to its rest position, an adjustable projection carried by the space slide, this projection being designed to come into contact with the dog block and to cause it to tilt when a space key is operated, if a type key has not been operated at the same time.

50. Machine according to claim 49 comprising a character slide, elastic means returning the aforesaid slide to its rest position, means linking unilaterally the group universal bars to the character slide in such a way that the slide is operated by group universal bars each time a stroke is made in any group, the space slide and the characters slide being mounted in such a way that, when one or several keys belonging to different groups and one space key are struck simultaneously these two slides move forward at the same time in a movement of a same amplitude whilst remaining parallel to one another, the characters slide and the space slide each carrying a projection whose position is adjustable, the machine comprising moreover a pivoting part situated between the paths that the two projections carried respectively by the character slide and by the space slide follow respectively, a lever carrying this pivoting part and controlling the retraction of the zero stop of the mobile dog, a return-spring maintaining the pivoting part in its rest position, so that, when both character and space slides move forward simultaneously, the pivoting part is then driven by the projections carried by both slides and causes then the retraction of the zero stop of the mobile dog.

51. Machine according to claim 50 in which the pivoting part carries two rollers designed to come into respective contact with the projections carried by both slides.

52. Machine according to claim 51 in which the pivoting part, its two rollers included, has a lateral overall dimension superior to the distance which separates the paths of both projections carried by the space slide and the character slide.

53. Machine according to claim 51 in which the pivoting part and the one of its rollers which is disposed on the side of the character slide are mounted in such a way that neither the pivoting part nor the roller considered are, at rest position, on the path of the projection carried by the character slide.

54. Machine according to claim 51 in which the pivoting part and the one of its rollers which is disposed on the side of the space slide are mounted in such a way that, in rest position, the aforesaid roller is located partially on the path of the projection carried by this slide.

55. Machine according to claim 50 comprising a return-spring of the lever controlling the retraction of the rest stop of the mobile dog called zero stop, the pivoting part being mounted on this lever, the return-spring of the pivoting part being weaker than the return-spring of the aforesaid lever.

56. Machine according to claim 50 comprising a locking pawl of the zero stop maintaining the zero stop in its retracted position, this locking pawl being retracted by the mobile dog when, during its return movement, the latter runs beyond the rest position of the zero stop, this dog preventing however the return of the zero stop up to its rest position so long as it has not run again beyond this rest position during its new starting course.

57. Machine according to claim 43 comprising for each group of type bars, a group space longitudinal lever, a group space key operating the aforesaid longitudinal lever, means linking unilaterally the space longitudinal lever of a group to the universal bar of the group so that, when a group space key is operated, the mobile stop corresponding to the group and stopping the mobile dog is retracted, and the effect on the escapement being the same as if a type bar of the group had been operated, the striking of a group space key of a given order producing a spacing corresponding to the number of single intervals represented by the order number of this group.

58. Machine according to claim 50 comprising longitudinal levers operated by the type keys and the function keys of the machine, a frame mounted to oscillate on the base of the machine, at least one electro-magnet operating the aforesaid oscillating frame, at least a return-spring of the oscillating frame, a pivoting bar articulated on the aforesaid oscillating frame, at least one return-spring for the aforesaid bar, a projection carried by each longitudinal lever and disposed in such a way that, as soon as each longitudinal lever has begun its run, this projection is on the path of the edge of the pivoting bar articulated on the oscillating frame, at least one projection carried by the pivoting bar, at least one adjustable stop mounted on the base of the machine and co-operating with the projections of the pivoting bar in such a way that when the oscillating frame returns to its resting position, and a little before the end of its return run, the stops are met by the projections of the pivoting bar, so that the latter pivots in relation to the oscillating frame in such a position that it is withdrawn from the path traversed by the projections of the longitudinal levers when the corresponding keys of these levers are operated, and finally means operated by the different kys to switch the electro-magnets on and off, so that when the oscillating frame is lowered by the action of the electro-magnet(s), the edge of the pivoting bar on its own path, encounters the projections of the longitudinal levers which have started their angular movement as an effect of a stroke on the corresponding key.

59. Machine according to claim 58 in which the means switching the electro-magnets on and off comprise a pawl mounted to pivot on the space slide, a pawl mounted to pivot on the character slide, a reversing lever on which both pawls are hooked at rest position, a first contact controlling the switching on of the electro-magnets, this contact being operated by the aforesaid reversing lever so that, when one or the two slides move forward, the corresponding pawls drive the reversing lever, this lever acting then on the contact and controlling the switching on of the electro-magnets, the machine comprising besides an adjustable stop disposed in such a way that the pawl(s) in course of their movement run against this stop and are thrown over in such a way as to break the linking between the slide corresponding to each pawl and the reversing lever, and finally a return-spring which returns the reversing lever to its rest position as soon as the latter is released.

60. Machine according to claim 59 comprising a repetition key, means for preventing the opening of the first contact, these means being controlled by the aforesaid repetition key, a second normally closed contact which is serially connected with the first contact in the supply circuit of the electro-magnets, this second contact being opened by the mobile combination, oscillating frame and pivoting bar, a little before the end of their run, so that the striking of one or several characters or blank spaces is automatically repeated so long as the corresponding keys remain depressed and the repetition key does not return to its rest position.

61. Machine according to claim 60 in which the repetition key is linked to the adjustable stop of the contact pawls, so that this adjustable stop is retracted when the repetition key is operated.

62. Machine according to claim 60 in which the repetition key is linked to the first contact device, so that this first contact remains closed when the repetition key is operated.

63. Machine according to claim 1 in which some of the type bars have several characters per case, said characters being juxtaposed and belonging to different striking groups, whereby the means to modify the case position of the different groups of type bars make it possible to print the juxtaposed characters at the same time as characters fixed on other type bars belonging to different groups, the latter characters being either of the same case or of a case different from the one to which the juxtaposed characters belong.

References Cited in the file of this patent
UNITED STATES PATENTS

| | | |
|---|---|---|
| 543,085 | Dennis | July 23, 1895 |
| 552,774 | Perry | Jan. 7, 1896 |
| 1,287,521 | Tioli | Dec. 10, 1918 |

FOREIGN PATENTS

| | | |
|---|---|---|
| 28,599 | Great Britain | 1903 |